(12) United States Patent
Trabold et al.

(10) Patent No.: US 12,171,230 B2
(45) Date of Patent: Dec. 24, 2024

(54) HERBICIDAL COMPOSITIONS

(71) Applicant: Bayer Aktiengesellschaft, Leverkusen (DE)

(72) Inventors: Klaus Trabold, Heidelberg (DE); Lothar Lorentz, Waldbroel (DE); Hubert Menne, Mainz-Kastel (DE); Elmar Gatzweiler, Bad Nauheim (DE); Christopher Hugh Rosinger, Hofheim (DE); Klaus Bernhard Haaf, Kelkheim (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 827 days.

(21) Appl. No.: 17/299,724

(22) PCT Filed: Dec. 2, 2019

(86) PCT No.: PCT/EP2019/083226
§ 371 (c)(1),
(2) Date: Jun. 3, 2021

(87) PCT Pub. No.: WO2020/114932
PCT Pub. Date: Jun. 11, 2020

(65) Prior Publication Data
US 2023/0032505 A1    Feb. 2, 2023

(30) Foreign Application Priority Data
Dec. 7, 2018  (EP) ..................... 18211041

(51) Int. Cl.
*A01N 43/80*    (2006.01)
(52) U.S. Cl.
CPC .................... *A01N 43/80* (2013.01)
(58) Field of Classification Search
CPC ........ A01G 31/06; A01G 31/02; A01G 31/00; A01G 9/24; A01G 9/247
See application file for complete search history.

(56) References Cited

U.S. PATENT DOCUMENTS

| 9,078,442 B2 | 7/2015 | Willms et al. |
| 2014/0100108 A1 | 4/2014 | Willms et al. |

FOREIGN PATENT DOCUMENTS

| WO | 2010130798 A1 | 11/2010 | |
| WO | 2012130798 A1 | 12/2012 | |
| WO | WO-2013174845 A1 * | 11/2013 | ............. A01N 25/00 |
| WO | 2018228985 A1 | 12/2018 | |

OTHER PUBLICATIONS

International Search Report of International Patent Application No. PCT/EP2019/083226 dated Jan. 28, 2020.

* cited by examiner

*Primary Examiner* — Zohreh A Fay
(74) *Attorney, Agent, or Firm* — Michael VanEngelen

(57) ABSTRACT

The present invention provides compositions comprising herbicidally active compounds (A) and (B), where (A) represents one or more compounds of the general formula (I) or their agrochemically acceptable salts [component (A)],

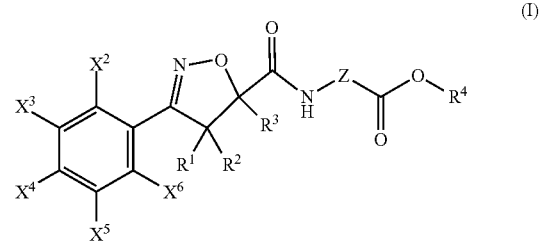

and (B) represents one or more herbicides [component (B)]. The application furthermore relates to a method and to the use of the herbicidal composition according to the invention for controlling harmful plants or for regulating growth.

14 Claims, No Drawings

HERBICIDAL COMPOSITIONS

CROSS-REFERENCE TO RELATED APPLICATIONS

This application is the National Stage entry of International Application No. PCT/EP2019/083226, filed 2 Dec. 2019, which claims priority to European Patent Application No. 18211041.1, filed 7 Dec. 2018.

BACKGROUND

Field

Description

The invention is in the technical field of crop protection products that can be used to counter unwanted plant growth on uncultivated land, for preparation for seeding or in crops, and comprise a combination of at least two herbicides as herbicidally active compounds, wherein the compositions comprise herbicidally active compounds (A) and (B), in which (A) represents one or more compounds of the general formula (I) or agrochemically compatible salts thereof [herbicides (A) or component (A)] and (B) represents one or more herbicides (component B).

Description of Related Art

Compounds from the structure class of the 3-phenylisoxazoline-5-carboxamides are known as herbicides (see, for example, WO2012/130798 A). The compounds are effective against a broad spectrum of harmful plants when applied by the pre-emergence method or else by the post-emergence method, with the possibility of non-selective use for control of unwanted plant growth or selective use in crops.

The efficacy of these herbicides against harmful plants is at a high level, but generally depends on the application rate, the form of the respective preparation, the spectrum of harmful plants, the harmful plants to be controlled in each case, the climate, and soil conditions, etc. A further criterion is the duration of action or the rate of degradation of the herbicide. Also to be taken into account are, if appropriate, changes in the susceptibility of harmful plants which may occur on prolonged use of the herbicides or in a geographically restricted manner. The compensation of losses in action in the case of individual plants by increasing the application rates of the herbicides is only possible to a certain degree, for example because such a procedure often worsens the selectivity of the herbicides or because the action is not improved, even when applying higher rates. There is generally need for methods of achieving herbicidal action with a lower application rate of active compounds. A lower application rate not only reduces the amount of active compound required for the application but generally also reduces the amount of formulation auxiliaries needed. Both reduce economic expenditure and improve the environmental compatibility of the herbicide treatment.

One way of improving the application profile of a herbicide may be to combine the active compound with one or more other active compounds which contribute the desired additional properties. However, in the combined application of a plurality of active compounds, there are frequently phenomena of physical and biological incompatibility, for example lack of stability of a coformulation, decomposition of an active compound and/or antagonism of the active compounds. What is desired, however, are combinations of active compounds having a favourable activity profile, high stability and ideally an unexpected synergistically enhanced activity which allows the application rate to be reduced compared to the individual application of the active compounds to be combined.

SUMMARY

It is the object of the present invention to provide alternative or advantageous herbicidal compositions that have a good profile biological use and have as many as possible of the abovementioned desirable favourable properties.

It has now been found that, surprisingly, this problem can be solved by using a composition comprising herbicidally active compounds (A) and (B), wherein (A) represents one or more compounds of the general formula (I) or agrochemically compatible salts thereof [component (A)] and (B) represents one or more herbicides [component (B)] selected from the group of the herbicide active compounds (B1) to (B11). The compositions according to the invention interact in a particularly favourable manner, for example when they are used to control unwanted plant growth in crop plants such as wheat (hard and soft wheat), maize, soya, sugarbeet, sugarcane, cotton, rice, beans (for example, beans and broad beans), flax, barley, oats, rye, triticale, potato and millet/sorghum, uncultivated land, pastureland and areas of grass/lawn and plantation crops.

The present invention thus provides compositions comprising herbicidally active compounds (A) and (B), where (A) represents one or more compounds of the general formula (I) or their agrochemically acceptable salts [component (A)],

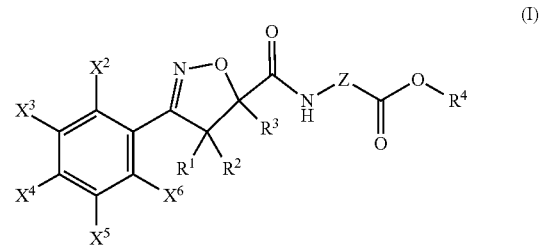

(I)

in which

R¹ and R² each represent hydrogen;

R³ represents $(C_1\text{-}C_3)$-alkyl, $(C_3\text{-}C_4)$-cycloalkyl, $(C_2\text{-}C_3)$-alkenyl, $(C_2\text{-}C_3)$-alkynyl or $(C_1\text{-}C_3)$-alkoxy, each of which is substituted by m radicals from the group consisting of fluorine, chlorine, cyano and $(C_1\text{-}C_2)$-alkoxy;

R⁴ represents hydrogen, or represents $(C_1\text{-}C_6)$-alkyl, $(C_3\text{-}C_6)$-cycloalkyl, $(C_3\text{-}C_6)$-cycloalkyl-$(C_1\text{-}C_6)$-alkyl, $(C_2\text{-}C_6)$-alkenyl, $(C_5\text{-}C_6)$-cycloalkenyl or $(C_2\text{-}C_6)$-alkynyl, each of which is substituted by m radicals from the group consisting of fluorine, chlorine, bromine, cyano, $(C_1\text{-}C_4)$-alkoxy, hydroxy and aryl;

Z represents a group Z-1, Z-2, Z-8, Z-9, Z-11 or Z13, where Z-1, Z-2, Z-8, Z-9, Z-11 and Z13 have the meaning below:

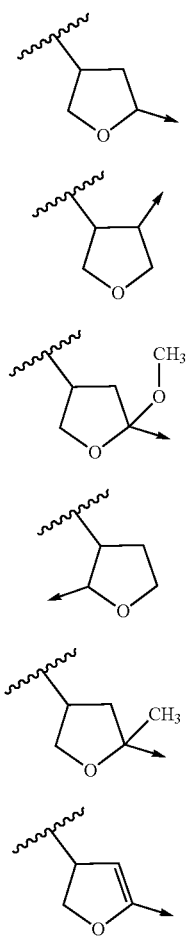

where the arrow in each case denotes a bond to the group C=O of the formula (I);

$X^2$, $X^4$ and $X^6$ independently of one another represent hydrogen or fluorine;

$X^3$ and $X^5$ independently of one another represent hydrogen, fluorine, chlorine or cyano, or represent $(C_1-C_3)$-alkyl or $(C_1-C_3)$-alkoxy, each of which is substituted by m radicals from the group consisting of fluorine and chlorine; and m represents the running number 0, 1, 2 or 3, and (B) represents one or more herbicides [component (B)] from the group of the herbicidally active compounds (B1) to (B11), where (B1) represents herbicidally active compounds from the group of the 1,3-diketo compounds selected from

| | | |
|---|---|---|
| (B1.1) | alloxydim, | (CAS 55634-91-8), (CAS 55635-13-7) |
| (B1.2) | bicyclopyrone, | (CAS 352010-68-5) |
| (B1.3) | butroxydim, | (CAS 138164-12-2) |
| (B1.4) | clethodim, | (CAS 99129-21-2) |
| (B1.5) | cycloxydim, | (CAS 101205-02-1) |
| (B1.6) | fenquinotrione, | (CAS 1342891-70-6) |
| (B1.7) | mesotrione, | (CAS 104206-82-8) |
| (B1.8) | pinoxaden, | (CAS 243973-20-8) |
| (B1.9) | profoxydim, | (CAS 139001-49-3) |
| (B1.10) | sethoxydim, | (CAS 74051-80-2) |
| (B1.11) | sulcotrione, | (CAS 99105-77-8) |

-continued

| | | |
|---|---|---|
| (B1.12) | SYP-9121 | (CAS 1976053-87-8) |
| (B1.13) | tefuryltrione, | (CAS 473278-76-1) |
| (B1.14) | tembotrione, | (CAS 335104-84-2) |
| (B1.15) | tepraloxydim, | (CAS 149979-41-9) |
| (B1.16) | tralkoxydim, | (CAS 87820-88-0) |
| (B1.17) | Y13161, | (CAS 1639426-14-4) |
| (B1.18) | Y13287; | (CAS 1639426-42-8) |

(B2) represents herbicidally active compounds from the group of the (sulfon)amides selected from

| | | |
|---|---|---|
| (B2.1) | acetochlor, | (CAS 34256-82-1) |
| (B2.2) | alachlor, | (CAS 15972-60-8), |
| (B2.3) | amidosulfuron, | (CAS 120923-37-7) |
| (B2.4) | asulam, | (CAS 3337-71-1) (CAS 14089-43-1), (CAS 2302-17-2) |
| (B2.5) | azimsulfuron, | (CAS 120162-55-2) |
| (B2.6) | beflubutamid, | (CAS 113614-08-7), (CAS 113614-09-8) |
| (B2.7) | bensulfuron, | (CAS 83055-99-6), (CAS 83055-99-6) |
| (B2.8) | butachlor, | (CAS 23184-66-99) |
| (B2.9) | carbetamide, | (CAS 16118-49-3) |
| (B2.10) | chlorimuron, | (CAS 99283-00-8), (CAS 90982-32-4), |
| (B2.11) | chlorpropham, | (CAS 101-21-3) |
| (B2.12) | chlorsulfuron, | (CAS 64902-72-3) |
| (B2.13) | cinosulfuron, | (CAS 94593-91-6) |
| (B2.14) | cloransulam, | (CAS 159518-97-5), (CAS 147150-35-4) |
| (B2.15) | cyclosulfamuron, | (CAS 136849-15-5) |
| (B2.16) | desmedipham, | (CAS 13684-56-5) |
| (B2.17) | diclosulam, | (CAS 145701-21-9) |
| (B2.18) | diflufenican, | (CAS 83164-33-4) |
| (B2.19) | dimethachlor, | (CAS 50563-36-5) |
| (B2.20) | dimethenamid, | (CAS 87674-68-8), (CAS 163515-14-8) |
| (B2.21) | esprocarb | (CAS 85785-20-2) |
| (B2.22) | ethametsulfuron, | (CAS 111353-84-5), (CAS 97780-06-8) |
| (B2.23) | ethoxysulfuron, | (CAS 126801-58-9) |
| (B2.24) | flazasulfuron, | (CAS 104040-78-0) |
| (B2.25) | florasulam, | (CAS 145701-23-1) |
| (B2.26) | flucarbazone, | (CAS 145026-88-6), (CAS 181274-17-9) |
| (B2.27) | flucetosulfuron, | (CAS 412928-75-7) |
| (B2.28) | flufenacet, | (CAS 142459-58-3) |
| (B2.29) | flumetsulam, | (CAS 98967-40-9) |
| (B2.30) | flupyrsulfuron, | (CAS 150315-10-9), (CAS 144740-53-4), (CAS 144740-54-5) |
| (B2.31) | foramsulfuron, | (CAS 173159-57-4) |
| (B2.32) | halosulfuron, | (CAS 135397-30-7), (CAS 100784-20-1) |
| (B2.33) | imazosulfuron, | (CAS 122548-33-8) |
| (B2.34) | iodosulfuron, | (CAS 185119-76-0), (CAS 144550-06-1), (CAS 144550-36-7) |
| (B2.35) | ipfencarbazone, | (CAS 212201-70-2) |
| (B2.36) | mefenacet, | (CAS 73250-68-7) |
| (B2.37) | mesosulfuron, | (CAS 400852-66-6), (CAS 208465-21-8) |
| (B2.38) | metazachlor, | (CAS 67129-08-2) |
| (B2.39) | metazosulfuron, | (CAS 868680-84-6) |
| (B2.40) | metolachlor, | (CAS 51218-45-2) |
| (B2.41) | metosulam, | (CAS 139528-85-1) |
| (B2.42) | metsulfuron, | (CAS 79510-48-8), (CAS 74223-64-6) |
| (B2.43) | nicosulfuron, | (CAS 111991-09-4) |
| (B2.44) | orthosulfamuron, | (CAS 213464-77-8) |
| (B2.45) | oxasulfuron, | (CAS 144651-06-9) |
| (B2.46) | penoxsulam, | (CAS 219714-96-2) |
| (B2.47) | pethoxamide, | (CAS 106700-29-2) |
| (B2.48) | phenmedipham, | (CAS 13684-63-4) |
| (B2.49) | picolinafen, | (CAS 137641-05-5) |
| (B2.50) | pretilachlor, | (CAS 51218-49-6) |
| (B2.51) | primisulfuron, | (CAS 113036-87-6), (CAS 86209-51-0) |
| (B2.52) | propachlor, | (CAS 1918-16-7) |
| (B2.53) | propanil, | (CAS 709-98-8) |
| (B2.54) | propham, | (CAS 122-42-9) |
| (B2.55) | propisochlor, | (CAS 86763-47-5) |
| (B2.56) | propoxycarbazone, | (CAS 145026-81-9), (CAS 181274-15-7) |
| (B2.57) | propyrisulfuron, | (CAS 570415-88-2) |
| (B2.58) | propyzamide, | (CAS 23950-58-5) |
| (B2.59) | prosulfocarb, | (CAS 52888-80-9) |
| (B2.60) | prosulfuron, | (CAS 94125-34-5) |
| (B2.61) | pyrazosulfuron, | (CAS 98389-04-9), (CAS 93697-74-6) |
| (B2.62) | pyroxsulam, | (CAS 422556-08-9) |
| (B2.63) | rimsulfuron, | (CAS 122931-48-0) |

-continued

| | | |
|---|---|---|
| (B2.64) | S-metolachlor, | (CAS 87392-12-9) |
| (B2.65) | sulfometuron, | (CAS 74223-56-6), (CAS 74222-97-2), (CAS 144651-06-9) |
| (B2.66) | sulfosulfuron, | (CAS 141776-32-1) |
| (B2.67) | thenylchlor, | (CAS 96491-05-3) |
| (B2.68) | thiencarbazone, | (CAS 936331-72-5), (CAS 317815-83-1) |
| (B2.69) | thifensulfuron, | (CAS 79277-67-1), (CAS 79277-27-3) |
| (B2.70) | tri-allate, | (CAS 2303-17-5) |
| (B2.71) | triasulfuron, | (CAS 82097-50-5) |
| (B2.72) | tribenuron, | (CAS 106040-48-6), (CAS 101200-48-0) |
| (B2.73) | trifloxysulfuron, | (CAS 145099-21-4, (CAS 199119-58-9) |
| (B2.74) | triflusulfuron, | (CAS 135990-29-3), (CAS 126535-15-7) |
| (B2.75) | tritosulfuron, | (CAS 142469-14-5) |
| (B2.76) | esprocarb, | (CAS 85785-20-2) |
| (B2.77) | profluazol, | (CAS 190314-43-3) |
| (B2.78) | tri-allate; | (CAS 2303-17-5) |

(B3) represents herbicidally active compounds from the group of the arylonitriles selected from

| | | |
|---|---|---|
| (B3.1) | bromoxynil, | (CAS 1689-84-5) (CAS 3861-41-4), (CAS 6634-95-8), (CAS 1689-99-2), (CAS 2961-68-4) |
| (B3.2) | chlorthiamid, | (CAS 1918-13-4) |
| (B3.3) | dichlobenil, | (CAS 1194-65-6) |
| (B3.4) | ioxynil, | (CAS 1689-83-4), (CAS 2961-61-7), (CAS 3861-47-0), (CAS 2961-62-8) |
| (B3.5) | pyraclonil; | (CAS 158353-15-2) |

(B4) represents herbicidally active compounds from the group of the azoles selected from

| | | |
|---|---|---|
| (B4.1) | amicarbazone, | (CAS 129909-90-6) |
| (B4.2) | amitrole, | (CAS 61-82-5) |
| (B4.3) | azafenidin, | (CAS 68049-83-2) |
| (B4.4) | benzofenap, | (CAS 82692-44-2) |
| (B4.5) | benzuofucaotong, | (CAS 1992017-55-6) |
| (B4.6) | biscarfentrazone, | (CAS 1622908-18-2) |
| (B4.7) | cafenstrole, | (CAS 125306-83-4) |
| (B4.8) | carfentrazone, | (CAS 128621-72-7), (CAS128639-02-1) |
| (B4.9) | fentrazamide, | (CAS 158237-07-1) |
| (B4.10) | imazamethabenz, | (CAS 100728-84-5), (CAS 81405-85-8) |
| (B4.11) | imazamox, | (CAS 114311-32-9), (CAS 247057-22-3) |
| (B4.12) | imazapic, | (CAS 104098-48-8), (CAS 115136-53-3) |
| (B4.13) | imazapyr, | (CAS 81334-34-1), (CAS 81510-83-0) |
| (B4.14) | imazaquin, | (CAS 81335-37-7), (CAS 81335-47-9), (CAS 81335-43-5), (CAS 81335-46-8) |
| (B4.15) | imazethapyr, | (CAS 81335-77-5), (CAS 101917-66-2) |
| (B4.16) | isouron, | (CAS 55861-78-4) |
| (B4.17) | isoxaben, | (CAS 82558-50-7) |
| (B4.18) | isoxaflutole, | (CAS 141112-29-0) |
| (B4.19) | oxadiargyl, | (CAS 39807-15-3) |
| (B4.20) | oxadiazon, | (CAS 19666-30-9) |
| (B4.21) | pyraflufen, | (CAS 129630-17-7), (CAS 129630-19-9) |
| (B4.22) | pyrasulfotole, | (CAS 365400-11-9) |
| (B4.23) | pyrazolynate, | (CAS 58011-68-0) |
| (B4.24) | pyrazoxyfen, | (CAS 71561-11-0) |
| (B4.25) | pyroxasulfone, | (CAS 447399-55-5) |
| (B4.26) | sulfentrazone, | (CAS 122836-35-5) |
| (B4.27) | tolpyralate, | (CAS 1101132-67-5) |
| (B4.28) | topramezone, | (CAS 210631-68-8) |
| (B4.29) | triazolesulcotrione (QYR-301), | (CAS 1911613-97-2) |
| (B4.30) | QYM-201, | (CAS 1855925-45-1) |
| (B4.31) | bencarbazone, | (CAS 173980-17-1) |
| (B4.32) | fluazolate, | (CAS 174514-07-9) |
| (B4.33) | flupoxam, | (CAS 119126-15-7) |
| (B4.34) | isoxachlortole; | (CAS 141112-06-3) |

(B5) represents further herbicidally active compounds selected from

| | | |
|---|---|---|
| (B5.1) | aminocyclopyrachlor, | (CAS 858956-08-8), (CAS 858954-83-3), (CAS 858956-35-1) |
| (B5.2) | aminopyralid, | (CAS 150114-71-9), (CAS 566191-87-5), (CAS 566191-89-7) |
| (B5.3) | benazolin-ethyl, | (CAS 3813-05-6), (CAS 38561-76-1), (CAS 25059-80-7), (CAS 67338-65-2) |
| (B5.4) | benfluralin, | (CAS 1861-40-1) |
| (B5.5) | bentazone, | (CAS 25057-89-0), (CAS 50723-80-3) |
| (B5.6) | benzobicyclon, | (CAS 156963-66-5) |
| (B5.7) | bixlozone, | (CAS 81777-95-9) |
| (B5.8) | bromofenoxim, | (CAS 13181-17-4) |
| (B5.9) | butralin, | (CAS 33629-47-9) |
| (B5.10) | chloridazon/pyrazon, | (CAS 1698-60-8) |
| (B5.11) | chlorthal, | (CAS 2136-79-0), (CAS 1861-32-1), (CAS 887-54-7) |
| (B5.12) | cinidon-ethyl, | (CAS 142891-20-1) |
| (B5.13) | cinmethylin, | (CAS 87818-31-3) |
| (B5.14) | clomazone, | (CAS 81777-89-1) |
| (B5.15) | cyclopyrimorate, | (CAS 499231-24-2) |
| (B5.16) | dinitramine, | (CAS 29091-05-2) |
| (B5.17) | diquat, | (CAS 2764-72-9), (CAS 85-00-7), (CAS 4032-26-2) |
| (B5.18) | dithiopyr, | (CAS 97886-45-8) |
| (B5.19) | acetic acid, | (CAS 64-19-7) |
| (B5.20) | ethalfluralin, | (CAS 55283-68-6) |
| (B5.21) | ethofumesate, | (CAS 26225-79-6) |
| (B5.22) | flamprop, | (CAS 58667-63-3, (CAS 90134-59-1), (CAS 63782-90-1), (CAS 63729-98-6) |
| (B5.23) | florpyrauxifen, | (CAS 943832-81-3), (CAS 1390661-72-9) |
| (B5.24) | flufenpyr, | (CAS 188490-07-5), (CAS 188489-07-8) |
| (B5.25) | flumiclorac, | (CAS 87547-04-4), (CAS 87546-18-7) |
| (B5.26) | flumioxazin, | (CAS 103361-09-7) |
| (B5.27) | fluridone, | (CAS 59756-60-4) |
| (B5.28) | flurochloridone, | (CAS 61213-25-0) |
| (B5.29) | flurtamone, | (CAS 96525-23-4) |
| (B5.30) | fluthiacet-methyl, | (CAS 149253-65-6) |
| (B5.31) | halauxifen, | (CAS 943832-60-8), (CAS 943831-98-9) |
| (B5.32) | indanofan, | (CAS 13320-30-1) |
| (B5.33) | norflurazon, | (CAS 27314-13-2) |

| | | |
|---|---|---|
| (B5.34) | oleic acid, | (CAS 112-80-1) |
| (B5.35) | oryzalin, | (CAS 19044-88-3) |
| (B5.36) | oxaziclomefone, | (CAS 153197-14-9) |
| (B5.37) | paraquat, | (CAS 4685-14-7), (CAS 1910-42-5), (CAS 2074-50-2) |
| (B5.38) | pelargonic acid, | (CAS 112-05-0) |
| (B5.39) | pendimethalin, | (CAS 40487-42-1) |
| (B5.40) | pentoxazone, | (CAS 110956-75-7) |
| (B5.41) | pyridafol, | (CAS 40020-01-7) |
| (B5.42) | pyridate, | (CAS 55512-33-9) |
| (B5.43) | tetflupyrolimet, | (CAS 2053901-33-8) |
| (B5.44) | thiazopyr, | (CAS 117718-60-2) |
| (B5.45) | triafamone, | (CAS 874195-61-6) |
| (B5.46) | trifluralin, | (CAS 1582-09-8) |
| (B5.47) | 4-amino-3-chloro-5-fluoro-6-(7-fluoro-1H-indol-6-yl)pyridine-2-carboxylic acid, | |
| (B5.48) | cyclopyrimorate, | (CAS 499231-24-2) |
| (B5.49) | diquat, | (CAS 2764-72-9, CAS 85-00-7, CAS4032-26-2) |
| (B5.50) | oxaziclomefone, | (CAS 153197-14-9) |
| (B5.51) | pentanochlor, | (CAS 2307-68-8) |
| (B5.52) | tebutam, | (CAS 35256-85-0) |
| (B5.53) | thidiazimin; | (CAS 123249-43-4) |

(B6) represents herbicidally active compounds from the group of the (het)arylcarboxylic acids

| | | |
|---|---|---|
| (B6.1) | chloramben, | (CAS 133-90-4), (CAS 1076-46-6), (CAS 53404-16-3), (CAS 7286-84-2), (CAS 25182-03-0), (1954-81-0) |
| (B6.2) | clopyralid, | (CAS 1702-17-6), (CAS 1532-24-7), (CAS 57754-85-5), (CAS 58509-83-4), (CAS 73455-09-1) |
| (B6.3) | dicamba, | (CAS 1918-00-9), (CAS 1286239-22-2), (CAS 104040-79-1), (CAS 2300-66-5), (CAS 25059-78-3), (CAS 55871-02-8), (CAS 6597-78-0), (CAS 53404-28-7), (CAS 10007-85-9), (CAS 1982-69-0), (53404-29-8), (CAS 56141-00-5) |
| (B6.4) | fluroxypyr, | (CAS 69377-81-7), (CAS -27-8), (CAS 81406-37-3) |
| (B6.5) | picloram, | (CAS 1918-02-1), (CAS 55870-98-9), (CAS 36374-99-9), (CAS 26952-20-5), (CAS 14143-55-6), (CAS 55871-00-6), (CAS 2545-60-0), (CAS 35832-11-2), (CAS 6753-47-5), (CAS 82683-78-1) |
| (B6.6) | quinclorac, | (CAS 84087-01-4), (CAS 84087-48-9), (CAS 84087-33-2) |
| (B6.7) | quinmerac, | (CAS 90717-03-6) |
| (B6.8) | TBA, | (CAS 50-31-7), (CAS 3426-62-8), (CAS 71750-37-3), (CAS 4559-30-2), (CAS 2078-42-4) |
| (B6.9) | trichlopyr; | (CAS 55335-06-3), (CAS [64700-56-7), (CAS 1048373-85-8), (CAS 60825-27-6), (CAS 57213-69-1) |

(B7) represents herbicidally active compounds from the group of the organophosphorus compounds selected from

| | | |
|---|---|---|
| (B7.1) | anilofos, | (CAS 64249-01-0) |
| (B7.2) | bialaphos, | (CAS 35597-43-4), (CAS 71048-99-2) |
| (B7.3) | butamifos, | (CAS 36335-67-8) |
| (B7.4) | glufosinate, | (CAS 51276-47-2), (CAS 35597-44-5), (CAS 77182-82-2), (CAS 70033-13-5) |
| (B7.5) | glyphosate, | (CAS 1071-83-6), (CAS 69254-40-6), (CAS 34494-04-7), (CAS 38641-94-0), (CAS 40465-66-5), (CAS 39600-42-5), (CAS 70393-85-0), (CAS 1591-81-3) |
| (B7.6) | piperophos, | (CAS 24151-93-7) |
| (B7.7) | sulfosate, | (CAS 1591-81-3) |
| (B7.8) | amiprofos; | (CAS 33857-23-7, CAS 36001-88-4) |

(B8) represents herbicidally active compounds from the group of the phenyl ethers selected from

| | | |
|---|---|---|
| (B8.1) | 2,4-D, | (CAS 94-75-7), (CAS 2307-55-3), (CAS 1929-73-3), (CAS 1320-18-9), (CAS 1928-45-6), (CAS 94-80-4), (CAS 20940-37-8), (CAS 2008-39-1), (CAS 5742-19-8), (CAS 2212-54-6), (CAS 533-23-3), CAS 1928-43-4), (CAS 37102-63-9), (CAS 713-15-1), (CAS 25168-26-7), (CAS 94-11-1), CAS 5742-17-6), (CAS 3766-27-6), (CAS 1917-97-1), (CAS 1928-38-7), (CAS 1928-44-5), (CAS 1917-92-6), (CAS 1928-61-6), (CAS 2702-72-9), (CAS 15146-99-3), (CAS 28685-18-9), (CAS 2646-78-8), (CAS 18584-79-7), (CAS 2569-01-9), (CAS 215655-76-8) |

| | | |
|---|---|---|
| (B8.2) | 2,4-DB, | (CAS 94-82-6), (CAS 2758-42-1), (CAS 1320-15-6), |
| (B8.3) | 2,4-DP, | (CAS 19480-40-1), (CAS 10433-59-7) CAS 120-36-5), (CAS 53404-31-2), (CAS 53404-32-3), (CAS 79270-78-3), (CAS 28631-35-8), (CAS 57153-17-0), (CAS 5746-17-8), (CAS 39104-30-8) |
| (B8.4) | acifluorfen, | (CAS 50594-66-6), (CAS 50594-67-7), (CAS 62476-59-9) |
| (B8.5) | aclonifen, | (CAS 74070-46-5) |
| (B8.6) | bifenox, | (CAS 42576-02-3) |
| (B8.7) | chlomethoxyfen, | (CAS 32861-85-1) |
| (B8.8) | clodinafop-propargyl, | (CAS 114420-56-3), (CAS 105512-06-9) |
| (B8.9) | clomeprop, | (CAS 84496-56-0) |
| (B8.10) | cyhalofop, | (CAS 122008-78-0), (CAS 122008-85-9) |
| (B8.11) | diclofop, | (CAS 40843-25-2), (CAS 51338-27-3) |
| (B8.12) | ethoxyfen, | (CAS 188634-90-4), (CAS 131086-42-5) |
| (B8.13) | fenoxaprop, | (CAS 95617-09-7), (CAS 113158-40-0), (CAS 71283-80-2) |
| (B8.14) | fluazifop, | (CAS 69335-91-7), (CAS 83066-88-0), (CAS 79241-46-6) |
| (B8.15) | fluoroglycofen, | (CAS 77501-60-1), (CAS 77501-90-7) |
| (B8.16) | fomesafen, | (CAS 72178-02-0), (CAS 108731-70-0) |
| (B8.17) | halosafen, | (CAS 77227-69-1) |
| (B8.18) | haloxyfop, | (CAS 69806-34-4), (CAS 95977-29-0), (CAS 72619-32-0) |
| (B8.19) | lactofen, | (CAS 77501-63-4) |
| (B8.20) | MCPA, | (CAS 94-74-6), (CAS 19480-43-4), (CAS 1713-12-8), (CAS 2039-46-5), (CAS 20405-19-0), (CAS 2698-38-6), (CAS 29450-45-1), (CAS 1713-11-7), (CAS 26544-20-7), (CAS 2698-40-0), (CAS 2436-73-9), (CAS 6365-62-4), (CAS 5221-16-9), (CAS 3653-48-3), (CAS 42459-68-7) |
| (B8.21) | MCPB, | (CAS 94-81-5), (CAS 10443-70-6), (CAS 57153-18-1), (CAS 6062-26-6) |
| (B8.22) | mecoprop, | (CAS 93-65-2), (CAS 32351-70-5), (CAS 1432-14-0), (CAS 71526-69-7), (CAS 28473-03-2), (CAS 2786-19-8), (CAS 1929-86-8), (CAS 19095-88-6), (CAS 53404-61-8), (CAS 16484-77-8) |
| (B8.23) | metamifop, | (CAS 256412-89-2) |
| (B8.24) | oxyfluorfen, | (CAS 42874-03-3) |
| (B8.25) | propaquizafop, | (CAS 111479-05-1) |
| (B8.26) | quizalofop, | (CAS 76578-12-6), (CAS 76578-14-8), |
| (B8.27) | quizalofop-p, | (CAS 94051-08-8), (CAS 100646-51-3), (CAS 200509-41-7) |
| (B8.28) | benzfendizone; | (CAS 158755-95-4) |

(B9) represents herbicidally active compounds from the group of the pyrimidines selected from

| | | |
|---|---|---|
| (B9.1) | bispyrac-sodium, | (CAS 125401-92-5) |
| (B9.2) | bromacil, | (CAS 314-40-9), (CAS 53404-19-6), (CAS 69484-12-4) |
| (B9.3) | butafenacil, | (CAS 134605-64-4) |
| (B9.4) | lenacil, | (CAS 2164-08-1) |
| (B9.5) | pyribenzoxim, | (CAS 168088-61-7) |
| (B9.6) | pyriftalid, | (CAS 135186-78-6) |
| (B9.7) | pyriminobac, | (CAS 136191-56-5), (CAS 136191-64-5) |
| (B9.8) | pyrimisulfan, | (CAS 221205-90-9) |
| (B9.9) | pyrithiobac-sodium, | (CAS 123342-93-8), (CAS 123343-16-8) |
| (B9.10) | saflufenacil, | (CAS 372137-35-4) |
| (B9.11) | terbacil, | (CAS 5902-51-2) |
| (B9.12) | tiafenacil, | (CAS 1220411-29-9) |
| (B9.13) | trifludimoxazin, | (CAS 1258836-72-4) |
| (B9.14) | ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate; | |

(B10) represents herbicidally active compounds from the group of the (thio)ureas selected from

| | | |
|---|---|---|
| (B10.1) | chlorobromuron, | (CAS 13360-45-7) |
| (B10.2) | chlorotoluron, | (CAS 15545-48-9) |
| (B10.3) | daimuron, | (CAS 42609-52-9) |
| (B10.4) | dimefuron, | (CAS 34205-21-5) |
| (B10.5) | diuron, | (CAS 330-54-1) |
| (B10.6) | diflufenzopyr, | (CAS 1957168-02-3) |
| (B10.7) | fluometuron, | (CAS 2164-17-2) |
| (B10.8) | isoproturon, | (CAS 34123-59-6) |
| (B10.9) | linuron, | (CAS 330-55-2) |
| (B10.10) | methabenzthiazuron, | (CAS 18691-97-9) |
| (B10.11) | metobromuron, | (CAS 3060-89-7) |
| (B10.12) | metoxuron, | (CAS 19937-59-8) |
| (B10.13) | monolinuron, | (CAS 1746-81-2) |

-continued

| (B10.14) | neburon, | (CAS 555-37-3) |
| (B10.15) | siduron, | (CAS 1982-49-6) |
| (B10.16) | tebuthiuron, | (CAS 34014-18-1) |
| (B10.17) | fenuron, | (CAS 101-42-8) |
| (B10.18) | chloroxuron, | (CAS 1982-47-4) |
| (B10.19) | diflufenzopyr, | (CAS 1957168-02-3, CAS 109293-98-3) |
| (B10.20) | ethidimuron; | (CAS 30043-49-3) |

(B11) represents herbicidally active compounds from the group of the triazines selected from

| (B11.1) | ametryne, | (CAS 834-12-8) |
| (B11.2) | atrazine, | (CAS 1912-24-9) |
| (B11.3) | cynazine, | (CAS 21725-46-2) |
| (B11.4) | dimethametryn, | (CAS 22936-75-0) |
| (B11.5) | hexazinone, | (CAS 51235-04-2) |
| (B11.6) | indaziflam, | (CAS 950782-86-2) |
| (B11.7) | metamitron, | (CAS 41394-05-2) |
| (B11.8) | metribuzin, | (CAS 21087-64-9) |
| (B11.9) | prometon, | (CAS 1610-18-0) |
| (B11.10) | prometryne, | (CAS 7287-19-6) |
| (B11.11) | propazine, | (CAS 139-40-2) |
| (B11.12) | simazine, | (CAS 122-34-9) |
| (B11.13) | simetryne, | (CAS 1014-70-6) |
| (B11.14) | terbumeton, | (CAS 33693-04-8) |
| (B11.15) | terbuthylazine, | (CAS 5915-41-3) |
| (B11.16) | terbutryne, | (CAS 886-50-0) |
| (B11.17) | triaziflam, | (CAS 131475-57-5) |
| (B11.18) | trietazine, | (CAS 1912-26-1) |
| (B11.19) | desmetryne. | (CAS 1014-69-3) |

DETAILED DESCRIPTION OF A PREFERRED EMBODIMENT

The common name of the herbicides listed above is supplemented by the "CAS RN" (Chemical Abstracts Service Registry Number) ("CAS" for short) between parentheses. The CAS RN is a widely used reference number that enables the unambiguous assignment of the substances in question since the "CAS RN" distinguishes inter alia between isomers including stereoisomers, and salts and esters. For active compounds that exist in various forms, the name of the neutral compound is given in each case in the above list. The CAS given between parentheses are directed to these and to all further known forms of the active compound. Only the neutral compound is mentioned hereinafter, and hence encompasses all existing forms as listed, unless a specific form of the active compound is relevant in a particular context, for example in table examples below for biological efficacy.

The compositions according to the invention may contain further components, for example other active compounds to counter harmful organisms such as harmful plants, plant-damaging animals or plants-damaging fungi, especially active compounds from the group of the herbicides, fungicides, insecticides, acaricides, nematicides and miticides, and related substances, or else other kinds of active compounds for crop protection (e.g. resistance inductors), plant growth regulators, and/or additions and/or formulation auxiliaries that are customary in crop protection. The components may be formulated together here (ready-to-use formulation) and employed as such, or they may be formulated separately and employed together, for example in a tankmix or in sequential application.

The individual herbicidal active compounds of the general formula (I) present as component (A) are also referred to hereinafter as compounds (A), active compounds (A), components (A) or herbicides (A). Correspondingly, the individual herbicidal active compounds present as component (B) are also referred to hereinafter as compounds (B), active compounds (B), components (B) or herbicides (B).

An advantageous property of the inventive combination of herbicides (A) and (B) is found to be that active compounds (A) and (B) are compatible with one another, meaning that they can be employed together without occurrence of significant chemical incompatibility between the active compounds (A) and/or (B) that leads to destruction of one or more active compounds. This avoids any reduction in the active compound content in formulations or spray liquors. The favourable compatibility also extends to the biological properties of the active compounds on combined use. For instance, antagonistic effects are generally not observed in the case of control of harmful plants with the active compound combinations according to the invention. The active compounds (A) and (B) are thus particularly suitable for employment together with or in addition to further active compounds for crop protection or agrochemicals. The combined application enabled permits the utilization of advantageous effects, for example the broadening of the spectrum of harmful plants to be controlled on application, or the reduction of the application rate of the individual herbicides (A) or (B) compared to the respective application rate of the herbicide in question in the case of individual application. It is thus possible to influence the degradation characteristics of the active compounds and to achieve more favourable conditions for the subsequent growing of crop plants. A further advantage is considered to be that the development of resistances of the harmful plants to the active compounds can often be significantly reduced or avoided through the combination of active compounds having different mechanisms of action.

More particularly, superadditive (=synergistic) effects surprisingly occur in the case of combined use of active compounds (A) and (B) for a greater number of economically important harmful plants. Here, the activity in the combination is higher than the expected sum of the activities of the individual herbicides employed. The synergistic effects allow the application rate to be reduced further, a broader spectrum of broad-leaved weeds and weed grasses to be controlled, a more rapid onset of the herbicidal action, a longer persistency, a better control of the harmful plants with only one or a few applications and a widening of the application period possible. To some extent, by using the compositions, the amount of harmful ingredients, such as nitrogen or oleic acid, and their introduction into the soil are likewise reduced.

Said properties and advantages are desired in practical weed control in order to keep agricultural crops clear of unwanted competing plants and hence to ensure and/or increase the yields in terms of quality and quantity. The novel combinations markedly exceed the technical state of the art with a view to the properties described.

The synergistic effects are observed in the case of joint deployment of active compounds (A) and (B), but can also frequently occur in the case of offset application (splitting). It is also possible to apply the herbicides (A) or (B) or the herbicidal composition (A) and (B) in multiple portions (sequential application). For example, one or more pre-emergence applications may be followed by a post-emergence application, or an early post-emergence application may be followed by a moderately late or late post-emergence application. Preference is given to the simultaneous or immediately successive application of the active compounds in the respective combination, if appropriate in several portions. But offset application of the individual active compounds of a combination is also possible, and may be advantageous in the individual case. It is also possible to integrate other crop protection agents into the system for application, for example the other active compounds mentioned (other herbicides, fungicides, insecticides, acaricides etc.) and/or various auxiliaries, adjuvants and/or applications of fertilizer.

Application by the pre-emergence method or by the postemergence method, according to the context in which the terms are used, is respectively understood to mean the application of the active compounds before and after the visible appearance of the harmful plants above the ground, or the use of the active compounds against harmful plants before emergence of the crop plants and after emergence of the crop plants.

In the formula (I) for compounds of the herbicidal active compounds (A) and all the formulae that follow, the following definitions are applicable:

Alkyl means saturated straight-chain or branched hydrocarbyl radicals having the number of carbon atoms specified in each case, e.g. $C_1$-$C_6$-alkyl such as methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl.

Halogen-substituted alkyl is straight-chain or branched alkyl groups where some or all of the hydrogen atoms in these groups may be replaced by halogen atoms, e.g. $C_1$-$C_2$-haloalkyl such as chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2-difluoroethyl, 2,2-dichloro-2-fluoroethyl, 2,2,2-trichloroethyl, pentafluoroethyl and 1,1,1-trifluoroprop-2-yl.

Alkenyl represents unsaturated straight-chain or branched hydrocarbyl radicals having the number of carbon atoms stated in each case and one double bond in any position, for example $C_2$-$C_6$-alkenyl such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl and 1-ethyl-2-methyl-2-propenyl.

Alkynyl means straight-chain or branched hydrocarbyl radicals having the number of carbon atoms specified in each case and one triple bond in any position, e.g. $C_2$-$C_6$-alkynyl such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl and 1-ethyl-1-methyl-2-propynyl.

Cycloalkyl means a carbocyclic saturated ring system having preferably 3-6 ring carbon atoms, for example cyclopropyl, cyclobutyl, cyclopentyl or cyclohexyl. In the case of optionally substituted cycloalkyl, cyclic systems with substituents are included, also including substituents with a double bond on the cycloalkyl radical, for example an alkylidene group such as methylidene.

Cycloalkenyl means a carbocyclic, nonaromatic, partially unsaturated ring system having 4-6 carbon atoms, e.g. 1-cyclobutenyl, 2-cyclobutenyl, 1-cyclopentenyl, 2-cyclopentenyl, 3-cyclopentenyl, or 1-cyclohexenyl, 2-cyclohexenyl, 3-cyclohexenyl, 1,3-cyclohexadienyl or 1,4-cyclohexadienyl, also including substituents with a double bond on the cycloalkenyl radical, for example an alkylidene group such as methylidene. In the case of optionally substituted cycloalkenyl, the elucidations for substituted cycloalkyl apply correspondingly.

Alkoxy means saturated, straight-chain or branched alkoxy radicals having the number of carbon atoms specified in each case, e.g. $C_1$-$C_4$-alkoxy such as methoxy, ethoxy, propoxy, 1-methylethoxy, butoxy, 1-methylpropoxy, 2-methylpropoxy and 1,1-dimethylethoxy. Halogen-substituted alkoxy means straight-chain or branched alkoxy radicals having the number of carbon atoms specified in each case, where some or all of the hydrogen atoms in these groups may be replaced by halogen atoms as specified above, e.g. $C_1$-$C_2$-haloalkoxy such as chloromethoxy, bromomethoxy, dichloromethoxy, trichloromethoxy, fluoromethoxy, difluoromethoxy, trifluoromethoxy, chlorofluoromethoxy, dichlorofluoromethoxy, chlorodifluoromethoxy, 1-chloroethoxy, 1-bromoethoxy, 1-fluoroethoxy, 2-fluoroethoxy, 2,2-difluoroethoxy, 2,2,2-trifluoroethoxy, 2-chloro-2-fluoroethoxy, 2-chloro-1,2-difluoroethoxy, 2,2-dichloro-2-fluoroethoxy, 2,2,2-trichloroethoxy, pentafluoroethoxy and 1,1,1-trifluoroprop-2-oxy.

Aryl means a phenyl which is optionally substituted by 0-5 radicals from the group consisting of fluorine, chlorine, bromine, iodine, cyano, hydroxy, ($C_1$-$C_3$)-alkyl, ($C_1$-$C_3$)-alkoxy, ($C_3$-$C_4$)-cycloalkyl, ($C_2$-$C_3$)-alkenyl or ($C_2$-$C_3$)-alkynyl.

The term "halogen" means fluorine, chlorine, bromine or iodine. If the term is used for a radical, "halogen" means a fluorine, chlorine, bromine or iodine atom.

According to the nature of the substituents and the way in which they are joined, the compounds of the formula (I) may be present as stereoisomers. If, for example, one or more asymmetrically substituted carbon atoms and/or sulfoxides are present, enantiomers and diastereomers may occur. Stereoisomers can be obtained from the mixtures obtained in the preparation by customary separation methods, for example by chromatographic separation processes. It is likewise possible to selectively prepare stereoisomers by using stereoselective reactions with use of optically active starting materials and/or auxiliaries.

The invention also relates to all stereoisomers and mixtures thereof which are encompassed by the formula (I) but not defined specifically. However, the following text will, for the sake of simplicity, always mention compounds of the formula (I), even though this is understood as meaning not only the pure compounds, but also, if appropriate, mixtures with various amounts of isomeric compounds.

According to the nature of the substituents defined above, the compounds of the formula (I) have acidic properties and can form salts, and if appropriate also internal salts or adducts with inorganic or organic bases or with metal ions. If the compounds of the formula (I) carry hydroxyl, carboxyl or other groups which induce acidic properties, these compounds can be reacted with bases to give salts. Suitable bases are, for example, hydroxides, carbonates, bicarbonates of the alkali metals and alkaline earth metals, in particular those of sodium, potassium, magnesium and calcium, furthermore ammonia, primary, secondary and tertiary amines having $(C_1-C_4)$-alkyl groups, mono-, di- and trialkanolamines of $(C_1-C_4)$-alkanols, choline and chlorocholine, and also organic amines such as trialkylamines, morpholine, piperidine or pyridine. These salts are compounds in which the acidic hydrogen is replaced by an agriculturally suitable cation, for example metal salts, especially alkali metal salts or alkaline earth metal salts, in particular sodium and potassium salts, or else ammonium salts, salts with organic amines or quaternary ammonium salts, for example with cations of the formula $[NRR'R''R''']^+$ in which R to R''' each independently of one another represent an organic radical, in particular alkyl, aryl, aralkyl or alkylaryl. Also suitable are alkylsulfonium and alkylsulfoxonium salts, such as $(C_1-C_4)$-trialkylsulfonium and $(C_1-C_4)$-trialkylsulfoxonium salts.

The compounds of the formula (I) can form salts by addition of a suitable inorganic or organic acid, for example mineral acids, for example HCl, HBr, $H_2SO_4$, $H_3PO_4$ or $HNO_3$, or organic acids, for example carboxylic acids such as formic acid, acetic acid, propionic acid, oxalic acid, lactic acid or salicylic acid or sulfonic acids, for example p-toluenesulfonic acid, onto a basic group, for example amino, alkylamino, dialkylamino, piperidino, morpholino or pyridino. In such a case, these salts comprise the conjugate base of the acid as the anion.

Suitable substituents present in deprotonated form, such as, for example, sulfonic acids or carboxylic acids, may form inner salts with groups which for their part can be protonated, such as amino groups.

If a group is polysubstituted by radicals, this means that this group is substituted by one or more identical or different radicals from those mentioned.

In all the formulae specified hereinafter, the substituents and symbols have the same meaning as described in the general formula (I) of herbicides (A), unless defined differently. Arrows in a chemical formula denote the points at which it is joined to the rest of the molecule.

Hereinbelow, preferred, particularly preferred and very particularly preferred meanings are described for each of the individual substituents of the herbicides (A) according to the general formula (I), as shown above. The other substituents of the herbicides (A) of the general formula (I) which are not specified hereinafter have the definition given above.

According to a first embodiment of the present invention, $R^3$ preferably represents $(C_1-C_3)$-alkyl, $(C_2-C_3)$-alkenyl or $(C_1-C_3)$-alkoxy, each of which is substituted by m radicals from the group consisting of fluorine and chlorine.

Particularly preferably, $R^3$ represents methyl, vinyl, trifluoromethyl or methoxy.

According to a second embodiment of the present invention,
$R^4$ preferably represents hydrogen, or represents $(C_1-C_6)$-alkyl, $(C_3-C_6)$-cycloalkyl, $(C_3-C_6)$-cycloalkyl-$(C_1-C_6)$-alkyl, $(C_2-C_6)$-alkenyl or $(C_2-C_6)$-alkynyl, each of which is substituted by m radicals from the group consisting of fluorine, chlorine, cyano, $(C_1-C_4)$-alkoxy and phenyl.

Particularly preferably, $R^4$ represents methyl, ethyl, chloroethyl, cyanomethyl, methoxyethyl or allyl.

According to a third embodiment of the present invention,
Z preferably represents the group Z-1 or Z13, where Z-1 and Z13 have the following meaning:

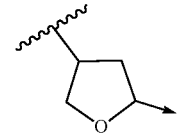

Z-1

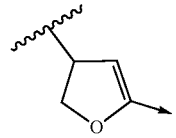

Z-13 where the arrow in each case denotes a bond to the group C=O of the formula (I).

According to a fourth embodiment of the present invention,
$X^2$, $X^4$ and $X^6$ preferably each represent hydrogen.

In the context of the present invention, the individual preferred, particularly preferred and most preferred meanings of the substituents $R^1$ to $R^4$, $X^2$ to $X^6$, Z, and the running number m can be combined with one another as desired.

This means that the present invention encompasses herbicides (A) of the general formula (I) in which, for example, the substituent $R^1$ has a preferred definition and the substituents $R^2$ to $R^4$ have the general definition or else the substituent $R^2$ has a preferred definition, the substituent $R^3$ has a particularly preferred or very particularly preferred definition and the remaining substituents have a general definition.

Two of these combinations of the definitions given above for the substituents $R^1$ to $R^4$, $X^2$ to $X^6$, Z, and the running number m are illustrated below by way of example, and each of them is disclosed as further embodiments:

According to a fifth embodiment of the present invention,
$R^1$ and $R^2$ each represent hydrogen;
$R^3$ represents $(C_1-C_3)$-alkyl, $(C_2-C_3)$-alkenyl or $(C_1-C_3)$-alkoxy, each of which is substituted by m radicals from the group consisting of fluorine and chlorine;
$R^4$ represents hydrogen,
or
represents $(C_1-C_6)$-alkyl, $(C_3-C_6)$-cycloalkyl, $(C_3-C_6)$-cycloalkyl-$(C_1-C_6)$-alkyl, $(C_2-C_6)$-alkenyl or $(C_2-C_6)$-alkynyl, each of which is substituted by m radicals from the group consisting of fluorine, chlorine, cyano, $(C_1-C_4)$-alkoxy and phenyl;

Z represents the group Z-1 or Z-13, where Z-1 and Z-13 have the following meaning:

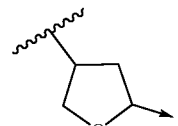
Z-1

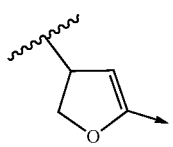
Z-13 where the arrow in each case denotes a bond to the group C=O of the formula (I);

$X^2$, $X^4$ and $X^6$ each represent hydrogen;

$X^3$ and $X^5$ independently of one another represent hydrogen, fluorine, chlorine or cyano, or represent ($C_1$-$C_3$)-alkyl or ($C_1$-$C_3$)-alkoxy, each of which is substituted by m radicals from the group consisting of fluorine and chlorine; and m represents the running number 0, 1, 2 or 3.

According to a sixth embodiment of the present invention, $R^1$ and $R^2$ each represent hydrogen;

$R^3$ represents methyl, vinyl, trifluoromethyl or methoxy;

$R^4$ represents methyl, ethyl, chloroethyl, cyanomethyl, methoxyethyl or allyl;

Z represents the group Z-1 or Z-13, where Z-1 and Z-13 have the following meaning:

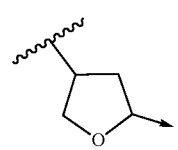
Z-1

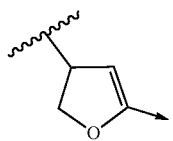
Z-13 where the arrow in each case denotes a bond to the group C=O of the formula (I);

$X^2$, $X^4$ and $X^6$ each represent hydrogen;

$X^3$ and $X^5$ independently of one another represent hydrogen, fluorine, chlorine or cyano, or represent ($C_1$-$C_3$)-alkyl or ($C_1$-$C_3$)-alkoxy, each of which is substituted by m radicals from the group consisting of fluorine and chlorine; and m represents the running number 0, 1, 2 or 3.

According to a seventh embodiment of the present invention, the herbicidal composition, as well as at least one component (B) as defined above, comprises preferably (A) one or more compounds [component (A)] of the general formula (I) or the agrochemically compatible salts thereof [herbicides (A)] according to Tables 1a and 1b.

TABLE 1a

Preferred compounds of the formula (I) (herbicide (A)):

| Compound No. | $X^3$ | $X^5$ | $R^3$ | $R^4$ | Z | Comment |
|---|---|---|---|---|---|---|
| A1 | Cl | Cl | OCH$_3$ | CH$_3$ | Z-1 | Z-1 of 2,4-cis configuration |
| A2 | Cl | Cl | CH=CH$_2$ | CH$_3$ | Z-1 | Z-1 of 2,4-cis configuration |
| A3 | F | F | (S)-CH=CH$_2$ | CH$_3$ | Z-1 | Z-1 of 2,4-cis configuration; 2 diastereomers |
| A4 | F | H | CH$_3$ | CH(CH$_3$)$_2$ | Z-1 | Z-1 of 2,4-cis configuration |
| A5 | F | F | (S)-CH=CH$_2$ | CH$_3$ | Z-13 | Z-13 of (3R) configuration |
| A6 | F | F | (R)-CH$_3$ | CH$_3$ | Z-13 | Z-13 of (3R) configuration |

TABLE 1b

IUPAC names and structural formulae of the preferred compounds of the formula (I) (herbicide (A))

| Compound No. | IUPAC name | Structural formula |
|---|---|---|
| A1 | methyl rel-(2R,4R)-4-[[3-(3,5-dichlorophenyl)-5-methoxy-4H-isoxazole-5-carbonyl]amino]tetrahydrofuran-2-carboxylate | rel-(2R,4R) |

TABLE 1b-continued

IUPAC names and structural formulae of the preferred compounds of the formula (I)
(herbicide (A))

| Compound No. | IUPAC name | Structural formula |
| --- | --- | --- |
| A2 | methyl rel-(2R,4R)-4-[[3-(3,5-dichlorophenyl)-5-vinyl-4H-isoxazole-5-carbonyl]amino]tetrahydrofuran-2-carboxylate | rel-(2R,4R) |
| A3 | methyl rel-(2R,4R)-4-[[(5S)-3-(3,5-difluorophenyl)-5-vinyl-4H-isoxazole-5-carbonyl]amino]tetrahydrofuran-2-carboxylate | rel-(2R,4R) |
| A4 | isopropyl rel-(2R,4R)-4-[[3-(3-fluorophenyl)-5-methyl-4H-isoxazole-5-carbonyl]amino]tetrahydrofuran-2-carboxylate | rel-(2R,4R) |
| A5 | methyl (3R)-3-[[(5S)-3-(3,5-difluorophenyl)-5-vinyl-4H-isoxazole-5-carbonyl]amino]-2,3-dihydrofuran-5-carboxylate | |
| A6 | methyl (3R)-3-[[(5R)-3-(3,5-difluorophenyl)-5-methyl-4H-isoxazole-5-carbonyl]amino]-2,3-dihydrofuran-5-carboxylate | |

The expression rel-(2R,4R) is in accordance with the IUPAC nomenclature, and means that both cis configurations of the substituents in the 2 and 4 positions exist.

In Tables 1a and 1b, the compounds are identified by the chemical formula of the main component, this component being present in a chemical purity of preferably at least 95 percent by weight of the compound. The compounds can naturally also be used with lower purities. Especially when secondary components of the compounds consist entirely or predominantly of stereoisomers of the respective compounds (A), efficacies are achieved on application. Preferred herbicides (A) are therefore also mixtures of two or more compounds (A) according to the invention.

When the stereochemical orientation at a carbon atom is defined in Tables 1a and 1b, the main component of the compound is a stereoisomer or stereoisomer mixture having the R or S configuration at the carbon atom in question.

If no stereochemistry is defined, the compound is a racemate. If there are multiple stereocentres and the configuration of each is identified as R or S, these are compounds having the stated stereochemistry at the centres in question.

If no R or S configuration is specified for multiple centres, the compounds are racemic mixtures, i.e. mirror-image stereoisomers (enantiomers of a pair of enantiomers) present therein are present in equal proportions in the mixture. Unless stated specifically, in Tables 1a and 1b, the diastereomeric components are present approximately in equal proportions in the case of racemic compounds (A) having multiple stereocentres. For practical use, however, mixtures of diastereomers having different portions of the diastereomeric components exist in the case of racemic compounds having multiple stereocentres.

It is preferable here that the respective compounds listed are also present in a stereochemical purity of 60% to 100%, preferably 70-100%, especially 80% to 100%.

Preference is also given to the mixtures detailed of stereoisomeric compounds (A).

The compounds of the formula (I) are known from the application having reference PCT/EP2018/065333, which was yet to be published at the priority date of the present application, and can be prepared by the processes described therein.

The application rates of the herbicides (A) are in the range from 0.01 to 2000 g of active substance per hectare (g a.i./ha hereinafter), preferably 0.02 to 1000 g a.i./ha, especially 0.5 to 750 g a.i./ha. In the combinations according to the invention, within the scope of the application rates mentioned by comparison to individual application, usually lower application rates of the respective active compound are required, preferably 0.01 to 1000 g a.i./ha, especially 0.02 to 500 g a.i./ha, and most preferably 5 to 250 g a.i./ha.

Suitable combination partners (B) [=component (B) or herbicides (B)] are in principle all active compounds from subgroups (B1) to (B11), where the herbicidal active compounds are largely named by the common name (in the English notation) according to the reference "The Pesticide Manual" 14th Ed., British Crop Protection Council 2006, abbreviated to "PM", or the chemical name according to the standard nomenclatures (IUPAC or Chemical Abstracts).

However, some herbicides (B) have surprisingly been found to be particularly good combination partners. The preferred, particularly preferred and most preferred herbicides (B) are listed hereinafter as further embodiments of the present invention.

In an eighth embodiment of the present invention, the herbicidally active compounds (B1) are preferably:

(B1.2) bicyclopyrone,
(B1.7) mesotrione,
(B1.8) pinoxaden,
(B1.10) sethoxydim,
(B1.11) sulcotrione,
(B1.14) tembotrione and
(B1.16) tralkoxydim.

Particular preference is given to the herbicidally active compounds (B1.7) mesotrione and
(B1.8) pinoxaden.

In a ninth embodiment of the present invention, preference is given to the herbicidally active compounds (B2):

(B2.3) amidosulfuron,
(B2.4) asulam,
(B2.6) beflubutamid,
(B2.10) chlorimuron,
(B2.12) chlorsulfuron,
(B2.14) cloransulam,
(B2.17) diclosulam,
(B2.18) diflufenican,
(B2.23) ethoxysulfuron,
(B2.24) flazasulfuron,
(B2.25) florasulam,
(B2.26) flucarbazone,
(B2.28) flufenacet,
(B2.29) flumetsulam,
(B2.30) flupyrsulfuron,
(B2.34) iodosulfuron,
(B2.37) mesosulfuron,
(B2.40) metolachlor,
(B2.41) metosulam,
(B2.42) metsulfuron,
(B2.46) penoxsulam,
(B2.49) picolinafen,
(B2.56) propoxycarbazone,
(B2.59) prosulfocarb,
(B2.60) prosulfuron,
(B2.62) pyroxsulam,
(B2.63) rimsulfuron,
(B2.64) S-metolachlor,
(B2.65) sulfometuron,
(B2.66) sulfosulfuron,
(B2.68) thiencarbazone,
(B2.69) thifensulfuron,
(B2.72) tribenuron,
(B2.76) esprocarb,
(B2.78) tri-allate.

Particular preference is given to
(B2.18) diflufenican,
(B2.25) florasulam,
(B2.28) flufenacet,
(B2.37) mesosulfuron,
(B2.40) metolachlor,
(B2.63) rimsulfuron and
(B2.68) thiencarbazone.

In a tenth embodiment of the present invention, preference is given to the herbicidally active compounds (B3)

(B3.1) bromoxynil and
(B3.4) ioxynil.

In an eleventh embodiment of the present invention, preference is given to the herbicidally active compounds (B4):

(B4.2) amitrole,
(B4.8) carfentrazone,
(B4.10) imazamethabenz,
(B4.11) imazamox, (B4.12) imazapic,
(B4.13) imazapyr,
(B4.15) imazethapyr,
(B4.17) isoxaben,
(B4.18) isoxaflutole,
(B4.21) pyraflufen,
(B4.22) pyrasulfotole,
(B4.25) pyroxasulfone,
(B4.28) topramezone and
(B4.33) flupoxam.

Particular preference is given to
(B4.18) isoxaflutole,
(B4.22) pyrasulfotole and
(B4.25) pyroxasulfone.

In a twelfth embodiment of the present invention, preference is given to the herbicidally active compounds (B5):
(B5.1) aminocyclopyrachlor,
(B5.2) aminopyralid,
(B5.3) benazolin,
(B5.5) bentazone,
(B5.7) bixlozone,
(B5.12) cinidon,
(B5.13) cinmethylin,
(B5.14) clomazone,
(B5.21) ethofumesate,
(B5.22) flamprop,
(B5.23) florpyrauxifen,
(B5.26) flumioxazin,
(B5.27) fluridone,
(B5.28) flurochloridone,
(B5.29) flurtamone,
(B5.31) halauxifen,
(B5.32) indanofan,
(B5.37) paraquat,
(B5.38) pelargonic acid,
(B5.39) pendimethalin,
(B5.45) triafamone,
(B5.46) trifluralin,
(B5.47) 4-amino-3-chloro-5-fluoro-6-(7-fluoro-1H-indol-6-yl)pyridine-2-carboxylic acid,
(B5.48) cyclopyrimorate,
(B5.49) diquat and
(B5.50) oxaziclomefone.

Particular preference is given to
(B5.7) bixlozone,
(B5.23) florpyrauxifen,
(B5.31) halauxifen and
(B5.38) pelargonic acid.

In a thirteenth embodiment of the present invention, preference is given to the herbicidally active compounds (B6):
(B6.2) clopyralid,
(B6.3) dicamba,
(B6.4) fluroxypyr and
(B6.5) picloram.

Particular preference is given to
(B6.2) clopyralid,
(B6.3) dicamba and
(B6.4) fluroxypyr.

In a fourteenth embodiment of the present invention, preference is given to the herbicidally active compounds (B7):
(B7.2) bialaphos,
(B7.4) glufosinate,
(B7.5) glyphosate and
(B7.7) sulfosate.

Particular preference is given to
(B7.5) glyphosate and
(B7.7) sulfosate.

In a fifteenth embodiment of the present invention, preference is given to the herbicidally active compounds (B8):
(B8.1) 2,4-D,
(B8.3) 2,4-DP,
(B8.5) aclonifen,
(B8.8) clodinafop,
(B8.11) diclofop,
(B8.13) fenoxaprop,
(B8.20) MCPA,
(B8.22) mecoprop,
(B8.26) quizalofop and
(B8.27) quizalofop.

Particular preference is given to
(B8.1) 2,4-D and
(B8.5) aclonifen.

In a sixteenth embodiment of the present invention, preference is given to the herbicidally active compounds (B9):
(B9.10) saflufenacil,
(B9.11) terbacil,
(B9.13) trifludimoxazin and
(B9.14) ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate.

Most preference is given to (B9.10) saflufenacil.

In a seventeenth embodiment of the present invention, preference is given to the herbicidally active compounds (B10):
(B10.1) chlorobromuron,
(B10.2) chlorotoluron,
(B10.5) diuron,
(B10.8) isoproturon,
(B10.9) linuron,
(B10.10) methabenzthiazuron,
(B10.11) metobromuron,
(B10.12) metoxuron and
(B10.13) monolinuron.

Particular preference is given to (B10.5) diuron and (B10.8) isoproturon.

In an eighteenth embodiment of the present invention, preference is given to the herbicidally active compounds (B11):
(B11.1) ametryne,
(B11.2) atrazine,
(B11.5) hexazinone,
(B11.6) indaziflam,
(B11.8) metribuzin,
(B11.12) simazine,
(B11.15) terbuthylazine and
(B11.16) terbutryne.

Particular preference is given to
(B11.5) hexazinone,
(B11.6) indaziflam and
(B11.8) metribuzin.

In the context of the present invention, it is possible to combine the individual preferred, particularly preferred and most preferred embodiments with one another as desired. This means that herbicidal compositions comprising (A) one or more compounds of the general formula (I) or agrochemically compatible salts thereof [component (A)] and (B) one or more herbicides [component (B)] selected from the group of the herbicidally active compounds (B1) to (B11) are encompassed by the present invention, in which any desired preferred, particularly preferred and most preferred embodiments disclosed can be combined with one another as detailed above.

Some binary compositions comprising (A) one or more herbicidally active compounds (A) of the general formula (I) or agrochemically compatible salts thereof [herbicides (A)] and a herbicide (B) have surprisingly been found to be particularly advantageous. The preferred, particularly preferred and most preferred binary systems are listed hereinafter as further embodiments of the present invention.

In a nineteenth embodiment of the present invention, the composition preferably comprises (A) a compound of the general formula (I) or their agrochemically acceptable salts [herbicides (A)]

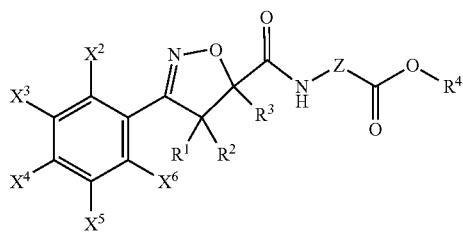

(I)

in which
R$^1$ and R$^2$ each represent hydrogen;
R$^3$ represents (C$_1$-C$_3$)-alkyl, (C$_2$-C$_3$)-alkenyl or (C$_1$-C$_3$)-alkoxy, each substituted by m radicals from the group consisting of fluorine and chlorine;
R$^4$ represents (C$_1$-C$_6$)-alkyl, (C$_3$-C$_6$)-cycloalkyl, (C$_3$-C$_6$)-cycloalkyl-(C$_1$-C$_6$)-alkyl, (C$_2$-C$_6$)-alkenyl or (C$_2$-C$_6$)-alkynyl, each of which is substituted by m radicals from the group consisting of fluorine, chlorine, cyano, (C$_1$-C$_4$)-alkoxy and phenyl;
Z represents the group Z-1 or Z-13, where Z1 and Z13 have the following meaning:

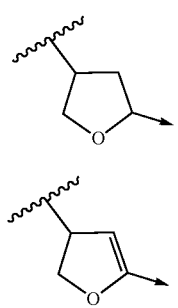

Z-1

Z-13 where the arrow in each case denotes a bond to the group C=O of the formula (I);
X$^2$, X$^4$ and X$^6$ independently of one another represent hydrogen;
X$^3$ and X$^5$ independently of one another represent hydrogen, fluorine, chlorine or cyano, or represent (C$_1$-C$_3$)-alkyl or (C$_1$-C$_3$)-alkoxy, each of which is substituted by m radicals from the group consisting of fluorine and chlorine; and
m represents the running number 0, 1, 2 or 3,
and
(B) a herbicide [component (B)] from the group consisting of (B1.2) bicyclopyrone,
(B1.7) mesotrione,
(B1.8) pinoxaden,
(B1.10) sethoxydim,
(B1.11) sulcotrione,
(B1.14) tembotrione,
(B1.16) tralkoxydim;
(B2.3) amidosulfuron,
(B2.4) asulam,
(B2.6) beflubutamid,
(B2.10) chlorimuron,
(B2.12) chlorsulfuron,
(B2.14) cloransulam,
(B2.17) diclosulam,
(B2.18) diflufenican,
(B2.23) ethoxysulfuron,
(B2.24) flazasulfuron,
(B2.25) florasulam,
(B2.26) flucarbazone,
(B2.28) flufenacet,
(B2.29) flumetsulam,
(B2.30) flupyrsulfuron,
(B2.34) iodosulfuron,
(B2.37) mesosulfuron,
(B2.40) metolachlor,
(B2.41) metosulam,
(B2.42) metsulfuron,
(B2.46) penoxsulam,
(B2.49) picolinafen,
(B2.56) propoxycarbazone,
(B2.59) prosulfocarb,
(B2.60) prosulfuron,
(B2.62) pyroxsulam,
(B2.63) rimsulfuron,
(B2.64) S-metolachlor,
(B2.65) sulfometuron,
(B2.66) sulfosulfuron,
(B2.68) thiencarbazone,
(B2.69) thifensulfuron,
(B2.72) iribenuron,
(B2.76) esprocarb.
(B2.78) tri-allate;
(B3.1) bromoxynil,
(B3.4) ioxynil;
(B4.2) amitrole,
(B4.8) carfentrazone,
(B4.10) imazamethabenz,
(B4.11) imazamox,
(B4.12) imazapie,
(B4.13) imazapyr,
(B4.15) imazethapyr,
(B4.17) isoxaben,
(B4.18) isoxaflutole,
(B4.21) pyraflufen,
(B4.22) pyrasulfotole,
(B4.25) pyroxasulfone,
(B4.28) topramezone,
(B4.33) flupoxam;
(B5.1) aminocyclopyrachlor,
(B5.2) aminopyralid,
(B5.3) benazolin,
(B5.5) hentazone,
(B5.7) bixlozone.
(B5.12) cinidon,
(B5.13) cinmethylin,
(B5.14) clomazone.
(B5.21) ethofumesate, (B5.22) flamprop,
(B5.23) florpyrauxifen,
(B5.26) flumioxazin,
(B5.27) fluridone,
(B5.28) flurochloridone,
(B5.29) flurtamone,
(B5.31) halauxifen,
(B5.32) indanofan,
(B5.37) paraquat,
(B5.38) pelargonic acid,
(B5.39) pendimethalin,
(B5.45) triafamone,
(B5.46) trifluralirt;
(B5.47) 4-amino-3-chloro-5-fluoro-6-(7-fluoro-1H-indol-6-yl)pyridine-2-carboxylic acid,
(B5.48) cyclopyrimorale,
(B5.49) diquat,
(B5.50) oxazielomefone;
(B6.2) clopyralid,
(B6.3) dicamba,
(B6.4) fluroxypyr,
(B6.5) picloram;
(B7.2) bialaphos,
(B7.4) glufosinate,
(B7.5) glyphosate,
(B7.7) sulfosate;
(B8.1) 2,4-D,
(B8.3) 2,4-DP,
(B8.5) aclonifen,
(B8.8) clodinafop,
(B8.11) diclofop,
(B8.13) fenoxaprop,
(B8.20) MCPA,
(B8.22) mecoprop,
(B8.26) quizalofop,
(B8.27) quizalofop;
(B9.10) saflufenacil,
(B9.11) terbacil,
(B9.13) trifludimoxazin;
(B10.1) chlorobromuron,
(B10.2) chlorotoluron,
(B10.5) diuron,
(B10.8) isoproturon,
(B10.9) linuron,
(B10.10) methabenzthiazuron,
(B10.11) metobromuron,
(B10.12) metoxuron,
(B10.13) monolinuron;
(B11.1) ametryne,
(B11.2) atrazine,
(B11.5) hexazinone,
(B11.6) indaziflam,
(B11.8) metribuzin,
(B11.12) simazine,
(B11.15) terbuthylazine and
(B11.16) terbutryne.

In a twentieth embodiment of the present invention, the composition preferably comprises
(A) a compound of the general formula (I) or their agrochemically acceptable salts [herbicides (A)]

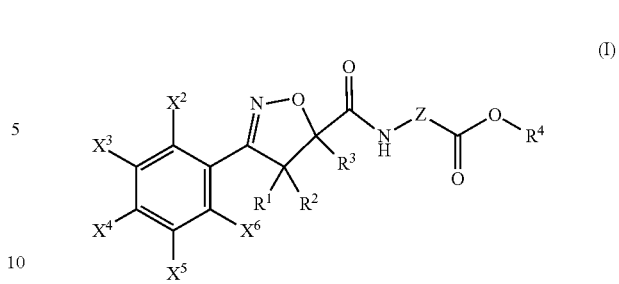

in which
R¹ and R² each represent hydrogen;
R³ represents methyl, vinyl, trifluoromethyl and methoxy;
R⁴ represents methyl, ethyl, chloroethyl, cyanomethyl, methoxyethyl and allyl;
Z represents the group Z-1 or Z-13, where Z1 and Z13 have the following meaning:

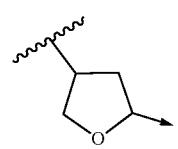

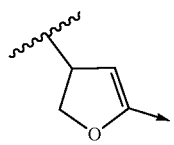

where the arrow in each case denotes a bond to the group C═O of the formula (I);
X², X⁴ and X⁶ independently of one another represent hydrogen;
X³ and X⁵ independently of one another represent hydrogen, fluorine, chlorine or cyano, or represent $(C_1$-$C_3)$-alkyl or $(C_1$-$C_3)$-alkoxy, each of which is substituted by m radicals from the group consisting of fluorine and chlorine; and
m represents the running number 0, 1, 2 or 3,
and
(B) a herbicide [component (B)] from the group consisting of
(B1.7) mesotrione,
(B1.8) pinoxaden,
(B2.18) diflufenican,
(B2.25) florasulam,
(B2.28) flufenacet,
(B2.37) mesosulfuron,
(B2.40) metolachlor,
(B2.63) rimsulfuron and
(B2.68) thiencarbazone,
(B4.18) isoxaflutole,
(B4.22) pyrasulfotole,
(B4.25) pyroxasulfone,
(B5.7) bixlozone,
(B5.23) florpyrauxifen,
(B5.38) pelargonic acid,
(B5.48) fulminate;
(B6.2) clopyralid,
(B6.3) dicamba, (B6.4) fluroxypyr,
(B7.5) glyphosate,
(B7.7) sulfosate;
(B8.1) 2,4-D,
(B8.5) aclonifen,
(B9.10) saflufenacil,
(B10.5) diuron,
(B10.8) isoproturon,
(B11.5) hexazinone,
(B11.6) indaziflam,
(B11.8) metribuzin.

Particularly preferred compositions in the context of the present invention are the compositions listed in Tables 2.1-2.7 below:

TABLE 2.1

Particularly preferred binary compositions comprising (A1)

| Binary composition | Compound (A) | Compound (B) |
|---|---|---|
| Z1 | A1 | (B1.7) |
| Z2 | A1 | (B1.8) |
| Z3 | A1 | (B2.18) |
| Z4 | A1 | (B2.25) |
| Z5 | A1 | (B2.28) |
| Z6 | A1 | (B2.37) |
| Z7 | A1 | (B2.40) |
| Z8 | A1 | (B2.63) |
| Z9 | A1 | (B2.68) |
| Z10 | A1 | (B4.18) |
| Z11 | A1 | (B4.22) |
| Z12 | A1 | (B4.25) |
| Z13 | A1 | (B5.7) |
| Z14 | A1 | (B5.23) |
| Z15 | A1 | (B5.31) |
| Z16 | A1 | (B5.38) |
| Z17 | A1 | (B6.2) |
| Z18 | A1 | (B6.3) |
| Z19 | A1 | (B6.4) |
| Z20 | A1 | (B7.5) |
| Z21 | A1 | (B7.7) |
| Z22 | A1 | (B8.1) |
| Z23 | A1 | (B8.5) |
| Z24 | A1 | (B9.10) |
| Z25 | A1 | (B10.5) |
| Z26 | A1 | (B10.8) |
| Z27 | A1 | (B11.5) |
| Z28 | A1 | (B11.6) |
| Z29 | A1 | (B11.8) |

TABLE 2.2

Particularly preferred binary compositions comprising (A2)

| Binary composition | Compound (A) | Compound (B) |
|---|---|---|
| Z30 | A2 | (B1.7) |
| Z31 | A2 | (B1.8) |
| Z32 | A2 | (B2.18) |
| Z33 | A2 | (B2.25) |
| Z34 | A2 | (B2.28) |
| Z35 | A2 | (B2.37) |
| Z36 | A2 | (B2.40) |
| Z37 | A2 | (B2.63) |
| Z38 | A2 | (B2.68) |
| Z39 | A2 | (B4.18) |
| Z40 | A2 | (B4.22) |
| Z41 | A2 | (B4.25) |
| Z42 | A2 | (B5.7) |
| Z43 | A2 | (B5.23) |
| Z44 | A2 | (B5.31) |
| Z45 | A2 | (B5.38) |
| Z46 | A2 | (B6.2) |
| Z47 | A2 | (B6.3) |
| Z48 | A2 | (B6.4) |
| Z49 | A2 | (B7.5) |
| Z50 | A2 | (B7.7) |
| Z51 | A2 | (B8.1) |
| Z52 | A2 | (B8.5) |
| Z53 | A2 | (B9.10) |
| Z54 | A2 | (B10.5) |
| Z55 | A2 | (B10.8) |
| Z56 | A2 | (B11.5) |
| Z57 | A2 | (B11.6) |
| Z58 | A2 | (B11.8) |

TABLE 2.3

Particularly preferred binary compositions comprising (A3)

| Binary composition | Compound (A) | Compound (B) |
|---|---|---|
| Z59 | A3 | (B1.7) |
| Z60 | A3 | (B1.8) |
| Z61 | A3 | (B2.18) |
| Z62 | A3 | (B2.25) |
| Z63 | A3 | (B2.28) |
| Z64 | A3 | (B2.37) |
| Z65 | A3 | (B2.40) |
| Z66 | A3 | (B2.63) |
| Z67 | A3 | (B2.68) |
| Z68 | A3 | (B4.18) |
| Z69 | A3 | (B4.22) |
| Z70 | A3 | (B4.25) |
| Z71 | A3 | (B5.7) |
| Z72 | A3 | (B5.23) |
| Z73 | A3 | (B5.31) |
| Z74 | A3 | (B5.38) |
| Z75 | A3 | (B6.2) |
| Z76 | A3 | (B6.3) |
| Z77 | A3 | (B6.4) |
| Z78 | A3 | (B7.5) |
| Z79 | A3 | (B7.7) |
| Z80 | A3 | (B8.1) |
| Z81 | A3 | (B8.5) |
| Z82 | A3 | (B9.10) |
| Z83 | A3 | (B10.5) |
| Z84 | A3 | (B10.8) |
| Z85 | A3 | (B11.5) |
| Z86 | A3 | (B11.6) |
| Z87 | A3 | (B11.8) |

TABLE 2.4

Particularly preferred binary compositions comprising (A4)

| Binary composition | Compound (A) | Compound (B) |
|---|---|---|
| Z88 | A4 | (B1.7) |
| Z89 | A4 | (B1.8) |
| Z90 | A4 | (B2.18) |
| Z91 | A4 | (B2.25) |
| Z92 | A4 | (B2.28) |
| Z93 | A4 | (B2.37) |
| Z94 | A4 | (B2.40) |
| Z95 | A4 | (B2.63) |
| Z96 | A4 | (B2.68) |
| Z97 | A4 | (B4.18) |
| Z98 | A4 | (B4.22) |
| Z99 | A4 | (B4.25) |
| Z100 | A4 | (B5.7) |
| Z101 | A4 | (B5.23) |
| Z102 | A4 | (B5.31) |
| Z103 | A4 | (B5.38) |
| Z104 | A4 | (B6.2) |
| Z105 | A4 | (B6.3) |

TABLE 2.4-continued

Particularly preferred binary compositions comprising (A4)

| Binary composition | Compound (A) | Compound (B) |
|---|---|---|
| Z106 | A4 | (B6.4) |
| Z107 | A4 | (B7.5) |
| Z108 | A4 | (B7.7) |
| Z109 | A4 | (B8.1) |
| Z110 | A4 | (B8.5) |
| Z111 | A4 | (B9.10) |
| Z112 | A4 | (B10.5) |
| Z113 | A4 | (B10.8) |
| Z114 | A4 | (B11.5) |
| Z115 | A4 | (B11.6) |
| Z116 | A4 | (B11.8) |

TABLE 2.5

Particularly preferred binary compositions comprising (A5)

| Binary composition | Compound (A) | Compound (B) |
|---|---|---|
| Z117 | A5 | (B1.7) |
| Z118 | A5 | (B1.8) |
| Z119 | A5 | (B2.18) |
| Z120 | A5 | (B2.25) |
| Z121 | A5 | (B2.28) |
| Z122 | A5 | (B2.37) |
| Z123 | A5 | (B2.40) |
| Z124 | A5 | (B2.63) |
| Z125 | A5 | (B2.68) |
| Z126 | A5 | (B4.18) |
| Z127 | A5 | (B4.22) |
| Z128 | A5 | (B4.25) |
| Z129 | A5 | (B5.7) |
| Z130 | A5 | (B5.23) |
| Z131 | A5 | (B5.31) |
| Z132 | A5 | (B5.38) |
| Z133 | A5 | (B6.2) |
| Z134 | A5 | (B6.3) |
| Z135 | A5 | (B6.4) |
| Z136 | A5 | (B7.5) |
| Z137 | A5 | (B7.7) |
| Z138 | A5 | (B8.1) |
| Z139 | A5 | (B8.5) |
| Z140 | A5 | (B9.10) |
| Z141 | A5 | (B10.5) |
| Z142 | A5 | (B10.8) |
| Z143 | A5 | (B11.5) |
| Z144 | A5 | (B11.6) |
| Z145 | A5 | (B11.8) |

TABLE 2.6

Particularly preferred binary compositions comprising (A6)

| Binary composition | Compound (A) | Compound (B) |
|---|---|---|
| Z146 | A6 | (B1.7) |
| Z147 | A6 | (B1.8) |
| Z148 | A6 | (B2.18) |
| Z149 | A6 | (B2.25) |
| Z150 | A6 | (B2.28) |
| Z151 | A6 | (B2.37) |
| Z152 | A6 | (B2.40) |
| Z153 | A6 | (B2.63) |
| Z154 | A6 | (B2.68) |
| Z155 | A6 | (B4.18) |
| Z156 | A6 | (B4.22) |
| Z157 | A6 | (B4.25) |
| Z158 | A6 | (B5.7) |
| Z159 | A6 | (B5.23) |
| Z160 | A6 | (B5.31) |
| Z161 | A6 | (B5.38) |
| Z162 | A6 | (B6.2) |
| Z163 | A6 | (B6.3) |
| Z164 | A6 | (B6.4) |
| Z165 | A6 | (B7.5) |
| Z166 | A6 | (B7.7) |
| Z167 | A6 | (B8.1) |
| Z168 | A6 | (B8.5) |
| Z169 | A6 | (B9.10) |
| Z170 | A6 | (B10.5) |
| Z171 | A6 | (B10.8) |
| Z172 | A6 | (B11.5) |
| Z173 | A6 | (B11.6) |
| Z174 | A6 | (B11.8) |

Furthermore, the combinations according to the invention can be employed together with other active compounds such as the active compounds mentioned (herbicides, fungicides, insecticides, acaricides etc.) and/or plant growth regulators or auxiliaries from the group of additives customary in crop protection, such as adjuvants and formulation aids. Here, the combination of the active crop protection compounds comprising the active compounds (A) and (B) and optionally further active compounds are referred to in short as "herbicide combination". Their use forms such as formulations or tank mixes represent herbicidal compositions.

Accordingly, the invention also provides the herbicidal compositions comprising the active compound combinations according to the invention with additives customary in crop protection, such as adjuvants and formulation aids, and optionally further active crop protection compounds.

The invention also provides the use of the or the application method using the active compound combinations according to the invention as herbicides and plant growth regulators, preferably as herbicides and plant growth regulators having a synergistically active content of the respective active compound combination present.

The application rates of the herbicides (B) are known in principle and are generally in the range from 0.01 to 4000 g of a.i./ha, preferably in the range from 0.02 to 2000 g of a.i./ha, in particular 1 to 2000 g of a.i./ha. For the active compound pelargonic acid (B5.38) from group (B5), the application rate is in the range from 1 to 100 000 g of a.i./ha.

In the mixtures according to the invention, in the context of the application rates mentioned, generally lower application rates of the respective active compound are required compared to the individual application.

For the active compounds from group (B1), the application rate is preferably in the range from 5 to 250 g of a.i./ha, in particular in the range from 5 to 150 g/ha and most preferably in the range from 5 to 60 g of a.i./ha.

For the active compounds from group (B2), the application rate is preferably in the range from 1 to 4000 g of a.i./ha, in particular in the range from 1 to 2000 g of a.i./ha and most preferably in the range from 1 to 400 g of a.i./ha.

For the active compound from group (B3), the application rate is preferably in the range from 10 to 1000 g of a.i./ha, in particular in the range from 10 to 500 g of a.i./ha and most preferably in the range from 10 to 300 g of a.i./ha.

For the active compound from group (B4), the application rate is preferably in the range from 1 to 700 g of a.i./ha, in particular in the range from 1 to 400 g of a.i./ha and most preferably in the range from 1 to 200 g of a.i./ha.

For the active compound from group (B5), except for pelargonic acid (B5.38), the application rate is preferably in the range from 1 to 2400 g of a.i./ha, in particular in the range from 1 to 1200 g of a.i./ha and most preferably in the range from 1 to 400 g of a.i./ha. For pelargonic acid (B.5.38), the application rate is preferably from 1 to 100,000 g of a.i./ha, more preferred in the range from 1 to 40,000 g of a.i./ha and in particular in the range from 1 to 30,000 g of a.i./ha.

For the active compound from group (B6), the application rate is preferably in the range from 10 to 1000 g of a.i./ha, in particular in the range from 10 to 600 g of a.i./ha.

For the active compound from group (B7), the application rate is preferably in the range from 20 to 3500 g of a.i./ha, in particular in the range from 20 to 2500 g of a.i./ha and most preferably in the range from 20 to 2000 g of a.i./ha.

For the active compound from group (B8), the application rate is preferably in the range from 5 to 1500 g of a.i./ha, in particular in the range from 5 to 1000 g of a.i./ha and most preferably in the range from 5 to 900 g of a.i./ha.

For the active compound from group (B9), the application rate is preferably in the range from 2 to 2000 g of a.i./ha, in particular in the range from 2 to 1000 g of a.i./ha, more preferably in the range from 2 to 200 g of a.i./ha and most preferably in the range from 2 to 50 g of a.i./ha.

For the active compound from group (B10), the application rate is preferably in the range from 20 to 3500 g of a.i./ha, in particular in the range from 20 to 2000 g of a.i./ha.

For the active compound from group (B11), the application rate is preferably in the range from 25 to 3000 g of a.i./ha, in particular in the range from 25 to 2500 g of a.i./ha and most preferably in the range from 25 to 2000 g of a.i./ha.

The ratios of (A):(B) based on weight, depending on the effective application rates, are generally in the range from 1:100000 to 2000:1, preferably 1:40000 to 750:1, especially in the range from 1:15000 to 500:1 and even further preferably in the range from 1:300 to 400:1.

For the active compounds from groups (B1) to (B11), the preferred weight ratios (A):(B) are as follows:
- (A):(B1) preferably in the range from 30:1 to 1:30, in particular from 15:1 to 1:15;
- (A):(B2) preferably in the range from 400:1 to 1:400, in particular from 200:1 to 1:200;
- (A):(B3) preferably in the range from 30:1 to 1:30, in particular from 15:1 to 1:15;
- (A):(B4) preferably in the range from 300:1 to 1:300, in particular from 150:1 to 1:150;
- (A):(B5) preferably in the range from 400:1 to 1:300, in particular from 300:1 to 1:150;
- (A):(B6) preferably in the range from 60:1 to 1:60, in particular from 30:1 to 1:30;
- (A):(B7) preferably in the range from 10:1 to 1:200, in particular from 1:1 to 1:100;
- (A):(B8) preferably in the range from 30:1 to 1:300, in particular from 10:1 to 1:80;
- (A):(B9) preferably in the range from 80:1 to 1:200, in particular from 40:1 to 1:100;
- (A):(B10) preferably in the range from 10:1 to 1:300, in particular from 3:1 to 1:150;
- (A):(B11) preferably in the range from 30:1 to 1:300, in particular from 15:1 to 1:150.

The herbicidal compositions according to the invention can also be combined with further herbicides and plant growth regulators, for example to supplement the activity spectrum. Active compounds which can be employed in combination with the compounds according to the invention in mixed formulations or in the tank mix are, for example, known active compounds which are based on the inhibition of, for example, acetolactate synthase, acetyl-CoA carboxylase, cellulose synthase, enolpyruvylshikimate-3-phosphate synthase, glutamine synthetase, p-hydroxyphenylpyruvate dioxygenase, phytoen desaturase, photosystem I, photosystem II, protoporphyrinogen oxidase, as are known, for example, from Weed Research 26 (1986) 441-445 or "The Pesticide Manual", 14th edition, The British Crop Protection Council and the Royal Soc. of Chemistry, 2006, the corresponding "e-Pesticide Manual Version 4 (2006)" and the literature cited therein. Further trade names and "common names" are listed in the "Compendium of Pesticide Common Names" (available on the Internet under http://www.alanwood.net/pesticides).

Known herbicides which may be mentioned as being suitable for being combined with the compounds according to the invention are, for example, the following active compounds (note: The compounds are referred to either by the "common name" in accordance with the International Organization for Standardization (ISO) or by the chemical name, if appropriate together with a customary code number), and in each case include all use forms, such as acids, salts, esters and isomers, such as stereoisomers and optical isomers. In this case, one or else, in some cases, more than one application form is mentioned:

2,4-D, acetochlor, acifluorfen, acifluorfen-sodium, aclonifen, alachlor, alloxydim, alloxydim-sodium, ametryn, amicarbazone, amidosulfuron, amitrole, anilofos, asulam, atrazine, azafenidin, azimsulfuron, beflubutamid, benazolin, benazolin-ethyl, benfuresate, bensulfuron-methyl, bentazone, benzfendizone, benzobicyclon, benzofenap, bifenox, bilanafos, bispyribac-sodium, bromacil, bromobutide, bromofenoxim, bromoxynil, butachlor, butafenacil, butenachlor, butralin, butroxydim, butylate, cafenstrole, carbetamide, carfentrazone-ethyl, chlomethoxyfen, chloridazon, chlorimuron-ethyl, chlornitrofen, chlorotoluron, chlorsulfuron, cinidon-ethyl, cinmethylin, cinosulfuron, clefoxydim, clethodim, clodinafop-propargyl, clomazone, clomeprop, clopyralid, cloransulam-methyl, cumyluron, cyanazine, cyclosulfamuron, cycloxydim, cyhalofop-butyl, desmedipham, dicamba, dichlobenil, dichlorprop, dichlorprop-P, diclofop-methyl, diclosulam, difenzoquat, diflufenican, diflufenzopyr, dikegulac-sodium, dimefuron, dimepiperate, dimethachlor, dimethametryn, dimethenamid, triaziflam, diquat-dibromide, dithiopyr, diuron, dymron, EPTC, esprocarb, ethalfluralin, ethametsulfuron-methyl, ethoxyfen, ethoxysulfuron, etobenzanid, fenoxaprop-ethyl, fenoxaprop-P-ethyl, fentrazamide, flamprop-M-isopropyl, flamprop-M-methyl, flazasulfuron, florasulam, fluazifop, fluazifop-butyl, fluazifop-butyl, fluazolate, flucarbazone-sodium, flucetosulfuron, fluchloralin, flufenacet, flufenpyr, flumetsulam, flumiclorac-pentyl, flumioxazin, fluometuron, fluorochloridone, fluoroglycofen-ethyl, flupoxam, flupyrsulfuron-methyl-sodium, fluridone, fluroxypyr, fluroxypyr-butoxypropyl, fluroxypyr-meptyl, flurprimidol, flurtamone, fluthiacet-methyl, fomesafen, foramsulfuron, glufosinate, glufosinate-ammonium, glyphosate, halosulfuron-methyl, haloxyfop, haloxyfop-ethoxyethyl, haloxyfop-methyl, haloxyfop-P-methyl, hexazinone, imazamethabenz-methyl, imazamox, imazapic, imazapyr, imazaquin, imazethapyr, imazosulfuron, indanofan, iodosulfuron-methyl-sodium, ioxynil, isoproturon, isouron, isoxaben, isoxachlortole, isoxaflutole, ketospiradox, lactofen, lenacil, linuron, MCPA, mecoprop, mecoprop-P, mefenacet, mesosulfuron-methyl, mesotrione, metamifop, metamitron, metazachlor, methabenzthiazuron, methyldymron, metobromuron, metolachlor, metosulam, metoxuron, metribuzin, metsulfuron-methyl, molinate, monolinuron, naproanilide, napropamide, neburon, nicosulfuron, norflurazon, orbencarb, oryzalin, oxadiargyl, oxadiazon, oxasulfuron, oxaziclomefone, oxyfluorfen, paraquat, pelargonic acid, pendimethalin, pendralin, pentoxazone, pethoxamid, phenmedipham, picloram, picolinafen, pinoxaden, piperophos, pretilachlor, primisulfuron-methyl, profluazol, profoxydim, prometryn, propachlor, propanil, propaquizafop, propisochlor, propoxycarbazone-sodium, propyzamide, prosulfocarb, prosulfuron, pyraclonil, pyraflufen-ethyl, pyrazolate, pyrazosulfuron-ethyl, pyrazoxyfen, pyribenzoxim, pyributicarb, pyridafol, pyridate, pyriftalid, pyriminobac-methyl, pyrithiobac-sodium, quinclorac, quinmerac, quinoclamine, quizalofop-ethyl, quizalofop-P-ethyl, quizalofop-P-tefuryl, rimsulfuron, sethoxydim, simazine, simetryn, S-metolachlor, sulcotrione, sulfentrazone, sulfometuron-methyl, sulfosate, sulfosulfuron, tebuthiuron, tepraloxydim, terbuthylazine, terbutryn, thenylchlor, thiazopyr, thifensulfuron-methyl, thiobencarb, tiocarbazil, tralkoxydim, triallate, triasulfuron, tribenuron-methyl, triclopyr, tridiphane, trifloxysulfuron, trifluralin, triflusulfuron-methyl, tritosulfuron, WL 110547, i.e. 5-phenoxy-1-[3-(trifluoromethyl)phenyl]-1H-tetrazole; HOK-201, HOK-202, UBH-509; D-489; LS 82-556; KPP-300; NC-324; NC-330; KH-218; DPX-N8189; SC-0774; TH-547, DOWCO-535; DK-8910; V-53482; PP-600; MBH-001; KIH-9201; ET-751; KIH-6127; KIH-2023 and KIH5996.

If the respective common name comprises a plurality of forms of the active compound, the name preferably defines the commercially available form.

Each of the further active compounds mentioned (=active compounds (C*), (C1*), (C2*) etc.) may then preferably be combined with one of the binary combinations according to the present invention, according to the scheme (A)+(B)+(C*) or else according to the scheme (A)+(B)+(C1*)+(C2*) etc.

The stated amounts are application rates (g of a.i./ha=grams of active substance per hectare) and thus also define the ratios in a co-formulation, a premix, a tank mix or a sequential application of the combined active compounds.

The combinations can be applied both by the pre-emergence method and by the post-emergence method. This applies both to the pre- and post-emergence with respect to the harmful plants and to the selective control of the harmful plants for the pre- and post-emergence of the crop plants. Mixed forms are also possible, for example after emergence of the crop plants control of the harmful plants at their pre- or post-emergence stage.

The herbicide combinations according to the invention may comprise further components, for example other active compounds against harmful organisms such as harmful plants, plant-damaging animals or plant-damaging fungi, here in particular active compounds from the group of the herbicides, fungicides, insecticides, acaricides, nematicides, miticides and related substances.

Fungicidally active compounds which can be employed in combination with the herbicide combinations according to the invention are preferably commercial active compounds, for example (analogously to the herbicides, the compounds are generally referred to by their Common names):

1) Ergosterol biosynthesis inhibitors, for example (1.001) cyproconazole, (1.002) difenoconazole, (1.003) epoxiconazole, (1.004) fenhexamid, (1.005) fenpropidin, (1.006) fenpropimorph, (1.007) fenpyrazamine, (1.008) fluquinconazole, (1.009) flutriafol, (1.010) imazalil, (1.011) imazalil sulphate, (1.012) ipconazole, (1.013) metconazole, (1.014) myclobutanil, (1.015) paclobutrazol, (1.016) prochloraz, (1.017) propiconazole, (1.018) prothioconazole, (1.019) pyrisoxazole, (1.020) spiroxamine, (1.021) tebuconazole, (1.022) tetraconazole, (1.023) triadimenol, (1.024) tridemorph, (1.025) triticonazole, (1.026) (1R,2S,5S)-5-(4-chlorobenzyl)-2-(chloromethyl)-2-methyl-1-(1H-1,2,4-triazol-1-ylmethyl)cyclopentanol, (1.027) (1S,2R,5R)-5-(4-chlorobenzyl)-2-(chloromethyl)-2-methyl-1-(1H-1,2,4-triazol-1-ylmethyl)cyclopentanol, (1.028) (2R)-2-(1-chlorocyclopropyl)-4-[(1R)-2,2-dichlorocyclopropyl]-1-(1H-1,2,4-triazol-1-yl)butan-2-ol (1.029) (2R)-2-(1-chlorocyclopropyl)-4-[(1S)-2,2-dichlorocyclopropyl]-1-(1H-1,2,4-triazol-1-yl)butan-2-ol, (1.030) (2R)-2-[4-(4-chlorophenoxy)-2-(trifluoromethyl)phenyl]-1-(1H-1,2,4-triazol-1-yl)propan-2-ol, (1.031) (2S)-2-(1-chlorocyclopropyl)-4-[(1R)-2,2-dichlorocyclopropyl]-1-(1H-1,2,4-triazol-1-yl)butan-2-ol, (1.032) (2S)-2-(1-chlorocyclopropyl)-4-[(1S)-2,2-dichlorocyclopropyl]-1-(1H-1,2,4-triazol-1-yl)butan-2-ol, (1.033) (2S)-2-[4-(4-chlorophenoxy)-2-(trifluoromethyl)phenyl]-1-(1H-1,2,4-triazol-1-yl)propan-2-ol, (1.034) (R)-[3-(4-chloro-2-fluorophenyl)-5-(2,4-difluorophenyl)-1,2-oxazol-4-yl](pyridin-3-yl)methanol, (1.035) (S)-[3-(4-chloro-2-fluorophenyl)-5-(2,4-difluorophenyl)-1,2-oxazol-4-yl](pyridin-3-yl)methanol, (1.036) [3-(4-chloro-2-fluorophenyl)-5-(2,4-difluorophenyl)-1,2-oxazol-4-yl](pyridin-3-yl)methanol, (1.037) 1-({(2R,4S)-2-[2-chloro-4-(4-chlorophenoxy)phenyl]-4-methyl-1,3-dioxolan-2-yl}methyl)-1H-1,2,4-triazole, (1.038) 1-({(2S,4S)-2-[2-chloro-4-(4-chlorophenoxy)phenyl]-4-methyl-1,3-dioxolan-2-yl}methyl)-1H-1,2,4-triazole, (1.039) 1-{[3-(2-chlorophenyl)-2-(2,4-difluorophenyl)oxiran-2-yl]methyl}-1H-1,2,4-triazol-5-yl thiocyanate, (1.040) 1-{[rel(2R,3R)-3-(2-chlorophenyl)-2-(2,4-difluorophenyl)oxiran-2-yl]methyl}-1H-1,2,4-triazol-5-yl thiocyanate, (1.041) 1-{[rel(2R,3S)-3-(2-chlorophenyl)-2-(2,4-difluorophenyl)oxiran-2-yl]methyl}-1H-1,2,4-triazol-5-yl thiocyanate, (1.042) 2-[(2R,4R,5R)-1-(2,4-dichlorophenyl)-5-hydroxy-2,6,6-trimethylheptan-4-yl]-2,4-dihydro-3H-1,2,4-triazole-3-thione, (1.043) 2-[(2R,4R,5S)-1-(2,4-dichlorophenyl)-5-hydroxy-2,6,6-trimethylheptan-4-yl]-2,4-dihydro-3H-1,2,4-triazole-3-thione, (1.044) 2-[(2R,4S,5R)-1-(2,4-dichlorophenyl)-5-hydroxy-2,6,6-trimethylheptan-4-yl]-2,4-dihydro-3H-1,2,4-triazole-3-thione, (1.045) 2-[(2R,4S,5S)-1-(2,4-dichlorophenyl)-5-hydroxy-2,6,6-trimethylheptan-4-yl]-2,4-dihydro-3H-1,2,4-triazole-3-thione, (1.046) 2-[(2S,4R,5R)-1-(2,4-dichlorophenyl)-5-hydroxy-2,6,6-trimethylheptan-4-yl]-2,4-dihydro-3H-1,2,4-triazole-3-thione, (1.047) 2-[(2S,4R,5S)-1-(2,4-dichlorophenyl)-5-hydroxy-2,6,6-trimethylheptan-4-yl]-2,4-dihydro-3H-1,2,4-triazole-3-thione, (1.048) 2-[(2S,4S,5R)-1-(2,4-dichlorophenyl)-5-hydroxy-2,6,6-trimethylheptan-4-yl]-2,4-dihydro-3H-1,2,4-triazole-3-thione, (1.049) 2-[(2S,4S,5S)-1-(2,4-dichlorophenyl)-5-hydroxy-2,6,6-trimethylheptan-4-yl]-2,4-dihydro-3H-1,2,4-triazole-3-thione, (1.050) 2-[1-(2,4-dichlorophenyl)-5-hydroxy-2,6,6-trimethylheptan-4-yl]-2,4-dihydro-3H-1,2,4-triazole-3-thione, (1.051) 2-[2-chloro-4-(2,4-dichlorophenoxy)phenyl]-1-(1H-1,2,4-triazol-1-yl)propan-2-ol, (1.052) 2-[2-chloro-4-(4-chlorophenoxy)phenyl]-1-(1H-1,2,4-triazol-1-yl)butan-2-ol, (1.053) 2-[4-(4-chlorophenoxy)-2-(trifluoromethyl)phenyl]-1-(1H-1,2,4-triazol-1-yl)butan-2-ol, (1.054) 2-[4-(4-chlorophenoxy)-2-(trifluoromethyl)phenyl]-1-(1H-1,2,4-triazol-1-yl)pentan-2-ol, (1.055) 2-[4-(4-chlorophenoxy)-2-(trifluoromethyl)phenyl]-1-(1H-1,2,4-triazol-1-yl)propan-2-ol, (1.056) 2-{[3-(2-chlorophenyl)-2-(2,4-difluorophenyl)oxiran-2-yl]methyl}-2,4-dihydro-3H-1,2,4-triazole-3-thione, (1.057) 2-{[rel(2R,3R)-3-(2-chlorophenyl)-2-(2,4-difluorophenyl)oxiran-2-yl]methyl}-2,4-dihydro-3H-1,2,4-triazole-3- thione, (1.058) 2-{[rel(2R,3S)-3-(2-chlorophenyl)-2-(2,4-difluorophenyl)oxiran-2-yl]methyl}-2,4-dihydro-3H-1,2,4-triazole-3-thione, (1.059) 5-(4-chlorobenzyl)-2-(chloromethyl)-2-methyl-1-(1H-1,2,4-triazol-1-ylmethyl) cyclopentanol, (1.060) 5-(allylsulphanyl)-1-{[3-(2-chlorophenyl)-2-(2,4-difluorophenyl)oxiran-2-yl]methyl}-1H-1,2,4-triazole, (1.061) 5-(allylsulphanyl)-1-{[rel(2R,3R)-3-(2-chlorophenyl)-2-(2,4-difluorophenyl)oxiran-2-yl] methyl}-1H-1,2,4-triazole, (1.062) 5-(allylsulphanyl)-1-{[rel(2R,3S)-3-(2-chlorophenyl)-2-(2,4-difluorophenyl) oxiran-2-yl]methyl}-1H-1,2,4-triazole, (1.063) N'-(2,5-dimethyl-4-{[3-(1,1,2,2-tetrafluoroethoxy)phenyl] sulphanyl}phenyl)-N-ethyl-N-methylimidoformamide, (1.064) N'-(2,5-dimethyl-4-{[3-(2,2,2-trifluoroethoxy)phenyl]sulphanyl}phenyl)-N-ethyl-N-methylimidoformamide, (1.065) N'-(2,5-dimethyl-4-{[3-(2,2,3,3-tetrafluoropropoxy) phenyl]sulphanyl}phenyl)-N-ethyl-N-methylimidoformamide, (1.066) N'-(2,5-dimethyl-4-{[3-(pentafluoroethoxy) phenyl]sulphanyl}phenyl)-N-ethyl-N-methylimidoformamide, (1.067) N'-(2,5-dimethyl-4-{3-[(1,1,2,2-tetrafluoroethyl)sulphanyl]phenoxy}phenyl)-N-ethyl-N-methylimidoformamide, (1.068) N'-(2,5-dimethyl-4-{3-[(2,2,2-trifluoroethyl)sulphanyl]phenoxy}phenyl)-N-ethyl-N-methylimidoformamide, (1.069) N'-(2,5-dimethyl-4-{3-[(2,2,3,3-tetrafluoropropyl)sulphanyl]phenoxy}phenyl)-N-ethyl-N-methylimidoformamide, (1.070) N'-(2,5-dimethyl-4-{3-[(pentafluoroethyl)sulphanyl]phenoxy}phenyl)-N-ethyl-N-methylimidoformamide, (1.071) N'-(2,5-dimethyl-4-phenoxyphenyl)-N-ethyl-N-methylimidoformamide, (1.072) N'-(4-{[3-(difluoromethoxy)phenyl]sulphanyl}-2,5-dimethylphenyl)-N-ethyl-N-methylimidoformamide, (1.073) N'-(4-{3-[(difluoromethyl)sulphanyl]phenoxy}-2,5-dimethylphenyl)-N-ethyl-N-methylimidoformamide, (1.074) N'-[5-bromo-6-(2,3-dihydro-1H-inden-2-yloxy)-2-methylpyridin-3-yl]-N-ethyl-N-methylimidoformamide, (1.075) N'-{4-[(4,5-dichloro-1,3-thiazol-2-yl)oxy]-2,5-dimethylphenyl}-N-ethyl-N-methylimidoformamide, (1.076) N'-{5-bromo-6-[(1R)-1-(3,5-difluorophenyl)ethoxy]-2-methylpyridin-3-yl}-N-ethyl-N-methylimidoformamide, (1.077) N'-{5-bromo-6-[(1S)-1-(3,5-difluorophenyl) ethoxy]-2-methylpyridin-3-yl}-N-ethyl-N-methylimidoformamide, (1.078) N'-{5-bromo-6-[(cis-4-isopropylcyclohexyl)oxy]-2-methylpyridin-3-yl}-N-ethyl-N-methylimidoformamide, (1.079) N'-{5-bromo-6-[(trans-4-isopropylcyclohexyl)oxy]-2-methylpyridin-3-yl}-N-ethyl-N-methylimidoformamide, (1.080) N'-{5-bromo-6-[1-(3,5-difluorophenyl)ethoxy]-2-methylpyridin-3-yl}-N-ethyl-N-methylimidoformamide, (1.081) mefentrifluconazole, (1.082) ipfentrifluconazole.

2) Inhibitors of the respiratory chain in complex I or II, for example (2.001) benzovindiflupyr, (2.002) bixafen, (2.003) boscalid, (2.004) carboxin, (2.005) fluopyram, (2.006) flutolanil, (2.007) fluxapyroxad, (2.008) furametpyr, (2.009) isofetamid, (2.010) isopyrazam (anti-epimeric enantiomer 1R,4S,9S), (2.011) isopyrazam (anti-epimeric enantiomer 1S,4R,9R), (2.012) isopyrazam (anti-epimeric racemate 1RS,4SR,9SR), (2.013) isopyrazam (mixture of the syn-epimeric racemate 1RS,4SR,9RS and the anti-epimeric racemate 1RS,4SR,9SR), (2.014) isopyrazam (syn-epimeric enantiomer 1R,4S,9R), (2.015) isopyrazam (syn-epimeric enantiomer 1S,4R,9S), (2.016) isopyrazam (syn-epimeric racemate 1RS,4SR,9RS), (2.017) penflufen, (2.018) penthiopyrad, (2.019) pydiflumetofen, (2.020) pyraziflumid, (2.021) sedaxane, (2.022) 1,3-dimethyl-N-(1,1,3-trimethyl-2,3-dihydro-1H-inden-4-yl)-1H-pyrazole-4-carboxamide, (2.023) 1,3-dimethyl-N-[(3R)-1,1,3-trimethyl-2,3-dihydro-1H-inden-4-yl]-1H-pyrazole-4-carboxamide, (2.024) 1,3-dimethyl-N-[(3S)-1,1,3-trimethyl-2,3-dihydro-1H-inden-4-yl]-1H-pyrazole-4-carboxamide, (2.025) 1-methyl-3-(trifluoromethyl)-N-[2'-(trifluoromethyl)biphenyl-2-yl]-1H-pyrazole-4-carboxamide, (2.026) 2-fluoro-6-(trifluoromethyl)-N-(1,1,3-trimethyl-2,3-dihydro-1H-inden-4-yl)benzamide, (2.027) 3-(difluoromethyl)-1-methyl-N-(1,1,3-trimethyl-2,3-dihydro-1H-inden-4-yl)-1H-pyrazole-4-carboxamide, (2.028) 3-(difluoromethyl)-1-methyl-N-[(3R)-1,1,3-trimethyl-2,3-dihydro-1H-inden-4-yl]-1H-pyrazole-4-carboxamide, (2.029) 3-(difluoromethyl)-1-methyl-N-[(3S)-1,1,3-trimethyl-2,3-dihydro-1H-inden-4-yl]-1H-pyrazole-4-carboxamide, (2.030) 3-(difluoromethyl)-N-(7-fluoro-1,1,3-trimethyl-2,3-dihydro-1H-inden-4-yl)-1-methyl-1H-pyrazole-4-carboxamide, (2.031) 3-(difluoromethyl)-N-[(3R)-7-fluoro-1,1,3-trimethyl-2,3-dihydro-1H-inden-4-yl]-1-methyl-1H-pyrazole-4-carboxamide, (2.032) 3-(difluoromethyl)-N-[(3S)-7-fluoro-1,1,3-trimethyl-2,3-dihydro-1H-inden-4-yl]-1-methyl-1H-pyrazole-4-carboxamide, (2.033) 5,8-difluoro-N-[2-(2-fluoro-4-{[4-(trifluoromethyl)pyridin-2-yl] oxy}phenyl)ethyl]quinazolin-4-amine, (2.034) N-(2-cyclopentyl-5-fluorobenzyl)-N-cyclopropyl-3-(difluoromethyl)-5-fluoro-1-methyl-1H-pyrazole-4-carboxamide, (2.035) N-(2-tert-butyl-5-methylbenzyl)-N-cyclopropyl-3-(difluoromethyl)-5-fluoro-1-methyl-1H-pyrazole-4-carboxamide, (2.036) N-(2-tert-butylbenzyl)-N-cyclopropyl-3-(difluoromethyl)-5-fluoro-1-methyl-1H-pyrazole-4-carboxamide, (2.037) N-(5-chloro-2-ethylbenzyl)-N-cyclopropyl-3-(difluoromethyl)-5-fluoro-1-methyl-1H-pyrazole-4-carboxamide, (2.038) N-(5-chloro-2-isopropylbenzyl)-N-cyclopropyl-3-(difluoromethyl)-5-fluoro-1-methyl-1H-pyrazole-4-carboxamide, (2.039) N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide, (2.040) N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide, (2.041) N-[1-(2,4-dichlorophenyl)-1-methoxypropan-2-yl]-3-(difluoromethyl)-1-methyl-1H-pyrazole-4-carboxamide, (2.042) N-[2-chloro-6-(trifluoromethyl)benzyl]-N-cyclopropyl-3-(difluoromethyl)-5-fluoro-1-methyl-1H-pyrazole-4-carboxamide, (2.043) N-[3-chloro-2-fluoro-6-(trifluoromethyl)benzyl]-N-cyclopropyl-3-(difluoromethyl)-5-fluoro-1-methyl-1H-pyrazole-4-carboxamide, (2.044) N-[5-chloro-2-(trifluoromethyl)benzyl]-N-cyclopropyl-3-(difluoromethyl)-5-fluoro-1-methyl-1H-pyrazole-4-carboxamide, (2.045) N-cyclopropyl-3-(difluoromethyl)-5-fluoro-1-methyl-N-[5-methyl-2-(trifluoromethyl)benzyl]-1H-pyrazole-4-carboxamide, (2.046) N-cyclopropyl-3-(difluoromethyl)-5-fluoro-N-(2-fluoro-6-isopropylbenzyl)-1-methyl-1H-pyrazole-4-carboxamide, (2.047) N-cyclopropyl-3-(difluoromethyl)-5-fluoro-N-(2-isopropyl-5-methylbenzyl)-1-methyl-1H-pyrazole-4-carboxamide, (2.048) N-cyclopropyl-3-(difluoromethyl)-5-fluoro-N-(2-isopropylbenzyl)-1-methyl-1H-pyrazole-4-carbothioamide, (2.049) N-cyclopropyl-3-(difluoromethyl)-5-fluoro-N-(2-isopropylbenzyl)-1-methyl-1H-pyrazole-4-carboxamide, (2.050) N-cyclopropyl-3-(difluoromethyl)-5-fluoro-N-(5-fluoro-2-isopropylbenzyl)-1-methyl-1H-pyrazole-4-carboxamide, (2.051) N-cyclopropyl-3-(difluoromethyl)-N-(2-ethyl-4,5-dimethylbenzyl)-5-fluoro-1-methyl-1H-pyrazole-4-carboxamide, (2.052) N-cyclopropyl-3-(difluoromethyl)-N-(2-ethyl-5-fluorobenzyl)-5-fluoro-1-methyl-1H-pyrazole-4-carboxamide, (2.053) N-cyclopropyl-3-(difluoromethyl)-N-(2-ethyl-5-methylbenzyl)-5-fluoro-1-methyl-1H-pyrazole-4-carboxamide, (2.054) N-cyclopropyl-N-(2-cyclopropyl-5-fluorobenzyl)-3-(difluoromethyl)-5-fluoro-1-methyl-1H-pyrazole-4-carboxamide, (2.055) N-cyclopropyl-N-(2-cyclopropyl-5-methylbenzyl)-3-(difluoromethyl)-5-fluoro-1-methyl-1H-pyrazole-4-carboxamide, (2.056) N-cyclopropyl-N-(2-cyclopropylbenzyl)-3-(difluoromethyl)-5-fluoro-1-methyl-1H-pyrazole-4-carboxamide.

3) Respiratory chain inhibitors acting on complex III, for example (3.001) ametoctradin, (3.002) amisulbrom, (3.003) azoxystrobin, (3.004) coumethoxystrobin, (3.005) coumoxystrobin, (3.006) cyazofamid, (3.007) dimoxystrobin, (3.008) enoxastrobin, (3.009) famoxadon, (3.010) fenamidon, (3.011) flufenoxystrobin, (3.012) fluoxastrobin, (3.013) kresoxim-methyl, (3.014) metominostrobin, (3.015) orysastrobin, (3.016) picoxystrobin, (3.017) pyraclostrobin, (3.018) pyrametostrobin, (3.019) pyraoxystrobin, (3.020) trifloxystrobin, (3.021) (2E)-2-{2-[({[(1E)-1-(3-{[(E)-1-fluoro-2-phenylyinyl]oxy}phenyl)ethylidene]amino}oxy)methyl]phenyl}-2-(methoxyimino)-N-methylacetamide, (3.022) (2E,3Z)-5-{[1-(4-chlorophenyl)-1H-pyrazol-3-yl]oxy}-2-(methoxyimino)-N,3-dimethylpent-3-enamide, (3.023) (2R)-2-{2-[(2,5-dimethylphenoxy)methyl]phenyl}-2-methoxy-N-methylacetamide, (3.024) (2S)-2-{2-[(2,5-dimethylphenoxy)methyl]phenyl}-2-methoxy-N-methylacetamide, (3.025) (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl 2-methylpropanoate, (3.026) 2-{2-[(2,5-dimethylphenoxy)methyl]phenyl}-2-methoxy-N-methylacetamide, (3.027) N-(3-ethyl-3,5,5-trimethylcyclohexyl)-3-formamido-2-hydroxybenzamide, (3.028) (2E,3Z)-5-{[1-(4-chloro-2-fluorophenyl)-1H-pyrazol-3-yl]oxy}-2-(methoxyimino)-N,3-dimethylpent-3-enamide, (3.029) methyl {5-[3-(2,4-dimethylphenyl)-1H-pyrazol-1-yl]-2-methylbenzyl}carbamate.

4) Mitosis and cell division inhibitors, for example (4.001) carbendazim, (4.002) diethofencarb, (4.003) ethaboxam, (4.004) fluopicolid, (4.005) pencycuron, (4.006) thiabendazole, (4.007) thiophanate-methyl, (4.008) zoxamide, (4.009) 3-chloro-4-(2,6-difluorophenyl)-6-methyl-5-phenylpyridazine, (4.010) 3-chloro-5-(4-chlorophenyl)-4-(2,6-difluorophenyl)-6-methylpyridazine, (4.011) 3-chloro-5-(6-chloropyridin-3-yl)-6-methyl-4-(2,4,6-trifluorophenyl)pyridazine, (4.012) 4-(2-bromo-4-fluorophenyl)-N-(2,6-difluorophenyl)-1,3-dimethyl-1H-pyrazol-5-amine, (4.013) 4-(2-bromo-4-fluorophenyl)-N-(2-bromo-6-fluorophenyl)-1,3-dimethyl-1H-pyrazol-5-amine, (4.014) 4-(2-bromo-4-fluorophenyl)-N-(2-bromophenyl)-1,3-dimethyl-1H-pyrazol-5-amine, (4.015) 4-(2-bromo-4-fluorophenyl)-N-(2-chloro-6-fluorophenyl)-1,3-dimethyl-1H-pyrazol-5-amine, (4.016) 4-(2-bromo-4-fluorophenyl)-N-(2-chlorophenyl)-1,3-dimethyl-1H-pyrazol-5-amine, (4.017) 4-(2-bromo-4-fluorophenyl)-N-(2-fluorophenyl)-1,3-dimethyl-1H-pyrazol-5-amine, (4.018) 4-(2-chloro-4-fluorophenyl)-N-(2,6-difluorophenyl)-1,3-dimethyl-1H-pyrazol-5-amine, (4.019) 4-(2-chloro-4-fluorophenyl)-N-(2-chloro-6-fluorophenyl)-1,3-dimethyl-1H-pyrazol-5-amine, (4.020) 4-(2-chloro-4-fluorophenyl)-N-(2-chlorophenyl)-1,3-dimethyl-1H-pyrazol-5-amine, (4.021) 4-(2-chloro-4-fluorophenyl)-N-(2-fluorophenyl)-1,3-dimethyl-1H-pyrazol-5-amine, (4.022) 4-(4-chlorophenyl)-5-(2,6-difluorophenyl)-3,6-dimethylpyridazine, (4.023) N-(2-bromo-6-fluorophenyl)-4-(2-chloro-4-fluorophenyl)-1,3-dimethyl-1H-pyrazol-5-amine, (4.024) N-(2-bromophenyl)-4-(2-chloro-4-fluorophenyl)-1,3-dimethyl-1H-pyrazol-5-amine, (4.025) N-(4-chloro-2,6-difluorophenyl)-4-(2-chloro-4-fluorophenyl)-1,3-dimethyl-1H-pyrazol-5-amine.

5) Compounds with multisite activity, for example (5.001) Bordeaux mixture, (5.002) captafol, (5.003) captan, (5.004) chlorthalonil, (5.005) copper hydroxide, (5.006) copper naphthenate, (5.007) copper oxide, (5.008) copper oxychloride, (5.009) copper(2+) sulfate, (5.010) dithianon, (5.011) dodine, (5.012) folpet, (5.013) mancozeb, (5.014) maneb, (5.015) metiram, (5.016) zinc metiram, (5.017) copper oxine, (5.018) propineb, (5.019) sulfur and sulfur preparations including calcium polysulfide, (5.020) thiram, (5.021) zineb, (5.022) ziram, (5.023) 6-ethyl-5,7-dioxo-6,7-dihydro-5H-pyrrolo[3',4':5,6][1,4]dithiino[2,3-c][1,2]thiazole-3-carbonitrile.

6) Compounds capable of triggering host defense, for example (6.001) acibenzolar-S-methyl, (6.002) isotianil, (6.003) probenazole, (6.004) tiadinil.

7) Amino acid and/or protein biosynthesis inhibitors, for example (7.001) cyprodinil, (7.002) kasugamycin, (7.003) kasugamycin hydrochloride hydrate, (7.004) oxytetracycline, (7.005) pyrimethanil, (7.006) 3-(5-fluoro-3,3,4,4-tetramethyl-3,4-dihydroisoquinolin-1-yl)quinoline.

8) ATP production inhibitors, for example (8.001) silthiofam.

9) Cell wall synthesis inhibitors, for example (9.001) benthiavalicarb, (9.002) dimethomorph, (9.003) flumorph, (9.004) iprovalicarb, (9.005) mandipropamid, (9.006) pyrimorph, (9.007) valifenalate, (9.008) (2E)-3-(4-tert-butylphenyl)-3-(2-chloropyridin-4-yl)-1-(morpholin-4-yl)prop-2-en-1-one, (9.009) (2Z)-3-(4-tert-butylphenyl)-3-(2-chloropyridin-4-yl)-1-(morpholin-4-yl)prop-2-en-1-one.

10) Lipid and membrane synthesis inhibitors, for example (10.001) propamocarb, (10.002) propamocarb hydrochloride, (10.003) tolclofos-methyl.

11) Melanin biosynthesis inhibitors, for example (11.001) tricyclazole, (11.002) 2,2,2-trifluoroethyl {3-methyl-1-[(4-methylbenzoyl)amino]butan-2-yl}carbamate.

12) Nucleic acid synthesis inhibitors, for example (12.001) benalaxyl, (12.002) benalaxyl-M (kiralaxyl), (12.003) metalaxyl, (12.004) metalaxyl-M (mefenoxam).

13) Signal transduction inhibitors, for example (13.001) fludioxonil, (13.002) iprodione, (13.003) procymidone, (13.004) proquinazid, (13.005) quinoxyfen, (13.006) vinclozolin.

14) Compounds that can act as decouplers, for example (14.001) fluazinam, (14.002) meptyldinocap.

15) Further compounds, for example (15.001) abscisic acid, (15.002) benthiazole, (15.003) bethoxazin, (15.004) capsimycin, (15.005) carvone, (15.006) chinomethionat, (15.007) cufraneb, (15.008) cyflufenamid, (15.009) cymoxanil, (15.010) cyprosulfamide, (15.011) flutianil, (15.012) fosetyl-aluminium, (15.013) fosetyl-calcium, (15.014) fosetyl-sodium, (15.015) methyl isothiocyanate, (15.016) metrafenon, (15.017) mildiomycin, (15.018) natamycin, (15.019) nickel dimethyldithiocarbamate, (15.020) nitrothal-isopropyl, (15.021) oxamocarb, (15.022) oxathiapiprolin, (15.023) oxyfenthiin, (15.024) pentachlorophenol and salts, (15.025) phosphonic acid and salts thereof, (15.026) propamocarb-fosetylate, (15.027) pyriofenone (chlazafenone), (15.028) tebufloquin, (15.029) tecloftalam, (15.030) tolnifanide, (15.031) 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (15.032) 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (15.033) 2-(6-benzylpyridin-2-yl)quinazoline, (15.034) 2,6-dimethyl-1H,5H-[1,4]dithiino[2,3-c:5,6-c']dipyrrole-1,3,5,7(2H,6H)-tetrone, (15.035) 2-[3, 5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, (15.036) 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, (15.037) 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, (15.038) 2-[6-(3-fluoro-4-methoxyphenyl)-5-methylpyridin-2-yl]quinazoline, (15.039) 2-{(5R)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.040) 2-{(5S)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.041) 2-{2-[(7,8-difluoro-2-methylquinolin-3-yl)oxy]-6-fluorophenyl}propan-2-ol, (15.042) 2-{2-fluoro-6-[(8-fluoro-2-methylquinolin-3-yl)oxy]phenyl}propan-2-ol, (15.043) 2-{3-[2-{1-[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.044) 2-{3-[2-{1-[3,5-bis(difluoromethyl)-1H-pyrazol-1-yl]acetyl}piperidin-4-yl)-1,3-thiazol-4-yl]-4,5-dihydro-1,2-oxazol-5-yl}phenyl methanesulfonate, (15.045) 2-phenylphenol and salts thereof, (15.046) 3-(4,4,5-trifluoro-3,3-dimethyl-3,4-dihydroisoquinolin-1-yl)quinoline, (15.047) 3-(4,4-difluoro-3,3-dimethyl-3,4-dihydroisoquinolin-1-yl)quinoline, (15.048) 4-amino-5-fluoropyrimidin-2-ol (tautomeric form: 4-amino-5-fluoropyrimidin-2(1H)-one), (15.049) 4-oxo-4-[(2-phenylethyl)amino]butyric acid, (15.050) 5-amino-1,3,4-thiadiazole-2-thiol, (15.051) 5-chloro-N'-phenyl-N'-(prop-2-yn-1-yl)thiophene 2-sulfonohydrazide, (15.052) 5-fluoro-2-[(4-fluorobenzyl)oxy]pyrimidin-4-amine, (15.053) 5-fluoro-2-[(4-methylbenzyl)oxy]pyrimidin-4-amine, (15.054) 9-fluoro-2,2-dimethyl-5-(quinolin-3-yl)-2,3-dihydro-1,4-benzoxazepine, (15.055) but-3-yn-1-yl {6-[{[(Z)-(1-methyl-1H-tetrazol-5-yl)(phenyl)methylene]amino}oxy)methyl]pyridin-2-yl}carbamate, (15.056) ethyl (2Z)-3-amino-2-cyano-3-phenylacrylate, (15.057) phenazine-1-carboxylic acid, (15.058) propyl 3,4,5-trihydroxybenzoate, (15.059) quinolin-8-ol, (15.060) quinolin-8-ol sulfate (2:1), (15.061) tert-butyl {6-[({[(1-methyl-1H-tetrazol-5-yl)(phenyl)methylene]amino}oxy)methyl]pyridin-2-yl}carbamate, (15.062) 5-fluoro-4-imino-3-methyl-1)sulfonyl]-3,4-dihydropyrimidin-2(1H)-one.

Preferred fungicides are selected from the group consisting of benalaxyl, bitertanol, bromuconazole, captafol, carbendazim, carpropamid, cyazofamid, cyproconazole, diethofencarb, edifenphos, fenpropimorph, fentine, fluquinconazole, fosetyl, fluoroimide, folpet, iminoctadine, iprodionem, iprovalicarb, kasugamycin, maneb, nabam, pencycuron, prochloraz, propamocarb, propineb, pyrimethanil, spiroxamine, quintozene, tebuconazole, tolylfluanid, triadimefon, triadimenol, trifloxystrobin, zineb.

Insecticidal, acaricidal, nematicidal, miticidal and related active compounds are, for example (analogously to the herbicides and fungicides, the compounds are, if possible, referred to by their Common names):

(1) Acetylcholinesterase (AChE) inhibitors, preferably carbamates selected from alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb; or organo- phosphates selected from acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(2) GABA-gated chloride channel blockers, preferably cyclodiene-organochlorines selected from chlordane and endosulfan or phenylpyrazoles (fiproles) selected from ethiprole and fipronil.

(3) Sodium channel modulators, preferably pyrethroids selected from acrinathrin, allethrin, d-cis-trans allethrin, d-trans allethrin, bifenthrin, bioallethrin, bioallethrin S-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans isomer], deltamethrin, empenthrin [(EZ)-(1R) isomer], esfenvalerate, etofenprox, fenpropathrin, fenvalerate, flucythrinate, flumethrin, tau-fluvalinate, halfenprox, imiprothrin, kadethrin, momfluorothrin, permethrin, phenothrin [(1R)-trans isomer], prallethrin, pyrethrins (pyrethrum), resmethrin, silafluofen, tefluthrin, tetramethrin, tetramethrin [(1R) isomer], tralomethrin and transfluthrin or DDT or methoxychlor.

(4) Nicotinic acetylcholine receptor (nAChR) competitive modulators, preferably neonicotinoids selected from acetamiprid, clothianidin, dinotefuran, imidacloprid, nitenpyram, thiacloprid and thiamethoxam, or nicotine, or sulfoximines selected from sulfoxaflor, or butenolides selected from flupyradifurone.

(5) Nicotinic acetylcholine receptor (nAChR) allosteric modulators, preferably spinosyns selected from spinetoram and spinosad.

(6) Glutamate-gated chloride channel (GluCl) allosteric modulators, preferably avermectins/milbemycins selected from abamectin, emamectin benzoate, lepimectin and milbemectin.

(7) Juvenile hormone mimics, preferably juvenile hormone analogs selected from hydroprene, kinoprene and methoprene or fenoxycarb or pyriproxyfen.

(8) Miscellaneous non-specific (multi-site) inhibitors, preferably alkyl halides selected from methyl bromide and other alkyl halides; or chloropicrin or sulfuryl fluoride or borax or tartar emetic or methyl isocyanate generators selected from diazomet and metam.

(9) Chordotonal organ TRPV channel modulators selected from pymetrozine and pyrifluquinazon.

(10) Mite growth inhibitors selected from clofentezine, hexythiazox, diflovidazin and etoxazole.

(11) Microbial disruptors of insect midgut membranes selected from *Bacillus thuringiensis* subspecies *israelensis*, *Bacillus sphaericus*, *Bacillus thuringiensis* subspecies *aizawai*, *Bacillus thuringiensis* subspecies *kurstaki*, *Bacillus thuringiensis* subspecies *tenebrionis*, and B.t. plant proteins selected from Cry1Ab, Cry1Ac, Cry1Fa, Cry1A.105, Cry2Ab, VIP3A, mCry3A, Cry3Ab, Cry3Bb and Cry34Ab1/35Ab1.

(12) Inhibitors of mitochondrial ATP synthase, preferably ATP disruptors selected from diafenthiuron or organotin compounds selected from azocyclotin, cyhexatin and fenbutatin oxide, or propargite or tetradifon.

(13) Uncouplers of oxidative phosphorylation via disruption of the proton gradient selected from chlorfenapyr, DNOC and sulfluramid.

(14) Nicotinic acetylcholine receptor channel blockers selected from bensultap, cartap hydrochloride, thiocyclam, and thiosultap-sodium.

(15) Inhibitors of chitin biosynthesis, type 0, selected from bistrifluron, chlorfluazuron, diflubenzuron, flucycloxuron, flufenoxuron, hexaflumuron, lufenuron, novaluron, noviflumuron, teflubenzuron and triflumuron.

(16) Inhibitors of chitin biosynthesis, type 1, selected from buprofezin.

(17) Molting disruptors (especially in the case of Diptera) selected from cyromazine.

(18) Ecdysone receptor agonists selected from chromafenozide, halofenozide, methoxyfenozide and tebufenozide.

(19) Octopamine receptor agonists selected from amitraz.

(20) Mitochondrial complex III electron transport inhibitors selected from hydramethylnon, acequinocyl and fluacrypyrim.

(21) Mitochondrial complex I electron transport inhibitors, preferably METI acaricides selected from fenazaquin, fenpyroximate, pyrimidifen, pyridaben, tebufenpyrad and tolfenpyrad, or rotenone (Derris).

(22) Voltage-dependent sodium channel blockers selected from indoxacarb and metaflumizone.

(23) Inhibitors of acetyl-CoA carboxylase, preferably tetronic and tetramic acid derivatives selected from spirodiclofen, spiromesifen and spirotetramat.

(24) Mitochondrial complex IV electron transport inhibitors, preferably phosphines selected from aluminium phosphide, calcium phosphide, phosphine and zinc phosphide, or cyanides selected from calcium cyanide, potassium cyanide and sodium cyanide.

(25) Mitochondrial complex II electron transport inhibitors, preferably beta-keto nitrile derivatives selected from cyenopyrafen and cyflumetofen, or carboxanilides selected from pyflubumide.

(28) Ryanodine receptor modulators, preferably diamides selected from chlorantraniliprole, cyantraniliprole and flubendiamide.

(29) Chordotonal organ modulators (with undefined target structure) selected from flonicamid.

(30) Further active compounds selected from acynonapyr, afidopyropen, afoxolaner, azadirachtin, benclothiaz, benzoximate, benzpyrimoxan, bifenazate, broflanilide, bromopropylate, chinomethionat, chloroprallethrin, cryolite, cyclaniliprole, cycloxaprid, cyhalodiamide, dicloromezotiaz, dicofol, epsilon metofluthrin, epsilon momfluthrin, flometoquin, fluazaindolizine, fluensulfone, flufenerim, flufenoxystrobin, flufiprole, fluhexafon, fluopyram, flupyrimin, fluralaner, fluxametamide, fufenozide, guadipyr, heptafluthrin, imidaclothiz, iprodione, kappa bifenthrin, kappa tefluthrin, lotilaner, meperfluthrin, oxazosulfyl, paichongding, pyridalyl, pyrifluquinazon, pyriminostrobin, spirobudiclofen, spiropidion, tetramethylfluthrin, tetraniliprole, tetrachlorantraniliprole, tigolaner, tioxazafen, thiofluoximate, triflumezopyrim and iodomethane; additionally preparations based on *Bacillus firmus* (I-1582, BioNeem, Votivo), and the following compounds: 1-{2-fluoro-4-methyl-5-[(2,2,2-trifluoroethyl)sulfinyl]phenyl}-3-(trifluoromethyl)-1H-1,2,4-triazole-5-amine (known from WO2006/043635) (CAS 885026-50-6), {1'-[(2E)-3-(4-chlorophenyl)prop-2-en-1-yl]-5-fluorospiro[indole-3,4'-piperidine]-1(2H)-yl}(2-chloropyridin-4-yl)methanone (known from WO2003/106457) (CAS 637360-23-7), 2-chloro-N-[2-{1-[(2E)-3-(4-chlorophenyl)prop-2-en-1-yl]piperidin-4-yl}-4-(trifluoromethyl) phenyl]isonicotinamide (known from WO2006/003494) (CAS 872999-66-1), 3-(4-chloro-2,6-dimethylphenyl)-4-hydroxy-8-methoxy-1,8-diazaspiro[4.5]dec-3-en-2-one (known from WO 2010052161) (CAS 1225292-17-0), 3-(4-chloro-2,6-dimethylphenyl)-8-methoxy-2-oxo-1,8-diazaspiro[4.5]dec-3-en-4-yl ethylcarbonate (known from EP 2647626) (CAS-1440516-42-6), 4-(but-2-yn-1-yloxy)-6-(3,5-dimethylpiperidin-1-yl)-5-fluoropyrimidine (known from WO2004/099160) (CAS 792914-58-0), PF1364 (known from JP2010/018586) (CAS Reg. No. 1204776-60-2), (3E)-3-[1-[(6-chloro-3-pyridyl)methyl]-2-pyridylidene]-1,1,1-trifluoropropan-2-one (known from WO2013/144213) (CAS 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO2010/051926) (CAS 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN103232431) (CAS 1449220-44-3), 4-[5-(3,5-dichlorophenyl)-4,5-dihydro-5-(trifluoromethyl)-3-isoxazolyl]-2-methyl-N-(cis-1-oxido-3-thietanyl)benzamide, 4-[5-(3,5-dichlorophenyl)-4,5-dihydro-5-(trifluoromethyl)-3-isoxazolyl]-2-methyl-N-(trans-1-oxido-3-thietanyl)benzamide and 4-[(5S)-5-(3,5-dichlorophenyl)-4,5-dihydro-5-(trifluoromethyl)-3-isoxazolyl]-2-methyl-N-(cis-1-oxido-3-thietanyl)benzamide (known from WO 2013/050317 A1) (CAS 1332628-83-7), N-[3-chloro-1-(3-pyridinyl)-1H-pyrazol-4-yl]-N-ethyl-3-[(3,3,3-trifluoropropyl)sulfinyl]propanamide, (+)-N-[3-chloro-1-(3-pyridinyl)-1H-pyrazol-4-yl]-N-ethyl-3-[(3,3,3-trifluoropropyl)sulfinyl]propanamide and (−)-N-[3-chloro-1-(3-pyridinyl)-1H-pyrazol-4-yl]-N-ethyl-3-[(3,3,3-trifluoropropyl)sulfinyl]propanamide (known from WO 2013/162715 A2, WO 2013/162716 A2, US 2014/0213448 A1) (CAS 1477923-37-7), 5-[[(2E)-3-chloro-2-propen-1-yl]amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide (Liudaibenjiaxuanan, known from CN 103109816 A) (CAS 1232543-85-9); N-[4-chloro-2-[[(1,1-dimethylethyl)amino]carbonyl]-6-methylphenyl]-1-(3-chloro-2-pyridinyl)-3-(fluoromethoxy)-1H-pyrazole-5-carboxamide (known from WO 2012/034403 A1) (CAS 1268277-22-0), N-[2-(5-amino-1,3,4-thiadiazol-2-yl)-4-chloro-6-methylphenyl]-3-bromo-1-(3-chloro-2-pyridinyl)-1H-pyrazole-5-carboxamide (known from WO 2011/085575 A1) (CAS 1233882-22-8), 4-[3-[2,6-dichloro-4-[(3,3-dichloro-2-propen-1-yl)oxy]phenoxy]propoxy]-2-methoxy-6-(trifluoromethyl) pyrimidine (known from CN 101337940 A) (CAS 1108184-52-6); (2E)- and 2(Z)-2-[2-(4-cyanophenyl)-1-[3-(trifluoromethyl)phenyl]ethylidene]-N-[4-(difluoromethoxy)phenyl]hydrazinecarboxamide (known from CN 101715774 A) (CAS 1232543-85-9); cyclopropanecarboxylic acid 3-(2,2-dichloroethenyl)-2,2-dimethyl-4-(1H-benzimidazol-2-yl)phenyl ester (known from CN 103524422 A) (CAS 1542271-46-4); (4aS)-7-chloro-2,5-dihydro-2-[[(methoxycarbonyl)[4-[(trifluoromethyl)thio] phenyl]amino]carbonyl]indeno[1,2-e][1,3,4]oxadiazine-4a (3H)-carboxylic acid methyl ester (known from CN 102391261 A) (CAS 1370358-69-2); 6-deoxy-3-O-ethyl-2,4-di-O-methyl-1-[N-[4-[1-[4-(1,1,2,2,2-pentafluoroethoxy)phenyl]-1H-1,2,4-triazol-3-yl]phenyl]carbamate]-α-L-mannopyranose (known from US 2014/0275503 A1) (CAS 1181213-14-8); 8-(2-cyclopropylmethoxy-4-trifluoromethylphenoxy)-3-(6-trifluoromethylpyridazin-3-yl)-3-azabicyclo[3.2.1]octane (CAS 1253850-56-4), (8-anti)-8-(2-cyclopropylmethoxy-4-trifluoromethylphenoxy)-3-(6-trifluoromethylpyridazin-3-yl)-3-azabicyclo[3.2.1]octane (CAS 933798-27-7), (8-syn)-8-(2-cyclopropylmethoxy-4-trifluoromethylphenoxy)-3-(6-trifluoromethylpyridazin-3-yl)-3-azabicyclo[3.2.1]octane (known from WO 2007040280 A1, WO 2007040282 A1) (CAS 934001-66-8), N-[3-chloro-1-(3-pyridinyl)-1H-pyrazol-4-yl]-N-ethyl-3-[(3,3,3-trifluoropropyl)thio]propanamide (known from WO 2015/058021 A1, WO 2015/058028 A1) (CAS 1477919-27-9) and N-[4-(aminothioxomethyl)-2-methyl-6-[(methylamino)carbonyl]phenyl]-3-bromo-1-(3-chloro-2-pyridinyl)-1H-pyrazole-5-carboxamide (known from CN 103265527 A) (CAS 1452877-50-7), 5-(1,3-dioxan-2-yl)-4-[[4-(trifluoromethyl)phenyl]methoxy]pyrimidine (known from WO 2013/115391 A1) (CAS 1449021-97-9), 3-(4-chloro-2,6-dimethylphenyl)-8-methoxy-1-methyl-1,8-diazaspiro[4.5]decane-2,4-dione (known from WO 2014/187846 A1) (CAS 1638765-58-8), ethyl 3-(4-chloro-2,6-dimethylphenyl)-8-methoxy-1-methyl-2-oxo-1,8-diazaspiro[4.5]dec-3-en-4-yl-carboxylate (known from WO 2010/066780 A1, WO 2011151146 A1) (CAS 1229023-00-0), 4-[(5S)-5-(3,5-dichloro-4-fluorophenyl)-4,5-dihydro-5-(trifluoromethyl)-3-isoxazolyl]-N-[(4R)-2-ethyl-3-oxo-4-isoxazolidinyl]-2-methylbenzamide (known from WO 2011/067272, WO2013/050302) (CAS 1309959-62-3).

Insecticides that can preferably be used together with the herbicides are, for example, as follows: acetamiprid, acrinathrin, aldicarb, amitraz, acinphos-methyl, cyfluthrin, carbaryl, cypermethrin, deltamethrin, endosulfan, ethoprophos, fenamiphos, fenthion, fipronil, imidacloprid, methamidophos, methiocarb, niclosamide, oxydemeton-methyl, prothiophos, silafluofen, thiacloprid, thiodicarb, tralomethrin, triazophos, trichlorfon, triflumuron, terbufos, fonofos, phorate, chlorpyriphos, carbofuran, tefluthrin.

The active compound combinations according to the invention are suitable for controlling a broad spectrum of weeds on non-crop land, on paths, railroad installations, industrial areas ("industrial weed control") or in plantation crops such as moderate, subtropical and tropical climates or geographies. Examples of plantation crops are oil palms, nuts (e.g. almonds, hazelnuts, walnuts, macadamia), coconut, berries, rubber trees, citrus (e.g. oranges, lemons, mandarins), bananas, pineapples, cotton, sugarcane, tea, coffee, cacao and the like. They are also suitable for use in the cultivation of fruit (for example pomaceous fruit such as apple, pear, cherry, mango, kiwi) and viticulture. The compositions can also be used for preparation for seeding ("burn-down", "no-till" or "zero-till" method) or for treatment after harvesting ("chemical fallow"). Possible applications of the active compound combinations also extend to weed control in tree cultures, for example young Christmas tree cultures or eucalyptus plantations, in each case before planting or after transplantation (also by over-top treatment).

The compositions can also be used to control unwanted plant growth in economically important crop plants such as wheat (hard and soft wheat), maize, soya, sugarbeet, sugarcane, cotton, rice, beans (for example, beans and broad beans), flax, barley, oats, rye, triticale, potato and millet/sorghum, pastureland and areas of grass/lawn and plantation crops. Plantation crops are, inter alia, pomaceous fruit (apple, pear, quince), *Ribes* species (blackberry, raspberry), citrus, *Prunus* species (cherries, nectarines, almonds), nuts (walnut, pecan nut, hazelnut, cashew, macadamia), mango, cacao, coffee, grapevines (for eating or for making wine), palms (such as oil palms, date palms, coconut palms), eucalyptus, kaki, persimmon, caoutchouc, pineapple, banana, avocado, lychee, forest cultures (Eucalypteae, Piniaceae, Piceae, Meliaceae, etc.)

The herbicidal active compound combinations according to the invention, in the respective use forms (=herbicidal compositions), have synergies with regard to herbicidal action and selectivity, and favourable action with regard to the spectrum of weeds. They have excellent herbicidal efficacy against a broad spectrum of economically important monocotyledonous and dicotyledonous annual harmful plants. The active compounds also have good control over perennial harmful plants which are difficult to control and produce shoots from rhizomes, root stocks or other perennial organs.

For application, the active compound combinations can be deployed onto the plants (for example harmful plants such as mono- or dicotyledonous weeds or unwanted crop plants), the seed (e.g. grains, seeds or vegetative propagation organs such as tubers or parts of shoots having buds), or the area in which the plants grow (e.g. the growing area).

The substances can be deployed prior to sowing (if appropriate also by incorporation into the soil), prior to emergence or after emergence. Preference is given to use by the early post-seeding pre-emergence method or by the post-emergence method in plantation crops against harmful plants that have not yet emerged or have already emerged. The application can also be integrated into weed management systems with divided repeated applications (sequentials).

Specific examples of some representatives of the monocotyledonous and dicotyledonous weed flora which can be controlled by the active compound combinations according to the invention are as follows, though the enumeration is not intended to impose a restriction to particular species. In the group of the monocotyledonous weed species, for example, *Aegilops, Agropyron, Agrostis, Alopecurus, Apera, Avena, Brachicaria, Bromus, Cynodon, Dactyloctenium, Digitaria, Echinochloa, Eleocharis, Eleusine, Eragrostis, Eriochloa, Festuca, Fimbristylis, Imperata, Ischaemum, Heteranthera, Imperata, Ischaemum, Leptochloa, Lolium, Monochoria, Panicum, Paspalum, Phalaris, Phleum, Poa, Rottboellia, Sagittaria, Scirpus, Setaria, Sorghum, Sphenoclea* and *Cyperus* species are covered by the annual group.

In the case of dicotyledonous weed species, the spectrum of action extends to species such as, for example, *Abutilon, Amaranthus, Ambrosia, Anoda, Anthemis, Aphanes, Artemisia, Atriplex, Bellis, Bidens, Capsella, Carduus, Cassia, Centaurea, Chenopodium, Cirsium, Convolvulus, Datura, Desmodium, Emex, Erodium, Erysimum, Euphorbia, Galeopsis, Galinsoga, Galium, Geranium, Hibiscus, Ipomoea, Kochia, Lamium, Lepidium, Lindernia, Matricaria, Mentha, Mercurialis, Mullugo, Myosotis, Papaver, Pharbitis, Plantago, Polygonum, Portulaca, Ranunculus, Raphanus, Rorippa, Rotala, Rumex, Salsola, Senecio, Sesbania, Sida, Sinapis, Solanum, Sonchus, Sphenoclea, Stellaria, Taraxacum, Thlaspi, Trifolium, Urtica, Veronica, Viola, Xanthium.*

If the active compound combinations according to the invention are applied to the soil surface before germination, either the emergence of the weed seedlings is prevented completely or the weeds grow until they have reached the cotyledon stage, but then they stop growing and ultimately die completely after three to four weeks have passed.

If the active compounds are applied post-emergence to the green parts of the plants, growth stops after the treatment, and the harmful plants remain at the growth stage at the time of application, or they die completely after a certain time, so that in this manner competition by the weeds, which is harmful to the crop plants, is eliminated very early and in a sustained manner.

The herbicidal compositions according to the invention are notable for a rapid onset and long duration of herbicidal action. In general, the rainfastness of the active compounds in the combinations according to the invention is favourable. A particular advantage is that the dosages used in the combinations and the effective dosages of compounds (A) and (B) can be adjusted to such a low level that their soil action is optimally low. Therefore, the use thereof in sensitive crops is not just enabled, but groundwater contamination is also virtually prevented. The combination according to the invention of active compounds allows the required application rate of the active compounds to be reduced considerably.

The combined use of herbicides (A) and (B) achieves performance properties extending beyond what was to be expected on account of the known properties of individual herbicides for the combination thereof. For example, the herbicidal effects for a particular harmful plant species exceed the expected value as can be estimated by standard methods, for example according to Colby or other extrapolation methods.

A synergistic effect is present whenever the effect, here the herbicidal effect, of the active compound combination is greater than the sum of the effects of the active compounds applied individually. The expected activity for a given combination of two active compounds can be calculated as follows, according to S. R. Colby ("Calculating Synergistic and Antagonistic Responses of Herbicide Combinations", Weeds 15 (1967), 20-22) (see below).

The synergistic effects therefore permit, for example, a reduction in the application rates of the individual active compounds, a higher efficacy at the same application rate, the control of species of harmful plant which are as yet uncovered (gaps), elevated residual action, an extended period of efficacy, an elevated speed of action, an extension of the period of application and/or a reduction in the number of individual applications required and—as a result for the user—weed control systems which are more advantageous economically and ecologically.

Even though the combinations according to the invention have excellent herbicidal activity with respect to mono- and dicotyledonous weeds, many economically important crop plants, depending on the structure of the respective active compound combinations according to the invention and the application rate thereof, are damaged only insignificantly, if at all. Here, economically important crops are, for example, dicotyledonous crops of the genera *Arachis, Beta, Brassica, Cucumis, Cucurbita, Helianthus, Daucus, Glycine, Gossypium, Ipomoea, Lactuca, Linum, Lycopersicon, Nicotiana, Phaseolus, Pisum, Solanum, Vicia,* or monocotyledonous crops of the genera *Allium, Ananas, Asparagus, Avena, Hordeum, Oryza, Panicum, Saccharum, Secale, Sorghum, Triticale, Triticum* and *Zea.*

In addition, the compositions according to the invention have in some cases outstanding growth-regulating properties in crop plants. They intervene in the plants' own metabolism with regulatory effect, and can thus be used for the controlled influencing of plant constituents and to facilitate harvesting, for example by triggering desiccation and stunted growth. Furthermore, they are also suitable for the general control and inhibition of unwanted vegetative growth without killing the plants in the process. Inhibition of vegetative growth plays a major role for many mono- and dicotyledonous crops since this can reduce or completely prevent lodging.

Owing to their herbicidal and plant growth-regulatory properties, the compositions can be employed for controlling harmful plants in known plant crops or in tolerant crop plants still to be developed, modified by conventional mutagenesis or modified by genetic engineering. In general, the transgenic plants are distinguished by specific advantageous properties, in addition to resistances to the compositions according to the invention, for example, by resistances to plant diseases or the causative organisms of plant diseases such as certain insects or microorganisms, such as fungi, bacteria or viruses. Other particular properties relate, for example, to the harvested material with regard to quantity, quality, storability, composition and specific constituents. For instance, there are known transgenic plants with an elevated starch content or altered starch quality, or those with a different fatty acid composition in the harvested material. Other particular properties may be tolerance or resistance to abiotic stressors, for example heat, low temperatures, drought, salinity and ultraviolet radiation.

Preferably, the active compound combinations according to the invention can be used as herbicides in crops of useful plants which are resistant, or have been made resistant by genetic engineering, to the phytotoxic effects of the herbicides.

Conventional ways of producing novel plants which have modified properties in comparison to existing plants consist, for example, in traditional cultivation methods and the generation of mutants. Alternatively, novel plants with modified properties can be generated with the aid of recombinant methods (see, for example, EP-A-0221044, EP-A-0131624). For example, there have been descriptions in several cases of:

genetic modifications of crop plants for the purpose of modifying the starch synthesized in the plants (e.g. WO 92/11376, WO 92/14827, WO 91/19806), transgenic crop plants which exhibit resistances to other herbicides, for example to sulfonylureas (EP-A-0257993, U.S. Pat. No. 5,013,659), transgenic crop plants with the capability of producing *Bacillus thuringiensis* toxins (Bt toxins), which make the plants resistant to particular pests (EP-A-0142924, EP-A-0193259), transgenic crop plants with a modified fatty acid composition (WO 91/13972), genetically modified crop plants with novel constituents or secondary metabolites, for example novel phytoalexins, which bring about an increased disease resistance (EPA 309862, EPA0464461), genetically modified plants having reduced photorespiration, which have higher yields and higher stress tolerance (EPA 0305398), transgenic crop plants which produce pharmaceutically or diagnostically important proteins ("molecular pharming"), transgenic crop plants which feature higher yields or better quality, transgenic crop plants which feature a combination, for example, of the abovementioned novel properties ("gene stacking").

Numerous molecular biology techniques which can be used to produce novel transgenic plants with modified properties are known in principle; see, for example, I. Potrykus and G. Spangenberg (eds.) Gene Transfer to Plants, Springer Lab Manual (1995), Springer Verlag Berlin, Heidelberg, or Christou, "Trends in Plant Science" 1 (1996) 423-431.

For such recombinant manipulations, nucleic acid molecules which allow mutagenesis or sequence alteration by recombination of DNA sequences can be introduced into plasmids. With the aid of standard methods, it is possible, for example, to undertake base exchanges, remove parts of sequences or add natural or synthetic sequences. To join the DNA fragments with one another, adapters or linkers can be placed onto the fragments, see, for example, Sambrook et al., 1989, Molecular Cloning, A Laboratory Manual, 2nd edition Cold Spring Harbor Laboratory Press, Cold Spring Harbor, NY; or Winnacker "Gene and Klone" [Genes and clones], VCH Weinheim 2nd edition 1996.

For example, the generation of plant cells with a reduced activity of a gene product can be achieved by expressing at least one corresponding antisense RNA, a sense RNA for achieving a cosuppression effect, or by expressing at least one suitably constructed ribozyme which specifically cleaves transcripts of the abovementioned gene product.

To this end, it is firstly possible to use DNA molecules which encompass the entire coding sequence of a gene product inclusive of any flanking sequences which may be present, and also DNA molecules which only encompass portions of the coding sequence, in which case it is necessary for these portions to be long enough to have an antisense effect in the cells. It is also possible to use DNA sequences which have a high degree of homology to the coding sequences of a gene product, but are not completely identical to them.

When expressing nucleic acid molecules in plants, the protein synthesized may be localized in any desired compartment of the plant cell. However, to achieve localization in a particular compartment, it is possible, for example, to join the coding region to DNA sequences which ensure localization in a particular compartment. Such sequences are known to those skilled in the art (see, for example, Braun et al., EMBO J. 11 (1992), 3219-3227; Wolter et al., Proc. Natl. Acad. Sci. USA 85 (1988), 846-850; Sonnewald et al., Plant J. 1 (1991), 95-106). The nucleic acid molecules can also be expressed in the organelles of the plant cells.

The transgenic plant cells can be regenerated by known techniques to give rise to entire plants. In principle, the transgenic plants may be plants of any desired plant species, i.e. not only monocotyledonous but also dicotyledonous plants. Thus, transgenic plants can be obtained whose properties are altered by overexpression, suppression or inhibition of homologous (=natural) genes or gene sequences or expression of heterologous (=foreign) genes or gene sequences. The active compound combinations according to the invention can preferably be used in transgenic crops that are tolerant or have been rendered tolerant to the active compounds used.

The active compound combinations according to the invention can preferably also be used in transgenic crops which are resistant to growth regulators such as, for example, dicamba, or to herbicides which inhibit essential plant enzymes, for example acetolactate synthases (ALS), EPSP synthases, glutamine synthases (GS) or hydroxyphenylpyruvate dioxygenases (HPPD), or to herbicides from the group of the sulfonylureas, the glyphosates, glufosinates or benzoylisoxazoles and analogous active compounds.

The invention therefore also provides a method of controlling unwanted plant growth, optionally in crops of crop plants, preferably on uncultivated land or in plantation crops, characterized in that one or more herbicides of type (A) is/are applied with one or more herbicides of type (B) to the harmful plants, parts of plants or plant seeds (seed) or to the growing area.

The invention also provides for the use of the novel combinations of compounds (A)+(B) for control of harmful plants, optionally in crops of crop plants, preferably on uncultivated land and plantation crops, but also for control of harmful plants before the sowing of the subsequent crop plant, such as, in particular, for preparation for seeding ("burn-down application").

The active compound combinations according to the invention may be present either as mixed formulations of the two components, if appropriate with further active compounds, additives and/or customary formulation auxiliaries, which are then applied in a customary manner diluted with water, or can be prepared as so-called tank mixes by joint dilution of the separately formulated or partially separately formulated components with water.

The compounds (A) and (B) or their combinations can be formulated in various ways according to which biological and/or physicochemical parameters are required. Examples of general formulation options are: wettable powders (WP), water-soluble powders (SP), emulsifiable concentrates (EC), water-soluble concentrates, aqueous solutions (SL), emulsions (EW), such as oil-in-water and water-in-oil emulsions, sprayable solutions or emulsions, dispersions based on oil or water, oil dispersions (OD), suspoemulsions, suspension concentrates (SC), oil-miscible solutions, capsule suspensions (CS), dusting products (DP), dressings, granules for soil application or scattering, granules (GR) in the form of microgranules, spray granules, absorption and adsorption granules, water-dispersible granules (WG), water-soluble granules (SG), ULV formulations, microcapsules or waxes.

The invention therefore also provides herbicidal and plant-growth-regulating compositions which comprise the active compound combinations according to the invention.

The individual types of formulation are known in principle and are described, for example, in: Winnacker-Küchler, "Chemische Technologie" [Chemical technology], Volume 7, C. Hanser Verlag Munich, 4th Ed. 1986; van Valkenburg, "Pesticides Formulations", Marcel Dekker, N.Y., 1973; K. Martens, "Spray Drying Handbook", 3rd Ed. 1979, G. Goodwin Ltd. London.

The formulation auxiliaries required, such as inert materials, surfactants, solvents and further additives, are likewise known and are described, for example, in: Watkins, "Handbook of Insecticide Dust Diluents and Carriers", 2nd Ed., Darland Books, Caldwell N.J.; H.v. Olphen, "Introduction to Clay Colloid Chemistry"; 2nd Ed., J. Wiley & Sons, N.Y.; Marsden, "Solvents Guide", 2nd Ed., Interscience, N.Y. 1963; McCutcheon's "Detergents and Emulsifiers Annual", MC Publ. Corp., Ridgewood N.J.; Sisley and Wood, "Encyclopedia of Surface Active Agents", Chem. Publ. Co. Inc., N.Y. 1964; Schönfeldt, "Grenzflächenaktive Äthylenoxidaddukte [Interface-active ethylene oxide adducts]", Wiss. Verlagsgesellschaft, Stuttgart 1976, Winnacker-Küchler, "Chemische Technologie [Chemical technology]", Volume 7, C. Hanser Verlag Munich, 4th Ed. 1986.

On the basis of these formulations, it is also possible to produce combinations with other pesticidally active substances, such as other herbicides, fungicides, insecticides or other pesticides (for example acaricides, nematicides, molluscicides, rodenticides, aphicides, avicides, larvicides, ovicides, bactericides, viricides etc.), and also with safeners, fertilizers and/or growth regulators, for example in the form of a finished formulation or as a tank mix.

Wettable powders are preparations which can be dispersed uniformly in water and, in addition to the active compound, apart from a diluent or inert substance, also comprise surfactants of the ionic and/or nonionic type (wetting agents, dispersants), for example polyoxyethylated alkylphenols, polyoxyethylated fatty alcohols, polyoxyethylated fatty amines, fatty alcohol polyglycol ether sulfates, alkanesulfonates, alkylbenzenesulfonates, sodium lignosulfonate, sodium 2,2'-dinaphthylmethane-6,6'-disulfonate, sodium dibutylnaphthalenesulfonate or else sodium oleoylmethyltaurate. To produce the wettable powders, the herbicidally active compounds are finely ground, for example in customary apparatuses such as hammer mills, blower mills and air-jet mills, and simultaneously or subsequently mixed with the formulation auxiliaries.

Emulsifiable concentrates are produced by dissolving the active compound in an organic solvent, for example butanol, cyclohexanone, dimethylformamide, xylene, or else relatively high-boiling aromatics or hydrocarbons or mixtures of the organic solvents, with addition of one or more ionic and/or nonionic surfactants (emulsifiers). Examples of emulsifiers which may be used are: calcium alkylarylsulfonate salts, for example calcium dodecylbenzenesulfonate, or nonionic emulsifiers such as fatty acid polyglycol esters, alkylaryl polyglycol ethers, fatty alcohol polyglycol ethers, propylene oxide-ethylene oxide condensation products, alkyl polyethers, sorbitan esters, for example sorbitan fatty acid esters, or for example polyoxyethylene sorbitan fatty acid esters.

Dusting products are obtained by grinding the active compound with finely distributed solids, for example talc, natural clays, such as kaolin, bentonite and pyrophyllite, or diatomaceous earth. Suspension concentrates may be water- or oil-based. They may be prepared, for example, by wet-grinding by means of commercial bead mills and optional addition of surfactants as have, for example, already been listed above for the other formulation types.

Emulsions, for example oil-in-water emulsions (EW), can be produced, for example, by means of stirrers, colloid mills and/or static mixers using aqueous organic solvents and optionally surfactants as already listed above, for example, for the other formulation types.

Granules can be prepared either by spraying the active compound onto granular inert material capable of adsorption or by applying active compound concentrates to the surface of carrier substances, such as sand, kaolinites or granular inert material, by means of adhesives, for example polyvinyl alcohol, sodium polyacrylate or else mineral oils. Suitable active compounds can also be granulated in the manner customary for the production of fertilizer granules—if desired as a mixture with fertilizers.

Water-dispersible granules are produced generally by processes such as spray-drying, fluidized bed granulation, pan granulation, mixing with high-speed mixers and extrusion without solid inert material.

The agrochemical preparations generally comprise from 0.1 to 99% by weight, in particular from 0.2 to 95% by weight, of active compounds of types (A) and/or (B), the following concentrations being customary, depending on the type of formulation:

In wettable powders, the active compound concentration is, for example, about 10 to 95% by weight, the remainder to 100% by weight consisting of customary formulation constituents. In the case of emulsifiable concentrates, the active compound concentration can be about 1 to 90% by weight, preferably 5 to 80% by weight.

In most cases, formulations in the form of dusts comprise 5 to 20% by weight of active compound; sprayable solutions comprise about 0.05 to 80, preferably 2 to 50% by weight of active compound.

In the case of granules such as dispersible granules, the active compound content depends partially on whether the active compound is present in liquid or solid form and on which granulation auxiliaries and fillers are used. In general, the content in the water-dispersible granules is between 1% and 95% by weight, preferably between 10% and 80% by weight.

In addition, the active compound formulations mentioned optionally comprise the respective customary adhesives, wetting agents, dispersants, emulsifiers, penetrants, preservatives, antifreeze agents and solvents, fillers, colorants and carriers, antifoams, evaporation inhibitors and pH- or viscosity-modifying agents.

For application, the formulations in commercial form are, if appropriate, diluted in a customary manner, for example in the case of wettable powders, emulsifiable concentrates, dispersions and water-dispersible granules with water. Dust-type preparations, granules for soil application or granules for scattering and sprayable solutions are not normally diluted further with other inert substances prior to application.

The active compounds can be applied to the plants, plant parts, plant seeds or area under cultivation (soil), preferably on the green plants and plant parts, and optionally additionally to the soil.

One possible use is the joint application of the active compounds in the form of tank-mixes, where the optimally formulated concentrated formulations of the individual active compounds are, together, mixed in a tank with water, and the spray liquor obtained is applied.

A joint herbicidal formulation of the inventive combination of active compounds (A) and (B) has the advantage that it can be applied more easily since the quantities of the components are already adjusted to the correct ratio to one another. Moreover, the auxiliaries in the formulation can be adjusted optimally to one another, whereas a tank mix of different formulations may result in unwanted combinations of auxiliaries.

A. General Formulation Examples
 a) A dusting product is obtained by mixing 10 parts by weight of an active compound (A) or (B) or an active compound mixture (A)+(B) (and optionally further active compound components) and/or salts thereof and 90 parts by weight of talc as inert substance, and comminuting in a beater mill
 b) A wettable powder which is readily dispersible in water is obtained by mixing 25 parts by weight of an active compound/active compound mixture, 64 parts by weight of kaolin-containing quartz as inert substance, 10 parts by weight of potassium lignosulfonate and 1 part by weight of sodium oleoylmethyltaurate as wetting agent and dispersant, and grinding the mixture in a pinned-disc mill
 c) A dispersion concentrate which is readily dispersible in water is obtained by mixing 20 parts by weight of an active compound/active compound mixture with 6 parts by weight of alkylphenol polyglycol ether (Triton® X 207), 3 parts by weight of isotridecanol polyglycol ether (8 EO) and 71 parts by weight of paraffinic mineral oil (boiling range for example approximately 255 to 277° C.) and grinding the mixture in a ball mill to a fineness of below 5 microns.

d) An emulsifiable concentrate is obtained from 15 parts by weight of an active compound/active compound mixture, 75 parts by weight of cyclohexanone as solvent and 10 parts by weight of oxyethylated nonylphenol as emulsifier.

e) Water-dispersible granules are obtained by mixing
75 parts by weight of an active compound/active compound mixture,
10 parts by weight of calcium lignosulfonate,
5 parts by weight of sodium lauryl sulfate,
3 parts by weight of polyvinyl alcohol and
7 parts by weight of kaolin,
grinding the mixture in a pinned-disk mill, and granulating the powder in a fluidized bed by spray application of water as a granulating liquid.

f) Water-dispersible granules are also obtained by homogenizing and precomminuting, in a colloid mill,
25 parts by weight of an active compound/active compound mixture,
5 parts by weight of sodium 2,2'-dinaphthylmethane-6,6'-disulfonate,
2 parts by weight of sodium oleoylmethyltaurate,
1 part by weight of polyvinyl alcohol,
17 parts by weight of calcium carbonate and
50 parts by weight of water,
then grinding the mixture in a bead mill and atomizing and drying the resulting suspension in a spray tower by means of a one-phase nozzle.

B. Biological Examples

On application of the combinations according to the invention, herbicidal effects on a harmful plant species that exceed the formal sum total of the effects of the herbicides present where applied alone are frequently observed. Alternatively, in some cases, it is possible to observe that a smaller application rate for the herbicide combination is required in order to achieve the same effect for a harmful plant species compared to the individual preparations. Such increases in action or increases in effectiveness or reductions in application rate are a strong indication of a synergistic effect.

When the observed efficacies exceed the formal sum total of the values of the tests with individual applications, they also exceed the expected value according to Colby, which is calculated using the formula below and is likewise regarded as an indication of synergism (cf. S. R. Colby; in Weeds 15 (1967) p. 20 to 22):

$$E^C = A + B - (A \cdot B/100)$$

Here:
A=efficacy of the active compound (A) in % at an application rate of a g a.i./ha;
B=efficacy of the active compound (B) in % at an application rate of b g a.i./ha;
$E^C$=expected value of the effect of the combination (A)+(B) in % at the combined application rate a+b g a.i./ha.

The observed values ($E^A$) from the experiments, given suitable low dosages, show an effect of the combinations exceeding the expected values according to Colby (Δ).

1. Post-Emergence Action Against Weeds

Seeds or rhizome pieces of mono- and dicotyledonous weeds are placed in sandy loam in pots, covered with soil and grown in a greenhouse under good growth conditions (temperature, air humidity, water supply). Three weeks after sowing, the test plants were treated at the three-leaf stage with the compositions according to the invention. The compositions according to the invention formulated as spray powders or as emulsion concentrates were sprayed onto the green plant parts in various dosages with an application rate of 300 to 800 l/ha of water (equivalent). After the test plants have been left to stand in the greenhouse under optimal growth conditions for about 3 to 4 weeks, the action of the preparations is scored visually in comparison to untreated controls. The compositions according to the invention also have good post-emergence herbicidal activity against a broad spectrum of economically important gramineous and broadleaf weeds.

Effects of the combinations according to the invention that exceed the formal sum total of the effects in the case of individual application of the herbicides are frequently observed here. The observed values from the experiments, given suitable low dosages, show an effect of the combinations exceeding the expected values according to Colby.

2. Herbicidal Pre-Emergence and Post-Emergence Action (Field Trials)

The experiments were conducted on outdoor plots in accordance with the greenhouse conditions from section 1. The rating was analogous to the experiment in section 1.

3. Herbicidal Action and Crop Plant Compatibility (Field Trials)

Crop plants were grown in outdoor plots under natural outdoor conditions, with laying-out of seeds or rhizome pieces of typical harmful plants or utilization of natural weed flora. The treatment with the compositions according to the invention was effected after the harmful plants and the crop plants had emerged, generally at the 2- to 4-leaf stage; in some cases (as specified), individual active compounds or active compound combinations were applied pre-emergence or as a sequential treatment partly pre-emergence and/or post-emergence.

In the case of plantation crops, in general, only the soil between the individual crop plants was treated with the active compounds.

After application, for example 2, 4, 6 and 8 weeks after application, the effect of the preparations was rated visually by comparison with untreated controls. The compositions according to the invention also have synergistic herbicidal activity in field trials against a broad spectrum of economically important weed grasses and broadleaved weeds. The comparison showed that the combinations according to the invention usually have greater, and in some cases considerably greater, herbicidal action than the sum total of the effects of the individual herbicides, and therefore suggests synergism. The effects over significant parts of the rating period were also above the expected values according to Colby, and therefore likewise suggest synergism. The crop plants, by contrast, were damaged only insignificantly, if at all, as a result of the treatments with the herbicidal compositions.

4. Specific Trial Examples

The following abbreviations are used in the description and the tables that follow:
g of a.i./ha=grams of active substance (active ingredient) (=100% active compound) per hectare;
The sum total of the effects of the individual applications is reported under $E^A$;
expected values according to Colby are each reported under $E^C$.

The biological results of the compositions according to the invention are summarized in Tables 3.1-3.8. The rating period is reported in days after application (DAT).

TABLE 3.1

Synergistic effect (Δ) for herbicidal binary compositions comprising herbicides from group B1, applied by the post-emergence method

| Active compound(s) | Application rate [g of a.i./ha] | Herbicidal action 28 DAT [%] against *Panicum maximum* |
|---|---|---|
| (B1.7) Mesotrione | 75 | 0 |
| A3 | 100 | 82 |
| A3 + (B1.7) Mesotrione | 100 + 75 | $E^A = 85$ ($E^C = 82$) Δ 4 |

| Active compound(s) (Z59) | Application rate [g of a.i./ha] | Herbicidal action 43 DAT [%] against *Bellis perenne* |
|---|---|---|
| (B1.7) Mesotrione | 105 | 0 |
| A3 | 100 | 0 |
| A3 + (B1.7) Mesotrione | 100 + 105 | $E^A = 50$ ($E^C = 0$) Δ 50 |

| Active compound(s) (Z59) | Application rate [g of a.i./ha] | Herbicidal action 43 DAT [%] against *Ephilobium hirsutum* |
|---|---|---|
| (B1.7) Mesotrione | 105 | 0 |
| A3 | 100 | 77 |
| A3 + (B1.7) Mesotrione | 100 + 105 | $E^A = 100$ ($E^C = 77$) Δ 23 |

| Active compound(s) (Z59) | Application rate [g of a.i./ha] | Herbicidal action 32 DAT [%] against *Lamium purpureum* |
|---|---|---|
| (B1.7) Mesotrione | 105 | 0 |
| A3 | 100 | 50 |
| A3 + (B1.7) Mesotrione | 100 + 105 | $E^A = 80$ ($E^C = 50$) Δ 30 |

| Active compound(s) (Z59) | Application rate [g of a.i./ha] | Herbicidal action 43 DAT [%] against *Ranunculus repens* |
|---|---|---|
| (B1.7) Mesotrione | 105 | 0 |
| A3 | 100 | 82 |
| A3 + (B1.7) Mesotrione | 100 + 105 | $E^A = 90$ ($E^C = 82$) Δ 8 |

| Active compound(s) (Z59) | Application rate [g of a.i./ha] | Herbicidal action 43 DAT [%] against *Viola arvensis* |
|---|---|---|
| (B1.7) Mesotrione | 105 | 0 |
| A3 | 100 | 50 |
| A3 + (B1.7) Mesotrione | 100 + 105 | $E^A = 60$ ($E^C = 50$) Δ 10 |

| Active compound(s) (Z59) | Application rate [g of a.i./ha] | Herbicidal action 21 DAT [%] against *Amaranthus palmeri* |
|---|---|---|
| (B1.7) Mesotrione | 5 | 0 |
| A3 | 5 | 15 |
|  | 1.7 | 10 |
| A3 + (B1.7) Mesotrione | 5 + 5 | $E^A = 40$ ($E^C = 15$) Δ 25 |
|  | 1.7 + 5 | $E^A = 30$ ($E^C = 10$) Δ 20 |

| Active compound(s) (Z59) | Application rate [g of a.i./ha] | Herbicidal action 21 DAT [%] against *Bidens pilosa* |
|---|---|---|
| (B1.7) Mesotrione | 45 | 25 |
|  | 5 | 0 |
| A3 | 15 | 25 |
|  | 5 | 10 |
|  | 1.7 | 0 |
| A3 + (B1.7) Mesotrione | 15 + 45 | $E^A = 55$ ($E^C = 43.75$) Δ 11.25 |
|  | 5 + 45 | $E^A = 60$ ($E^C = 32.5$) Δ 27.5 |
|  | 1.7 + 45 | $E^A = 65$ ($E^C = 25$) Δ 40 |
|  | 5 + 5 | $E^A = 45$ ($E^C = 10$) Δ 35 |
|  | 1.7 + 5 | $E^A = 25$ ($E^C = 0$) Δ 25 |

| Active compound(s) | Application rate [g of a.i./ha] | Herbicidal action 21 DAT [%] against *Brachiaria platyphylla* |
|---|---|---|
| (B1.14) Tembotrione | 45 | 50 |
|  | 15 | 50 |
| A3 | 1.7 | 20 |
| A3 + (B1.14) Tembotrione | 1.7 + 45 | $E^A = 97$ ($E^C = 76$) Δ 21 |
|  | 1.7 + 15 | $E^A = 85$ ($E^C = 60$) Δ 25 |

| Active compound(s) | Application rate [g of a.i./ha] | Herbicidal action 21 DAT [%] against *Setaria viridis* |
|---|---|---|
| (B1.14) Tembotrione | 5 | 10 |
| A3 | 1.7 | 70 |
| A3 + (B1.14) Tembotrione | 1.7 + 5 | $E^A = 97$ ($E^C = 73$) Δ 24 |

| Active compound(s) | Application rate [g of a.i./ha] | Herbicidal action 21 DAT [%] against *Sorghum halepense* |
|---|---|---|
| (B1.14) Tembotrione | 15 | 50 |
|  | 5 | 30 |
| A3 | 1.7 | 40 |
| A3 + (B1.14) Tembotrione | 1.7 + 15 | $E^A = 80$ ($E^C = 70$) Δ 10 |
|  | 1.7 + 5 | $E^A = 70$ ($E^C = 58$) Δ 12 |

| Active compound(s) | Application rate [g of a.i./ha] | Herbicidal action 21 DAT [%] against *Amaranthus palmeri* |
|---|---|---|
| (B1.14) Tembotrione | 15 | 20 |
|  | 5 | 10 |
| A3 | 15 | 30 |
|  | 5 | 10 |
|  | 1.7 | 0 |
| A3 + (B1.14) Tembotrione | 5 + 15 | $E^A = 50$ ($E^C = 28$) Δ 22 |
|  | 1.7 + 15 | $E^A = 50$ ($E^C = 20$) Δ 30 |
|  | 15 + 5 | $E^A = 60$ ($E^C = 37$) Δ 23 |
|  | 5 + 5 | $E^A = 50$ ($E^C = 19$) Δ 31 |
|  | 1.7 + 5 | $E^A = 30$ ($E^C = 10$) Δ 20 |

| Active compound(s) | Application rate [g of a.i./ha] | Herbicidal action 21 DAT [%] against *Bidens pilosa* |
|---|---|---|
| (B1.14) Tembotrione | 45 | 25 |
|  | 15 | 25 |
|  | 5 | 10 |
| A3 | 5 | 10 |
|  | 1.7 | 10 |
| A3 + (B1.14) Tembotrione | 5 + 45 | $E^A = 60$ ($E^C = 32.5$) Δ 27.5 |
|  | 1.7 + 15 | $E^A = 45$ ($E^C = 32.5$) Δ 12.5 |
|  | 5 + 5 | $E^A = 35$ ($E^C = 19$) Δ 16 |
|  | 1.7 + 5 | $E^A = 30$ ($E^C = 19$) Δ 11 |

| Active compound(s) | Application rate [g of a.i./ha] | Herbicidal action 37 DAT [%] against *Ipomoea hederacea* |
|---|---|---|
| (B1.14) Tembotrione | 37.5 | 0 |
| A3 | 100 | 8 |
| A3 + (B1.14) Tembotrione | 100 + 37.5 | $E^A = 13$ ($E^C = 8$) Δ 5 |

TABLE 3.2

Synergistic effect (Δ) for herbicidal binary compositions comprising herbicides from group B2, applied by the post-emergence method

| Active compound(s) (Z3) | Application rate [g of a.i./ha] | Herbicidal action 21 DAT [%] against *Bidens pilosa* |
|---|---|---|
| (B2.18) Diflufenican | 90 | 10 |
|  | 30 | 10 |
| A1 | 15 | 35 |
| A1 + | 15 + 90 | $E^A = 50$ ($E^C = 42$) Δ 8 |
| (B2.18) Diflufenican | 15 + 30 | $E^A = 50$ ($E^C = 42$) Δ 8 |

| Active compound(s) (Z3) | Application rate [g of a.i./ha] | Herbicidal action 21 DAT [%] against *Echinochloa crus-galli* |
|---|---|---|
| (B2.18) Diflufenican | 270 | 20 |
|  | 30 | 10 |
| A1 | 5 | 10 |
| A1 + | 5 + 270 | $E^A = 35$ ($E^C = 28$) Δ 7 |
| (B2.18) Diflufenican | 5 + 30 | $E^A = 30$ ($E^C = 19$) Δ 11 |

| Active compound(s) (Z3) | Application rate [g of a.i./ha] | Herbicidal action 21 DAT [%] against *Eleusine indica* |
|---|---|---|
| (B2.18) Diflufenican | 270 | 30 |
|  | 90 | 20 |
| A1 | 15 | 70 |
|  | 5 | 45 |
| A1 + | 5 + 270 | $E^A = 75$ ($E^C = 62$) Δ 13 |
| (B2.18) Diflufenican | 15 + 90 | $E^A = 85$ ($E^C = 76$) Δ 9 |

| Active compound(s) (Z3) | Application rate [g of a.i./ha] | Herbicidal action 21 DAT [%] against *Polygonum convolvulus* |
|---|---|---|
| (B2.18) Diflufenican | 90 | 20 |
|  | 30 | 10 |
| A1 | 45 | 85 |
| A1 + | 45 + 90 | $E^A = 97$ ($E^C = 88$) Δ 9 |
| (B2.18) Diflufenican | 45 + 30 | $E^A = 93$ ($E^C = 87$) Δ 6 |

| Active compound(s) (Z3) | Application rate [g of a.i./ha] | Herbicidal action 21 DAT [%] against *Sorghum halepense* |
|---|---|---|
| (B2.18) Diflufenican | 90 | 10 |
|  | 30 | 10 |
| A1 | 15 | 35 |
|  | 5 | 20 |
| A1 + | 15 + 90 | $E^A = 97$ ($E^C = 42$) Δ 55 |
| (B2.18) Diflufenican | 5 + 90 | $E^A = 45$ ($E^C = 28$) Δ 17 |
|  | 15 + 30 | $E^A = 93$ ($E^C = 42$) Δ 51 |
|  | 5 + 30 | $E^A = 40$ ($E^C = 28$) Δ 12 |

| Active compound(s) (Z32) | Application rate [g of a.i./ha] | Herbicidal action 21 DAT [%] against *Abutilon theophrasti* |
|---|---|---|
| (B2.18) Diflufenican | 90 | 10 |
|  | 30 | 10 |
| A2 | 15 | 75 |
| A2 + | 15 + 90 | $E^A = 85$ ($E^C = 78$) Δ 7 |
| (B2.18) Diflufenican | 15 + 30 | $E^A = 85$ ($E^C = 78$) Δ 7 |

| Active compound(s) (Z32) | Application rate [g of a.i./ha] | Herbicidal action 21 DAT [%] against *Brachiaria platyphylla* |
|---|---|---|
| (B2.18) Diflufenican | 270 | 20 |
|  | 90 | 15 |
|  | 30 | 15 |
| A2 | 15 | 85 |
|  | 5 | 65 |
|  | 1.7 | 10 |
| A2 + | 5 + 270 | $E^A = 90$ ($E^C = 72$) Δ 18 |
| (B2.18) Diflufenican | 15 + 90 | $E^A = 99$ ($E^C = 87$) Δ 12 |
|  | 5 + 90 | $E^A = 98$ ($E^C = 70$) Δ 28 |
|  | 1.7 + 90 | $E^A = 50$ ($E^C = 24$) Δ 26 |
|  | 15 + 30 | $E^A = 98$ ($E^C = 87$) Δ 11 |
|  | 5 + 30 | $E^A = 93$ ($E^C = 70$) Δ 23 |
|  | 1.7 + 30 | $E^A = 40$ ($E^C = 24$) Δ 16 |

| Active compound(s) (Z32) | Application rate [g of a.i./ha] | Herbicidal action 21 DAT [%] against *Echinochloa crus-galli* |
|---|---|---|
| (B2.18) Diflufenican | 270 | 15 |
|  | 90 | 10 |
|  | 30 | 10 |
| A2 | 15 | 80 |
|  | 5 | 40 |
| A2 + | 15 + 270 | $E^A = 90$ ($E^C = = 83$) Δ 7 |
| (B2.18) Diflufenican | 15 + 90 | $E^A = 97$ ($E^C = 82$) Δ 15 |
|  | 15 + 30 | $E^A = 99$ ($E^C = 82$) Δ 17 |
|  | 5 + 30 | $E^A = 70$ ($E^C = 46$) Δ 24 |

| Active compound(s) (Z32) | Application rate [g of a.i./ha] | Herbicidal action 21 DAT [%] against *Eleusine indica* |
|---|---|---|
| (B2.18) Diflufenican | 270 | 65 |
|  | 90 | 20 |
|  | 30 | 20 |
| A2 | 15 | 70 |
|  | 1.7 | 10 |
| A2 + | 15 + 270 | $E^A = 99$ ($E^C = 90$) Δ 9 |
| (B2.18) Diflufenican | 15 + 90 | $E^A = 98$ ($E^C = 76$) Δ 22 |
|  | 15 + 30 | $E^A = 99$ ($E^C = 76$) Δ 23 |
|  | 1.7 + 30 | $E^A = 35$ ($E^C = 28$) Δ 7 |

| Active compound(s) (Z32) | Application rate [g of a.i./ha] | Herbicidal action 21 DAT [%] against *Kochia scoparia* |
|---|---|---|
| (B2.18) Diflufenican | 30 | 25 |
| A2 | 5 | 40 |
| A2 + (B2.18) Diflufenican | 5 + 30 | $E^A = 65$ ($E^C = 55$) Δ 10 |

| Active compound(s) (Z32) | Application rate [g of a.i./ha] | Herbicidal action 21 DAT [%] against *Setaria viridis* |
|---|---|---|
| (B2.18) Diflufenican | 270 | 15 |
|  | 90 | 15 |
|  | 30 | 10 |
| A2 | 5 | 80 |
|  | 1.7 | 10 |
| A2 + | 5 + 270 | $E^A = 99$ ($E^C = 83$) Δ 16 |
| (B2.18) Diflufenican | 1.7 + 270 | $E^A = 65$ ($E^C = 24$) Δ 41 |
|  | 5 + 90 | $E^A = 93$ ($E^C = 83$) Δ 10 |
|  | 5 + 30 | $E^A = 99$ ($E^C = 82$) Δ 17 |

| Active compound(s) (Z32) | Application rate [g of a.i./ha] | Herbicidal action 21 DAT [%] against *Digitaria sanguinalis* |
|---|---|---|
| (B2.18) Diflufenican | 270 | 20 |
|  | 90 | 20 |
|  | 30 | 15 |
| A2 | 15 | 80 |
|  | 5 | 25 |
| A2 + | 15 + 270 | $E^A = 95$ ($E^C = 84$) Δ 11 |
| (B2.18) Diflufenican | 15 + 90 | $E^A = 99$ ($E^C = 84$) Δ 15 |
|  | 5 + 30 | $E^A = 75$ ($E^C = 36$) Δ 39 |

| Active compound(s) (Z32) | Application rate [g of a.i./ha] | Herbicidal action 21 DAT [%] against *Sorghum halepense* |
|---|---|---|
| (B2.18) Diflufenican | 270 | 15 |
|  | 90 | 15 |
|  | 30 | 10 |

TABLE 3.2-continued

Synergistic effect (Δ) for herbicidal binary compositions comprising herbicides from group B2, applied by the post-emergence method

| Active compound(s) | Application rate [g of a.i./ha] | |
|---|---|---|
| A2 | 5 | 75 |
|  | 1.7 | 15 |
| A2 + (B2.18) Diflufenican | 5 + 270 | $E^A = 93$ ($E^C = 79$) Δ 14 |
|  | 1.7 + 270 | $E^A = 50$ ($E^C = 28$) Δ 22 |
|  | 5 + 90 | $E^A = 95$ ($E^C = 79$) Δ 16 |
|  | 1.7 + 90 | $E^A = 70$ ($E^C = 28$) Δ 42 |
|  | 5 + 30 | $E^A = 95$ ($E^C = 78$) Δ 17 |
|  | 1.7 + 30 | $E^A = 30$ ($E^C = 24$) Δ 6 |

| Active compound(s) | Application rate [g of a.i./ha] | Herbicidal action 28 DAT [%] against *Brachiaria plantaginea* |
|---|---|---|
| (B2.4) Asulam (CAS 2302-17-2) | 720 | 0 |
| A3 | 100 | 82 |
| A3 + (B2.4) Asulam (CAS 2302-17-2) | 100 + 720 | $E^A = 87$ ($E^C = 82$) Δ 5 |

| Active compound(s) | Application rate [g of a.i./ha] | Herbicidal action 28 DAT [%] against *Digitaria horizontalis* |
|---|---|---|
| (B2.4) Asulam (CAS 2302-17-2) | 720 | 0 |
| A3 | 100 | 96 |
| A3 + (B2.4) Asulam (CAS 2302-17-2) | 100 + 720 | $E^A = 99$ ($E^C = 96$) Δ 3 |

| Active compound(s) | Application rate [g of a.i./ha] | Herbicidal action 28 DAT [%] against *Digitaria horizontalis* |
|---|---|---|
| (B2.4) Asulam (CAS 2302-17-2) | 720 | 0 |
| A3 | 100 | 87 |
| A3 + (B2.4) Asulam (CAS 2302-17-2) | 100 + 720 | $E^A = 90$ ($E^C = 87$) Δ 3 |

| Active compound(s) (Z61) | Application rate [g of a.i./ha] | Herbicidal action 37 DAT [%] against *Digitaria sanguinalis* |
|---|---|---|
| (B2.18) Diflufenican | 180 | 0 |
| A3 | 100 | 94 |
| A3 + (B2.18) Diflufenican | 100 + 180 | $E^A = 99$ ($E^C = 94$) Δ 5 |

| Active compound(s) (Z61) | Application rate [g of a.i./ha] | Herbicidal action 27 DAT [%] against *Chenopodium album* |
|---|---|---|
| (B2.18) Diflufenican | 180 | 20 |
| A3 | 100 | 85 |
| A3 + (B2.18) Diflufenican | 100 + 180 | $E^A = 96$ ($E^C = 88$) Δ 8 |

| Active compound(s) (Z61) | Application rate [g of a.i./ha] | Herbicidal action 28 DAT [%] against *Brachiaria plantaginea* |
|---|---|---|
| (B2.18) Diflufenican | 200 | 0 |
| A3 | 100 | 82 |
| A3 + (B2.18) Diflufenican | 100 + 200 | $E^A = 89$ ($E^C = 82$) Δ 7 |

| Active compound(s) (Z61) | Application rate [g of a.i./ha] | Herbicidal action 28 DAT [%] against *Digitaria horizontalis* |
|---|---|---|
| (B2.18) Diflufenican | 200 | 0 |
| A3 | 100 | 96 |
| A3 + (B2.18) Diflufenican | 100 + 200 | $E^A = 100$ ($E^C = 96$) Δ 4 |

| Active compound(s) (Z61) | Application rate [g of a.i./ha] | Herbicidal action 28 DAT [%] against *Brachiaria decumbens* |
|---|---|---|
| (B2.18) Diflufenican | 200 | 0 |
| A3 | 100 | 87 |
| A3 + (B2.18) Diflufenican | 100 + 200 | $E^A = 99$ ($E^C = 87$) Δ 12 |

| Active compound(s) (Z61) | Application rate [g of a.i./ha] | Herbicidal action 28 DAT [%] against *Panicum maximum* |
|---|---|---|
| (B2.18) Diflufenican | 200 | 0 |
| A3 | 100 | 82 |
| A3 + (B2.18) Diflufenican | 100 + 200 | $E^A = 92$ ($E^C = 82$) Δ 10 |

| Active compound(s) (Z61) | Application rate [g of a.i./ha] | Herbicidal action in [%] 14 DAT against *Alopecurus myosuroides* |
|---|---|---|
| A3 | 4 | 90 |
|  | 1 | 15 |
| (B2.18) Diflufenican | 270 | 20 |
|  | 90 | 15 |
| A3 + (B2.18) Diflufenican | 4 + 270 | $E^A = 97$ ($E^C = 92$) Δ = 5 |
|  | 4 + 90 | $E^A = 97$ ($E^C = 92$) Δ = 5 |
|  | 1 + 270 | $E^A = 97$ ($E^C = 32$) Δ = 65 |
|  | 1 + 90 | $E^A = 80$ ($E^C = 28$) Δ = 52 |

| Active compound(s) (Z61) | Application rate [g of a.i./ha] | Herbicidal action in [%] 28 DAT against *Alopecurus myosuroides* |
|---|---|---|
| A3 | 16 | 90 |
|  | 4 | 50 |
|  | 1 | 15 |
| (B2.18) Diflufenican | 270 | 20 |
|  | 90 | 15 |
| A3 + (B2.18) Diflufenican | 16 + 270 | $E^A = 98$ ($E^C = 92$) Δ = 6 |
|  | 4 + 270 | $E^A = 100$ ($E^C = 60$) Δ = 40 |
|  | 4 + 90 | $E^A = 85$ ($E^C = 58$) Δ = 27 |
|  | 1 + 270 | $E^A = 100$ ($E^C = 32$) Δ = 68 |
|  | 1 + 90 | $E^A = 35$ ($E^C = 28$) Δ = 7 |

| Active compound(s) (Z61) | Application rate [g of a.i./ha] | Herbicidal action in [%] 14 DAT against *Bromus sterilis* |
|---|---|---|
| A3 | 4 | 85 |
|  | 1 | 15 |
| (B2.18) Diflufenican | 270 | 15 |
|  | 90 | 10 |
| A3 + (B2.18) Diflufenican | 4 + 270 | $E^A = 95$ ($E^C = 87$) Δ = 8 |
|  | 1 + 270 | $E^A = 85$ ($E^C = 28$) Δ = 57 |
|  | 1 + 90 | $E^A = 85$ ($E^C = 24$) Δ = 61 |

| Active compound(s) (Z61) | Application rate [g of a.i./ha] | Herbicidal action in [%] 28 DAT against *Bromus sterilis* |
|---|---|---|
| A3 | 1 | 15 |
| (B2.18) Diflufenican | 270 | 20 |
|  | 90 | 15 |
| A3 + (B2.18) Diflufenican | 1 + 270 | $E^A = 95$ ($E^C = 32$) Δ = 63 |
|  | 1 + 90 | $E^A = 80$ ($E^C = 28$) Δ = 52 |

TABLE 3.2-continued

Synergistic effect (Δ) for herbicidal binary compositions comprising herbicides from group B2, applied by the post-emergence method

| Active compound(s) (Z61) | Application rate [g of a.i./ha] | Herbicidal action in [%] 28 DAT against *Centaurea cyanus* |
|---|---|---|
| A3 | 1 | 0 |
| (B2.18) Diflufenican | 270 | 40 |
|  | 90 | 25 |
| A3 + (B2.18) Diflufenican | 1 + 270 | $E^A = 50$ ($E^C = 40$) $\Delta = 10$ |
|  | 1 + 90 | $E^A = 30$ ($E^C = 25$) $\Delta = 5$ |

| Active compound(s) (Z61) | Application rate [g of a.i./ha] | Herbicidal action in [%] 14 DAT against *Galium aparine* |
|---|---|---|
| A3 | 1 | 40 |
| (B2.18) Diflufenican | 270 | 60 |
|  | 90 | 50 |
|  | 30 | 50 |
| A3 + (B2.18) Diflufenican | 1 + 270 | $E^A = 85$ ($E^C = 76$) $\Delta = 9$ |
|  | 1 + 90 | $E^A = 90$ ($E^C = 70$) $\Delta = 20$ |
|  | 1 + 30 | $E^A = 80$ ($E^C = 70$) $\Delta = 10$ |

| Active compound(s) (Z61) | Application rate [g of a.i./ha] | Herbicidal action in [%] 28 DAT against *Galium aparine* |
|---|---|---|
| A3 | 16 | 75 |
|  | 1 | 15 |
| (B2.18) Diflufenican | 270 | 40 |
|  | 90 | 30 |
|  | 30 | 30 |
| A3 + (B2.18) Diflufenican | 16 + 270 | $E^A = 95$ ($E^C = 85$) $\Delta = 10$ |
|  | 16 + 90 | $E^A = 90$ ($E^C = 83$) $\Delta = 7$ |
|  | 1 + 270 | $E^A = 70$ ($E^C = 49$) $\Delta = 21$ |
|  | 1 + 90 | $E^A = 70$ ($E^C = 41$) $\Delta = 29$ |
|  | 1 + 30 | $E^A = 70$ ($E^C = 41$) $\Delta = 29$ |

| Active compound(s) (Z61) | Application rate [g of a.i./ha] | Herbicidal action in [%] 14 DAT against *Lamium purpureum* L. |
|---|---|---|
| A3 | 1 | 65 |
| (B2.18) Diflufenican | 270 | 35 |
|  | 90 | 30 |
| A3 + (B2.18) Diflufenican | 1 + 270 | $E^A = 95$ ($E^C = 77$) $\Delta = 18$ |
|  | 1 + 90 | $E^A = 93$ ($E^C = 76$) $\Delta = 17$ |

| Active compound(s) (Z61) | Application rate [g of a.i./ha] | Herbicidal action in [%] 28 DAT against *Lamium purpureum* L. |
|---|---|---|
| A3 | 4 | 40 |
|  | 1 | 25 |
| (B2.18) Diflufenican | 270 | 20 |
|  | 30 | 20 |
|  | 90 | 20 |
| A3 + (B2.18) Diflufenican | 4 + 270 | $E^A = 70$ ($E^C = 52$) $\Delta = 18$ |
|  | 4 + 30 | $E^A = 60$ ($E^C = 52$) $\Delta = 8$ |
|  | 1 + 270 | $E^A = 60$ ($E^C = 40$) $\Delta = 20$ |
|  | 1 + 90 | $E^A = 60$ ($E^C = 40$) $\Delta = 20$ |
|  | 1 + 30 | $E^A = 60$ ($E^C = 40$) $\Delta = 20$ |

| Active compound(s) (Z61) | Application rate [g of a.i./ha] | Herbicidal action in [%] 14 DAT against *Lolium rigidum* |
|---|---|---|
| A3 | 1 | 35 |
| (B2.18) Diflufenican | 270 | 10 |
|  | 90 | 10 |
|  | 30 | 0 |
| A3 + (B2.18) Diflufenican | 1 + 270 | $E^A = 97$ ($E^C = 42$) $\Delta = 55$ |
|  | 1 + 90 | $E^A = 95$ ($E^C = 42$) $\Delta = 53$ |
|  | 1 + 30 | $E^A = 45$ ($E^C = 35$) $\Delta = 10$ |

| Active compound(s) (Z61) | Application rate [g of a.i./ha] | Herbicidal action in [%] 28 DAT against *Lolium rigidum* |
|---|---|---|
| A3 | 4 | 50 |
|  | 1 | 15 |
| (B2.18) Diflufenican | 270 | 20 |
|  | 90 | 15 |
| A3 + (B2.18) Diflufenican | 4 + 270 | $E^A = 95$ ($E^C = 60$) $\Delta = 35$ |
|  | 4 + 90 | $E^A = 70$ ($E^C = 58$) $\Delta = 12$ |
|  | 1 + 270 | $E^A = 95$ ($E^C = 32$) $\Delta = 63$ |
|  | 1 + 90 | $E^A = 80$ ($E^C = 28$) $\Delta = 52$ |

| Active compound(s) (Z61) | Application rate [g of a.i./ha] | Herbicidal action in [%] 14 DAT against *Lolium rigidum* (resistant biotype) |
|---|---|---|
| A3 | 4 | 40 |
|  | 1 | 15 |
| (B2.18) Diflufenican | 270 | 10 |
|  | 90 | 0 |
| A3 + (B2.18) Diflufenican | 4 + 270 | $E^A = 93$ ($E^C = 46$) $\Delta = 47$ |
|  | 1 + 270 | $E^A = 80$ ($E^C = 24$) $\Delta = 56$ |
|  | 1 + 90 | $E^A = 80$ ($E^C = 15$) $\Delta = 65$ |

| Active compound(s) (Z61) | Application rate [g of a.i./ha] | Herbicidal action in [%] 28 DAT against *Lolium rigidum* (resistant biotype) |
|---|---|---|
| A3 | 4 | 10 |
|  | 1 | 0 |
| (B2.18) Diflufenican | 270 | 20 |
|  | 90 | 10 |
| A3 + (B2.18) Diflufenican | 4 + 270 | $E^A = 60$ ($E^C = 28$) $\Delta = 32$ |
|  | 1 + 90 | $E^A = 35$ ($E^C = 10$) $\Delta = 25$ |

| Active compound(s) (Z61) | Application rate [g of a.i./ha] | Herbicidal action in [%] 14 DAT against *Matricaria inodora* |
|---|---|---|
| A3 | 1 | 0 |
| (B2.18) Diflufenican | 270 | 30 |
|  | 30 | 15 |
| A3 + (B2.18) Diflufenican | 1 + 270 | $E^A = 40$ ($E^C = 30$) $\Delta = 10$ |
|  | 1 + 30 | $E^A = 30$ ($E^C = 15$) $\Delta = 15$ |

| Active compound(s) (Z61) | Application rate [g of a.i./ha] | Herbicidal action in [%] 28 DAT against *Matricaria inodora* |
|---|---|---|
| A3 | 4 | 20 |
|  | 1 | 15 |
| (B2.18) Diflufenican | 30 | 0 |
| A3 + (B2.18) Diflufenican | 4 + 30 | $E^A = 30$ ($E^C = 20$) $\Delta = 10$ |
|  | 1 + 30 | $E^A = 20$ ($E^C = 15$) $\Delta = 5$ |

| Active compound(s) (Z61) | Application rate [g of a.i./ha] | Herbicidal action in [%] 14 DAT against *Phalaris minor* |
|---|---|---|
| A3 | 16 | 85 |
|  | 4 | 90 |
|  | 1 | 10 |
| (B2.18) Diflufenican | 270 | 25 |
|  | 90 | 0 |
|  | 30 | 0 |
| A3 + (B2.18) Diflufenican | 16 + 270 | $E^A = 97$ ($E^C = 89$) $\Delta = 8$ |
|  | 16 + 90 | $E^A = 95$ ($E^C = 85$) $\Delta = 10$ |
|  | 4 + 90 | $E^A = 97$ ($E^C = 90$) $\Delta = 7$ |
|  | 1 + 270 | $E^A = 95$ ($E^C = 33$) $\Delta = 62$ |
|  | 1 + 90 | $E^A = 95$ ($E^C = 10$) $\Delta = 85$ |
|  | 1 + 30 | $E^A = 25$ ($E^C = 10$) $\Delta = 15$ |

TABLE 3.2-continued

Synergistic effect (Δ) for herbicidal binary compositions comprising herbicides from group B2, applied by the post-emergence method

| Active compound(s) (Z61) | Application rate [g of a.i./ha] | Herbicidal action in [%] 28 DAT against *Phalaris minor* |
|---|---|---|
| A3 | 16 | 40 |
|  | 4 | 70 |
|  | 1 | 0 |
| (B2.18) Diflufenican | 270 | 20 |
|  | 90 | 5 |
| A3 + | 16 + 270 | $E^A = 80$ ($E^C = 52$) Δ = 28 |
| (B2.18) Diflufenican | 16 + 90 | $E^A = 70$ ($E^C = 43$) Δ = 27 |
|  | 4 + 270 | $E^A = 100$ ($E^C = 76$) Δ = 24 |
|  | 4 + 90 | $E^A = 97$ ($E^C = 72$) Δ = 25 |
|  | 1 + 270 | $E^A = 50$ ($E^C = 20$) Δ = 30 |
|  | 1 + 90 | $E^A = 70$ ($E^C = 5$) Δ = 65 |

| Active compound(s) (Z61) | Application rate [g of a.i./ha] | Herbicidal action in [%] 14 DAT against *Poa annua* L. |
|---|---|---|
| A3 | 16 | 85 |
|  | 1 | 40 |
| (B2.18) Diflufenican | 270 | 20 |
|  | 90 | 20 |
| A3 + | 16 + 270 | $E^A = 97$ ($E^C = 88$) Δ = 9 |
| (B2.18) Diflufenican | 16 + 90 | $E^A = 97$ ($E^C = 88$) Δ = 9 |
|  | 1 + 270 | $E^A = 95$ ($E^C = 52$) Δ = 43 |
|  | 1 + 90 | $E^A = 95$ ($E^C = 52$) Δ = 43 |

| Active compound(s) (Z61) | Application rate [g of a.i./ha] | Herbicidal action in [%] 28 DAT against *Poa annua* L. |
|---|---|---|
| A3 | 16 | 40 |
|  | 1 | 15 |
| (B2.18) Diflufenican | 270 | 15 |
|  | 90 | 10 |
| A3 + | 16 + 270 | $E^A = 80$ ($E^C = 49$) Δ = 31 |
| (B2.18) Diflufenican | 16 + 90 | $E^A = 97$ ($E^C = 46$) Δ = 51 |
|  | 1 + 270 | $E^A = 80$ ($E^C = 28$) Δ = 52 |
|  | 1 + 90 | $E^A = 95$ ($E^C = 24$) Δ = 71 |

| Active compound(s) (Z61) | Application rate [g of a.i./ha] | Herbicidal action in [%] 14 DAT against *Veronica hederifolia* |
|---|---|---|
| A3 | 16 | 40 |
| (B2.18) Diflufenican | 270 | 85 |
| A3 + (B2.18) Diflufenican | 16 + 270 | 97 ($E^C = 91$) Δ = 6 |

| Active compound(s) (Z61) | Application rate [g of a.i./ha] | Herbicidal action in [%] 28 DAT against *Viola tricolor* |
|---|---|---|
| A3 | 16 | 20 |
|  | 1 | 15 |
| (B2.18) Diflufenican | 30 | 40 |
| A3 + | 16 + 30 | $E^A = 97$ ($E^C = 52$) Δ = 45 |
| (B2.18) Diflufenican | 1 + 30 | $E^A = 60$ ($E^C = 49$) Δ = 11 |

| Active compound(s) (Z119) | Application rate [g of a.i./ha] | Herbicidal action in [%] 14 DAT against *Alopecurus myosuroides* |
|---|---|---|
| A5 | 16 | 85 |
|  | 1 | 50 |
| (B2.18) Diflufenican | 270 | 10 |
| A5 + | 16 + 270 | $E^A = 95$ ($E^C = 87$) Δ = 8 |
| (B2.18) Diflufenican | 1 + 270 | $E^A = 70$ ($E^C = 55$) Δ = 15 |

| Active compound(s) (Z119) | Application rate [g of a.i./ha] | Herbicidal action in [%] 28 DAT against *Alopecurus myosuroides* |
|---|---|---|
| A5 | 16 | 90 |
|  | 1 | 30 |
| (B2.18) Diflufenican | 270 | 0 |
|  | 90 | 0 |
|  | 30 | 0 |
| A5 + | 16 + 270 | $E^A = 98$ ($E^C = 90$) Δ = 8 |
| (B2.18) Diflufenican | 16 + 90 | $E^A = 98$ ($E^C = 90$) Δ = 8 |
|  | 16 + 30 | $E^A = 95$ ($E^C = 90$) Δ = 5 |
|  | 1 + 270 | $E^A = 40$ ($E^C = 30$) Δ = 10 |
|  | 1 + 90 | $E^A = 40$ ($E^C = 30$) Δ = 10 |

| Active compound(s) (Z119) | Application rate [g of a.i./ha] | Herbicidal action in [%] 14 DAT against *Bromus sterilis* |
|---|---|---|
| A5 | 1 | 50 |
| (B2.18) Diflufenican | 270 | 5 |
|  | 90 | 5 |
| A5 + | 1 + 270 | $E^A = 70$ ($E^C = 53$) Δ = 17 |
| (B2.18) Diflufenican | 1 + 90 | $E^A = 60$ ($E^C = 53$) Δ = 7 |

| Active compound(s) (Z119) | Application rate [g of a.i./ha] | Herbicidal action in [%] 28 DAT against *Bromus sterilis* |
|---|---|---|
| A5 | 1 | 30 |
| (B2.18) Diflufenican | 270 | 0 |
| A5 + (B2.18) Diflufenican | 1 + 270 | $E^A = 50$ ($E^C = 30$) Δ = 20 |

| Active compound(s) (Z119) | Application rate [g of a.i./ha] | Herbicidal action in [%] 14 DAT against *Centaurea cyanus* |
|---|---|---|
| A5 | 16 | 85 |
|  | 4 | 60 |
| (B2.18) Diflufenican | 270 | 10 |
|  | 90 | 0 |
|  | 30 | 0 |
| A5 + | 16 + 270 | $E^A = 95$ ($E^C = 87$) Δ = 8 |
| (B2.18) Diflufenican | 16 + 90 | $E^A = 93$ ($E^C = 85$) Δ = 8 |
|  | 16 + 30 | $E^A = 93$ ($E^C = 85$) Δ = 8 |
|  | 4 + 90 | $E^A = 70$ ($E^C = 60$) Δ = 10 |

| Active compound(s) (Z119) | Application rate [g of a.i./ha] | Herbicidal action in [%] 28 DAT against *Centaurea cyanus* |
|---|---|---|
| A5 | 16 | 75 |
| (B2.18) Diflufenican | 270 | 5 |
|  | 90 | 0 |
|  | 30 | 0 |
| A5 + | 16 + 270 | $E^A = 95$ ($E^C = 76$) Δ = 19 |
| (B2.18) Diflufenican | 16 + 90 | $E^A = 80$ ($E^C = 75$) Δ = 5 |
|  | 16 + 30 | $E^A = 80$ ($E^C = 75$) Δ = 5 |

| Active compound(s) (Z119) | Application rate [g of a.i./ha] | Herbicidal action in [%] 14 DAT against *Galium aparine* |
|---|---|---|
| A5 | 1 | 60 |
| (B2.18) Diflufenican | 30 | 30 |
| A5 + (B2.18) Diflufenican | 1 + 30 | $E^A = 80$ ($E^C = 72$) Δ = 8 |

| Active compound(s) (Z119) | Application rate [g of a.i./ha] | Herbicidal action in [%] 28 DAT against *Galium aparine* |
|---|---|---|
| A5 | 16 | 70 |
|  | 4 | 60 |
| (B2.18) Diflufenican | 30 | 0 |
| A5 + | 16 + 30 | $E^A = 75$ ($E^C = 70$) Δ = 5 |
| (B2.18) Diflufenican | 4 + 30 | $E^A = 75$ ($E^C = 60$) Δ = 15 |

| Active compound(s) (Z119) | Application rate [g of a.i./ha] | Herbicidal action in [%] 14 DAT against *Lamium purpureum* L. |
|---|---|---|

TABLE 3.2-continued

Synergistic effect (Δ) for herbicidal binary compositions comprising herbicides from group B2, applied by the post-emergence method

| Active compound(s) | Application rate [g of a.i./ha] | |
|---|---|---|
| A5 | 16 | 80 |
| (B2.18) Diflufenican | 30 | 20 |
| A5 + (B2.18) Diflufenican | 16 + 30 | $E^A = 90$ ($E^C = 84$) $\Delta = 6$ |

| Active compound(s) (Z119) | Application rate [g of a.i./ha] | Herbicidal action in [%] 14 DAT against *Lolium rigidum* |
|---|---|---|
| A5 | 16 | 75 |
|  | 1 | 30 |
| (B2.18) Diflufenican | 90 | 5 |
|  | 270 | 5 |
| A5 + (B2.18) Diflufenican | 16 + 90 | $E^A = 85$ ($E^C = 76$) $\Delta = 9$ |
|  | 1 + 270 | $E^A = 60$ ($E^C = 34$) $\Delta = 26$ |

| Active compound(s) (Z119) | Application rate [g of a.i./ha] | Herbicidal action in [%] 28 DAT against *Lolium rigidum* |
|---|---|---|
| A5 | 16 | 60 |
|  | 4 | 50 |
|  | 1 | 30 |
| (B2.18) Diflufenican | 270 | 0 |
|  | 90 | 0 |
|  | 30 | 0 |
| A5 + (B2.18) Diflufenican | 16 + 270 | $E^A = 80$ ($E^C = 60$) $\Delta = 20$ |
|  | 16 + 90 | $E^A = 85$ ($E^C = 60$) $\Delta = 25$ |
|  | 16 + 30 | $E^A = 75$ ($E^C = 60$) $\Delta = 15$ |
|  | 4 + 270 | $E^A = 80$ ($E^C = 50$) $\Delta = 30$ |
|  | 4 + 90 | $E^A = 70$ ($E^C = 50$) $\Delta = 20$ |
|  | 4 + 30 | $E^A = 60$ ($E^C = 50$) $\Delta = 10$ |
|  | 1 + 270 | $E^A = 50$ ($E^C = 30$) $\Delta = 20$ |

| Active compound(s) (Z119) | Application rate [g of a.i./ha] | Herbicidal action in [%] 14 DAT against *Lolium rigidum* (resistant biotype) |
|---|---|---|
| A5 | 16 | 70 |
|  | 1 | 30 |
| (B2.18) Diflufenican | 90 | 5 |
|  | 30 | 0 |
|  | 270 | 5 |
| A5 + (B2.18) Diflufenican | 16 + 90 | $E^A = 85$ ($E^C = 72$) $\Delta = 13$ |
|  | 16 + 30 | $E^A = 75$ ($E^C = 70$) $\Delta = 5$ |
|  | 1 + 270 | $E^A = 40$ ($E^C = 34$) $\Delta = 6$ |

| Active compound(s) (Z119) | Application rate [g of a.i./ha] | Herbicidal action in [%] 28 DAT against *Lolium rigidum* (resistant biotype) |
|---|---|---|
| A5 | 1 | 20 |
| (B2.18) Diflufenican | 270 | 0 |
| A5 + (B2.18) Diflufenican | 1 + 270 | $E^A = 30$ ($E^C = 20$) $\Delta = 10$ |

| Active compound(s) (Z119) | Application rate [g of a.i./ha] | Herbicidal action in [%] 28 DAT against *Matricaria inodora* |
|---|---|---|
| A5 | 16 | 70 |
|  | 4 | 30 |
| (B2.18) Diflufenican | 270 | 50 |
|  | 90 | 50 |
| A5 + (B2.18) Diflufenican | 16 + 270 | $E^A = 95$ ($E^C = 85$) $\Delta = 10$ |
|  | 4 + 90 | $E^A = 70$ ($E^C = 65$) $\Delta = 5$ |

| Active compound(s) (Z119) | Application rate [g of a.i./ha] | Herbicidal action in [%] 14 DAT against *Phalaris minor* |
|---|---|---|
| A5 | 16 | 85 |
|  | 4 | 85 |
|  | 270 | 10 |

| (B2.18) Diflufenican | 90 | 5 |
|---|---|---|
|  | 270 | 10 |
| A5 + (B2.18) Diflufenican | 16 + 270 | $E^A = 93$ ($E^C = 87$) $\Delta = 6$ |
|  | 16 + 90 | $E^A = 93$ ($E^C = 86$) $\Delta = 7$ |
|  | 4 + 270 | $E^A = 93$ (E = 87) $\Delta = 6$ |

| Active compound(s) (Z119) | Application rate [g of a.i./ha] | Herbicidal action in [%] 28 DAT against *Phalaris minor* |
|---|---|---|
| A5 | 16 | 70 |
|  | 4 | 60 |
| (B2.18) Diflufenican | 270 | 5 |
|  | 90 | 0 |
|  | 30 | 0 |
| A5 + (B2.18) Diflufenican | 16 + 270 | $E^A = 80$ ($E^C = 72$) $\Delta = 8$ |
|  | 16 + 90 | $E^A = 98$ ($E^C = 70$) $\Delta = 28$ |
|  | 16 + 30 | $E^A = 85$ ($E^C = 70$) $\Delta = 15$ |
|  | 4 + 270 | $E^A = 85$ ($E^C = 62$) $\Delta = 23$ |
|  | 4 + 30 | $E^A = 70$ ($E^C = 60$) $\Delta = 10$ |

| Active compound(s) (Z119) | Application rate [g of a.i./ha] | Herbicidal action in [%] 14 DAT against *Poa annua* L. |
|---|---|---|
| A5 | 16 | 70 |
|  | 1 | 30 |
| (B2.18) Diflufenican | 270 | 10 |
|  | 90 | 5 |
|  | 30 | 0 |
| A5 + (B2.18) Diflufenican | 16 + 270 | $E^A = 85$ ($E^C = 73$) $\Delta = 12$ |
|  | 16 + 90 | $E^A = 90$ ($E^C = 72$) $\Delta = 18$ |
|  | 16 + 30 | $E^A = 90$ ($E^C = 70$) $\Delta = 20$ |
|  | 1 + 270 | $E^A = 50$ ($E^C = 37$) $\Delta = 13$ |
|  | 1 + 90 | $E^A = 50$ ($E^C = 34$) $\Delta = 16$ |
|  | 1 + 30 | $E^A = 50$ ($E^C = 30$) $\Delta = 20$ |

| Active compound(s) (Z119) | Application rate [g of a.i./ha] | Herbicidal action in [%] 28 DAT against *Poa annua* L. |
|---|---|---|
| A5 | 16 | 40 |
|  | 1 | 20 |
| (B2.18) Diflufenican | 270 | 0 |
|  | 90 | 0 |
|  | 30 | 0 |
| A5 + (B2.18) Diflufenican | 16 + 270 | $E^A = 65$ ($E^C = 40$) $\Delta = 25$ |
|  | 16 + 90 | $E^A = 85$ ($E^C = 40$) $\Delta = 45$ |
|  | 16 + 30 | $E^A = 80$ ($E^C = 40$) $\Delta = 40$ |
|  | 1 + 270 | $E^A = 50$ ($E^C = 20$) $\Delta = 30$ |

| Active compound(s) (Z119) | Application rate [g of a.i./ha] | Herbicidal action in [%] 14 DAT against *Viola tricolor* |
|---|---|---|
| A5 | 16 | 60 |
| (B2.18) Diflufenican | 270 | 40 |
| A5 + (B2.18) Diflufenican | 16 + 270 | $E^A = 85$ ($E^C = 76$) $\Delta = 9$ |

| Active compound(s) (Z148) | Application rate [g of a.i./ha] | Herbicidal action in [%] 14 DAT against *Bromus sterilis* |
|---|---|---|
| A6 | 4 | 80 |
|  | 1 | 75 |
| (B2.18) Diflufenican | 270 | 5 |
|  | 90 | 5 |
|  | 30 | 0 |
| A6 + (B2.18) Diflufenican | 4 + 270 | $E^A = 90$ ($E^B = 81$) $\Delta = 9$ |
|  | 4 + 90 | $E^A = 90$ ($E^B = 81$) $\Delta = 9$ |
|  | 4 + 30 | $E^A = 85$ ($E^B = 80$) $\Delta = 5$ |
|  | 1 + 30 | $E^A = 80$ ($E^B = 75$) $\Delta = 5$ |

| Active compound(s) (Z148) | Application rate [g of a.i./ha] | Herbicidal action in [%] 28 DAT against *Bromus sterilis* |
|---|---|---|

TABLE 3.2-continued

Synergistic effect (Δ) for herbicidal binary compositions comprising herbicides from group B2, applied by the post-emergence method

| Active compound(s) (Z148) | Application rate [g of a.i./ha] | Herbicidal action |
|---|---|---|
| A6 | 1 | 50 |
|  | 270 | 0 |
| (B2.18) Diflufenican | 90 | 0 |
|  | 30 | 0 |
| A6 + | 1 + 270 | $E^A = 70$ ($E^B = 50$) Δ = 20 |
| (B2.18) Diflufenican | 1 + 90 | $E^A = 90$ ($E^B = 50$) Δ = 40 |
|  | 1 + 30 | $E^A = 60$ ($E^B = 50$) Δ = 10 |

| Active compound(s) (Z148) | Application rate [g of a.i./ha] | Herbicidal action in [%] 14 DAT against *Centaurea cyanus* |
|---|---|---|
| A6 | 4 | 85 |
|  | 1 | 40 |
| (B2.18) Diflufenican | 90 | 0 |
|  | 30 | 0 |
|  | 270 | 10 |
| A6 + | 4 + 90 | $E^A = 90$ ($E^B = 85$) Δ = 5 |
| (B2.18) Diflufenican | 4 + 30 | $E^A = 90$ ($E^B = 85$) Δ = 5 |
|  | 1 + 270 | $E^A = 85$ ($E^B = 46$) Δ = 39 |
|  | 1 + 30 | $E^A = 70$ ($E^B = 40$) Δ = 30 |

| Active compound(s) (Z148) | Application rate [g of a.i./ha] | Herbicidal action in [%] 28 DAT against *Centaurea cyanus* |
|---|---|---|
| A6 | 4 | 70 |
|  | 1 | 40 |
| (B2.18) Diflufenican | 90 | 0 |
|  | 30 | 0 |
|  | 270 | 5 |
| A6 + | 4 + 90 | $E^A = 80$ ($E^B = 70$) Δ = 10 |
| (B2.18) Diflufenican | 4 + 30 | $E^A = 90$ ($E^B = 70$) Δ = 20 |
|  | 1 + 270 | $E^A = 70$ ($E^B = 43$) Δ = 27 |

| Active compound(s) (Z148) | Application rate [g of a.i./ha] | Herbicidal action in [%] 28 DAT against *Galium aparine* |
|---|---|---|
| A6 | 1 | 60 |
| (B2.18) Diflufenican | 90 | 20 |
|  | 30 | 0 |
| A6 + | 1 + 90 | $E^A = 75$ ($E^B = 68$) Δ = 7 |
| (B2.18) Diflufenican | 1 + 30 | $E^A = 70$ ($E^B = 60$) Δ = 10 |

| Active compound(s) (Z148) | Application rate [g of a.i./ha] | Herbicidal action in [%] 14 DAT against *Lamium purpureum* L. |
|---|---|---|
| A6 | 4 | 85 |
| (B2.18) Diflufenican | 30 | 20 |
| A6 + (B2.18) Diflufenican | 4 + 30 | $E^A = 93$ ($E^B = 88$) Δ = 5 |

| Active compound(s) (Z148) | Application rate [g of a.i./ha] | Herbicidal action in [%] 28 DAT against *Lamium purpureum* L. |
|---|---|---|
| A6 | 1 | 75 |
| (B2.18) Diflufenican | 90 | 20 |
|  | 30 | 10 |
| A6 + | 1 + 90 | $E^A = 85$ ($E^B = 80$) Δ = 5 |
| (B2.18) Diflufenican | 1 + 30 | $E^A = 85$ ($E^B = 78$) Δ = 7 |

| Active compound(s) (Z148) | Application rate [g of a.i./ha] | Herbicidal action in [%] 28 DAT against *Lolium rigidum* |
|---|---|---|
| A6 | 16 | 90 |
| (B2.18) Diflufenican | 270 | 0 |
|  | 90 | 0 |
| A6 + | 16 + 270 | $E^A = 95$ ($E^B = 90$) Δ = 5 |
| (B2.18) Diflufenican | 16 + 90 | $E^A = 95$ ($E^B = 90$) Δ = 5 |

| Active compound(s) (Z148) | Application rate [g of a.i./ha] | Herbicidal action in [%] 28 DAT against *Lolium rigidum* (resistant biotype) |
|---|---|---|
| A6 | 16 | 70 |
| (B2.18) Diflufenican | 270 | 0 |
|  | 90 | 0 |
|  | 30 | 0 |
| A6 + | 16 + 270 | $E^A = 75$ ($E^B = 70$) Δ = 5 |
| (B2.18) Diflufenican | 16 + 90 | $E^A = 85$ ($E^B = 70$) Δ = 15 |
|  | 16 + 30 | $E^A = 80$ ($E^B = 70$) Δ = 10 |

| Active compound(s) (Z148) | Application rate [g of a.i./ha] | Herbicidal action in [%] 14 DAT against *Matricaria inodora* |
|---|---|---|
| A6 | 16 | 70 |
| (B2.18) Diflufenican | 90 | 50 |
| A6 + (B2.18) Diflufenican | 16 + 90 | $E^A = 90$ ($E^B = 85$) Δ = 5 |

| Active compound(s) (Z148) | Application rate [g of a.i./ha] | Herbicidal action in [%] 28 DAT against *Phalaris minor* |
|---|---|---|
| A6 | 16 | 90 |
| (B2.18) Diflufenican | 270 | 5 |
|  | 90 | 0 |
|  | 30 | 0 |
| A6 + | 16 + 270 | $E^A = 98$ ($E^B = 91$) Δ = 7 |
| (B2.18) Diflufenican | 16 + 90 | $E^A = 98$ ($E^B = 90$) Δ = 8 |
|  | 16 + 30 | $E^A = 98$ ($E^B = 90$) Δ = 8 |

| Active compound(s) (Z148) | Application rate [g of a.i./ha] | Herbicidal action in [%] 28 DAT against *Poa annua* L. |
|---|---|---|
| A6 | 16 | 70 |
| (B2.18) Diflufenican | 270 | 0 |
|  | 90 | 0 |
|  | 30 | 0 |
| A6 + | 16 + 270 | $E^A = 80$ ($E^B = 70$) Δ = 10 |
| (B2.18) Diflufenican | 16 + 90 | $E^A = 93$ ($E^B = 70$) Δ = 23 |
|  | 16 + 30 | $E^A = 93$ ($E^B = 70$) Δ = 23 |

| Active compound(s) (Z63) | Application rate [g of a.i./ha] | Herbicidal action in [%] 14 DAT against *Alopecurus myosuroides* |
|---|---|---|
| A3 | 1 | 15 |
| (B2.28) Flufenacet | 100 | 70 |
| A3 + (B2.28) Flufenacet | 1 + 100 | $E^A = 80$ ($E^C = 75$) Δ = 5 |

| Active compound(s) (Z63) | Application rate [g of a.i./ha] | Herbicidal action in [%] 28 DAT against *Alopecurus myosuroides* |
|---|---|---|
| A3 | 4 | 50 |
|  | 1 | 15 |
| (B2.28) Flufenacet | 300 | 75 |
| A3 + | 4 + 300 | $E^A = 100$ ($E^C = 88$) Δ = 12 |
| (B2.28) Flufenacet | 1 + 300 | $E^A = 98$ ($E^C = 79$) Δ = 19 |

| Active compound(s) (Z63) | Application rate [g of a.i./ha] | Herbicidal action in [%] 14 DAT against *Bromus sterilis* |
|---|---|---|
| A3 | 1 | 15 |
| (B2.28) Flufenacet | 100 | 75 |
|  | 33 | 35 |
| A3 + | 1 + 100 | $E^A = 85$ ($E^C = 79$) Δ = 6 |
| (B2.28) Flufenacet | 1 + 33 | $E^A = 60$ ($E^C = 45$) Δ = 15 |

TABLE 3.2-continued

Synergistic effect (Δ) for herbicidal binary compositions comprising herbicides from group B2, applied by the post-emergence method

| Active compound(s) (Z63) | Application rate [g of a.i./ha] | Herbicidal action in [%] 28 DAT against *Bromus sterilis* |
|---|---|---|
| A3 | 1 | 15 |
| (B2.28) Flufenacet | 300 | 65 |
|  | 100 | 25 |
| A3 + (B2.28) Flufenacet | 1 + 300 | $E^A = 97$ ($E^C = 70$) Δ = 27 |
|  | 1 + 100 | $E^A = 95$ ($E^C = 36$) Δ = 59 |

| Active compound(s) (Z63) | Application rate [g of a.i./ha] | Herbicidal action in [%] 14 DAT against *Centaurea cyanus* |
|---|---|---|
| A3 | 4 | 50 |
|  | 1 | 20 |
| (B2.28) Flufenacet | 300 | 30 |
| A3 + (B2.28) Flufenacet | 4 + 300 | $E^A = 75$ ($E^C = 65$) Δ = 10 |
|  | 1 + 300 | $E^A = 70$ ($E^C = 44$) Δ = 26 |

| Active compound(s) (Z63) | Application rate [g of a.i./ha] | Herbicidal action in [%] 28 DAT against *Centaurea cyanus* |
|---|---|---|
| A3 | 1 | 0 |
| (B2.28) Flufenacet | 100 | 20 |
| A3 + (B2.28) Flufenacet | 1 + 100 | $E^A = 25$ ($E^C = 20$) Δ = 5 |

| Active compound(s) (Z63) | Application rate [g of a.i./ha] | Herbicidal action in [%] 28 DAT against *Galium aparine* |
|---|---|---|
| A3 | 16 | 75 |
|  | 1 | 15 |
| (B2.28) Flufenacet | 33 | 60 |
|  | 100 | 65 |
| A3 + (B2.28) Flufenacet | 16 + 33 | $E^A = 97$ ($E^C = 90$) Δ = 7 |
|  | 1 + 100 | $E^A = 90$ ($E^C = 70$) Δ = 20 |
|  | 1 + 33 | $E^A = 75$ ($E^C = 66$) Δ = 9 |

| Active compound(s) (Z63) | Application rate [g of a.i./ha] | Herbicidal action in [%] 14 DAT against *Lamium purpureum* L. |
|---|---|---|
| A3 | 1 | 65 |
| (B2.28) Flufenacet | 100 | 40 |
| A3 + (B2.28) Flufenacet | 1 + 100 | $E^A = 95$ ($E^C = 79$) Δ = 16 |

| Active compound(s) (Z63) | Application rate [g of a.i./ha] | Herbicidal action in [%] 28 DAT against *Lamium purpureum* L. |
|---|---|---|
| A3 | 1 | 25 |
| (B2.28) Flufenacet | 100 | 20 |
| A3 + (B2.28) Flufenacet | 1 + 100 | $E^A = 50$ ($E^C = 40$) Δ = 10 |

| Active compound(s) (Z63) | Application rate [g of a.i./ha] | Herbicidal action in [%] 14 DAT against *Lolium rigidum* |
|---|---|---|
| A3 | 1 | 35 |
| (B2.28) Flufenacet | 300 | 40 |
|  | 100 | 35 |
|  | 33 | 0 |
| A3 + (B2.28) Flufenacet | 1 + 300 | $E^A = 95$ ($E^C = 61$) Δ = 34 |
|  | 1 + 100 | $E^A = 95$ ($E^C = 58$) Δ = 37 |
|  | 1 + 33 | $E^A = 50$ ($E^C = 35$) Δ = 15 |

| Active compound(s) (Z63) | Application rate [g of a.i./ha] | Herbicidal action in [%] 28 DAT against *Lolium rigidum* |
|---|---|---|
| A3 | 4 | 50 |
|  | 1 | 15 |
| (B2.28) Flufenacet | 300 | 25 |
|  | 100 | 20 |
| A3 + (B2.28) Flufenacet | 4 + 300 | $E^A = 90$ ($E^C = 63$) Δ = 27 |
|  | 4 + 100 | $E^A = 80$ ($E^C = 60$) Δ = 20 |
|  | 1 + 300 | $E^A = 95$ ($E^C = 36$) Δ = 59 |
|  | 1 + 100 | $E^A = 93$ ($E^C = 32$) Δ = 61 |

| Active compound(s) (Z63) | Application rate [g of a.i./ha] | Herbicidal action in [%] 14 DAT against *Lolium rigidum* (resistant biotype) |
|---|---|---|
| A3 | 4 | 40 |
|  | 1 | 15 |
| (B2.28) Flufenacet | 300 | 10 |
|  | 100 | 20 |
| A3 + (B2.28) Flufenacet | 4 + 300 | $E^A = 70$ ($E^C = 46$) Δ = 24 |
|  | 4 + 100 | $E^A = 70$ ($E^C = 52$) Δ = 18 |
|  | 1 + 300 | $E^A = 90$ ($E^C = 24$) Δ = 66 |
|  | 1 + 100 | $E^A = 50$ ($E^C = 32$) Δ = 18 |

| Active compound(s) (Z63) | Application rate [g of a.i./ha] | Herbicidal action in [%] 28 DAT against *Lolium rigidum* (resistant biotype) |
|---|---|---|
| A3 | 4 | 10 |
|  | 1 | 0 |
| (B2.28) Flufenacet | 300 | 20 |
|  | 100 | 10 |
| A3 + (B2.28) Flufenacet | 4 + 300 | $E^A = 40$ ($E^C = 28$) Δ = 12 |
|  | 4 + 100 | $E^A = 25$ ($E^C = 19$) Δ = 6 |
|  | 1 + 300 | $E^A = 70$ ($E^C = 20$) Δ = 50 |
|  | 1 + 100 | $E^A = 15$ ($E^C = 10$) Δ = 5 |

| Active compound(s) (Z63) | Application rate [g of a.i./ha] | Herbicidal action in [%] 14 DAT against *Matricaria inodora* |
|---|---|---|
| A3 | 16 | 20 |
| (B2.28) Flufenacet | 33 | 0 |
| A3 + (B2.28) Flufenacet | 16 + 33 | $E^A = 30$ ($E^C = 20$) Δ = 10 |

| Active compound(s) (Z63) | Application rate [g of a.i./ha] | Herbicidal action in [%] 28 DAT against *Phalaris minor* |
|---|---|---|
| A3 | 16 | 40 |
|  | 1 | 0 |
| (B2.28) Flufenacet | 300 | 85 |
|  | 100 | 40 |
|  | 33 | 0 |
| A3 + (B2.28) Flufenacet | 16 + 300 | $E^A = 98$ ($E^C = 91$) Δ = 7 |
|  | 16 + 100 | $E^A = 90$ ($E^C = 64$) Δ = 26 |
|  | 16 + 33 | $E^A = 80$ ($E^C = 40$) Δ = 40 |
|  | 1 + 300 | $E^A = 100$ ($E^C = 85$) Δ = 15 |
|  | 1 + 100 | $E^A = 80$ ($E^C = 40$) Δ = 40 |

| Active compound(s) (Z63) | Application rate [g of a.i./ha] | Herbicidal action in [%] 28 DAT against *Poa annua* L. |
|---|---|---|
| A3 | 16 | 40 |
|  | 1 | 15 |
| (B2.28) Flufenacet | 300 | 65 |
|  | 100 | 70 |
|  | 33 | 10 |
| A3 + (B2.28) Flufenacet | 16 + 300 | $E^A = 97$ ($E^C = 79$) Δ = 18 |
|  | 16 + 100 | $E^A = 97$ ($E^C = 82$) Δ = 15 |
|  | 16 + 33 | $E^A = 60$ ($E^C = 46$) Δ = 14 |
|  | 1 + 100 | $E^A = 97$ ($E^C = 75$) Δ = 22 |

| Active compound(s) (Z63) | Application rate [g of a.i./ha] | Herbicidal action in [%] 14 DAT against *Veronica hederifolia* |
|---|---|---|

TABLE 3.2-continued

Synergistic effect (Δ) for herbicidal binary compositions comprising herbicides from group B2, applied by the post-emergence method

| Active compound(s) | Application rate [g of a.i./ha] | |
|---|---|---|
| A3 | 16 | 40 |
| (B2.28) Flufenacet | 100 | 40 |
|  | 33 | 35 |
| A3 + | 16 + 100 | $E^A = 80$ ($E^C = 64$) Δ = 16 |
| (B2.28) Flufenacet | 16 + 33 | $E^A = 80$ ($E^C = 61$) Δ = 19 |

| Active compound(s) (Z63) | Application rate [g of a.i./ha] | Herbicidal action in [%] 14 DAT against *Viola tricolor* |
|---|---|---|
| A3 | 16 | 85 |
|  | 1 | 50 |
| (B2.28) Flufenacet | 33 | 20 |
|  | 100 | 50 |
| A3 + | 16 + 33 | $E^A = 95$ ($E^C = 88$) Δ = 7 |
| (B2.28) Flufenacet | 1 + 100 | $E^A = 90$ ($E^C = 75$) Δ = 15 |

| Active compound(s) (Z63) | Application rate [g of a.i./ha] | Herbicidal action in [%] 28 DAT against *Viola tricolor* |
|---|---|---|
| A3 | 16 | 20 |
|  | 4 | 30 |
|  | 1 | 15 |
| (B2.28) Flufenacet | 300 | 35 |
|  | 100 | 20 |
|  | 33 | 20 |
| A3 + | 16 + 300 | $E^A = 65$ ($E^C = 48$) Δ = 17 |
| (B2.28) Flufenacet | 16 + 100 | $E^A = 70$ ($E^C = 36$) Δ = 34 |
|  | 16 + 33 | $E^A = 97$ ($E^C = 36$) Δ = 61 |
|  | 4 + 300 | $E^A = 65$ ($E^C = 55$) Δ = 10 |
|  | 4 + 100 | $E^A = 65$ ($E^C = 44$) Δ = 21 |
|  | 1 + 300 | $E^A = 50$ ($E^C = 45$) Δ = 5 |
|  | 1 + 100 | $E^A = 40$ ($E^C = 32$) Δ = 8 |

| Active compound(s) | Application rate [g of a.i./ha] | Herbicidal action in [%] 14 DAT against *Alopecurus myosuroides* |
|---|---|---|
| A3 | 1 | 15 |
| (B2.31) Foramsulfuron | 1 | 80 |
| A3 + (B2.31) Foramsulfuron | 1 + 1 | $E^A = 95$ ($E^C = 83$) Δ = 12 |

| Active compound(s) | Application rate [g of a.i./ha] | Herbicidal action in [%] 28 DAT against *Alopecurus myosuroides* |
|---|---|---|
| A3 | 4 | 50 |
|  | 1 | 15 |
| (B2.31) Foramsulfuron | 9 | 85 |
|  | 3 | 80 |
|  | 1 | 40 |
| A3 + | 4 + 9 | $E^A = 98$ ($E^C = 92.5$) Δ = 5.5 |
| (B2.31) Foramsulfuron | 4 + 3 | $E^A = 97$ ($E^C = 90$) Δ = 7 |
|  | 4 + 1 | $E^A = 80$ ($E^C = 70$) Δ = 10 |
|  | 1 + 1 | $E^A = 70$ ($E^C = 49$) Δ = 21 |

| Active compound(s) | Application rate [g of a.i./ha] | Herbicidal action in [%] 14 DAT against *Bromus sterilis* |
|---|---|---|
| A3 | 1 | 15 |
| (B2.31) Foramsulfuron | 9 | 85 |
|  | 3 | 85 |
|  | 1 | 65 |
| A3 + | 1 + 9 | $E^A = 95$ ($E^C = 87$) Δ = 8 |
| (B2.31) Foramsulfuron | 1 + 3 | $E^A = 95$ ($E^C = 87$) Δ = 8 |
|  | 1 + 1 | $E^A = 75$ ($E^C = 70$) Δ = 5 |

| Active compound(s) | Application rate [g of a.i./ha] | Herbicidal action in [%] 28 DAT against *Bromus sterilis* |
|---|---|---|
| A3 | 1 | 15 |
| (B2.31) Foramsulfuron | 9 | 60 |
|  | 3 | 25 |
| A3 + | 1 + 9 | $E^A = 95$ ($E^C = 66$) Δ = 29 |
| (B2.31) Foramsulfuron | 1 + 3 | $E^A = 60$ ($E^C = 36$) Δ = 24 |

| Active compound(s) | Application rate [g of a.i./ha] | Herbicidal action in [%] 28 DAT against *Galium aparine* |
|---|---|---|
| A3 | 1 | 15 |
| (B2.31) Foramsulfuron | 9 | 65 |
|  | 1 | 0 |
| A3 + | 1 + 9 | $E^A = 80$ ($E^C = 70$) Δ = 10 |
| (B2.31) Foramsulfuron | 1 + 1 | $E^A = 50$ ($E^C = 15$) Δ = 35 |

| Active compound(s) | Application rate [g of a.i./ha] | Herbicidal action in [%] 28 DAT against *Lolium rigidum* |
|---|---|---|
| A3 | 1 | 15 |
| (B2.31) Foramsulfuron | 9 | 65 |
|  | 3 | 35 |
| A3 + | 1 + 9 | $E^A = 95$ ($E^C = 70$) Δ = 25 |
| (B2.31) Foramsulfuron | 1 + 3 | $E^A = 60$ ($E^C = 45$) Δ = 15 |

| Active compound(s) | Application rate [g of a.i./ha] | Herbicidal action in [%] 14 DAT against *Lolium rigidum* (resistant biotype) |
|---|---|---|
| A3 | 4 | 40 |
|  | 1 | 15 |
| (B2.31) Foramsulfuron | 9 | 15 |
|  | 3 | 15 |
| A3 + | 4 + 9 | $E^A = 70$ ($E^C = 49$) Δ = 21 |
| (B2.31) Foramsulfuron | 1 + 9 | $E^A = 70$ ($E^C = 28$) Δ = 42 |
|  | 1 + 3 | $E^A = 40$ ($E^C = 2$) Δ = 12 |

| Active compound(s) | Application rate [g of a.i./ha] | Herbicidal action in [%] 28 DAT against *Lolium rigidum* (resistant biotype) |
|---|---|---|
| A3 | 1 | 0 |
| (B2.31) Foramsulfuron | 9 | 20 |
|  | 3 | 10 |
| A3 + | 1 + 9 | $E^A = 40$ ($E^C = 20$) Δ = 20 |
| (B2.31) Foramsulfuron | 1 + 3 | $E^A = 15$ ($E^C = 10$) Δ = 5 |

| Active compound(s) | Application rate [g of a.i./ha] | Herbicidal action in [%] 14 DAT against *Matricaria inodora* |
|---|---|---|
| A3 | 16 | 20 |
| (B2.31) Foramsulfuron | 1 | 70 |
| A3 + (B2.31) Foramsulfuron | 16 + 1 | $E^A = 85$ ($E^C = 76$) Δ = 9 |

| Active compound(s) | Application rate [g of a.i./ha] | Herbicidal action in [%] 28 DAT against *Matricaria inodora* |
|---|---|---|
| A3 | 16 | 15 |
| (B2.31) Foramsulfuron | 1 | 30 |
| A3 + (B2.31) Foramsulfuron | 16 + 1 | $E^A = 50$ ($E^C = 40.5$) Δ = 9.5 |

| Active compound(s) | Application rate [g of a.i./ha] | Herbicidal action in [%] 14 DAT against *Phalaris minor* |
|---|---|---|
| A3 | 1 | 10 |
| (B2.31) Foramsulfuron | 9 | 80 |
|  | 3 | 85 |

TABLE 3.2-continued

Synergistic effect (Δ) for herbicidal binary compositions comprising herbicides from group B2, applied by the post-emergence method

| Active compound(s) | Application rate [g of a.i./ha] | |
|---|---|---|
| A3 + | 1 + 9 | $E^A = 93$ ($E^C = 82$) $\Delta = 11$ |
| (B2.31) Foramsulfuron | 1 + 3 | $E^A = 93$ ($E^C = 87$) $\Delta = 6$ |

| Active compound(s) | Application rate [g of a.i./ha] | Herbicidal action in [%] 28 DAT against *Phalaris minor* |
|---|---|---|
| A3 | 16 | 40 |
|  | 4 | 70 |
|  | 1 | 0 |
| (B2.31) Foramsulfuron | 9 | 20 |
|  | 3 | 40 |
| A3 + | 16 + 9 | $E^A = 95$ ($E^C = 52$) $\Delta = 43$ |
| (B2.31) Foramsulfuron | 16 + 3 | $E^A = 80$ ($E^C = 64$) $\Delta = 16$ |
|  | 4 + 3 | $E^A = 90$ ($E^C = 82$) $\Delta = 8$ |
|  | 1 + 9 | $E^A = 70$ ($E^C = 20$) $\Delta = 50$ |
|  | 1 + 3 | $E^A = 70$ ($E^C = 40$) $\Delta = 30$ |

| Active compound(s) | Application rate [g of a.i./ha] | Herbicidal action in [%] 28 DAT against *Poa annua* L. |
|---|---|---|
| A3 | 16 | 40 |
| (B2.31) Foramsulfuron | 1 | 40 |
| A3 + (B2.31) Foramsulfuron | 16 + 1 | $E^A = 93$ ($E^C = 64$) $\Delta = 29$ |

| Active compound(s) | Application rate [g of a.i./ha] | Herbicidal action in [%] 14 DAT against *Veronica hederifolia* |
|---|---|---|
| A3 | 16 | 40 |
| (B2.31) Foramsulfuron | 1 | 80 |
| A3 + (B2.31) Foramsulfuron | 16 + 1 | $E^A = 95$ ($E^C = 88$) $\Delta = 7$ |

| Active compound(s) | Application rate [g of a.i./ha] | Herbicidal action in [%] 28 DAT against *Viola tricolor* |
|---|---|---|
| A3 | 16 | 20 |
| (B2.31) Foramsulfuron | 3 | 80 |
|  | 1 | 65 |
| A3 + | 16 + 3 | $E^A = 100$ ($E^C = 84$) $\Delta = 16$ |
| (B2.31) Foramsulfuron | 16 + 1 | $E^A = 90$ ($E^C = 72$) $\Delta = 18$ |

| Active compound(s) (Z64) | Application rate [g of a.i./ha] | Herbicidal action in [%] 28 DAT against *Alopecurus myosuroides* |
|---|---|---|
| A3 | 4 | 60 |
| (B2.37) Mesosulfuron (CAS 208465-21-8) | 1.7 | 75 |
| A3 + (B2.37) Mesosulfuron (CAS 208465-21-8) | 4 + 1.7 | $E^A = 95$ ($E^C = 90$) $\Delta = 5$ |

| Active compound(s) (Z64) | Application rate [g of a.i./ha] | Herbicidal action in [%] 28 DAT against *Centaurea cyanus* |
|---|---|---|
| A3 | 1 | 10 |
| (B2.37) Mesosulfuron (CAS 208465-21-8) | 5 | 60 |
| A3 + (B2.37) Mesosulfuron (CAS 208465-21-8) | 1 + 5 | $E^A = 70$ ($E^C = 64$) $\Delta = 6$ |

| Active compound(s) (Z64) | Application rate [g of a.i./ha] | Herbicidal action in [%] 14 DAT against *Lolium rigidum* (resistant biotype) |
|---|---|---|
| A3 | 4 | 60 |
|  | 1 | 30 |
| (B2.37) Mesosulfuron | 15 | 30 |

TABLE 3.2-continued

Synergistic effect (Δ) for herbicidal binary compositions comprising herbicides from group B2, applied by the post-emergence method

| | | |
|---|---|---|
| (CAS 208465-21-8) | 5 | 30 |
|  | 1.7 | 20 |
| A3 + | 4 + 15 | $E^A = 85$ ($E^C = 72$) $\Delta = 13$ |
| (B2.37) Mesosulfuron | 4 + 5 | $E^A = 90$ ($E^C = 72$) $\Delta = 18$ |
| (CAS 208465-21-8) | 4 + 1.7 | $E^A = 85$ ($E^C = 68$) $\Delta = 17$ |
|  | 1 + 15 | $E^A = 75$ ($E^C = 51$) $\Delta = 24$ |
|  | 1 + 5 | $E^A = 75$ ($E^C = 51$) $\Delta = 24$ |

| Active compound(s) (Z64) | Application rate [g of a.i./ha] | Herbicidal action in [%] 28 DAT against *Lolium rigidum* (resistant biotype) |
|---|---|---|
| A3 | 16 | 80 |
|  | 4 | 40 |
|  | 1 | 0 |
| (B2.37) Mesosulfuron (CAS 208465-21-8) | 5 | 0 |
|  | 1.7 | 0 |
|  | 15 | 20 |
| A3 + | 16 + 5 | $E^A = 85$ ($E^C = 80$) $\Delta = 5$ |
| (B2.37) Mesosulfuron | 16 + 1.7 | $E^A = 85$ ($E^C = 80$) $\Delta = 5$ |
| (CAS 208465-21-8) | 4 + 15 | $E^A = 75$ ($E^C = 52$) $\Delta = 23$ |
|  | 4 + 5 | $E^A = 85$ ($E^C = 40$) $\Delta = 45$ |
|  | 4 + 1.7 | $E^A = 70$ ($E^C = 40$) $\Delta = 30$ |
|  | 1 + 15 | $E^A = 40$ ($E^C = 20$) $\Delta = 20$ |
|  | 1 + 5 | $E^A = 40$ ($E^C = 0$) $\Delta = 40$ |
|  | 1 + 1.7 | $E^A = 30$ ($E^C = 0$) $\Delta = 30$ |

| Active compound(s) (Z64) | Application rate [g of a.i./ha] | Herbicidal action in [%] 14 DAT against *Matricaria inodora* |
|---|---|---|
| A3 | 4 | 30 |
|  | 1 | 0 |
| (B2.37) Mesosulfuron (CAS 208465-21-8) | 15 | 75 |
| A3 + | 4 + 15 | $E^A = 95$ ($E^C = 83$) $\Delta = 12$ |
| (B2.37) Mesosulfuron (CAS 208465-21-8) | 1 + 15 | $E^A = 85$ ($E^C = 75$) $\Delta = 10$ |

| Active compound(s) (Z64) | Application rate [g of a.i./ha] | Herbicidal action in [%] 28 DAT against *Matricaria inodora* |
|---|---|---|
| A3 | 4 | 30 |
|  | 1 | 0 |
| (B2.37) Mesosulfuron (CAS 208465-21-8) | 15 | 65 |
| A3 + | 4 + 15 | $E^A = 98$ ($E^C = 76$) $\Delta = 22$ |
| (B2.37) Mesosulfuron (CAS 208465-21-8) | 1 + 15 | $E^A = 80$ ($E^C = 65$) $\Delta = 15$ |

| Active compound(s) (Z64) | Application rate [g of a.i./ha] | Herbicidal action in [%] 28 DAT against *Phalaris minor* |
|---|---|---|
| A3 | 1 | 10 |
| (B2.37) Mesosulfuron (CAS 208465-21-8) | 15 | 85 |
| A3 + (B2.37) Mesosulfuron (CAS 208465-21-8) | 1 + 15 | $E^A = 98$ ($E^C = 87$) $\Delta = 11$ |

| Active compound(s) (Z66) | Application rate [g of a.i./ha] | Herbicidal action 37 DAT [%] against *Ipomoea hederacea* |
|---|---|---|
| (B2.63) Rimsulfuron | 35 | 0 |
| A3 | 100 | 8 |
| A3 + (B2.63) Rimsulfuron | 100 + 35 | $E^A = 65$ ($E^C = 8$) $\Delta$ 57 |

| Active compound(s) | Application rate [g of a.i./ha] | Herbicidal action 21 DAT [%] against *Brachiaria platyphylla* |
|---|---|---|
| (B2.64) S-Metolachlor | 450 | 25 |
|  | 150 | 10 |

TABLE 3.2-continued

Synergistic effect (Δ) for herbicidal binary compositions comprising herbicides from group B2, applied by the post-emergence method

| Active compound(s) | Application rate [g of a.i./ha] | |
|---|---|---|
| A3 | 1.7 | 20 |
| A3 + | 1.7 + 450 | $E^A = 70$ ($E^C = 40$) Δ 30 |
| (B2.64) S-Metolachlor | 1.7 + 150 | $E^A = 60$ ($E^C = 38$) Δ 32 |

| Active compound(s) | Application rate [g of a.i./ha] | Herbicidal action 21 DAT [%] against *Digitaria sanguinalis* |
|---|---|---|
| (B2.64) S-Metolachlor | 150 | 40 |
|  | 50 | 10 |
| A3 | 5 | 80 |
|  | 1.7 | 10 |
| A3 + | 1.7 + 150 | $E^A = 60$ ($E^C = 46$) Δ 14 |
| (B2.64) S-Metolachlor | 5 + 50 | $E^A = 95$ ($E^C = 82$) Δ 13 |

| Active compound(s) | Application rate [g of a.i./ha] | Herbicidal action 21 DAT [%] against *Setaria viridis* |
|---|---|---|
| (B2.64) S-Metolachlor | 50 | 30 |
| A3 | 1.7 | 70 |
| A3 + (B2.64) S-Metolachlor | 1.7 + 50 | $E^A = 99$ ($E^C = 79$) Δ 20 |

| Active compound(s) | Application rate [g of a.i./ha] | Herbicidal action 21 DAT [%] against *Sorghum halepense* |
|---|---|---|
| (B2.64) S-Metolachlor | 450 | 40 |
| A3 | 1.7 | 40 |
| A3 + (B2.64) S-Metolachlor | 1.7 + 450 | $E^A = 80$ ($E^C = 64$) Δ 16 |

| Active compound(s) | Application rate [g of a.i./ha] | Herbicidal action 21 DAT [%] against *Abutilon theophrasti* |
|---|---|---|
| (B2.64) S-Metolachlor | 450 | 10 |
|  | 150 | 0 |
| A3 | 5 | 30 |
|  | 1.7 | 0 |
| A3 + | 5 + 450 | $E^A = $ ($E^C = 37$) Δ 13 |
| (B2.64) S-Metolachlor | 5 + 150 | $E^A = 50$ ($E^C = 30$) Δ 20 |
|  | 1.7 + 150 | $E^A = 30$ ($E^C = 0$) Δ 30 |

| Active compound(s) | Application rate [g of a.i./ha] | Herbicidal action 21 DAT [%] against *Bidens pilosa* |
|---|---|---|
| (B2.64) S-Metolachlor | 450 | 20 |
|  | 150 | 10 |
| A3 | 5 | 10 |
|  | 1.7 | 10 |
| A3 + | 5 + 450 | $E^A = 50$ ($E^C = 28$) Δ 22 |
| (B2.64) S-Metolachlor | 1.7 + 450 | $E^A = 40$ ($E^C = 28$) Δ 12 |
|  | 5 + 150 | $E^A = 40$ ($E^C = 19$) Δ 21 |
|  | 1.7 + 150 | $E^A = 40$ ($E^C = 19$) Δ 21 |

| Active compound(s) | Application rate [g of a.i./ha] | Herbicidal action 21 DAT [%] against *Kochia scoparia* |
|---|---|---|
| (B2.64) S-Metolachlor | 450 | 10 |
|  | 150 | 0 |
| A3 | 1.7 | 30 |
| A3 + | 1.7 + 450 | $E^A = 60$ ($E^C = 37$) Δ 23 |
| (B2.64) S-Metolachlor | 1.7 + 150 | $E^A = 40$ ($E^C = 30$) Δ 10 |

| Active compound(s) | Application rate [g of a.i./ha] | Herbicidal action 21 DAT [%] against *Pharbitis purpurea* |
|---|---|---|
| (B2.64) S-Metolachlor | 450 | 10 |
|  | 150 | 0 |
| A3 | 5 | 80 |

TABLE 3.2-continued

Synergistic effect (Δ) for herbicidal binary compositions comprising herbicides from group B2, applied by the post-emergence method

| Active compound(s) | Application rate [g of a.i./ha] | |
|---|---|---|
| A3 + | 5 + 450 | $E^A = 95$ ($E^C = 82$) Δ 13 |
| (B2.64) S-Metolachlor | 5 + 150 | $E^A = 90$ ($E^C = 80$) Δ 10 |

| Active compound(s) (Z67) | Application rate [g of a.i./ha] | Herbicidal action in [%] 14 DAT against *Alopecurus myosuroides* |
|---|---|---|
| A3 | 1 | 15 |
| (B2.68) Thiencarbazone (CAS 317815-83-1) | 1.5 | 35 |
|  | 0.5 | 40 |
| A3 + | 1 + 1.5 | $E^A = 98$ ($E^C = 45$) Δ = 53 |
| (B2.68) Thiencarbazone (CAS 317815-83-1) | 1 + 0.5 | $E^A = 75$ ($E^C = 49$) Δ = 26 |

| Active compound(s) (Z67) | Application rate [g of a.i./ha] | Herbicidal action in [%] 28 DAT against *Alopecurus myosuroides* |
|---|---|---|
| A3 | 4 | 50 |
|  | 1 | 15 |
| (B2.68) Thiencarbazone (CAS 317815-83-1) | 1.5 | 30 |
| A3 + | 4 + 1.5 | $E^A = 100$ ($E^C = 65$) Δ = 35 |
| (B2.68) Thiencarbazone (CAS 317815-83-1) | 1 + 1.5 | $E^A = 100$ ($E^C = 41$) Δ = 59 |

| Active compound(s) (Z67) | Application rate [g of a.i./ha] | Herbicidal action in [%] 14 DAT against *Bromus sterilis* |
|---|---|---|
| A3 | 4 | 85 |
|  | 1 | 15 |
| (B2.68) Thiencarbazone (CAS 317815-83-1) | 1.5 | 20 |
|  | 0.5 | 15 |
| A3 + | 4 + 1.5 | $E^A = 95$ ($E^C = 88$) Δ = 7 |
| (B2.68) Thiencarbazone (CAS 317815-83-1) | 1 + 1.5 | $E^A = 95$ ($E^C = 32$) Δ = 63 |
|  | 1 + 0.5 | $E^A = 85$ ($E^C = 28$) Δ = 57 |

| Active compound(s) (Z67) | Application rate [g of a.i./ha] | Herbicidal action in [%] 28 DAT against *Bromus sterilis* |
|---|---|---|
| A3 | 1 | 15 |
| (B2.68) Thiencarbazone (CAS 317815-83-1) | 1.5 | 20 |
|  | 0.5 | 15 |
| A3 + | 1 + 1.5 | $E^A = 97$ ($E^C = 32$) Δ = 65 |
| (B2.68) Thiencarbazone (CAS 317815-83-1) | 1 + 0.5 | $E^A = 85$ ($E^C = 28$) Δ = 57 |

| Active compound(s) (Z67) | Application rate [g of a.i./ha] | Herbicidal action in [%] 14 DAT against *Centaurea cyanus* |
|---|---|---|
| A3 | 1 | 20 |
| (B2.68) Thiencarbazone (CAS 317815-83-1) | 0.17 | 0 |
| A3 + (B2.68) Thiencarbazone (CAS 317815-83-1) | 1 + 0.17 | $E^A = 30$ ($E^C = 20$) Δ = 10 |

| Active compound(s) (Z67) | Application rate [g of a.i./ha] | Herbicidal action in [%] 28 DAT against *Centaurea cyanus* |
|---|---|---|
| A3 | 4 | 20 |
|  | 1 | 0 |
| (B2.68) | 1.5 | 35 |

TABLE 3.2-continued

Synergistic effect (Δ) for herbicidal binary compositions comprising herbicides from group B2, applied by the post-emergence method

| | | |
|---|---|---|
| Thiencarbazone (CAS 317815-83-1) | 0.17 | 0 |
| A3 + | 4 + 1.5 | $E^A = 60$ ($E^C = 48$) $\Delta = 12$ |
| (B2.68) | 4 + 0.17 | $E^A = 25$ ($E^C = 20$) $\Delta = 5$ |
| Thiencarbazone (CAS 317815-83-1) | 1 + 0.17 | $E^A = 20$ ($E^C = 0$) $\Delta = 20$ |

| Active compound(s) (Z67) | Application rate [g of a.i./ha] | Herbicidal action in [%] 14 DAT against *Galium aparine* |
|---|---|---|
| A3 | 1 | 40 |
| (B2.68) | 0.17 | 60 |
| Thiencarbazone (CAS 317815-83-1) | | |
| A3 + (B2.68) Thiencarbazone (CAS 317815-83-1) | 1 + 0.17 | $E^A = 85$ ($E^C = 76$) $\Delta = 9$ |

| Active compound(s) (Z67) | Application rate [g of a.i./ha] | Herbicidal action in [%] 28 DAT against *Galium aparine* |
|---|---|---|
| A3 | 1 | 15 |
| (B2.68) | 0.17 | 50 |
| Thiencarbazone (CAS 317815-83-1) | | |
| A3 + (B2.68) Thiencarbazone (CAS 317815-83-1) | 1 + 0.17 | $E^A = 65$ ($E^C = 58$) $\Delta = 7$ |

| Active compound(s) (Z67) | Application rate [g of a.i./ha] | Herbicidal action in [%] 28 DAT against *Lamium purpureum* L. |
|---|---|---|
| A3 | 1 | 25 |
| (B2.68) | 0.17 | 35 |
| Thiencarbazone (CAS 317815-83-1) | | |
| A3 + (B2.68) Thiencarbazone (CAS 317815-83-1) | 1 + 0.17 | $E^A = 70$ ($E^C = 51$) $\Delta = 19$ |

| Active compound(s) (Z67) | Application rate [g of a.i./ha] | Herbicidal action in [%] 14 DAT against *Lolium rigidum* |
|---|---|---|
| A3 | 1 | 35 |
| (B2.68) | 1.5 | 85 |
| Thiencarbazone (CAS 317815-83-1) | 0.5 | 60 |
| A3 + | 1 + 1.5 | $E^A = 95$ ($E^C = 90$) $\Delta = 5$ |
| (B2.68) | 1 + 0.5 | $E^A = 93$ ($E^C = 74$) $\Delta = 19$ |
| Thiencarbazone (CAS 317815-83-1) | | |

| Active compound(s) (Z67) | Application rate [g of a.i./ha] | Herbicidal action in [%] 28 DAT against *Lolium rigidum* |
|---|---|---|
| A3 | 4 | 50 |
| | 1 | 15 |
| (B2.68) | 0.5 | 10 |
| Thiencarbazone (CAS 317815-83-1) | 1.5 | 50 |
| A3 + | 4 + 0.5 | $E^A = 65$ ($E^C = 55$) $\Delta = 10$ |
| (B2.68) | 1 + 1.5 | $E^A = 97$ ($E^C = 58$) $\Delta = 39$ |
| Thiencarbazone (CAS 317815-83-1) | 1 + 0.5 | $E^A = 75$ ($E^C = 24$) $\Delta = 51$ |

| Active compound(s) (Z67) | Application rate [g of a.i./ha] | Herbicidal action in [%] 14 DAT against *Lolium rigidum* (resistant biotype) |
|---|---|---|
| A3 | 4 | 40 |
| | 1 | 15 |
| (B2.68) | 1.5 | 0 |
| Thiencarbazone (CAS 317815-83-1) | 0.5 | 0 |
| | 0.17 | 0 |
| A3 + | 4 + 1.5 | $E^A = 85$ ($E^C = 40$) $\Delta = 45$ |
| (B2.68) | 1 + 1.5 | $E^A = 93$ ($E^C = 15$) $\Delta = 78$ |
| Thiencarbazone (CAS 317815-83-1) | 1 + 0.5 | $E^A = 65$ ($E^C = 15$) $\Delta = 50$ |
| | 1 + 0.17 | $E^A = 20$ ($E^C = 15$) $\Delta = 5$ |

| Active compound(s) (Z67) | Application rate [g of a.i./ha] | Herbicidal action in [%] 28 DAT against *Lolium rigidum* (resistant biotype) |
|---|---|---|
| A3 | 1 | 0 |
| (B2.68) | 1.5 | 20 |
| Thiencarbazone (CAS 317815-83-1) | 0.5 | 10 |
| A3 + | 1 + 1.5 | $E^A = 50$ ($E^C = 20$) $\Delta = 30$ |
| (B2.68) | 1 + 0.5 | $E^A = 20$ ($E^C = 10$) $\Delta = 10$ |
| Thiencarbazone (CAS 317815-83-1) | | |

| Active compound(s) (Z67) | Application rate [g of a.i./ha] | Herbicidal action in [%] 14 DAT against *Matricaria inodora* |
|---|---|---|
| A3 | 16 | 20 |
| | 4 | 20 |
| (B2.68) | 0.5 | 50 |
| Thiencarbazone (CAS 317815-83-1) | 0.17 | 15 |
| A3 + | 16 + 0.5 | $E^A = 80$ ($E^C = 60$) $\Delta = 20$ |
| (B2.68) | 16 + 0.17 | $E^A = 75$ ($E^C = 32$) $\Delta = 43$ |
| Thiencarbazone (CAS 317815-83-1) | 4 + 0.17 | $E^A = 40$ ($E^C = 32$) $\Delta = 8$ |

| Active compound(s) (Z67) | Application rate [g of a.i./ha] | Herbicidal action in [%] 28 DAT against *Matricaria inodora* |
|---|---|---|
| A3 | 16 | 15 |
| | 1 | 15 |
| (B2.68) | 0.17 | 0 |
| Thiencarbazone (CAS 317815-83-1) | | |
| A3 + | 16 + 0.17 | $E^A = 35$ ($E^C = 15$) $\Delta = 20$ |
| (B2.68) | 1 + 0.17 | $E^A = 40$ ($E^C = 15$) $\Delta = 25$ |
| Thiencarbazone (CAS 317815-83-1) | | |

| Active compound(s) (Z67) | Application rate [g of a.i./ha] | Herbicidal action in [%] 14 DAT against *Phalaris minor* |
|---|---|---|
| A3 | 4 | 90 |
| | 1 | 10 |
| (B2.68) | 1.5 | 10 |
| Thiencarbazone (CAS 317815-83-1) | 0.5 | 15 |
| | 0.17 | 0 |
| A3 + | 4 + 1.5 | $E^A = 97$ ($E^C = 91$) $\Delta = 6$ |
| (B2.68) | 1 + 1.5 | $E^A = 95$ ($E^C = 19$) $\Delta = 76$ |
| Thiencarbazone (CAS 317815-83-1) | 1 + 0.5 | $E^A = 93$ ($E^C = 24$) $\Delta = 69$ |
| | 1 + 0.17 | $E^A = 20$ ($E^C = 10$) $\Delta = 10$ |

| Active compound(s) (Z67) | Application rate [g of a.i./ha] | Herbicidal action in [%] 28 DAT against *Phalaris minor* |
|---|---|---|
| A3 | 1 | 0 |
| (B2.68) | 1.5 | 20 |

TABLE 3.2-continued

Synergistic effect (Δ) for herbicidal binary compositions comprising herbicides from group B2, applied by the post-emergence method

| Thiencarbazone (CAS 317815-83-1) | 0.5 | 0 |
|---|---|---|
| A3 + (B2.68) | 1 + 1.5 | $E^A = 80$ ($E^C = 20$) Δ = 60 |
| | 1 + 0.5 | $E^A = 25$ ($E^C = 0$) Δ = 25 |
| Thiencarbazone (CAS 317815-83-1) | | |

| Active compound(s) (Z67) | Application rate [g of a.i./ha] | Herbicidal action in [%] 14 DAT against *Poa annua* L. |
|---|---|---|
| A3 | 1 | 40 |
| | 1.5 | 15 |
| (B2.68) Thiencarbazone (CAS 317815-83-1) | 0.5 | 10 |
| A3 + (B2.68) | 1 + 1.5 | $E^A = 95$ ($E^C = 49$) Δ = 46 |
| | 1 + 0.5 | $E^A = 93$ ($E^C = 46$) Δ = 47 |
| Thiencarbazone (CAS 317815-83-1) | | |

| Active compound(s) (Z67) | Application rate [g of a.i./ha] | Herbicidal action in [%] 28 DAT against *Poa annua* L. |
|---|---|---|
| A3 | 16 | 40 |
| | 1 | 15 |
| (B2.68) | 0.5 | 0 |
| Thiencarbazone (CAS 317815-83-1) | 1.5 | 25 |
| A3 + (B2.68) | 16 + 0.5 | $E^A = 75$ ($E^C = 40$) Δ = 35 |
| | 1 + 1.5 | $E^A = 85$ ($E^C = 36$) Δ = 49 |
| Thiencarbazone (CAS 317815-83-1) | 1 + 0.5 | $E^A = 25$ ($E^C = 15$) Δ = 10 |

| Active compound(s) (Z67) | Application rate [g of a.i./ha] | Herbicidal action in [%] 14 DAT against *Veronica hederifolia* |
|---|---|---|
| A3 | 16 | 40 |
| (B2.68) | 0.17 | 70 |
| Thiencarbazone (CAS 317815-83-1) | | |
| A3 + (B2.68) | 16 + 0.17 | $E^A = 97$ ($E^C = 82$) Δ = 15 |
| Thiencarbazone (CAS 317815-83-1) | | |

| Active compound(s) (Z67) | Application rate [g of a.i./ha] | Herbicidal action in [%] 28 DAT against *Veronica hederifolia* |
|---|---|---|
| A3 | 16 | 50 |
| (B2.68) | 0.17 | 70 |
| Thiencarbazone (CAS 317815-83-1) | | |
| A3 + (B2.68) | 16 + 0.17 | $E^A = 95$ ($E^C = 85$) Δ = 10 |
| Thiencarbazone (CAS 317815-83-1) | | |

| Active compound(s) (Z90) | Application rate [g of a.i./ha] | Herbicidal action 21 DAT [%] against *Abutilon theophrasti* |
|---|---|---|
| (B2.18) Diflufenican | 270 | 25 |
| | 90 | 10 |
| | 30 | 10 |
| A4 | 45 | 20 |
| | 15 | 10 |
| | 5 | 10 |
| A4 + (B2.18) Diflufenican | 45 + 270 | $E^A = 60$ ($E^C = 40$) Δ 20 |
| | 15 + 270 | $E^A = 50$ ($E^C = 33$) Δ 17 |
| | 5 + 270 | $E^A = 60$ ($E^C = 33$) Δ 27 |
| | 45 + 90 | $E^A = 50$ ($E^C = 28$) Δ 22 |
| | 15 + 90 | $E^A = 40$ ($E^C = 19$) Δ 21 |
| | 5 + 90 | $E^A = 30$ ($E^C = 19$) Δ 11 |
| | 45 + 30 | $E^A = 50$ ($E^C = 28$) Δ 22 |
| | 15 + 30 | $E^A = 30$ ($E^C = 19$) Δ 11 |
| | 5 + 30 | $E^A = 30$ ($E^C = 19$) Δ 11 |

| Active compound(s) (Z90) | Application rate [g of a.i./ha] | Herbicidal action 21 DAT [%] against *Amaranthus palmeri* (res.) |
|---|---|---|
| (B2.18) Diflufenican | 30 | 40 |
| A4 | 45 | 30 |
| | 15 | 10 |
| A4 + (B2.18) Diflufenican | 45 + 30 | $E^A = 85$ ($E^C = 58$) Δ 27 |
| | 15 + 30 | $E^A = 70$ ($E^C = 46$) Δ 24 |

| Active compound(s) (Z90) | Application rate [g of a.i./ha] | Herbicidal action 21 DAT [%] against *Bidens pilosa* |
|---|---|---|
| (B2.18) Diflufenican | 270 | 45 |
| | 90 | 35 |
| A4 | 15 | 10 |
| | 5 | 10 |
| A4 + (B2.18) Diflufenican | 15 + 270 | $E^A = 65$ ($E^C = 51$) Δ 14 |
| | 5 + 270 | $E^A = 70$ ($E^C = 51$) Δ 19 |
| | 15 + 90 | $E^A = 60$ ($E^C = 42$) Δ 18 |

| Active compound(s) (Z90) | Application rate [g of a.i./ha] | Herbicidal action 21 DAT [%] against *Echinochloa crus-galli* |
|---|---|---|
| (B2.18) Diflufenican | 30 | 10 |
| A4 | 15 | 20 |
| A4 + (B2.18) Diflufenican | 15 + 30 | $E^A = 70$ (E = 28) Δ 42 |

| Active compound(s) (Z90) | Application rate [g of a.i./ha] | Herbicidal action 21 DAT [%] against *Setaria viridis* |
|---|---|---|
| (B2.18) Diflufenican | 270 | 15 |
| | 90 | 10 |
| | 30 | 10 |
| A4 | 15 | 60 |
| | 1.5 | 10 |
| A4 + (B2.18) Diflufenican | 1.7 + 270 | $E^A = 35$ ($E^C = 24$) Δ 11 |
| | 15 + 90 | $E^A = 80$ ($E^C = 66$) Δ 14 |
| | 15 + 30 | $E^A = 75$ ($E^C = 64$) Δ 11 |

| Active compound(s) (Z90) | Application rate [g of a.i./ha] | Herbicidal action 21 DAT [%] against *Sorghum halepense* |
|---|---|---|
| (B2.18) Diflufenican | 30 | 10 |
| A4 | 15 | 10 |
| A4 + (B2.18) Diflufenican | 15 + 30 | $E^A = 30$ ($E^C = 19$) Δ 11 |

TABLE 3.3

Synergistic effect (Δ) for herbicidal binary compositions comprising herbicides from group B3, applied by the post-emergence method

| Active compound(s) | Application rate [g of a.i./ha] | Herbicidal action in [%] 14 DAT against *Alopecurus myosuroides* |
|---|---|---|
| A3 | 4 | 90 |
| | 1 | 15 |
| (B3.1) Bromoxynil (CAS 1689-84-5) | 150 | 15 |
| | 450 | 25 |
| A3 + (B3.1) Bromoxynil (CAS 1689-84-5) | 4 + 150 | $E^A = 97$ ($E^C = 92$) Δ = 5 |
| | 1 + 450 | $E^A = 97$ ($E^C = 36$) Δ = 61 |
| | 1 + 150 | $E^A = 80$ ($E^C = 28$) Δ = 52 |

TABLE 3.3-continued

Synergistic effect (Δ) for herbicidal binary compositions comprising herbicides from group B3, applied by the post-emergence method

| Active compound(s) | Application rate [g of a.i./ha] | Herbicidal action in [%] 28 DAT against *Alopecurus myosuroides* |
|---|---|---|
| A3 | 4 | 50 |
|  | 1 | 15 |
| (B3.1) Bromoxynil | 150 | 15 |
| (CAS 1689-84-5) | 450 | 25 |
| A3 + | 4 + 150 | $E^A = 100$ ($E^C = 58$) $\Delta = 42$ |
| (B3.1) Bromoxynil | 1 + 450 | $E^A = 98$ ($E^C = 36$) $\Delta = 62$ |
| (CAS 1689-84-5) | 1 + 150 | $E^A = 60$ ($E^C = 28$) $\Delta = 32$ |

| Active compound(s) | Application rate [g of a.i./ha] | Herbicidal action in [%] 14 DAT against *Bromus sterilis* |
|---|---|---|
| A3 | 4 | 85 |
|  | 1 | 15 |
| (B3.1) Bromoxynil | 450 | 10 |
| (CAS 1689-84-5) | 150 | 10 |
|  | 50 | 0 |
| A3 + | 4 + 450 | $E^A = 95$ ($E^C = 87$) $\Delta = 8$ |
| (B3.1) Bromoxynil | 4 + 150 | $E^A = 93$ ($E^C = 87$) $\Delta = 6$ |
| (CAS 1689-84-5) | 1 + 450 | $E^A = 85$ ($E^C = 24$) $\Delta = 61$ |
|  | 1 + 150 | $E^A = 80$ ($E^C = 24$) $\Delta = 56$ |
|  | 1 + 50 | $E^A = 30$ ($E^C = 15$) $\Delta = 15$ |

| Active compound(s) | Application rate [g of a.i./ha] | Herbicidal action in [%] 28 DAT against *Bromus sterilis* |
|---|---|---|
| A3 | 1 | 15 |
| (B3.1) Bromoxynil | 450 | 20 |
| (CAS 1689-84-5) | 150 | 15 |
| A3 + | 1 + 450 | $E^A = 95$ ($E^C = 32$) $\Delta = 63$ |
| (B3.1) Bromoxynil | 1 + 150 | $E^A = 65$ ($E^C = 28$) $\Delta = 37$ |
| (CAS 1689-84-5) |  |  |

| Active compound(s) | Application rate [g of a.i./ha] | Herbicidal action in [%] 14 DAT against *Centaurea cyanus* |
|---|---|---|
| A3 | 16 | 80 |
| (B3.1) Bromoxynil | 50 | 30 |
| (CAS 1689-84-5) |  |  |
| A3 + | 16 + 50 | $E^A = 100$ ($E^C = 86$) $\Delta = 14$ |
| (B3.1) Bromoxynil |  |  |
| (CAS 1689-84-5) |  |  |

| Active compound(s) | Application rate [g of a.i./ha] | Herbicidal action in [%] 28 DAT against *Centaurea cyanus* |
|---|---|---|
| A3 | 16 | 40 |
| (B3.1) Bromoxynil | 50 | 10 |
| (CAS 1689-84-5) |  |  |
| A3 + | 16 + 50 | $E^A = 100$ ($E^C = 46$) $\Delta = 54$ |
| (B3.1) Bromoxynil |  |  |
| (CAS 1689-84-5) |  |  |

| Active compound(s) | Application rate [g of a.i./ha] | Herbicidal action in [%] 14 DAT against *Galium aparine* |
|---|---|---|
| A3 | 1 | 40 |
| (B3.1) Bromoxynil | 450 | 50 |
| (CAS 1689-84-5) | 150 | 30 |
|  | 50 | 20 |
| A3 + | 1 + 450 | $E^A = 90$ ($E^C = 70$) $\Delta = 20$ |
| (B3.1) Bromoxynil | 1 + 150 | $E^A = 85$ ($E^C = 58$) $\Delta = 27$ |
| (CAS 1689-84-5) | 1 + 50 | $E^A = 70$ ($E^C = 52$) $\Delta = 18$ |

| Active compound(s) | Application rate [g of a.i./ha] | Herbicidal action in [%] 28 DAT against *Galium aparine* |
|---|---|---|
| A3 | 1 | 15 |
| (B3.1) Bromoxynil | 450 | 75 |
| (CAS 1689-84-5) |  |  |
| A3 + | 1 + 450 | $E^A = 85$ ($E^C = 79$) $\Delta = 6$ |
| (B3.1) Bromoxynil |  |  |
| (CAS 1689-84-5) |  |  |

| Active compound(s) | Application rate [g of a.i./ha] | Herbicidal action in [%] 14 DAT against *Lamium purpureum* L. |
|---|---|---|
| A3 | 1 | 65 |
| (B3.1) Bromoxynil | 450 | 40 |
| (CAS 1689-84-5) | 150 | 15 |
| A3 + | 1 + 450 | $E^A = 95$ ($E^C = 79$) $\Delta = 16$ |
| (B3.1) Bromoxynil | 1 + 150 | $E^A = 93$ ($E^C = 70$) $\Delta = 23$ |
| (CAS 1689-84-5) |  |  |

| Active compound(s) | Application rate [g of a.i./ha] | Herbicidal action in [%] 28 DAT against *Lamium purpureum* L. |
|---|---|---|
| A3 | 4 | 40 |
|  | 1 | 25 |
| (B3.1) Bromoxynil | 450 | 25 |
| (CAS 1689-84-5) | 150 | 25 |
| A3 + | 4 + 450 | $E^A = 65$ ($E^C = 55$) $\Delta = 10$ |
| (B3.1) Bromoxynil | 4 + 150 | $E^A = 60$ ($E^C = 55$) $\Delta = 5$ |
| (CAS 1689-84-5) | 1 + 450 | $E^A = 60$ ($E^C = 44$) $\Delta = 16$ |

| Active compound(s) | Application rate [g of a.i./ha] | Herbicidal action in [%] 14 DAT against *Lolium rigidum* |
|---|---|---|
| A3 | 1 | 35 |
| (B3.1) Bromoxynil | 450 | 15 |
| (CAS 1689-84-5) | 150 | 0 |
| A3 + | 1 + 450 | $E^A = 95$ ($E^C = 45$) $\Delta = 50$ |
| (B3.1) Bromoxynil | 1 + 150 | $E^A = 93$ ($E^C = 35$) $\Delta = 58$ |
| (CAS 1689-84-5) |  |  |

| Active compound(s) | Application rate [g of a.i./ha] | Herbicidal action in [%] 28 DAT against *Lolium rigidum* |
|---|---|---|
| A3 | 4 | 50 |
|  | 1 | 15 |
| (B3.1) Bromoxynil | 450 | 20 |
| (CAS 1689-84-5) | 150 | 10 |
| A3 + | 4 + 450 | $E^A = 80$ ($E^C = 60$) $\Delta = 20$ |
| (B3.1) Bromoxynil | 1 + 450 | $E^A = 97$ ($E^C = 32$) $\Delta = 65$ |
| (CAS 1689-84-5) | 1 + 150 | $E^A = 80$ ($E^C = 24$) $\Delta = 56$ |

| Active compound(s) | Application rate [g of a.i./ha] | Herbicidal action in [%] 14 DAT against *Lolium rigidum* (resistant biotype) |
|---|---|---|
| A3 | 4 | 40 |
|  | 1 | 15 |
| (B3.1) Bromoxynil | 450 | 15 |
| (CAS 1689-84-5) | 150 | 0 |
| A3 + | 4 + 450 | $E^A = 70$ ($E^C = 49$) $\Delta = 21$ |
| (B3.1) Bromoxynil | 1 + 450 | $E^A = 95$ ($E^C = 28$) $\Delta = 67$ |
| (CAS 1689-84-5) | 1 + 150 | $E^A = 80$ ($E^C = 15$) $\Delta = 65$ |

| Active compound(s) | Application rate [g of a.i./ha] | Herbicidal action in [%] 28 DAT against *Lolium rigidum* (resistant biotype) |
|---|---|---|
| A3 | 1 | 0 |
| (B3.1) Bromoxynil | 450 | 20 |
| (CAS 1689-84-5) | 150 | 10 |
| A3 + | 1 + 450 | $E^A = 80$ ($E^C = 20$) $\Delta = 60$ |
| (B3.1) Bromoxynil | 1 + 150 | $E^A = 50$ ($E^C = 10$) $\Delta = 40$ |
| (CAS 1689-84-5) |  |  |

TABLE 3.3-continued

Synergistic effect (Δ) for herbicidal binary compositions comprising herbicides from group B3, applied by the post-emergence method

| Active compound(s) | Application rate [g of a.i./ha] | Herbicidal action in [%] 14 DAT against *Matricaria inodora* |
|---|---|---|
| A3 | 16 | 20 |
|  | 4 | 20 |
| (B3.1) Bromoxynil | 450 | 85 |
| (CAS 1689-84-5) | 50 | 40 |
| A3 + | 16 + 450 | $E^A = 100$ ($E^C = 88$) Δ = 12 |
| (B3.1) Bromoxynil | 16 + 50 | $E^A = 100$ ($E^C = 52$) Δ = 48 |
| (CAS 1689-84-5) | 4 + 450 | $E^A = 97$ ($E^C = 88$) Δ = 9 |
|  | 4 + 50 | $E^A = 80$ ($E^C = 52$) Δ = 28 |

| Active compound(s) | Application rate [g of a.i./ha] | Herbicidal action in [%] 28 DAT against *Matricaria inodora* |
|---|---|---|
| A3 | 16 | 15 |
| (B3.1) Bromoxynil | 450 | 80 |
| (CAS 1689-84-5) | 50 | 15 |
| A3 + | 16 + 450 | $E^A = 100$ ($E^C = 83$) Δ = 17 |
| (B3.1) Bromoxynil | 16 + 50 | $E^A = 100$ ($E^C = 28$) Δ = 72 |
| (CAS 1689-84-5) |  |  |

| Active compound(s) | Application rate [g of a.i./ha] | Herbicidal action in [%] 14 DAT against *Phalaris minor* |
|---|---|---|
| A3 | 16 | 85 |
|  | 4 | 90 |
|  | 1 | 10 |
| (B3.1) Bromoxynil | 450 | 15 |
| (CAS 1689-84-5) | 150 | 10 |
|  | 50 | 0 |
| A3 + | 16 + 450 | $E^A = 95$ ($E^C = 87$) Δ = 8 |
| (B3.1) Bromoxynil | 4 + 150 | $E^A = 97$ ($E^C = 91$) Δ = 6 |
| (CAS 1689-84-5) | 1 + 450 | $E^A = 95$ ($E^C = 24$) Δ = 71 |
|  | 1 + 150 | $E^A = 95$ ($E^C = 19$) Δ = 76 |
|  | 1 + 50 | $E^A = 20$ ($E^C = 10$) Δ = 10 |

| Active compound(s) | Application rate [g of a.i./ha] | Herbicidal action in [%] 28 DAT against *Phalaris minor* |
|---|---|---|
| A3 | 16 | 40 |
|  | 4 | 70 |
|  | 1 | 0 |
| (B3.1) Bromoxynil | 450 | 15 |
| (CAS 1689-84-5) | 150 | 0 |
| A3 + | 16 + 450 | $E^A = 90$ ($E^C = 49$) Δ = 41 |
| (B3.1) Bromoxynil | 16 + 150 | $E^A = 50$ ($E^C = 40$) Δ = 10 |
| (CAS 1689-84-5) | 4 + 150 | $E^A = 80$ ($E^C = 70$) Δ = 10 |
|  | 1 + 450 | $E^A = 80$ ($E^C = 15$) Δ = 65 |
|  | 1 + 150 | $E^A = 80$ ($E^C = 0$) Δ = 80 |

| Active compound(s) | Application rate [g of a.i./ha] | Herbicidal action in [%] 14 DAT against *Poa annua L.* |
|---|---|---|
| A3 | 16 | 85 |
|  | 1 | 40 |
| (B3.1) Bromoxynil | 450 | 20 |
| (CAS 1689-84-5) | 150 | 15 |
| A3 + | 16 + 450 | $E^A = 95$ ($E^C = 88$) Δ = 7 |
| (B3.1) Bromoxynil | 16 + 150 | $E^A = 95$ ($E^C = 87$) Δ = 8 |
| (CAS 1689-84-5) | 1 + 450 | $E^A = 95$ ($E^C = 52$) Δ = 43 |
|  | 1 + 150 | $E^A = 95$ ($E^C = 49$) Δ = 46 |

| Active compound(s) | Application rate [g of a.i./ha] | Herbicidal action in [%] 28 DAT against *Poa annua L.* |
|---|---|---|
| A3 | 16 | 40 |
|  | 1 | 15 |
| (B3.1) Bromoxynil | 450 | 25 |
| (CAS 1689-84-5) | 150 | 15 |
| A3 + | 16 + 450 | $E^A = 80$ ($E^C = 55$) Δ = 25 |
| (B3.1) Bromoxynil | 16 + 150 | $E^A = 97$ ($E^C = 49$) Δ = 48 |
| (CAS 1689-84-5) | 1 + 450 | $E^A = 90$ ($E^C = 36$) Δ = 54 |
|  | 1 + 150 | $E^A = 85$ ($E^C = 28$) Δ = 57 |

| Active compound(s) | Application rate [g of a.i./ha] | Herbicidal action in [%] 14 DAT against *Veronica hederifolia* |
|---|---|---|
| A3 | 16 | 40 |
|  | 1 | 30 |
| (B3.1) Bromoxynil | 450 | 20 |
| (CAS 1689-84-5) | 150 | 0 |
| A3 + | 16 + 450 | $E^A = 85$ ($E^C = 52$) Δ = 33 |
| (B3.1) Bromoxynil | 16 + 150 | $E^A = 85$ ($E^C = 40$) Δ = 45 |
| (CAS 1689-84-5) | 1 + 450 | $E^A = 50$ ($E^C = 44$) Δ = 6 |
|  | 1 + 150 | $E^A = 40$ ($E^C = 30$) Δ = 10 |

| Active compound(s) | Application rate [g of a.i./ha] | Herbicidal action in [%] 14 DAT against *Viola tricolor* |
|---|---|---|
| A3 | 16 | 85 |
|  | 1 | 50 |
| (B3.1) Bromoxynil | 150 | 50 |
| (CAS 1689-84-5) | 450 | 30 |
|  | 50 | 15 |
| A3 + | 16 + 150 | $E^A = 100$ ($E^C = 93$) Δ = 7 |
| (B3.1) Bromoxynil | 1 + 450 | $E^A = 85$ ($E^C = 65$) Δ = 20 |
| (CAS 1689-84-5) | 1 + 150 | $E^A = 80$ ($E^C = 75$) Δ = 5 |
|  | 1 + 50 | $E^A = 80$ ($E^C = 58$) Δ = 22 |

| Active compound(s) | Application rate [g of a.i./ha] | Herbicidal action in [%] 28 DAT against *Viola tricolor* |
|---|---|---|
| A3 | 16 | 20 |
|  | 1 | 15 |
| (B3.1) Bromoxynil | 450 | 15 |
| (CAS 1689-84-5) | 150 | 40 |
|  | 50 | 25 |
| A3 + | 16 + 450 | $E^A = 40$ ($E^C = 32$) Δ = 8 |
| (B3.1) Bromoxynil | 16 + 150 | $E^A = 100$ ($E^C = 52$) Δ = 48 |
| (CAS 1689-84-5) | 16 + 50 | $E^A = 70$ ($E^C = 40$) Δ = 30 |
|  | 1 + 450 | $E^A = 50$ ($E^C = 28$) Δ = 22 |
|  | 1 + 150 | $E^A = 70$ ($E^C = 49$) Δ = 21 |
|  | 1 + 50 | $E^A = 50$ ($E^C = 36$) Δ = 14 |

TABLE 3.4

Synergistic effect (Δ) for herbicidal binary compositions comprising herbicides from group B4, applied by the post-emergence method

| Active compound(s) | Application rate [g of a.i./ha] | Herbicidal action in [%] 14 DAT against *Alopecurus myosuroides* |
|---|---|---|
| A3 | 1 | 15 |
| (B4.8) Carfentrazone | 45 | 25 |
| (CAS 128639-02-1) | 15 | 0 |
|  | 5 | 0 |
| A3 + | 1 + 45 | $E^A = 97$ ($E^C = 36$) Δ = 61 |
| (B4.8) Carfentrazone | 1 + 15 | $E^A = 70$ ($E^C = 15$) Δ = 55 |
| (CAS 128639-02-1) | 1 + 5 | $E^A = 20$ ($E^C = 15$) Δ = 5 |

| Active compound(s) | Application rate [g of a.i./ha] | Herbicidal action in [%] 28 DAT against *Alopecurus myosuroides* |
|---|---|---|
| A3 | 16 | 90 |
|  | 4 | 50 |
|  | 1 | 15 |
| (B4.8) Carfentrazone | 45 | 20 |
| (CAS 128639-02-1) | 15 | 0 |
| A3 + | 16 + 45 | $E^A = 98$ ($E^C = 92$) Δ = 6 |

TABLE 3.4-continued

Synergistic effect (Δ) for herbicidal binary compositions comprising herbicides from group B4, applied by the post-emergence method

| Active compound(s) | Application rate [g of a.i./ha] | |
|---|---|---|
| (B4.8) Carfentrazone (CAS 128639-02-1) | 4 + 45 | $E^A = 100$ ($E^C = 60$) Δ = 40 |
|  | 1 + 45 | $E^A = 100$ ($E^C = 32$) Δ = 68 |
|  | 1 + 15 | $E^A = 30$ ($E^C = 15$) Δ = 15 |

| Active compound(s) | Application rate [g of a.i./ha] | Herbicidal action in [%] 14 DAT against *Bromus sterilis* |
|---|---|---|
| A3 | 1 | 15 |
| (B4.8) Carfentrazone (CAS 128639-02-1) | 45 | 30 |
|  | 15 | 20 |
| A3 + (B4.8) Carfentrazone (CAS 128639-02-1) | 1 + 45 | $E^A = 85$ ($E^C=$) Δ = 44 |
|  | 1 + 15 | $E^A = 75$ ($E^C = 32$) Δ = 43 |

| Active compound(s) | Application rate [g of a.i./ha] | Herbicidal action in [%] 28 DAT against *Bromus sterilis* |
|---|---|---|
| A3 | 1 | 15 |
| (B4.8) Carfentrazone (CAS 128639-02-1) | 45 | 35 |
|  | 15 | 15 |
| A3 + (B4.8) Carfentrazone (CAS 128639-02-1) | 1 + 45 | $E^A = 97$ ($E^C = 45$) Δ = 52 |
|  | 1 + 15 | $E^A = 45$ ($E^C = 28$) Δ = 17 |

| Active compound(s) | Application rate [g of a.i./ha] | Herbicidal action in [%] 28 DAT against *Galium aparine* |
|---|---|---|
| A3 | 16 | 75 |
|  | 4 | 65 |
| (B4.8) Carfentrazone (CAS 128639-02-1) | 15 | 80 |
|  | 5 | 70 |
| A3 + (B4.8) Carfentrazone (CAS 128639-02-1) | 16 + 15 | $E^A = 100$ ($E^C = 95$) Δ = 5 |
|  | 4 + 5 | $E^A = 100$ ($E^C = 90$) Δ = 10 |

| Active compound(s) | Application rate [g of a.i./ha] | Herbicidal action in [%] 28 DAT against *Lamium purpureum* L. |
|---|---|---|
| A3 | 1 | 25 |
| (B4.8) Carfentrazone (CAS 128639-02-1) | 45 | 80 |
| A3 + (B4.8) Carfentrazone (CAS 128639-02-1) | 1 + 45 | $E^A = 100$ ($E^C = 85$) Δ = 15 |

| Active compound(s) | Application rate [g of a.i./ha] | Herbicidal action in [%] 14 DAT against *Matricaria inodora* |
|---|---|---|
| A3 | 4 | 20 |
| (B4.8) Carfentrazone (CAS 128639-02-1) | 5 | 25 |
| A3 + (B4.8) Carfentrazone (CAS 128639-02-1) | 4 + 5 | $E^A = 50$ ($E^C = 40$) Δ = 10 |

| Active compound(s) | Application rate [g of a.i./ha] | Herbicidal action in [%] 14 DAT against *Alopecurus myosuroides* |
|---|---|---|
| A3 | 1 | 35 |
| (B4.8) Carfentrazone (CAS 128639-02-1) | 45 | 35 |
|  | 15 | 15 |
| A3 + (B4.8) Carfentrazone (CAS 128639-02-1) | 1 + 45 | $E^A = 95$ ($E^C = 58$) Δ = 37 |
|  | 1 + 15 | $E^A = 80$ ($E = 45$) Δ = 35 |

| Active compound(s) | Application rate [g of a.i./ha] | Herbicidal action in [%] 28 DAT against *Lolium rigidum* |
|---|---|---|
| A3 | 1 | 15 |
| (B4.8) Carfentrazone | 45 | 20 |
| (CAS 128639-02-1) | 15 | 0 |
| A3 + (B4.8) Carfentrazone (CAS 128639-02-1) | 1 + 45 | $E^A = 97$ ($E^C = 32$) Δ = 65 |
|  | 1 + 15 | $E^A = 50$ ($E^C = 15$) Δ = 35 |

| Active compound(s) | Application rate [g of a.i./ha] | Herbicidal action in [%] 14 DAT against *Lolium rigidum* (resistant biotype) |
|---|---|---|
| A3 | 1 | 15 |
| (B4.8) Carfentrazone (CAS 128639-02-1) | 45 | 25 |
|  | 15 | 10 |
| A3 + (B4.8) Carfentrazone (CAS 128639-02-1) | 1 + 45 | $E^A = 60$ ($E^C = 36$) Δ = 24 |
|  | 1 + 15 | $E^A = 50$ ($E^C = 24$) Δ = 26 |

| Active compound(s) | Application rate [g of a.i./ha] | Herbicidal action in [%] 28 DAT against *Lolium rigidum* (resistant biotype) |
|---|---|---|
| A3 | 1 | 0 |
| (B4.8) Carfentrazone (CAS 128639-02-1) | 45 | 20 |
|  | 15 | 0 |
| A3 + (B4.8) Carfentrazone (CAS 128639-02-1) | 1 + 45 | $E^A = 30$ ($E^C = 20$) Δ = 10 |
|  | 1 + 15 | $E^A = 25$ ($E^C = 0$) Δ = 25 |

| Active compound(s) | Application rate [g of a.i./ha] | Herbicidal action in [%] 14 DAT against *Phalaris minor* |
|---|---|---|
| A3 | 1 | 10 |
| (B4.8) Carfentrazone (CAS 128639-02-1) | 45 | 20 |
|  | 15 | 15 |
| A3 + (B4.8) Carfentrazone (CAS 128639-02-1) | 1 + 45 | $E^A = 97$ ($E^C = 28$) Δ = 69 |
|  | 1 + 15 | $E^A = 97$ ($E^C = 24$) Δ = 73 |

| Active compound(s) | Application rate [g of a.i./ha] | Herbicidal action in [%] 28 DAT against *Phalaris minor* |
|---|---|---|
| A3 | 1 | 0 |
| (B4.8) Carfentrazone (CAS 128639-02-1) | 45 | 10 |
|  | 15 | 0 |
| A3 + (B4.8) Carfentrazone (CAS 128639-02-1) | 1 + 45 | $E^A = 80$ ($E^C = 10$) Δ = 70 |
|  | 1 + 15 | $E^A = 80$ ($E^C = 0$) Δ = 80 |

| Active compound(s) | Application rate [g of a.i./ha] | Herbicidal action in [%] 14 DAT against *Poa annua* L. |
|---|---|---|
| A3 | 16 | 85 |
|  | 1 | 40 |
| (B4.8) Carfentrazone (CAS 128639-02-1) | 45 | 10 |
|  | 15 | 0 |
|  | 5 | 0 |
| A3 + (B4.8) Carfentrazone (CAS 128639-02-1) | 16 + 45 | $E^A = 95$ ($E^C = 87$) Δ = 8 |
|  | 16 + 15 | $E^A = 90$ ($E^C = 85$) Δ = 5 |
|  | 1 + 45 | $E^A = 95$ ($E^C = 46$) Δ = 49 |
|  | 1 + 15 | $E^A = 95$ ($E^C = 40$) Δ = 55 |
|  | 1 + 5 | $E^A = 50$ ($E^C = 40$) Δ = 10 |

| Active compound(s) | Application rate [g of a.i./ha] | Herbicidal action in [%] 28 DAT against *Poa annua* L. |
|---|---|---|
| A3 | 16 | 40 |
|  | 1 | 15 |
| (B4.8) Carfentrazone (CAS 128639-02-1) | 45 | 20 |
|  | 15 | 0 |
| A3 + (B4.8) Carfentrazone | 16 + 45 | $E^A = 70$ ($E^C = 52$) Δ = 18 |
|  | 16 + 15 | $E^A = 60$ ($E^C = 40$) Δ = 20 |

TABLE 3.4-continued

Synergistic effect (Δ) for herbicidal binary compositions comprising herbicides from group B4, applied by the post-emergence method

| (CAS 128639-02-1) | 1 + 45 | $E^A$ = 90 ($E^C$ = 32) Δ = 58 |
|---|---|---|
| | 1 + 15 | $E^A$ = 98 ($E^C$ = 15) Δ = 83 |

| Active compound(s) | Application rate [g of a.i./ha] | Herbicidal action in [%] 28 DAT against *Viola tricolor* |
|---|---|---|
| A3 | 4 | 30 |
| | 1 | 15 |
| (B4.8) Carfentrazone (CAS 128639-02-1) | 5 | 80 |
| A3 + (B4.8) Carfentrazone (CAS 128639-02-1) | 4 + 5 | $E^A$ = 100 ($E^C$ = 86) Δ = 14 |
| | 1 + 5 | $E^A$ = 100 ($E^C$ = 83) Δ = 17 |

| Active compound(s) | Application rate [g of a.i./ha] | Herbicidal action 21 DAT [%] against *Digitaria sanguinalis* |
|---|---|---|
| (B4.11) Imazamox (CAS 114311-32-9) | 3.3 | 60 |
| A3 | 1.7 | 20 |
| A3 + (B4.11) Imazamox (CAS 114311-32-9) | 1.7 + 3.3 | $E^A$ = 40 ($E^C$ = 19) Δ 21 |

| Active compound(s) | Application rate [g of a.i./ha] | Herbicidal action 21 DAT [%] against *Bidens pilosa* |
|---|---|---|
| (B4.11) Imazamox (CAS 114311-32-9) | 30 | 50 |
| | 3.3 | 20 |
| A3 | 15 | 50 |
| | 5 | 10 |
| | 1.7 | 10 |
| A3 + (B4.11) Imazamox (CAS 114311-32-9) | 5 + 30 | $E^A$ = 80 ($E^C$ = 55) Δ 25 |
| | 1.7 + 30 | $E^A$ = 75 ($E^C$ = 55) Δ 20 |
| | 15 + 3.3 | $E^A$ = 75 ($E^C$ = 60) Δ 15 |
| | 5 + 3.3 | $E^A$ = 60 ($E^C$ = 28) Δ 32 |

| Active compound(s) | Application rate [g of a.i./ha] | Herbicidal action in [%] 14 DAT against *Alopecurus myosuroides* |
|---|---|---|
| A3 | 4 | 90 |
| | 1 | 15 |
| (B4.13) Imazapyr (CAS 81334-34-1) | 4.5 | 20 |
| | 1.5 | 10 |
| A3 + (B4.13) Imazapyr (CAS 81334-34-1) | 4 + 4.5 | $E^A$ = 97 ($E^C$ = 92) Δ = 5 |
| | 1 + 4.5 | $E^A$ = 97 ($E^C$ = 32) Δ = 65 |
| | 1 + 1.5 | $E^A$ = 75 ($E^C$ = 24) Δ = 51 |

| Active compound(s) | Application rate [g of a.i./ha] | Herbicidal action in [%] 28 DAT against *Alopecurus myosuroides* |
|---|---|---|
| A3 | 16 | 90 |
| | 4 | 50 |
| | 1 | 15 |
| (B4.13) Imazapyr (CAS 81334-34-1) | 4.5 | 20 |
| A3 + (B4.13) Imazapyr (CAS 81334-34-1) | 16 + 4.5 | $E^A$ = 98 ($E^C$ = 92) Δ = 6 |
| | 4 + 4.5 | $E^A$ = 100 ($E^C$ = 60) Δ = 40 |
| | 1 + 4.5 | $E^A$ = 95 ($E^C$ = 32) Δ = 63 |

| Active compound(s) | Application rate [g of a.i./ha] | Herbicidal action in [%] 14 DAT against *Bromus sterilis* |
|---|---|---|
| A3 | 1 | 15 |
| (B4.13) Imazapyr (CAS 81334-34-1) | 4.5 | 25 |
| | 1.5 | 0 |
| | 0.5 | 0 |
| A3 + (B4.13) Imazapyr (CAS 81334-34-1) | 1 + 4.5 | $E^A$ = 85 ($E^C$ = 36) Δ = 49 |
| | 1 + 1.5 | $E^A$ = 85 ($E^C$ = 15) Δ = 70 |
| | 1 + 0.5 | $E^A$ = 20 ($E^C$ = 15) Δ = 5 |

| Active compound(s) | Application rate [g of a.i./ha] | Herbicidal action in [%] 28 DAT against *Bromus sterilis* |
|---|---|---|
| A3 | 1 | 15 |
| (B4.13) Imazapyr (CAS 81334-34-1) | 4.5 | 15 |
| | 1.5 | 10 |
| A3 + (B4.13) Imazapyr (CAS 81334-34-1) | 1 + 4.5 | $E^A$ = 97 ($E^C$ = 28) Δ = 69 |
| | 1 + 1.5 | $E^A$ = 70 ($E^C$ = 24) Δ = 46 |

| Active compound(s) | Application rate [g of a.i./ha] | Herbicidal action in [%] 14 DAT against *Centaurea cyanus* |
|---|---|---|
| A3 | 4 | 50 |
| (B4.13) Imazapyr (CAS 81334-34-1) | 4.5 | 10 |
| A3 + (B4.13) Imazapyr (CAS 81334-34-1) | 4 + 4.5 | $E^A$ = 60 ($E^C$ = 55) Δ = 5 |

| Active compound(s) | Application rate [g of a.i./ha] | Herbicidal action in [%] 28 DAT against *Centaurea cyanus* |
|---|---|---|
| A3 | 16 | 40 |
| (B4.13) Imazapyr (CAS 81334-34-1) | 4.5 | 25 |
| A3 + (B4.13) Imazapyr (CAS 81334-34-1) | 16 + 4.5 | $E^A$ = 65 ($E^C$ = 55) Δ = 10 |

| Active compound(s) | Application rate [g of a.i./ha] | Herbicidal action in [%] 14 DAT against *Galium aparine* |
|---|---|---|
| A3 | 1 | 40 |
| (B4.13) Imazapyr (CAS 81334-34-1) | 4.5 | 25 |
| | 1.5 | 40 |
| A3 + (B4.13) Imazapyr (CAS 81334-34-1) | 1 + 4.5 | $E^A$ = 93 ($E^C$ = 55) Δ = 38 |
| | 1 + 1.5 | $E^A$ = 90 ($E^C$ = 64) Δ = 26 |

| Active compound(s) | Application rate [g of a.i./ha] | Herbicidal action in [%] 28 DAT against *Galium aparine* |
|---|---|---|
| A3 | 1 | 15 |
| (B4.13) Imazapyr (CAS 81334-34-1) | 4.5 | 40 |
| | 1.5 | 50 |
| | 0.5 | 30 |
| A3 + (B4.13) Imazapyr (CAS 81334-34-1) | 1 + 4.5 | $E^A$ = 85 ($E^C$ = 49) Δ = 36 |
| | 1 + 1.5 | $E^A$ = 70 ($E^C$ = 58) Δ = 12 |
| | 1 + 0.5 | $E^A$ = 50 ($E^C$ = 41) Δ = 9 |

| Active compound(s) | Application rate [g of a.i./ha] | Herbicidal action in [%] 14 DAT against *Lamium purpureum* L. |
|---|---|---|
| A3 | 1 | 65 |
| (B4.13) Imazapyr (CAS 81334-34-1) | 4.5 | 40 |
| | 1.5 | 25 |
| | 0.5 | 0 |
| A3 + (B4.13) Imazapyr (CAS 81334-34-1) | 1 + 4.5 | $E^A$ = 95 ($E^C$ = 79) Δ = 16 |
| | 1 + 1.5 | $E^A$ = 93 ($E^C$ = 74) Δ = 19 |
| | 1 + 0.5 | $E^A$ = 85 ($E^C$ = 65) Δ = 20 |

| Active compound(s) | Application rate [g of a.i./ha] | Herbicidal action in [%] 28 DAT against *Lamium purpureum* L. |
|---|---|---|
| A3 | 4 | 40 |
| | 1 | 25 |
| (B4.13) Imazapyr (CAS 81334-34-1) | 4.5 | 20 |
| | 0.5 | 0 |
| | 1.5 | 0 |

TABLE 3.4-continued

Synergistic effect (Δ) for herbicidal binary compositions comprising herbicides from group B4, applied by the post-emergence method

| Active compound(s) | Application rate [g of a.i./ha] | |
|---|---|---|
| A3 + (B4.13) Imazapyr (CAS 81334-34-1) | 4 + 4.5 | $E^A = 75$ ($E^C = 52$) $\Delta = 23$ |
| | 4 + 0.5 | $E^A = 45$ ($E^C = 40$) $\Delta = 5$ |
| | 1 + 4.5 | $E^A = 60$ ($E^C = 40$) $\Delta = 20$ |
| | 1 + 1.5 | $E^A = 40$ ($E^C = 25$) $\Delta = 15$ |
| | 1 + 0.5 | $E^A = 70$ ($E^C = 25$) $\Delta = 45$ |

| Active compound(s) | Application rate [g of a.i./ha] | Herbicidal action in [%] 14 DAT against *Lolium rigidum* |
|---|---|---|
| A3 | 1 | 35 |
| (B4.13) Imazapyr (CAS 81334-34-1) | 4.5 | 20 |
| | 1.5 | 0 |
| A3 + (B4.13) Imazapyr (CAS 81334-34-1) | 1 + 4.5 | $E^A = 95$ ($E^C = 48$) $\Delta = 47$ |
| | 1 + 1.5 | $E^A = 95$ ($E^C = 35$) $\Delta = 60$ |

| Active compound(s) | Application rate [g of a.i./ha] | Herbicidal action in [%] 28 DAT against *Lolium rigidum* |
|---|---|---|
| A3 | 4 | 50 |
| | 1 | 15 |
| (B4.13) Imazapyr (CAS 81334-34-1) | 4.5 | 15 |
| | 1.5 | 0 |
| A3 + (B4.13) Imazapyr (CAS 81334-34-1) | 4 + 4.5 | $E^A = 97$ ($E^C = 58$) $\Delta = 39$ |
| | 4 + 1.5 | $E^A = 60$ ($E^C = 50$) $\Delta = 10$ |
| | 1 + 4.5 | $E^A = 80$ ($E^C = 28$) $\Delta = 52$ |
| | 1 + 1.5 | $E^A = 70$ ($E^C = 15$) $\Delta = 55$ |

| Active compound(s) | Application rate [g of a.i./ha] | Herbicidal action in [%] 14 DAT against *Lolium rigidum* (resistant biotype) |
|---|---|---|
| A3 | 4 | 40 |
| | 1 | 15 |
| (B4.13) Imazapyr (CAS 81334-34-1) | 4.5 | 15 |
| | 1.5 | 10 |
| | 0.5 | 0 |
| A3 + (B4.13) Imazapyr (CAS 81334-34-1) | 4 + 4.5 | $E^A = 80$ ($E^C = 49$) $\Delta = 31$ |
| | 1 + 4.5 | $E^A = 70$ ($E^C = 28$) $\Delta = 42$ |
| | 1 + 1.5 | $E^A = 35$ ($E^C = 24$) $\Delta = 11$ |
| | 1 + 0.5 | $E^A = 20$ ($E^C = 15$) $\Delta = 5$ |

| Active compound(s) | Application rate [g of a.i./ha] | Herbicidal action in [%] 28 DAT against *Lolium rigidum* (resistant biotype) |
|---|---|---|
| A3 | 4 | 10 |
| | 1 | 0 |
| (B4.13) Imazapyr (CAS 81334-34-1) | 4.5 | 15 |
| | 1.5 | 0 |
| A3 + (B4.13) Imazapyr (CAS 81334-34-1) | 4 + 4.5 | $E^A = 40$ ($E^C = 24$) $\Delta = 16$ |
| | 4 + 1.5 | $E^A = 15$ ($E^C = 10$) $\Delta = 5$ |
| | 1 + 4.5 | $E^A = 30$ ($E^C = 15$) $\Delta = 15$ |
| | 1 + 1.5 | $E^A = 15$ ($E^C = 0$) $\Delta = 15$ |

| Active compound(s) | Application rate [g of a.i./ha] | Herbicidal action in [%] 14 DAT against *Matricaria inodora* |
|---|---|---|
| A3 | 16 | 20 |
| (B4.13) Imazapyr (CAS 81334-34-1) | 0.5 | 0 |
| A3 + (B4.13) Imazapyr (CAS 81334-34-1) | 16 + 0.5 | $E^A = 25$ ($E^C = 20$) $\Delta = 5$ |

| Active compound(s) | Application rate [g of a.i./ha] | Herbicidal action in [%] 28 DAT against *Matricaria inodora* |
|---|---|---|
| A3 | 16 | 15 |
| (B4.13) Imazapyr (CAS 81334-34-1) | 4.5 | 20 |
| | 0.5 | 0 |
| A3 + (B4.13) Imazapyr (CAS 81334-34-1) | 16 + 4.5 | $E^A = 40$ ($E^C = 32$) $\Delta = 8$ |
| | 16 + 0.5 | $E^A = 20$ ($E^C = 15$) $\Delta = 5$ |

| Active compound(s) | Application rate [g of a.i./ha] | Herbicidal action in [%] 14 DAT against *Phalaris minor* |
|---|---|---|
| A3 | 16 | 85 |
| | 4 | 90 |
| | 1 | 10 |
| (B4.13) Imazapyr (CAS 81334-34-1) | 4.5 | 25 |
| | 1.5 | 0 |
| | 0.5 | 0 |
| A3 + (B4.13) Imazapyr (CAS 81334-34-1) | 16 + 4.5 | $E^A = 97$ ($E^C = 89$) $\Delta = 8$ |
| | 4 + 1.5 | $E^A = 95$ ($E^C = 90$) $\Delta = 5$ |
| | 1 + 4.5 | $E^A = 95$ ($E^C = 33$) $\Delta = 62$ |
| | 1 + 1.5 | $E^A = 95$ ($E^C = 10$) $\Delta = 85$ |
| | 1 + 0.5 | $E^A = 20$ ($E^C = 10$) $\Delta = 10$ |

| Active compound(s) | Application rate [g of a.i./ha] | Herbicidal action in [%] 28 DAT against *Phalaris minor* |
|---|---|---|
| A3 | 16 | 40 |
| | 4 | 70 |
| | 1 | 0 |
| (B4.13) Imazapyr (CAS 81334-34-1) | 4.5 | 20 |
| | 1.5 | 10 |
| | 0.5 | 0 |
| A3 + (B4.13) Imazapyr (CAS 81334-34-1) | 16 + 4.5 | $E^A = 80$ ($E^C = 52$) $\Delta = 28$ |
| | 4 + 4.5 | $E^A = 100$ ($E^C = 76$) $\Delta = 24$ |
| | 4 + 1.5 | $E^A = 80$ ($E^C = 73$) $\Delta = 7$ |
| | 1 + 4.5 | $E^A = 70$ ($E^C = 20$) $\Delta = 50$ |
| | 1 + 1.5 | $E^A = 60$ ($E^C = 10$) $\Delta = 50$ |
| | 1 + 0.5 | $E^A = 15$ ($E^C = 0$) $\Delta = 15$ |

| Active compound(s) | Application rate [g of a.i./ha] | Herbicidal action in [%] 14 DAT against *Poa annua* L. |
|---|---|---|
| A3 | 16 | 85 |
| | 1 | 40 |
| (B4.13) Imazapyr (CAS 81334-34-1) | 4.5 | 0 |
| | 1.5 | 0 |
| A3 + (B4.13) Imazapyr (CAS 81334-34-1) | 16 + 4.5 | $E^A = 95$ ($E^C = 85$) $\Delta = 10$ |
| | 16 + 1.5 | $E^A = 95$ ($E^C = 85$) $\Delta = 10$ |
| | 1 + 4.5 | $E^A = 95$ ($E^C = 40$) $\Delta = 55$ |
| | 1 + 1.5 | $E^A = 97$ ($E^C = 40$) $\Delta = 57$ |

| Active compound(s) | Application rate [g of a.i./ha] | Herbicidal action in [%] 28 DAT against *Poa annua* L. |
|---|---|---|
| A3 | 16 | 40 |
| | 1 | 15 |
| (B4.13) Imazapyr (CAS 81334-34-1) | 4.5 | 20 |
| | 1.5 | 15 |
| | 0.5 | 0 |
| A3 + (B4.13) Imazapyr (CAS 81334-34-1) | 16 + 4.5 | $E^A = 98$ ($E^C = 52$) $\Delta = 46$ |
| | 16 + 1.5 | $E^A = 97$ ($E^C = 49$) $\Delta = 48$ |
| | 1 + 4.5 | $E^A = 50$ ($E^C = 32$) $\Delta = 18$ |
| | 1 + 1.5 | $E^A = 98$ ($E^C = 28$) $\Delta = 70$ |
| | 1 + 0.5 | $E^A = 20$ ($E^C = 15$) $\Delta = 5$ |

| Active compound(s) | Application rate [g of a.i./ha] | Herbicidal action in [%] 14 DAT against *Viola tricolor* |
|---|---|---|
| A3 | 1 | 50 |
| (B4.13) Imazapyr (CAS 81334-34-1) | 4.5 | 40 |
| | 1.5 | 40 |
| | 0.5 | 10 |
| A3 + (B4.13) Imazapyr (CAS 81334-34-1) | 1 + 4.5 | $E^A = 85$ ($E^C = 70$) $\Delta = 15$ |
| | 1 + 1.5 | $E^A = 90$ ($E^C = 70$) $\Delta = 20$ |
| | 1 + 0.5 | $E^A = 80$ ($E^C = 55$) $\Delta = 25$ |

TABLE 3.4-continued

Synergistic effect (Δ) for herbicidal binary compositions comprising herbicides from group B4, applied by the post-emergence method

| Active compound(s) | Application rate [g of a.i./ha] | Herbicidal action in [%] 28 DAT against *Viola tricolor* |
|---|---|---|
| A3 | 4 | 30 |
|  | 1 | 15 |
| (B4.13) Imazapyr (CAS 81334-34-1) | 4.5 | 15 |
|  | 1.5 | 20 |
| A3 + (B4.13) Imazapyr (CAS 81334-34-1) | 4 + 4.5 | $E^A = 75$ ($E^C = 41$) Δ = 34 |
|  | 4 + 1.5 | $E^A = 80$ ($E^C = 44$) Δ = 36 |
|  | 1 + 4.5 | $E^A = 60$ ($E^C = 28$) Δ = 32 |
|  | 1 + 1.5 | $E^A = 80$ ($E^C = 32$) Δ = 48 |

| Active compound(s) | Application rate [g of a.i./ha] | Herbicidal action 21 DAT [%] against *Amaranthus palmeri* |
|---|---|---|
| (B4.15) Imazethapyr (CAS 81335-77-5) | 30 | 10 |
|  | 10 | 0 |
|  | 3.33 | 0 |
| A3 | 5 | 15 |
|  | 1.7 | 10 |
| A3 + (B4.15) Imazethapyr (CAS 81335-77-5) | 5 + 30 | $E^A = 35$ ($E^C = 23.5$) Δ 11.5 |
|  | 1.7 + 10 | $E^A = 20$ ($E^C = 10$) Δ 10 |
|  | 1.7 + 3.33 | $E^A = 20$ ($E^C = 10$) Δ 10 |

| Active compound(s) | Application rate [g of a.i./ha] | Herbicidal action 21 DAT [%] against *Bidens pilosa* |
|---|---|---|
| (B4.15) Imazethapyr (CAS 81335-77-5) | 30 | 25 |
|  | 10 | 0 |
|  | 3.33 | 0 |
| A3 | 5 | 10 |
|  | 1.7 | 0 |
| A3 + (B4.15) Imazethapyr (CAS 81335-77-5) | 5 + 30 | $E^A = 60$ ($E^C = 32.5$) Δ 27.5 |
|  | 1.7 + 30 | $E^A = 50$ ($E^C = 25$) Δ 25 |
|  | 1.7 + 10 | $E^A = 10$ ($E^C = 0$) Δ 10 |
|  | 5 + 3.33 | $E^A = 25$ ($E^C = 10$) Δ 15 |
|  | 1.7 + 3.33 | $E^A = 25$ ($E^C = 0$) Δ 25 |

| Active compound(s) (Z68) | Application rate [g of a.i./ha] | Herbicidal action 37 DAT [%] against *Abutilon theophrasti* |
|---|---|---|
| (B4.18) Isoxaflutole | 75 | 58 |
| A3 | 100 | 75 |
| A3 + (B4.18) Isoxaflutole | 100 + 75 | $E^A = 93$ ($E^C = 89.5$) Δ 3.5 |

| Active compound(s) (Z68) | Application rate [g of a.i./ha] | Herbicidal action 21 DAT [%] against *Brachiaria platyphylla* |
|---|---|---|
| (B4.18) Isoxaflutole | 45 | 30 |
|  | 15 | 20 |
| A3 | 5 | 80 |
|  | 1.7 | 20 |
| A3 + (B4.18) Isoxaflutole | 5 + 45 | $E^A = 100$ ($E^C = 86$) Δ 14 |
|  | 1.7 + 45 | $E^A = 70$ ($E^C = 44$) Δ 26 |
|  | 5 + 15 | $E^A = 95$ ($E^C = 84$) Δ 11 |
|  | 1.7 + 15 | $E^A = 65$ ($E^C = 36$) Δ 29 |

| Active compound(s) (Z68) | Application rate [g of a.i./ha] | Herbicidal action 21 DAT [%] against *Digitaria sanguinalis* |
|---|---|---|
| (B4.18) Isoxaflutole | 45 | 25 |
|  | 15 | 10 |
| A3 | 5 | 80 |
|  | 1.7 | 10 |
| A3 + (B4.18) Isoxaflutole | 5 + 45 | $E^A = 98$ ($E^C = 85$) Δ 13 |
|  | 1.7 + 15 | $E^A = 50$ ($E^C = 19$) Δ 31 |

| Active compound(s) (Z68) | Application rate [g of a.i./ha] | Herbicidal action 21 DAT [%] against *Sorghum halepense* |
|---|---|---|
| (B4.18) Isoxaflutole | 45 | 60 |
| A3 | 1.7 | 40 |
| A3 + (B4.18) Isoxaflutole | 1.7 + 45 | $E^A = 93$ ($E^C = 76$) Δ 17 |

| Active compound(s) (Z68) | Application rate [g of a.i./ha] | Herbicidal action 21 DAT [%] against *Amaranthus palmeri* |
|---|---|---|
| (B4.18) Isoxaflutole | 45 | 20 |
|  | 15 | 10 |
|  | 5 | 10 |
| A3 | 15 | 30 |
|  | 5 | 10 |
|  | 1.7 | 0 |
| A3 + (B4.18) Isoxaflutole | 1.7 + 45 | $E^A = 30$ ($E^C = 20$) Δ 10 |
|  | 15 + 15 | $E^A = 50$ ($E^C = 37$) Δ 13 |
|  | 5 + 15 | $E^A = 40$ ($E^C = 19$) Δ 21 |
|  | 1.7 + 15 | $E^A = 20$ ($E^C = 10$) Δ 10 |
|  | 5 + 5 | $E^A = 30$ ($E^C = 19$) Δ 11 |
|  | 1.7 + 5 | $E^A = 25$ ($E^C = 10$) Δ 15 |

| Active compound(s) (Z68) | Application rate [g of a.i./ha] | Herbicidal action 21 DAT [%] against *Bidens pilosa* |
|---|---|---|
| (B4.18) Isoxaflutole | 45 | 60 |
|  | 5 | 20 |
| A3 | 15 | 50 |
|  | 5 | 10 |
|  | 1.7 | 10 |
| A3 + (B4.18) Isoxaflutole | 15 + 45 | $E^A = 90$ ($E^C = 80$) Δ 10 |
|  | 5 + 45 | $E^A = 85$ ($E^C = 64$) Δ 21 |
|  | 1.7 + 45 | $E^A = 80$ ($E^C = 64$) Δ 16 |
|  | 5 + 5 | $E^A = 60$ ($E^C = 28$) Δ 32 |
|  | 1.7 + 5 | $E^A = 40$ ($E^C = 28$) Δ 12 |

| Active compound(s) (Z69) | Application rate [g of a.i./ha] | Herbicidal action in [%] 14 DAT against *Alopecurus myosuroides* |
|---|---|---|
| A3 | 4 | 75 |
|  | 1 | 30 |
| (B4.22) Pyrasulfotole | 45 | 10 |
|  | 15 | 0 |
|  | 5 | 0 |
| A3 + (B4.22) Pyrasulfotole | 4 + 45 | $E^A = 90$ ($E^C = 78$) Δ = 12 |
|  | 4 + 15 | $E^A = 90$ ($E^C = 75$) Δ = 15 |
|  | 4 + 5 | $E^A = 90$ ($E^C = 75$) Δ = 15 |
|  | 1 + 45 | $E^A = 50$ ($E^C = 37$) Δ = 13 |
|  | 1 + 15 | $E^A = 40$ ($E^C = 30$) Δ = 10 |
|  | 1 + 5 | $E^A = 60$ ($E^C = 30$) Δ = 30 |

| Active compound(s) (Z69) | Application rate [g of a.i./ha] | Herbicidal action in [%] 28 DAT against *Alopecurus myosuroides* |
|---|---|---|
| A3 | 4 | 60 |
|  | 1 | 10 |
| (B4.22) Pyrasulfotole | 45 | 10 |
|  | 15 | 0 |
|  | 5 | 0 |
| A3 + (B4.22) Pyrasulfotole | 4 + 45 | $E^A = 93$ ($E^C = 64$) Δ = 29 |
|  | 4 + 15 | $E^A = 95$ ($E^C = 60$) Δ = 35 |
|  | 4 + 5 | $E^A = 80$ ($E^C = 60$) Δ = 20 |
|  | 1 + 15 | $E^A = 30$ ($E^C = 10$) Δ = 20 |
|  | 1 + 5 | $E^A = 40$ ($E^C = 10$) Δ = 30 |

| Active compound(s) (Z69) | Application rate [g of a.i./ha] | Herbicidal action in [%] 14 DAT against *Bromus sterilis* |
|---|---|---|

TABLE 3.4-continued

Synergistic effect (Δ) for herbicidal binary compositions comprising herbicides from group B4, applied by the post-emergence method

| Active compound(s) (Z69) | Application rate [g of a.i./ha] | Herbicidal action in [%] against |
|---|---|---|
| A3 | 1 | 30 |
| (B4.22) Pyrasulfotole | 45 | 10 |
|  | 15 | 0 |
|  | 5 | 0 |
| A3 + | 1 + 45 | $E^A = 70$ ($E^C = 37$) Δ = 33 |
| (B4.22) Pyrasulfotole | 1 + 15 | $E^A = 60$ ($E^C = 30$) Δ = 30 |
|  | 1 + 5 | $E^A = 70$ ($E^C = 30$) Δ = 40 |

| Active compound(s) (Z69) | Application rate [g of a.i./ha] | Herbicidal action in [%] 14 DAT against *Centaurea cyanus* |
|---|---|---|
| A3 | 16 | 70 |
|  | 1 | 30 |
| (B4.22) Pyrasulfotole | 15 | 10 |
|  | 45 | 30 |
| A3 + | 16 + 15 | $E^A = 80$ ($E^C = 73$) Δ = 7 |
| (B4.22) Pyrasulfotole | 1 + 45 | $E^A = 60$ ($E^C = 51$) Δ = 9 |
|  | 1 + 15 | $E^A = 50$ ($E^C = 37$) Δ = 13 |

| Active compound(s) (Z69) | Application rate [g of a.i./ha] | Herbicidal action in [%] 28 DAT against *Centaurea cyanus* |
|---|---|---|
| A3 | 16 | 70 |
|  | 4 | 50 |
|  | 1 | 10 |
| (B4.22) Pyrasulfotole | 15 | 0 |
|  | 5 | 0 |
|  | 45 | 20 |
| A3 + | 16 + 15 | $E^A = 75$ ($E^C = 70$) Δ = 5 |
| (B4.22) Pyrasulfotole | 16 + 5 | $E^A = 75$ ($E^C = 70$) Δ = 5 |
|  | 4 + 15 | $E^A = 60$ ($E^C = 50$) Δ = 10 |
|  | 4 + 5 | $E^A = 60$ ($E^C = 50$) Δ = 10 |
|  | 1 + 45 | $E^A = 40$ ($E^C = 28$) Δ = 12 |
|  | 1 + 15 | $E^A = 60$ ($E^C = 10$) Δ = 50 |
|  | 1 + 5 | $E^A = 30$ ($E^C = 10$) Δ = 20 |

| Active compound(s) (Z69) | Application rate [g of a.i./ha] | Herbicidal action in [%] 14 DAT against *Lolium rigidum* |
|---|---|---|
| A3 | 4 | 85 |
|  | 1 | 40 |
| (B4.22) Pyrasulfotole | 5 | 0 |
|  | 45 | 5 |
|  | 15 | 0 |
| A3 + | 4 + 5 | $E^A = 90$ ($E^C = 85$) Δ = 5 |
| (B4.22) Pyrasulfotole | 1 + 45 | $E^A = 70$ ($E^C = 43$) Δ = 27 |
|  | 1 + 15 | $E^A = 75$ ($E^C = 43$) Δ = 32 |
|  | 1 + 5 | $E^A = 70$ ($E^C = 40$) Δ = 30 |

| Active compound(s) (Z69) | Application rate [g of a.i./ha] | Herbicidal action in [%] 28 DAT against *Lolium rigidum* |
|---|---|---|
| A3 | 4 | 70 |
|  | 1 | 10 |
| (B4.22) Pyrasulfotole | 45 | 10 |
|  | 15 | 0 |
|  | 5 | 0 |
| A3 + | 4 + 45 | $E^A = 95$ ($E^C = 73$) Δ = 22 |
| (B4.22) Pyrasulfotole | 4 + 15 | $E^A = 85$ ($E^C = 70$) Δ = 15 |
|  | 4 + 5 | $E^A = 90$ ($E^C = 70$) Δ = 20 |
|  | 1 + 15 | $E^A = 40$ ($E^C = 10$) Δ = 30 |
|  | 1 + 5 | $E^A = 40$ ($E^C = 10$) Δ = 30 |

| Active compound(s) (Z69) | Application rate [g of a.i./ha] | Herbicidal action in [%] 14 DAT against *Lolium rigidum* (resistant biotype) |
|---|---|---|
| A3 | 4 | 60 |
|  | 1 | 30 |
| (B4.22) Pyrasulfotole | 45 | 10 |
|  | 15 | 5 |
|  | 5 | 5 |
| A3 + | 4 + 45 | $E^A = 85$ ($E^C = 64$) Δ = 21 |
| (B4.22) Pyrasulfotole | 4 + 15 | $E^A = 85$ ($E^C = 62$) Δ = 23 |
|  | 4 + 5 | $E^A = 85$ ($E^C = 62$) Δ = 23 |
|  | 1 + 15 | $E^A = 50$ ($E^C = 34$) Δ = 16 |
|  | 1 + 5 | $E^A = 50$ ($E^C = 34$) Δ = 16 |

| Active compound(s) (Z69) | Application rate [g of a.i./ha] | Herbicidal action in [%] 28 DAT against *Lolium rigidum* (resistant biotype) |
|---|---|---|
| A3 | 4 | 40 |
|  | 1 | 0 |
| (B4.22) Pyrasulfotole | 15 | 0 |
|  | 5 | 0 |
| A3 + | 4 + 15 | $E^A = 60$ ($E^C = 40$) Δ = 20 |
| (B4.22) Pyrasulfotole | 4 + 5 | $E^A = 70$ ($E^C = 40$) Δ = 30 |
|  | 1 + 15 | $E^A = 30$ ($E^C = 0$) Δ = 30 |
|  | 1 + 5 | $E^A = 20$ ($E^C = 0$) Δ = 20 |

| Active compound(s) (Z69) | Application rate [g of a.i./ha] | Herbicidal action in [%] 14 DAT against *Matricaria inodora* |
|---|---|---|
| A3 | 16 | 40 |
| (B4.22) Pyrasulfotole | 5 | 20 |
| A3 + (B4.22) Pyrasulfotole | 16 + 5 | $E^A = 80$ ($E^C = 52$) Δ = 28 |

| Active compound(s) (Z69) | Application rate [g of a.i./ha] | Herbicidal action in [%] 28 DAT against *Matricaria inodora* |
|---|---|---|
| A3 | 16 | 50 |
| (B4.22) Pyrasulfotole | 5 | 10 |
| A3 + (B4.22) Pyrasulfotole | 16 + 5 | $E^A = 60$ ($E^C = 55$) Δ = 5 |

| Active compound(s) (Z69) | Application rate [g of a.i./ha] | Herbicidal action in [%] 14 DAT against *Phalaris minor* |
|---|---|---|
| A3 | 16 | 85 |
|  | 4 | 85 |
|  | 1 | 20 |
| (B4.22) Pyrasulfotole | 15 | 0 |
|  | 5 | 0 |
| A3 + | 16 + 15 | $E^A = 95$ ($E^C = 85$) Δ = 10 |
| (B4.22) Pyrasulfotole | 16 + 5 | $E^A = 95$ ($E^C = 85$) Δ = 10 |
|  | 4 + 15 | $E^A = 93$ ($E^C = 85$) Δ = 8 |
|  | 4 + 5 | $E^A = 90$ ($E^C = 85$) Δ = 5 |
|  | 1 + 15 | $E^A = 40$ ($E^C = 20$) Δ = 20 |
|  | 1 + 5 | $E^A = 30$ ($E^C = 20$) Δ = 10 |

| Active compound(s) (Z69) | Application rate [g of a.i./ha] | Herbicidal action in [%] 28 DAT against *Phalaris minor* |
|---|---|---|
| A3 | 16 | 85 |
|  | 1 | 10 |
| (B4.22) Pyrasulfotole | 15 | 0 |
|  | 5 | 0 |
| A3 + | 16 + 15 | $E^A = 93$ ($E^C = 85$) Δ = 8 |
| (B4.22) Pyrasulfotole | 16 + 5 | $E^A = 90$ ($E^C = 85$) Δ = 5 |
|  | 1 + 15 | $E^A = 30$ ($E^C = 10$) Δ = 20 |

| Active compound(s) (Z69) | Application rate [g of a.i./ha] | Herbicidal action in [%] 14 DAT against *Poa annua* L. |
|---|---|---|
| A3 | 4 | 85 |
|  | 1 | 50 |
| (B4.22) Pyrasulfotole | 45 | 0 |
|  | 15 | 0 |
|  | 5 | 0 |
| A3 + | 4 + 45 | $E^A = 95$ ($E^C = 85$) Δ = 10 |
| (B4.22) Pyrasulfotole | 4 + 15 | $E^A = 95$ ($E^C = 85$) Δ = 10 |

TABLE 3.4-continued

Synergistic effect (Δ) for herbicidal binary compositions comprising herbicides from group B4, applied by the post-emergence method

| | 4 + 5 | $E^A = 95$ ($E^C = 85$) Δ = 10 |
| | 1 + 45 | $E^A = 60$ ($E^C = 50$) Δ = 10 |
| | 1 + 15 | $E^A = 70$ ($E^C = 50$) Δ = 20 |
| | 1 + 5 | $E^A = 70$ ($E^C = 50$) Δ = 20 |

| Active compound(s) (Z69) | Application rate [g of a.i./ha] | Herbicidal action in [%] 28 DAT against *Poa annua* L. |
|---|---|---|
| A3 | 16 | 85 |
| | 4 | 80 |
| | 1 | 20 |
| (B4.22) Pyrasulfotole | 45 | 0 |
| | 15 | 0 |
| | 5 | 0 |
| A3 + | 16 + 45 | $E^A = 98$ ($E^C = 85$) Δ = 13 |
| (B4.22) Pyrasulfotole | 16 + 15 | $E^A = 98$ ($E^C = 85$) Δ = 13 |
| | 16 + 5 | $E^A = 90$ ($E^C = 85$) Δ = 5 |
| | 4 + 45 | $E^A = 98$ ($E^C = 80$) Δ = 18 |
| | 4 + 15 | $E^A = 98$ ($E^C = 80$) Δ = 18 |
| | 4 + 5 | $E^A = 98$ ($E^C = 80$) Δ = 18 |
| | 1 + 15 | $E^A = 40$ ($E^C = 20$) Δ = 20 |
| | 1 + 5 | $E^A = 50$ ($E^C = 20$) Δ = 30 |

TABLE 3.5

Synergistic effect (Δ) for herbicidal binary compositions comprising herbicides from group B5, applied by the post-emergence method

| Active compound(s) (Z72) | Application rate [g of a.i./ha] | Herbicidal action 28 DAT [%] against *Brachiaria plantaginea* |
|---|---|---|
| (B5.23) Florpyrauxifen (CAS 1390661-72-9) | 30 | 40 |
| A3 | 100 | 82 |
| A3 + (B5.23) Florpyrauxifen (CAS 1390661-72-9) | 100 + 30 | $E^A = 93$ ($E^C = 89$) Δ 4 |

| Active compound(s) | Application rate [g of a.i./ha] | Herbicidal action 21 DAT [%] against *Amaranthus palmeri* |
|---|---|---|
| (B5.26) Flumioxazin | 12 | 10 |
| | 4 | 0 |
| | 1.33 | 0 |
| A3 | 5 | 15 |
| | 1.7 | 10 |
| A3 + (B5.26) Flumioxazin | 5 + 12 | $E^A = 93$ ($E^C = 23.5$) Δ 69.5 |
| | 5 + 4 | $E^A = 45$ ($E^C = 15$) Δ 30 |
| | 1.7 + 12 | $E^A = 40$ ($E^C = 19$) Δ 21 |
| | 1.7 + 4 | $E^A = 50$ ($E^C = 10$) Δ 40 |
| | 1.7 + 1.33 | $E^A = 30$ ($E^C = 10$) Δ 20 |

| Active compound(s) (Z73) | Application rate [g of a.i./ha] | Herbicidal action in [%] 14 DAT against *Alopecurus myosuroides* |
|---|---|---|
| A3 | 4 | 75 |
| | 1 | 30 |
| (B5.31) Halauxifen (CAS 943831-98-9) | 9 | 5 |
| | 3 | 0 |
| | 1 | 0 |
| A3 + (B5.31) Halauxifen (CAS 943831-98-9) | 4 + 9 | $E^A = 85$ ($E^C = 76$) Δ = 9 |
| | 4 + 3 | $E^A = 95$ ($E^C = 75$) Δ = 20 |
| | 4 + 1 | $E^A = 90$ ($E^C = 75$) Δ = 15 |
| | 1 + 9 | $E^A = 70$ ($E^C = 34$) Δ = 36 |
| | 1 + 3 | $E^A = 70$ ($E^C = 30$) Δ = 40 |
| | 1 + 1 | $E^A = 60$ ($E^C = 30$) Δ = 30 |

TABLE 3.5-continued

Synergistic effect (Δ) for herbicidal binary compositions comprising herbicides from group B5, applied by the post-emergence method

| Active compound(s) (Z73) | Application rate [g of a.i./ha] | Herbicidal action in [%] 28 DAT against *Alopecurus myosuroides* |
|---|---|---|
| A3 | 4 | 60 |
| | 1 | 10 |
| (B5.31) Halauxifen (CAS 943831-98-9) | 9 | 0 |
| | 3 | 0 |
| | 1 | 0 |
| A3 + (B5.31) Halauxifen (CAS 943831-98-9) | 4 + 9 | $E^A = 70$ ($E^C = 60$) Δ = 10 |
| | 4 + 3 | $E^A = 90$ ($E^C = 60$) Δ = 30 |
| | 4 + 1 | $E^A = 75$ ($E^C = 60$) Δ = 15 |
| | 1 + 9 | $E^A = 40$ ($E^C = 10$) Δ = 30 |
| | 1 + 3 | $E^A = 40$ ($E^C = 10$) Δ = 30 |
| | 1 + 1 | $E^A = 30$ ($E^C = 10$) Δ = 20 |

| Active compound(s) (Z73) | Application rate [g of a.i./ha] | Herbicidal action in [%] 14 DAT against *Bromus sterilis* |
|---|---|---|
| A3 | 1 | 30 |
| (B5.31) Halauxifen (CAS 943831-98-9) | 9 | 30 |
| | 3 | 10 |
| | 1 | 0 |
| A3 + (B5.31) Halauxifen (CAS 943832-60-8) | 1 + 9 | $E^A = 80$ ($E^C = 51$) Δ = 29 |
| | 1 + 3 | $E^A = 85$ ($E^C = 37$) Δ = 48 |
| | 1 + 1 | $E^A = 80$ ($E^C = 30$) Δ = 50 |

| Active compound(s) (Z73) | Application rate [g of a.i./ha] | Herbicidal action in [%] 28 DAT against *Bromus sterilis* |
|---|---|---|
| A3 | 4 | 90 |
| | 1 | 30 |
| (B5.31) Halauxifen (CAS 943831-98-9) | 3 | 0 |
| | 1 | 0 |
| | 9 | 20 |
| A3 + (B5.31) Halauxifen (CAS 943831-98-9) | 4 + 3 | $E^A = 95$ ($E^C = 90$) Δ = 5 |
| | 4 + 1 | $E^A = 95$ ($E^C = 90$) Δ = 5 |
| | 1 + 9 | $E^A = 50$ ($E^C = 44$) Δ = 6 |
| | 1 + 3 | $E^A = 70$ ($E^C = 30$) Δ = 40 |
| | 1 + 1 | $E^A = 40$ ($E^C = 30$) Δ = 10 |

| Active compound(s) (Z73) | Application rate [g of a.i./ha] | Herbicidal action in [%] 14 DAT against *Lolium rigidum* |
|---|---|---|
| A3 | 4 | 85 |
| | 1 | 40 |
| (B5.31) Halauxifen (CAS 943831-98-9) | 9 | 5 |
| | 3 | 0 |
| | 1 | 0 |
| A3 + (B5.31) Halauxifen (CAS 943831-98-9) | 4 + 9 | $E^A = 93$ ($E^C = 86$) Δ = 7 |
| | 4 + 3 | $E^A = 90$ ($E^C = 85$) Δ = 5 |
| | 4 + 1 | $E^A = 93$ ($E^C = 85$) Δ = 8 |
| | 1 + 9 | $E^A = 80$ ($E^C = 43$) Δ = 37 |
| | 1 + 3 | $E^A = 75$ ($E^C = 40$) Δ = 35 |
| | 1 + 1 | $E^A = 70$ ($E^C = 40$) Δ = 30 |

| Active compound(s) (Z73) | Application rate [g of a.i./ha] | Herbicidal action in [%] 28 DAT against *Lolium rigidum* |
|---|---|---|
| A3 | 4 | 70 |
| | 1 | 10 |
| (B5.31) Halauxifen (CAS 943831-98-9) | 9 | 0 |
| | 3 | 0 |
| | 1 | 0 |
| A3 + (B5.31) Halauxifen (CAS 943831-98-9) | 4 + 9 | $E^A = 85$ ($E^C = 70$) Δ = 15 |
| | 4 + 3 | $E^A = 85$ ($E^C = 70$) Δ = 15 |
| | 4 + 1 | $E^A = 95$ ($E^C = 70$) Δ = 25 |
| | 1 + 9 | $E^A = 60$ ($E^C = 10$) Δ = 50 |
| | 1 + 3 | $E^A = 40$ ($E^C = 10$) Δ = 30 |
| | 1 + 1 | $E^A = 30$ ($E^C = 10$) Δ = 20 |

TABLE 3.5-continued

Synergistic effect (Δ) for herbicidal binary compositions comprising herbicides from group B5, applied by the post-emergence method

| Active compound(s) (Z73) | Application rate [g of a.i./ha] | Herbicidal action in [%] 14 DAT against *Lolium rigidum* (resistant biotype) |
|---|---|---|
| A3 | 4 | 60 |
|  | 1 | 30 |
| (B5.31) Halauxifen (CAS 943831-98-9) | 9 | 5 |
|  | 3 | 0 |
|  | 1 | 0 |
| A3 + (B5.31) Halauxifen (CAS 943831-98-9) | 4 + 9 | $E^A = 85$ ($E^C = 62$) Δ = 23 |
|  | 4 + 3 | $E^A = 85$ ($E^C = 60$) Δ = 25 |
|  | 4 + 1 | $E^A = 85$ ($E^C = 60$) Δ = 25 |
|  | 1 + 9 | $E^A = 40$ ($E^C = 34$) Δ = 6 |
|  | 1 + 3 | $E^A = 75$ ($E^C = 30$) Δ = 45 |
|  | 1 + 1 | $E^A = 60$ ($E^C = 30$) Δ = 30 |

| Active compound(s) (Z73) | Application rate [g of a.i./ha] | Herbicidal action in [%] 28 DAT against *Lolium rigidum* (resistant biotype) |
|---|---|---|
| A3 | 16 | 80 |
|  | 4 | 40 |
|  | 1 | 0 |
| (B5.31) Halauxifen (CAS 943831-98-9) | 3 | 0 |
|  | 9 | 10 |
|  | 1 | 0 |
| A3 + (B5.31) Halauxifen (CAS 943831-98-9) | 16 + 3 | $E^A = 90$ ($E^C = 80$) Δ = 10 |
|  | 4 + 9 | $E^A = 70$ ($E^C = 46$) Δ = 24 |
|  | 4 + 3 | $E^A = 60$ ($E^C = 40$) Δ = 20 |
|  | 4 + 1 | $E^A = 75$ ($E^C = 40$) Δ = 35 |
|  | 1 + 9 | $E^A = 20$ ($E^C = 10$) Δ = 10 |
|  | 1 + 3 | $E^A = 30$ ($E^C = 0$) Δ = 30 |
|  | 1 + 1 | $E^A = 30$ ($E^C = 0$) Δ = 30 |

| Active compound(s) (Z73) | Application rate [g of a.i./ha] | Herbicidal action in [%] 14 DAT against *Matricaria inodora* |
|---|---|---|
| A3 | 16 | 40 |
|  | 4 | 30 |
| (B5.31) Halauxifen (CAS 943831-98-9) | 9 | 60 |
|  | 3 | 40 |
|  | 1 | 30 |
| A3 + (B5.31) Halauxifen (CAS 943832-60-8) | 16 + 9 | $E^A = 90$ ($E^C = 76$) Δ = 14 |
|  | 16 + 3 | $E^A = 80$ ($E^C = 64$) Δ = 16 |
|  | 4 + 1 | $E^A = 60$ ($E^C = 51$) Δ = 9 |

| Active compound(s) (Z73) | Application rate [g of a.i./ha] | Herbicidal action in [%] 14 DAT against *Phalaris minor* |
|---|---|---|
| A3 | 16 | 85 |
|  | 4 | 85 |
|  | 1 | 20 |
| (B5.31) Halauxifen (CAS 943831-98-9) | 9 | 5 |
|  | 3 | 0 |
|  | 1 | 0 |
| A3 + (B5.31) Halauxifen (CAS 943831-98-9) | 16 + 9 | $E^A = 95$ ($E^C = 86$) Δ = 9 |
|  | 16 + 3 | $E^A = 93$ ($E^C = 85$) Δ = 8 |
|  | 16 + 1 | $E^A = 93$ ($E^C = 85$) Δ = 8 |
|  | 4 + 3 | $E^A = 93$ ($E^C = 85$) Δ = 8 |
|  | 4 + 1 | $E^A = 93$ ($E^C = 85$) Δ = 8 |
|  | 1 + 9 | $E^A = 50$ ($E^C = 24$) Δ = 26 |
|  | 1 + 3 | $E^A = 70$ ($E^C = 20$) Δ = 50 |
|  | 1 + 1 | $E^A = 70$ ($E^C = 20$) Δ = 50 |

| Active compound(s) (Z73) | Application rate [g of a.i./ha] | Herbicidal action in [%] 28 DAT against *Phalaris minor* |
|---|---|---|
| A3 | 16 | 85 |
|  | 1 | 10 |
| (B5.31) Halauxifen (CAS 943831-98-9) | 9 | 5 |
|  | 3 | 0 |
|  | 1 | 0 |
| A3 + (B5.31) Halauxifen (CAS 943831-98-9) | 16 + 9 | $E^A = 98$ ($E^C = 86$) Δ = 12 |
|  | 1 + 9 | $E^A = 40$ ($E^C = 15$) Δ = 25 |
|  | 1 + 3 | $E^A = 20$ ($E^C = 10$) Δ = 10 |
|  | 1 + 1 | $E^A = 30$ ($E^C = 10$) Δ = 20 |

| Active compound(s) (Z73) | Application rate [g of a.i./ha] | Herbicidal action in [%] 14 DAT against *Poa annua* L. |
|---|---|---|
| A3 | 16 | 93 |
|  | 4 | 85 |
|  | 1 | 50 |
| (B5.31) Halauxifen (CAS 943831-98-9) | 9 | 5 |
|  | 3 | 0 |
|  | 1 | 0 |
| A3 + (B5.31) Halauxifen (CAS 943831-98-9) | 16 + 9 | $E^A = 98$ ($E^C = 93$) Δ = 5 |
|  | 4 + 9 | $E^A = 98$ ($E^C = 86$) Δ = 12 |
|  | 4 + 3 | $E^A = 95$ ($E^C = 85$) Δ = 10 |
|  | 4 + 1 | $E^A = 95$ ($E^C = 85$) Δ = 10 |
|  | 1 + 9 | $E^A = 85$ ($E^C = 53$) Δ = 32 |
|  | 1 + 3 | $E^A = 85$ ($E^C = 50$) Δ = 35 |
|  | 1 + 1 | $E^A = 80$ ($E^C = 50$) Δ = 30 |

| Active compound(s) (Z73) | Application rate [g of a.i./ha] | Herbicidal action in [%] 28 DAT against *Poa annua* L. |
|---|---|---|
| A3 | 16 | 85 |
|  | 4 | 80 |
|  | 1 | 20 |
| (B5.31) Halauxifen (CAS 943831-98-9) | 9 | 0 |
|  | 3 | 0 |
|  | 1 | 0 |
| A3 + (B5.31) Halauxifen (CAS 943831-98-9) | 16 + 9 | $E^A = 98$ ($E^C = 85$) Δ = 13 |
|  | 16 + 3 | $E^A = 98$ ($E^C = 85$) Δ = 13 |
|  | 16 + 1 | $E^A = 100$ ($E^C = 85$) Δ = 15 |
|  | 4 + 9 | $E^A = 98$ ($E^C = 80$) Δ = 18 |
|  | 4 + 3 | $E^A = 90$ ($E^C = 80$) Δ = 10 |
|  | 4 + 1 | $E^A = 98$ ($E^C = 80$) Δ = 18 |
|  | 1 + 9 | $E^A = 60$ ($E^C = 20$) Δ = 40 |
|  | 1 + 3 | $E^A = 40$ ($E^C = 20$) Δ = 20 |
|  | 1 + 1 | $E^A = 60$ ($E^C = 20$) Δ = 40 |

| Active compound(s) (Z73) | Application rate [g of a.i./ha] | Herbicidal action in [%] 14 DAT against *Veronica hederifolia* |
|---|---|---|
| A3 | 4 | 30 |
|  | 1 | 10 |
| (B5.31) Halauxifen (CAS 943831-98-9) | 9 | 60 |
|  | 3 | 60 |
| A3 + (B5.31) Halauxifen (CAS 943831-98-9) | 4 + 9 | $E^A = 85$ ($E^C = 72$) Δ = 13 |
|  | 1 + 9 | $E^A = 80$ ($E^C = 64$) Δ = 16 |
|  | 1 + 3 | $E^A = 70$ ($E^C = 64$) Δ = 6 |

| Active compound(s) | Application rate [g of a.i./ha] | Herbicidal action 21 DAT [%] against *Abutilon theophrasti* |
|---|---|---|
| (B5.37) Paraquat (CAS 4685-14-7) | 45 | 10 |
|  | 5 | 0 |
| A3 | 15 | 35 |
|  | 1.7 | 10 |
| A3 + (B5.37) Paraquat (CAS 4685-14-7) | 1.7 + 45 | $E^A = 45$ ($E^C = 19$) Δ 26 |
|  | 15 + 5 | $E^A = 65$ ($E^C = 45$) Δ 20 |
|  | 1.7 + 5 | $E^A = 30$ ($E^C = 10$) Δ 20 |

| Active compound(s) | Application rate [g of a.i./ha] | Herbicidal action 21 DAT [%] against *Amaranthus palmeri* |
|---|---|---|
| (B5.37) Paraquat (CAS 4685-14-7) | 45 | 10 |
|  | 5 | 0 |
| A3 | 5 | 15 |
|  | 1.7 | 10 |

TABLE 3.5-continued

Synergistic effect (Δ) for herbicidal binary compositions comprising herbicides from group B5, applied by the post-emergence method

| Active compound(s) | Application rate [g of a.i./ha] | |
|---|---|---|
| A3 + | 5 + 45 | $E^A = 60$ ($E^C = 23.5$) Δ 36.5 |
| (B5.37) Paraquat | 1.7 + 45 | $E^A = 35$ ($E^C = 19$) Δ 16 |
| (CAS 4685-14-7) | 1.7 + 5 | $E^A = 20$ ($E^C = 10$) Δ 10 |

| Active compound(s) | Application rate [g of a.i./ha] | Herbicidal action 21 DAT [%] against *Bidens pilosa* |
|---|---|---|
| (B5.37) Paraquat (CAS 4685-14-7) | 45 | 10 |
|  | 5 | 0 |
| A3 | 15 | 25 |
|  | 5 | 10 |
|  | 1.7 | 0 |
| A3 + | 15 + 45 | $E^A = 50$ ($E^C = 32.5$) Δ 17.5 |
| (B5.37) Paraquat | 5 + 45 | $E^A = 50$ ($E^C = 19$) Δ 31 |
| (CAS 4685-14-7) | 1.7 + 45 | $E^A = 65$ ($E^C = 10$) Δ 55 |
|  | 15 + 5 | $E^A = 40$ ($E^C = 25$) Δ 15 |
|  | 5 + 5 | $E^A = 60$ ($E^C = 10$) Δ 50 |
|  | 1.7 + 5 | $E^A = 50$ ($E^C = 0$) Δ 50 |

| Active compound(s) | Application rate [g of a.i./ha] | Herbicidal action 21 DAT [%] against *Pharbitis purpurea* |
|---|---|---|
| (B5.37) Paraquat (CAS 4685-14-7) | 5 | 15 |
| A3 | 15 | 85 |
|  | 5 | 85 |
| A3 + | 15 + 5 | $E^A = 99$ ($E^C = 87$) Δ 12 |
| (B5.37) Paraquat (CAS 4685-14-7) | 5 + 5 | $E^A = 98$ ($E^C = 87$) Δ 11 |

TABLE 3.6

Synergistic effect (Δ) for herbicidal binary compositions comprising herbicides from group B7, applied by the post-emergence method

| Active compound(s) | Application rate [g of a.i./ha] | Herbicidal action 21 DAT [%] against *Setaria viridis* |
|---|---|---|
| (B7.4) Glufosinate (CAS 77182-82-2) | 50 | 20 |
| A1 | 1.7 | 15 |
| A1 + (B7.4) Glufosinate (CAS 77182-82-2) | 1.7 + 50 | $E^A = 45$ ($E^C = 32$) Δ 13 |

| Active compound(s) | Application rate [g of a.i./ha] | Herbicidal action 21 DAT [%] against *Sorghum halepense* |
|---|---|---|
| (B7.4) Glufosinate (CAS 77182-82-2) | 450 | 5 |
|  | 50 | 20 |
| A1 | 15 | 35 |
|  | 1.7 | 10 |
| A1 + | 1.7 + 450 | $E^A = 93$ ($E^C = 87$) Δ 6 |
| (B7.4) Glufosinate | 15 + 50 | $E^A = 75$ ($E^C = 48$) Δ 27 |
| (CAS 77182-82-2) | 1.7 + 50 | $E^A = 40$ ($E^C = 28$) Δ 12 |

| Active compound(s) | Application rate [g of a.i./ha] | Herbicidal action 21 DAT [%] against *Amaranthus palmeri* (res.) |
|---|---|---|
| (B7.4) Glufosinate (CAS 77182-82-2) | 50 | 35 |
| A1 | 45 | 40 |
|  | 15 | 10 |
|  | 5 | 10 |
| A1 + | 45 + 50 | $E^A = 75$ ($E^C = 61$) Δ 14 |
| (B7.4) Glufosinate | 15 + 50 | $E^A = 75$ ($E^C = 42$) Δ 33 |
| (CAS 77182-82-2) | 5 + 50 | $E^A = 75$ ($E^C = 42$) Δ 33 |

TABLE 3.6-continued

Synergistic effect (Δ) for herbicidal binary compositions comprising herbicides from group B7, applied by the post-emergence method

| Active compound(s) | Application rate [g of a.i./ha] | Herbicidal action 21 DAT [%] against *Bidens pilosa* |
|---|---|---|
| (B7.4) Glufosinate (CAS 77182-82-2) | 450 | 90 |
|  | 50 | 30 |
| A1 | 15 | 35 |
| A1 + | 15 + 450 | $E^A = 100$ ($E^C = 94$) Δ 6 |
| (B7.4) Glufosinate (CAS 77182-82-2) | 15 + 50 | $E^A = 75$ ($E^C = 55$) Δ 20 |

| Active compound(s) | Application rate [g of a.i./ha] | Herbicidal action 21 DAT [%] against *Brachiaria platyphylla* |
|---|---|---|
| (B7.4) Glufosinate (CAS 77182-82-2) | 150 | 70 |
| A1 | 1.7 | 50 |
| A1 + (B7.4) Glufosinate (CAS 77182-82-2) | 1.7 + 150 | $E^A = 95$ ($E^C = 85$) Δ 10 |

| Active compound(s) | Application rate [g of a.i./ha] | Herbicidal action 21 DAT [%] against *Digitaria sanguinalis* |
|---|---|---|
| (B7.4) Glufosinate (CAS 77182-82-2) | 450 | 85 |
| A1 | 1.7 | 20 |
| A1 + (B7.4) Glufosinate (CAS 77182-82-2) | 1.7 + 450 | $E^A = 98$ ($E^C = 88$) Δ 10 |

| Active compound(s) | Application rate [g of a.i./ha] | Herbicidal action 21 DAT [%] against *Eleusine indica* |
|---|---|---|
| (B7.4) Glufosinate (CAS 77182-82-2) | 450 | 60 |
|  | 150 | 40 |
| A1 | 1.7 | 20 |
| A1 + | 1.7 + 450 | $E^A = 80$ ($E^C = 68$) Δ 12 |
| (B7.4) Glufosinate (CAS 77182-82-2) | 1.7 + 150 | $E^A = 70$ ($E^C = 52$) Δ 18 |

| Active compound(s) | Application rate [g of a.i./ha] | Herbicidal action 21 DAT [%] against *Kochia scoparia* |
|---|---|---|
| (B7.4) Glufosinate (CAS 77182-82-2) | 450 | 80 |
| A1 | 15 | 45 |
|  | 5 | 20 |
| A1 + | 15 + 450 | $E^A = 100$ ($E^C = 89$) Δ 11 |
| (B7.4) Glufosinate (CAS 77182-82-2) | 5 + 450 | $E^A = 100$ ($E^C = 84$) Δ 16 |

| Active compound(s) | Application rate [g of a.i./ha] | Herbicidal action 21 DAT [%] against *Polygonum convolvulus* |
|---|---|---|
| (B7.4) Glufosinate (CAS 77182-82-2) | 150 | 20 |
|  | 50 | 10 |
| A1 | 45 | 85 |
|  | 5 | 85 |
| A1 + | 45 + 150 | $E^A = 99$ ($E^C = 88$) Δ 11 |
| (B7.4) Glufosinate | 45 + 50 | $E^A = 93$ ($E^C = 87$) Δ 6 |
| (CAS 77182-82-2) | 5 + 50 | $E^A = 93$ ($E^C = 87$) Δ 6 |

| Active compound(s) | Application rate [g of a.i./ha] | Herbicidal action 21 DAT [%] against *Amaranthus palmeri* |
|---|---|---|
| (B7.4) Glufosinate (CAS 77182-82-2) | 50 | 50 |
| A2 | 5 | 45 |

TABLE 3.6-continued

Synergistic effect (Δ) for herbicidal binary compositions comprising herbicides from group B7, applied by the post-emergence method

| Active compound(s) | Application rate [g of a.i./ha] | Herbicidal action 21 DAT [%] |
|---|---|---|
| A2 + (B7.4) Glufosinate (CAS 77182-82-2) | 5 + 50 | $E^A = 90$ ($E^C = 73$) Δ 17 |

| Active compound(s) | Application rate [g of a.i./ha] | Herbicidal action 21 DAT [%] against *Bidens pilosa* |
|---|---|---|
| (B7.4) Glufosinate (CAS 77182-82-2) | 450 | 75 |
| A2 | 45 | 70 |
|  | 15 | 50 |
|  | 5 | 45 |
| A2 + (B7.4) Glufosinate (CAS 77182-82-2) | 45 + 450 | $E^A = 100$ ($E^C = 93$) Δ 7 |
|  | 15 + 450 | $E^A = 95$ ($E^C = 88$) Δ 7 |
|  | 5 + 450 | $E^A = 95$ ($E^C = 86$) Δ 9 |

| Active compound(s) | Application rate [g of a.i./ha] | Herbicidal action 21 DAT [%] against *Eleusine indica* |
|---|---|---|
| (B7.4) Glufosinate (CAS 77182-82-2) | 150 | 35 |
| A2 | 1.7 | 10 |
| A2 + (B7.4) Glufosinate (CAS 77182-82-2) | 1.7 + 150 | $E^A = 65$ ($E^C = 42$) Δ 23 |

| Active compound(s) | Application rate [g of a.i./ha] | Herbicidal action 21 DAT [%] against *Kochia scoparia* |
|---|---|---|
| (B7.4) Glufosinate (CAS 77182-82-2) | 50 | 20 |
| A2 | 5 | 40 |
| A2 + (B7.4) Glufosinate (CAS 77182-82-2) | 5 + 50 | $E^A = 70$ ($E^C = 52$) Δ 18 |

| Active compound(s) | Application rate [g of a.i./ha] | Herbicidal action 21 DAT [%] against *Setaria viridis* |
|---|---|---|
| (B7.4) Glufosinate (CAS 77182-82-2) | 50 | 40 |
| A2 | 1.7 | 10 |
| A2 + (B7.4) Glufosinate (CAS 77182-82-2) | 1.7 + 50 | $E^A = 65$ ($E^C = 46$) Δ 19 |

| Active compound(s) | Application rate [g of a.i./ha] | Herbicidal action 21 DAT [%] against *Digitaria sanguinalis* |
|---|---|---|
| (B7.4) Glufosinate- (CAS 77182-82-2) | 120 | 30 |
|  | 40 | 10 |
| A3 | 1.7 | 10 |
| A3 + (B7.4) Glufosinate- (CAS 77182-82-2) | 1.7 + 120 | $E^A = 75$ ($E^C = 37$) Δ 38 |
|  | 1.7 + 40 | $E^A = 45$ ($E^C = 19$) Δ 26 |

| Active compound(s) | Application rate [g of a.i./ha] | Herbicidal action 21 DAT [%] against *Bidens pilosa* |
|---|---|---|
| (B7.4) Glufosinate- (CAS 77182-82-2) | 360 | 70 |
| A3 | 5 | 10 |
|  | 1.7 | 10 |
| A3 + (B7.4) Glufosinate- (CAS 77182-82-2) | 5 + 360 | $E^A = 100$ ($E^C = 73$) Δ 27 |
|  | 1.7 + 360 | $E^A = 99$ ($E^C = 73$) Δ 26 |

| Active compound(s) | Application rate [g of a.i./ha] | Herbicidal action 21 DAT [%] against *Amaranthus palmeri* (res.) |
|---|---|---|
| (B7.4) Glufosinate (CAS 77182-82-2) | 150 | 70 |
| A4 | 5 | 10 |
| A4 + (7.4) Glufosinate (CAS 77182-82-2) | 5 + 150 | $E^A = 100$ ($E^C = 73$) Δ 27 |

| Active compound(s) | Application rate [g of a.i./ha] | Herbicidal action 21 DAT [%] against *Bidens pilosa* |
|---|---|---|
| (B7.4) Glufosinate (CAS 77182-82-2) | 450 | 75 |
|  | 150 | 75 |
| A4 | 45 | 30 |
|  | 15 | 10 |
|  | 5 | 10 |
| A4 + (B7.4) Glufosinate (CAS 77182-82-2) | 45 + 450 | $E^A = 100$ ($E^C = 83$) Δ 17 |
|  | 15 + 450 | $E^A = 100$ ($E^C = 78$) Δ 22 |
|  | 5 + 450 | $E^A = 100$ ($E^C = 78$) Δ 22 |
|  | 15 + 150 | $E^A = 100$ ($E^C = 78$) Δ 22 |
|  | 5 + 150 | $E^A = 98$ ($E^C = 78$) Δ 20 |

| Active compound(s) | Application rate [g of a.i./ha] | Herbicidal action 21 DAT [%] against *Echinochloa crus-galli* |
|---|---|---|
| (B7.4) Glufosinate (CAS 77182-82-2) | 150 | 65 |
| A4 | 5 | 10 |
| A4 + (B7.4) Glufosinate (CAS 77182-82-2) | 5 + 150 | $E^A = 95$ ($E^C = 69$) Δ 26 |

| Active compound(s) | Application rate [g of a.i./ha] | Herbicidal action 21 DAT [%] against *Eleusine indica* |
|---|---|---|
| (B7.4) Glufosinate (CAS 77182-82-2) | 150 | 35 |
|  | 50 | 15 |
| A4 | 1.7 | 20 |
| A4 + (B7.4) Glufosinate (CAS 77182-82-2) | 1.7 + 150 | $E^A = 85$ ($E^C = 48$) Δ 37 |
|  | 1.7 + 50 | $E^A = 60$ ($E^C = 32$) Δ 28 |

| Active compound(s) | Application rate [g of a.i./ha] | Herbicidal action 21 DAT [%] against *Kochia scoparia* |
|---|---|---|
| (B7.4) Glufosinate (CAS 77182-82-2) | 50 | 20 |
| A4 | 15 | 10 |
|  | 5 | 10 |
| A4 + (B7.4) Glufosinate (CAS 77182-82-2) | 15 + 50 | $E^A = 60$ ($E^C = 28$) Δ 32 |
|  | 5 + 50 | $E^A = 50$ ($E^C = 28$) Δ 22 |

| Active compound(s) | Application rate [g of a.i./ha] | Herbicidal action 21 DAT [%] against *Pharbitis purpurea* |
|---|---|---|
| (B7.4) Glufosinate (CAS 77182-82-2) | 50 | 20 |
| A4 | 15 | 60 |
| A4 + (B7.4) Glufosinate (CAS 77182-82-2) | 15 + 50 | $E^A = 85$ ($E^C = 68$) Δ 17 |

| Active compound(s) | Application rate [g of a.i./ha] | Herbicidal action 21 DAT [%] against *Setaria viridis* |
|---|---|---|

TABLE 3.6-continued

Synergistic effect (Δ) for herbicidal binary compositions comprising herbicides from group B7, applied by the post-emergence method

| Active compound(s) | Application rate [g of a.i./ha] | Herbicidal action |
|---|---|---|
| (B7.4) Glufosinate (CAS 77182-82-2) | 50 | 40 |
| A4 | 15 | 60 |
|  | 5 | 20 |
| A4 + (B7.4) Glufosinate (CAS 77182-82-2) | 15 + 50 | $E^A = 100$ ($E^C = 76$) Δ 24 |
|  | 5 + 50 | $E^A = 70$ ($E^C = 52$) Δ 18 |

| Active compound(s) | Application rate [g of a.i./ha] | Herbicidal action in [%] 14 DAT against *Bromus sterilis* |
|---|---|---|
| A5 | 16 | 80 |
|  | 4 | 75 |
| (7.4) Glufosinate (CAS 77182-82-2) | 50 | 0 |
| A5. + (7.4) Glufosinate CAS 77182-82-2) | 16 + 50 | $E^A = 85$ ($E^C = 80$) Δ = 5 |
|  | 4 + 50 | $E^A = 85$ ($E^C = 75$) Δ = 10 |

| Active compound(s) | Application rate [g of a.i./ha] | Herbicidal action in [%] 14 DAT against *Centaurea cyanus* |
|---|---|---|
| A5 | 1 | 20 |
| (7.4) Glufosinate (CAS 77182-82-2) | 50 | 30 |
| A5 + (7.4) Glufosinate (CAS 77182-82-2) | 1 + 50 | $E^A = 50$ ($E^C = 44$) Δ = 6 |

| Active compound(s) | Application rate [g of a.i./ha] | Herbicidal action in [%] 28 DAT against *Centaurea cyanus* |
|---|---|---|
| A5 | 16 | 75 |
| (7.4) Glufosinate (CAS 77182-82-2) | 450 | 60 |
| A5 + (7.4) Glufosinate (CAS 77182-82-2) | 16 + 450 | $E^A = 100$ ($E^C = 90$) Δ = 10 |

| Active compound(s) | Application rate [g of a.i./ha] | Herbicidal action in [%] 28 DAT against *Galium aparine* |
|---|---|---|
| A5 | 16 | 70 |
| (7.4) Glufosinate (CAS 77182-82-2) | 50 | 0 |
| A5 + (7.4) Glufosinate (CAS 77182-82-2) | 16 + 50 | $E^A = 85$ ($E^C = 70$) Δ = 15 |

| Active compound(s) | Application rate [g of a.i./ha] | Herbicidal action in [%] 14 DAT against *Lolium rigidum* |
|---|---|---|
| A5 | 1 | 30 |
| (7.4) Glufosinate (CAS 77182-82-2) | 150 | 50 |
| A5 + (7.4) Glufosinate (CAS 77182-82-2) | 1 + 150 | $E^A = 70$ ($E^C = 65$) Δ = 5 |

| Active compound(s) | Application rate [g of a.i./ha] | Herbicidal action in [%] 28 DAT against *Lolium rigidum* |
|---|---|---|
| A5 | 16 | 60 |
| (7.4) Glufosinate (CAS 77182-82-2) | 150 | 30 |
| A5 + (7.4) Glufosinate (CAS 77182-82-2) | 16 + 150 | $E^A = 80$ ($E^C = 72$) Δ = 8 |

TABLE 3.6-continued

Synergistic effect (Δ) for herbicidal binary compositions comprising herbicides from group B7, applied by the post-emergence method

| Active compound(s) | Application rate [g of a.i./ha] | Herbicidal action in [%] 14 DAT against *Lolium rigidum* (resistant biotype) |
|---|---|---|
| A5 | 16 | 70 |
|  | 1 | 30 |
| (7.4) Glufosinate (CAS 77182-82-2) | 150 | 30 |
| A5 + (7.4) Glufosinate (CAS 77182-82-2) | 16 + 150 | $E^A = 85$ ($E^C = 79$) Δ = 6 |
|  | 1 + 150 | $E^A = 60$ ($E^C = 51$) Δ = 9 |

| Active compound(s) | Application rate [g of a.i./ha] | Herbicidal action in [%] 28 DAT against *Lolium rigidum* (resistant biotype) |
|---|---|---|
| A5 | 1 | 20 |
| (7.4) Glufosinate (CAS 77182-82-2) | 450 | 50 |
|  | 150 | 30 |
| A5 + (7.4) Glufosinate (CAS 77182-82-2) | 1 + 450 | $E^A = 70$ ($E^C = 60$) Δ = 10 |
|  | 1 + 150 | $E^A = 50$ ($E^C = 44$) Δ = 6 |

| Active compound(s) | Application rate [g of a.i./ha] | Herbicidal action in [%] 14 DAT against *Matricaria inodora* |
|---|---|---|
| A5 | 1 | 30 |
| (7.4) Glufosinate (CAS 77182-82-2) | 450 | 90 |
| A5 + (7.4) Glufosinate (CAS 77182-82-2) | 1 + 450 | $E^A = 99$ ($E^C = 93$) Δ = 6 |

| Active compound(s) | Application rate [g of a.i./ha] | Herbicidal action in [%] 28 DAT against *Matricaria inodora* |
|---|---|---|
| A5 | 1 | 10 |
| (7.4) Glufosinate (CAS 77182-82-2) | 450 | 85 |
| A5 + (7.4) Glufosinate (CAS 77182-82-2) | 1 + 450 | $E^A = 95$ ($E^C = 87$) Δ = 8 |

| Active compound(s) | Application rate [g of a.i./ha] | Herbicidal action in [%] 14 DAT against *Phalaris minor* |
|---|---|---|
| A5 | 16 | 85 |
|  | 1 | 60 |
| (7.4) Glufosinate (CAS 77182-82-2) | 50 | 0 |
|  | 150 | 30 |
| A5 + (7.4) Glufosinate (CAS 77182-82-2) | 16 + 50 | $E^A = 90$ ($E^C = 85$) Δ = 5 |
|  | 1 + 150 | $E^A = 80$ ($E^C = 72$) Δ = 8 |

| Active compound(s) | Application rate [g of a.i./ha] | Herbicidal action in [%] 28 DAT against *Phalaris minor* |
|---|---|---|
| A5 | 16 | 70 |
| (7.4) Glufosinate (CAS 77182-82-2) | 450 | 30 |
|  | 150 | 10 |
|  | 50 | 0 |
| A5 + (7.4) Glufosinate (CAS 77182-82-2) | 16 + 450 | $E^A = 98$ ($E^C = 79$) Δ = 19 |
|  | 16 + 150 | $E^A = 95$ ($E^C = 73$) Δ = 22 |
|  | 16 + 50 | $E^A = 85$ ($E^C = 70$) Δ = 15 |

| Active compound(s) | Application rate [g of a.i./ha] | Herbicidal action in [%] 14 DAT against *Poa annua* L. |
|---|---|---|
| A5 | 16 | 70 |
|  | 1 | 30 |

TABLE 3.6-continued

Synergistic effect (Δ) for herbicidal binary compositions comprising herbicides from group B7, applied by the post-emergence method

| Active compound(s) | Application rate [g of a.i./ha] | |
|---|---|---|
| (7.4) Glufosinate (CAS 77182-82-2) | 50 450 150 | 10 40 30 |
| A5 + (7.4) Glufosinate (CAS 77182-82-2) | 16 + 50 1 + 450 1 + 150 | $E^A = 85$ ($E^C = 73$) Δ = 12 $E^A = 75$ ($E^C = 58$) Δ = 17 $E^A = 60$ ($E^C = 51$) Δ = 9 |

| Active compound(s) | Application rate [g of a.i./ha] | Herbicidal action in [%] 14 DAT against *Viola tricolor* |
|---|---|---|
| A5 (7.4) Glufosinate (CAS 77182-82-2) | 16 150 | 60 80 |
| A5 + (7.4) Glufosinate (CAS 77182-82-2) | 16 + 150 | $E^A = 98$ ($E^C = 92$) Δ = 6 |

| Active compound(s) | Application rate [g of a.i./ha] | Herbicidal action in [%] 28 DAT against *Viola tricolor* |
|---|---|---|
| A5 (7.4) Glufosinate (CAS 77182-82-2) | 16 4 150 50 450 | 40 40 50 20 60 |
| A5 + (7.4) Glufosinate (CAS 77182-82-2) | 16 + 150 16 + 50 4 + 450 | $E^A = 100$ ($E^C = 70$) Δ = 30 $E^A = 60$ ($E^C = 52$) Δ = 8 $E^A = 85$ ($E^C = 76$) Δ = 9 |

| Active compound(s) | Application rate [g of a.i./ha] | Herbicidal action in [%] 14 DAT against *Bromus sterilis* |
|---|---|---|
| A6 (B7.4) Glufosinate (CAS 77182-82-2) | 16 4 50 | 85 80 0 |
| A6 + (B7.4) Glufosinate (CAS 77182-82-2) | 16 + 50 4 + 50 | $E^A = 90$ ($E^B = 85$) Δ = 5 $E^A = 85$ ($E^B = 80$) Δ = 5 |

| Active compound(s) | Application rate [g of a.i./ha] | Herbicidal action in [%] 28 DAT against *Bromus sterilis* |
|---|---|---|
| A6 (B7.4) Glufosinate (CAS 77182-82-2) | 1 150 | 50 10 |
| A6 + (B7.4) Glufosinate (CAS 77182-82-2) | 1 + 150 | $E^A = 70$ ($E^B = 55$) Δ = 15 |

| Active compound(s) | Application rate [g of a.i./ha] | Herbicidal action in [%] 14 DAT against *Centaurea cyanus* |
|---|---|---|
| A6 (B7.4) Glufosinate (CAS 77182-82-2) | 4 1 150 50 | 85 40 60 30 |
| A6 + (B7.4) Glufosinate (CAS 77182-82-2) | 4 + 150 1 + 50 | $E^A = 99$ ($E^B = 94$) Δ = 5 $E^A = 70$ ($E^B = 58$) Δ = 12 |

| Active compound(s) | Application rate [g of a.i./ha] | Herbicidal action in [%] 28 DAT against *Centaurea cyanus* |
|---|---|---|
| A6 (B7.4) Glufosinate (CAS 77182-82-2) | 4 150 | 70 30 |
| A6 + (B7.4) Glufosinate (CAS 77182-82-2) | 4 + 150 | $E^A = 85$ ($E^B = 79$) Δ = 6 |

| Active compound(s) | Application rate [g of a.i./ha] | Herbicidal action in [%] 28 DAT against *Lolium rigidum* (resistant biotype) |
|---|---|---|
| A6 (B7.4) Glufosinate (CAS 77182-82-2) | 16 150 50 | 70 30 10 |
| A6 + (B7.4) Glufosinate (CAS 77182-82-2) | 16 + 150 16 + 50 | $E^A = 95$ ($E^B = 79$) Δ = 16 $E^A = 85$ ($E^B = 73$) Δ = 12 |

| Active compound(s) | Application rate [g of a.i./ha] | Herbicidal action in [%] 28 DAT against *Phalaris minor* |
|---|---|---|
| A6 (B7.4) Glufosinate (CAS 77182-82-2) | 16 450 150 | 90 30 10 |
| A6 + (B7.4) Glufosinate (CAS 77182-82-2) | 16 + 450 16 + 150 | $E^A = 98$ ($E^B = 93$) Δ = 5 $E^A = 98$ ($E^B = 91$) Δ = 7 |

| Active compound(s) | Application rate [g of a.i./ha] | Herbicidal action in [%] 28 DAT against *Poa annua* L. |
|---|---|---|
| A6 (B7.4) Glufosinate (CAS 77182-82-2) | 16 150 50 | 70 30 20 |
| A6 + (B7.4) Glufosinate (CAS 77182-82-2) | 16 + 150 16 + 50 | $E^A = 95$ ($E^B = 79$) Δ = 16 $E^A = 85$ ($E^B = 76$) Δ = 9 |

| Active compound(s) | Application rate [g of a.i./ha] | Herbicidal action in [%] 28 DAT against *Viola tricolor* |
|---|---|---|
| A6 (B7.4) Glufosinate (CAS 77182-82-2) | 16 4 450 50 | 60 50 60 20 |
| A6 + (B7.4) Glufosinate (CAS 77182-82-2) | 16 + 450 16 + 50 4 + 450 | $E^A = 100$ ($E^B = 84$) Δ = 16 $E^A = 75$ ($E^B = 68$) Δ = 7 $E^A = 95$ ($E^B = 80$) Δ = 15 |

| Active compound(s) (Z20) | Application rate [g of a.i./ha] | Herbicidal action 21 DAT [%] against *Amaranthus palmeri* (res.) |
|---|---|---|
| (B7.5) Glyphosate (CAS 38641-94-0) A1 | 50 15 5 | 60 10 10 |
| A1 + (B7.5) Glyphosate (CAS 38641-94-0) | 15 + 50 5 + 50 | $E^A = 85$ ($E^C = 64$) Δ 21 $E^A = 80$ ($E^C = 64$) Δ 16 |

| Active compound(s) (Z20) | Application rate [g of a.i./ha] | Herbicidal action 21 DAT [%] against *Bidens pilosa* |
|---|---|---|
| (B7.5) Glyphosate (CAS 38641-94-0) A1 | 150 15 | 75 35 |
| A1 + (B7.5) Glyphosate (CAS 38641-94-0) | 15 + 150 | $E^A = 90$ ($E^C = 84$) Δ 6 |

| Active compound(s) (Z20) | Application rate [g of a.i./ha] | Herbicidal action 21 DAT [%] against *Digitaria sanguinalis* |
|---|---|---|
| (B7.5) Glyphosate (CAS 38641-94-0) A1 | 50 1.7 | 80 20 |

TABLE 3.6-continued

Synergistic effect (Δ) for herbicidal binary compositions comprising herbicides from group B7, applied by the post-emergence method

| | | |
|---|---|---|
| A1 + (B7.5) Glyphosate (CAS 38641-94-0) | 1.7 + 50 | $E^A = 95$ ($E^C = 84$) Δ 11 |

| Active compound(s) (Z20) | Application rate [g of a.i./ha] | Herbicidal action 21 DAT [%] against Kochia scoparia |
|---|---|---|
| (B7.5) Glyphosate (CAS 38641-94-0) | 450<br>150 | 25<br>20 |
| A1 | 45<br>15<br>5 | 70<br>45<br>20 |
| A1 + (B7.5) Glyphosate (CAS 38641-94-0) | 45 + 450<br>15 + 450<br>5 + 450<br>15 + 150<br>5 + 150 | $E^A = 85$ ($E^C = 78$) Δ 7<br>$E^A = 85$ ($E^C = 59$) Δ 26<br>$E^A = 65$ ($E^C = 40$) Δ 25<br>$E^A = 65$ ($E^C = 56$) Δ 9<br>$E^A = 45$ ($E^C = 36$) Δ 9 |

| Active compound(s) (Z20) | Application rate [g of a.i./ha] | Herbicidal action 21 DAT [%] against Polygonum convolvulus |
|---|---|---|
| (B7.5) Glyphosate (CAS 38641-94-0) | 50 | 10 |
| A1 | 45<br>15<br>5 | 85<br>85<br>85 |
| A1 + (B7.5) Glyphosate (CAS 38641-94-0) | 45 + 50<br>15 + 50<br>5 + 50 | $E^A = 93$ ($E^C = 87$) Δ 6<br>$E^A = 93$ ($E^C = 87$) Δ 6<br>$E^A = 93$ ($E^C = 87$) Δ 6 |

| Active compound(s) (Z20) | Application rate [g of a.i./ha] | Herbicidal action 21 DAT [%] against Sorghum halepense |
|---|---|---|
| (B7.5) Glyphosate (CAS 38641-94-0) | 450<br>150<br>50 | 85<br>70<br>30 |
| A1 | 15<br>5<br>1.7 | 35<br>20<br>10 |
| A1 + (B7.5) Glyphosate (CAS 38641-94-0) | 15 + 450<br>15 + 150<br>5 + 150<br>1.7 + 150<br>15 + 50<br>1.7 + 50 | $E^A = 99$ ($E^C = 90$) Δ 9<br>$E^A = 93$ ($E^C = 81$) Δ 12<br>$E^A = 95$ ($E^C = 76$) Δ 19<br>$E^A = 90$ ($E^C = 73$) Δ 17<br>$E^A = 95$ ($E^C = 55$) Δ 40<br>$E^A = 45$ ($E^C = 37$) Δ 8 |

| Active compound(s) (Z49) | Application rate [g of a.i./ha] | Herbicidal action 21 DAT [%] against Bidens pilosa |
|---|---|---|
| (B7.5) Glyphosate (CAS 38641-94-0) | 450 | 85 |
| A2 | 15<br>5 | 50<br>45 |
| A2 + (B7.5) Glyphosate (CAS 38641-94-0) | 15 + 450<br>5 + 450 | $E^A = 100$ ($E^C = 93$) Δ 7<br>$E^A = 98$ $E^C = 92$) Δ 6 |

| Active compound(s) (Z49) | Application rate [g of a.i./ha] | Herbicidal action 21 DAT [%] against Echinochloa crus-galli |
|---|---|---|
| (B7.5) Glyphosate (CAS 38641-94-0) | 50 | 45 |
| A2 | 15 | 80 |
| A2 + (B7.5) Glyphosate (CAS 38641-94-0) | 15 + 50 | $E^A = 95$ ($E^C = 89$) Δ 6 |

| Active compound(s) (Z49) | Application rate [g of a.i./ha] | Herbicidal action 21 DAT [%] against Kochia scoparia |
|---|---|---|
| (B7.5) Glyphosate (CAS 38641-94-0) | 50 | 35 |
| A2 | 5 | 40 |
| A2 + (B7.5) Glyphosate (CAS 38641-94-0) | 5 + 50 | $E^A = 75$ ($E^C = 61$) Δ 14 |

| Active compound(s) (Z78) | Application rate [g of a.i./ha] | Herbicidal action 45 DAT [%] against Ipomoea ssp. |
|---|---|---|
| (B7.5) Glyphosate (CAS 39600-42-5) | 720 | 0 |
| A3 | 50 | 40 |
| A3 + (B7.5) Glyphosate (CAS 39600-42-5) | 50 + 720 | $E^A = 50$ ($E^C = 40$) Δ 10 |

| Active compound(s) (Z78) | Application rate [g of a.i./ha] | Herbicidal action 45 DAT [%] against Ipomoea ssp. |
|---|---|---|
| (B7.5) Glyphosate (CAS 39600-42-5) | 1440 | 0 |
| A3 | 100 | 50 |
| A3 + (B7.5) Glyphosate (CAS 39600-42-5) | 100 + 1440 | $E^A = 70$ ($E^C = 50$) Δ 20 |

| Active compound(s) (Z78) | Application rate [g of a.i./ha] | Herbicidal action 16 DAT [%] against Amaranthus palmeri |
|---|---|---|
| (B7.5) Glyphosate (CAS 39600-42-5) | 1440 | 2 |
| A3 | 100 | 45 |
| A3 + (B7.5) Glyphosate (CAS 39600-42-5) | 100 + 1440 | $E^A = 73$ ($E^C = 46$) Δ 27 |

| Active compound(s) (Z78) | Application rate [g of a.i./ha] | Herbicidal action 16 DAT [%] against Amaranthus palmeri |
|---|---|---|
| (B7.5) Glyphosate (CAS 39600-42-5) | 1440 | 2 |
| A3 | 50 | 35 |
| A3 + (B7.5) Glyphosate (CAS 39600-42-5) | 50 + 1440 | $E^A = 52$ ($E^C = 36$) Δ 17 |

| Active compound(s) (Z78) | Application rate [g of a.i./ha] | Herbicidal action 45 DAT [%] against Lysimachia nummularia |
|---|---|---|
| (B7.5) Glyphosate (CAS 39600-42-5) | 720 | 7 |
| A3 | 100 | 18 |
| A3 + (B7.5) Glyphosate (CAS 39600-42-5) | 100 + 720 | $E^A = 63$ ($E^C = 24$) Δ 39 |

| Active compound(s) (Z78) | Application rate [g of a.i./ha] | Herbicidal action 42 DAT [%] against Malva pusilia |
|---|---|---|
| (B7.5) Glyphosate (CAS 39600-42-5) | 720 | 0 |
| A3 | 100 | 50 |
| A3 + (B7.5) Glyphosate (CAS 39600-42-5) | 100 + 720 | $E^A = 63$ ($E^C = 50$) Δ 13 |

| Active compound(s) (Z78) | Application rate [g of a.i./ha] | Herbicidal action in [%] 14 DAT against Alopecurus myosuroides |
|---|---|---|

TABLE 3.6-continued

Synergistic effect (Δ) for herbicidal binary compositions comprising herbicides from group B7, applied by the post-emergence method

| Active compound(s) (Z78) | Application rate [g of a.i./ha] | Herbicidal action in [%] |
|---|---|---|
| A3 | 4 | 75 |
|  | 1 | 30 |
| (B7.5) Glyphosate (CAS 38641-94-0) | 50 | 30 |
| A3 + (B7.5) Glyphosate (CAS 38641-94-0) | 4 + 50 | $E^A = 90$ ($E^C = 83$) Δ = 7 |
|  | 1 + 50 | $E^A = 75$ ($E^C = 51$) Δ = 24 |

| Active compound(s) (Z78) | Application rate [g of a.i./ha] | Herbicidal action in [%] 28 DAT against *Alopecurus myosuroides* |
|---|---|---|
| A3 | 4 | 60 |
|  | 1 | 10 |
| (B7.5) Glyphosate (CAS 38641-94-0) | 450 | 60 |
|  | 150 | 30 |
|  | 50 | 10 |
| A3 + (B7.5) Glyphosate (CAS 38641-94-0) | 4 + 450 | $E^A = 98$ ($E^C = 84$) Δ = 14 |
|  | 4 + 150 | $E^A = 95$ ($E^C = 72$) Δ = 23 |
|  | 4 + 50 | $E^A = 85$ ($E^C = 64$) Δ = 21 |
|  | 1 + 450 | $E^A = 70$ ($E^C = 64$) Δ = 6 |
|  | 1 + 50 | $E^A = 50$ ($E^c = 19$) Δ = 31 |

| Active compound(s) (Z78) | Application rate [g of a.i./ha] | Herbicidal action in [%] 14 DAT against *Bromus sterilis* |
|---|---|---|
| A3 | 1 | 30 |
| (B7.5) Glyphosate (CAS 38641-94-0) | 50 | 30 |
| A3 + (B7.5) Glyphosate (CAS 38641-94-0) | 1 + 50 | $E^A = 80$ ($E^C = 51$) Δ = 29 |

| Active compound(s) (Z78) | Application rate [g of a.i./ha] | Herbicidal action in [%] 14 DAT against *Lolium rigidum* |
|---|---|---|
| A3 | 1 | 40 |
| (B7.5) Glyphosate (CAS 38641-94-0) | 50 | 40 |
| A3 + (B7.5) Glyphosate (CAS 38641-94-0) | 1 + 50 | $E^A = 80$ ($E^C = 64$) Δ = 16 |

| Active compound(s) (Z78) | Application rate [g of a.i./ha] | Herbicidal action in [%] 28 DAT against *Lolium rigidum* |
|---|---|---|
| A3 | 4 | 70 |
|  | 1 | 10 |
| (B7.5) Glyphosate (CAS 38641-94-0) | 50 | 30 |
| A3 + (B7.5) Glyphosate (CAS 38641-94-0) | 4 + 50 | $E^A = 85$ ($E^C = 79$) Δ = 6 |
|  | 1 + 50 | $E^A = 60$ ($E^C = 37$) Δ = 23 |

| Active compound(s) (Z78) | Application rate [g of a.i./ha] | Herbicidal action in [%] 14 DAT against *Matricaria inodora* |
|---|---|---|
| A3 | 1 | 0 |
| (B7.5) Glyphosate (CAS 38641-94-0) | 50 | 50 |
| A3 + (B7.5) Glyphosate (CAS 38641-94-0) | 1 + 50 | $E^A = 60$ ($E^C = 50$) Δ = 10 |

| Active compound(s) (Z78) | Application rate [g of a.i./ha] | Herbicidal action in [%] 28 DAT against *Matricaria inodora* |
|---|---|---|
| A3 | 1 | 0 |
| (B7.5) Glyphosate (CAS 38641-94-0) | 450 | 80 |

| Active compound(s) (Z78) | Application rate [g of a.i./ha] | Herbicidal action in [%] |
|---|---|---|
| A3 + (B7.5) Glyphosate (CAS 38641-94-0) | 1 + 450 | $E^A = 85$ ($E^C = 80$) Δ = 5 |

| Active compound(s) (Z78) | Application rate [g of a.i./ha] | Herbicidal action in [%] 14 DAT against *Phalaris minor* |
|---|---|---|
| A3 | 16 | 85 |
|  | 4 | 85 |
|  | 1 | 20 |
| (B7.5) Glyphosate (CAS 38641-94-0) | 50 | 30 |
|  | 450 | 80 |
| A3 + (B7.5) Glyphosate (CAS 38641-94-0) | 16 + 50 | $E^A = 98$ ($E^C = 90$) Δ = 8 |
|  | 4 + 50 | $E^A = 95$ ($E^C = 90$) Δ = 5 |
|  | 1 + 450 | $E^A = 90$ ($E^C = 84$) Δ = 6 |
|  | 1 + 50 | $E^a = 85$ ($E^C = 44$) Δ = 41 |

| Active compound(s) (Z78) | Application rate [g of a.i./ha] | Herbicidal action in [%] 28 DAT against *Phalaris minor* |
|---|---|---|
| A3 | 16 | 85 |
|  | 4 | 85 |
|  | 1 | 10 |
| (B7.5) Glyphosate (CAS 38641-94-0) | 450 | 30 |
|  | 150 | 0 |
|  | 50 | 0 |
| A3 + (B7.5) Glyphosate (CAS 38641-94-0) | 16 + 450 | $E^A = 100$ ($E^C = 90$) Δ = 10 |
|  | 16 + 150 | $E^A = 98$ ($E^C = 85$) Δ = 13 |
|  | 16 + 50 | $E^A = 98$ ($E^C = 85$) Δ = 13 |
|  | 4 + 50 | $E^A = 95$ ($E^C = 85$) Δ = 10 |
|  | 1 + 450 | $E^A = 70$ ($E^C = 37$) Δ = 33 |
|  | 1 + 150 | $E^A = 50$ ($E^C = 10$) Δ = 40 |
|  | 1 + 50 | $E^A = 40$ ($E^C = 10$) Δ = 30 |

| Active compound(s) (Z78) | Application rate [g of a.i./ha] | Herbicidal action in [%] 14 DAT against *Poa annua* L. |
|---|---|---|
| A3 | 4 | 85 |
|  | 1 | 50 |
| (B7.5) Glyphosate (CAS 38641-94-0) | 50 | 20 |
| A3 + (B7.5) Glyphosate (CAS 38641-94-0) | 4 + 50 | $E^A = 95$ ($E^C = 88$) Δ = 7 |
|  | 1 + 50 | $E^A = 80$ ($E^C = 60$) Δ = 20 |

| Active compound(s) (Z78) | Application rate [g of a.i./ha] | Herbicidal action in [%] 28 DAT against *Poa annua* L. |
|---|---|---|
| A3 | 16 | 85 |
|  | 4 | 80 |
|  | 1 | 20 |
|  | 50 | 0 |
| (B7.5) Glyphosate (CAS 38641-94-0) | 150 | 60 |
|  | 450 | 60 |
| A3 + (B7.5) Glyphosate (CAS 38641-94-0) | 16 + 50 | $E^A = 98$ ($E^C = 85$) Δ = 13 |
|  | 4 + 150 | $E^A = 98$ ($E^C = 92$) Δ = 6 |
|  | 4 + 50 | $E^A = 98$ ($E^C = 80$) Δ = 18 |
|  | 1 + 450 | $E^A = 93$ ($E^C = 68$) Δ = 25 |
|  | 1 + 50 | $E^A = 60$ ($E^C = 20$) Δ = 40 |

| Active compound(s) (Z78) | Application rate [g of a.i./ha] | Herbicidal action in [%] 28 DAT against *Veronica hederifolia* |
|---|---|---|
| A3 | 1 | 30 |
| (B7.5) Glyphosate (CAS 38641-94-0) | 450 | 90 |
| A3 + (B7.5) Glyphosate (CAS 38641-94-0) | 1 + 450 | $E^A = 98$ ($E^C = 93$) Δ = 5 |

TABLE 3.6-continued

Synergistic effect (Δ) for herbicidal binary compositions comprising herbicides from group B7, applied by the post-emergence method

| Active compound(s) (Z107) | Application rate [g of a.i./ha] | Herbicidal action 21 DAT [%] against *Bidens pilosa* |
|---|---|---|
| (B7.5) Glyphosate (CAS 38641-94-0) | 450 | 85 |
| A4 | 5 | 10 |
| A4 + (B7.5) Glyphosate (CAS 38641-94-0) | 5 + 450 | $E^A = 100$ ($E^C = 87$) Δ 13 |

| Active compound(s) (Z107) | Application rate [g of a.i./ha] | Herbicidal action 21 DAT [%] against *Kochia scoparia* |
|---|---|---|
| (B7.5) Glyphosate (CAS 38641-94-0) | 450 | 80 |
| A4 | 5 | 10 |
| A4 + (B7.5) Glyphosate (CAS 38641-94-0) | 5 + 450 | $E^A = 99$ ($E^C = 82$) Δ 17 |

| Active compound(s) (Z136) | Application rate [g of a.i./ha] | Herbicidal action in [%] 28 DAT against *Bromus sterilis* |
|---|---|---|
| A5 | 1 | 30 |
| (B7.5) Glyphosate (CAS 38641-94-0) | 150 | 40 |
| A5 + (B7.5) Glyphosate (CAS 38641-94-0) | 1 + 150 | $E^A = 70$ ($E^C = 58$) Δ = 12 |

| Active compound(s) (Z136) | Application rate [g of a.i./ha] | Herbicidal action in [%] 14 DAT against *Centaurea cyanus* |
|---|---|---|
| A5 | 1 | 20 |
| (B7.5) Glyphosate (CAS 38641-94-0) | 150 | 60 |
|  | 50 | 30 |
| A5 + (B7.5) Glyphosate (CAS 38641-94-0) | 1 + 150 | $E^A = 85$ ($E^C = 68$) Δ = 17 |
|  | 1 + 50 | $E^A = 50$ ($E^C = 44$) Δ = 6 |

| Active compound(s) (Z136) | Application rate [g of a.i./ha] | Herbicidal action in [%] 28 DAT against *Galium aparine* |
|---|---|---|
| A5 | 1 | 50 |
| (CAS 38641-94-0) | 150 | 40 |
| A5 + (B7.5) Glyphosate (CAS 38641-94-0) | 1 + 150 | $E^A = 75$ ($E^C = 70$) Δ = 5 |

| Active compound(s) (Z136) | Application rate [g of a.i./ha] | Herbicidal action in [%] 14 DAT against *Lamium purpureum* L. |
|---|---|---|
| A5 | 1 | 60 |
| (B7.5) Glyphosate (CAS 38641-94-0) | 50 | 50 |
| A5 + (B7.5) Glyphosate (CAS 38641-94-0) | 1 + 50 | $E^A = 85$ ($E^C = 80$) Δ = 5 |

| Active compound(s) (Z136) | Application rate [g of a.i./ha] | Herbicidal action in [%] 28 DAT against *Lamium purpureum* L. |
|---|---|---|
| A5 | 1 | 40 |
| (B7.5) Glyphosate (CAS 38641-94-0) | 450 | 75 |
|  | 150 | 40 |
|  | 50 | 30 |
| A5 + (B7.5) Glyphosate (CAS 38641-94-0) | 1 + 450 | $E^A = 90$ ($E^C = 85$) Δ = 5 |
|  | 1 + 150 | $E^A = 85$ ($E^C = 64$) Δ = 21 |
|  | 1 + 50 | $E^A = 70$ ($E^C = 58$) Δ = 12 |

| Active compound(s) (Z136) | Application rate [g of a.i./ha] | Herbicidal action in [%] 28 DAT against *Lolium rigidum* |
|---|---|---|
| A5 | 1 | 30 |
| (B7.5) Glyphosate (CAS 38641-94-0) | 150 | 60 |
| A5 + (B7.5) Glyphosate (CAS 38641-94-0) | 1 + 150 | $E^A = 80$ ($E^C = 72$) Δ = 8 |

| Active compound(s) (Z136) | Application rate [g of a.i./ha] | Herbicidal action in [%] 14 DAT against *Lolium rigidum* (resistant biotype) |
|---|---|---|
| A5 | 16 | 70 |
| (B7.5) Glyphosate (CAS 38641-94-0) | 50 | 20 |
| A5 + (B7.5) Glyphosate (CAS 38641-94-0) | 16 + 50 | $E^A = 85$ ($E^C = 76$) Δ = 9 |

| Active compound(s) (Z136) | Application rate [g of a.i./ha] | Herbicidal action in [%] 28 DAT against *Phalaris minor* |
|---|---|---|
| A5 | 1 | 30 |
| (B7.5) Glyphosate (CAS 38641-94-0) | 150 | 85 |
| A5 + (B7.5) Glyphosate (CAS 38641-94-0) | 1 + 150 | $E^A = 98$ ($E^C = 90$) Δ = 8 |

| Active compound(s) (Z136) | Application rate [g of a.i./ha] | Herbicidal action in [%] 28 DAT against *Poa annua* L. |
|---|---|---|
| A5 | 1 | 20 |
| (B7.5) Glyphosate (CAS 38641-94-0) | 150 | 50 |
|  | 50 | 30 |
| A5 + (B7.5) Glyphosate (CAS 38641-94-0) | 1 + 150 | $E^A = 70$ ($E^C = 60$) Δ = 10 |
|  | 1 + 50 | $E^A = 50$ ($E^C = 44$) Δ = 6 |

| Active compound(s) (Z165) | Application rate [g of a.i./ha] | Herbicidal action in [%] 28 DAT against *Bromus sterilis* |
|---|---|---|
| A6 | 1 | 50 |
| (B7.5) Glyphosate (CAS 38641-94-0) | 150 | 40 |
| A6 + (B7.5) Glyphosate | 1 + 150 | $E^A = 80$ ($E^B = 70$) Δ = 10 |

| Active compound(s) (Z165) | Application rate [g of a.i./ha] | Herbicidal action in [%] 14 DAT against *Centaurea cyanus* |
|---|---|---|
| A6 | 1 | 40 |
| (B7.5) Glyphosate (CAS 38641-94-0) | 150 | 60 |
|  | 50 | 30 |
| A6 + (B7.5) Glyphosate (CAS 38641-94-0) | 1 + 150 | $E^A = 95$ ($E^B = 76$) Δ = 19 |
|  | 1 + 50 | $E^A = 70$ ($E^B = 58$) Δ = 12 |

| Active compound(s) (Z165) | Application rate [g of a.i./ha] | Herbicidal action in [%] 28 DAT against *Centaurea cyanus* |
|---|---|---|
| A6 | 4 | 70 |
|  | 1 | 40 |
| (B7.5) Glyphosate (CAS 38641-94-0) | 50 | 30 |
|  | 450 | 85 |
|  | 150 | 60 |
| A6 + | 4 + 50 | $E^A = 90$ ($E^B = 79$) Δ = 11 |

TABLE 3.6-continued

Synergistic effect (Δ) for herbicidal binary compositions comprising herbicides from group B7, applied by the post-emergence method

| | | |
|---|---|---|
| (B7.5) Glyphosate (CAS 38641-94-0) | 1 + 450 | $E^A = 98$ ($E^B = 91$) Δ = 7 |
| | 1 + 150 | $E^A = 95$ ($E^B = 76$) Δ = 19 |
| | 1 + 50 | $E^A = 70$ ($E^B = 58$) Δ = 12 |

| Active compound(s) (Z165) | Application rate [g of a.i./ha] | Herbicidal action in [%] 14 DAT against *Lolium rigidum* (resistant biotype) |
|---|---|---|
| A6 | 1 | 50 |
| (B7.5) Glyphosate (CAS 38641-94-0) | 50 | 20 |
| A6 + (B7.5) Glyphosate (CAS 38641-94-0) | 1 + 50 | $E^A = 70$ ($E^B = 60$) Δ = 10 |

| Active compound(s) (Z165) | Application rate [g of a.i./ha] | Herbicidal action in [%] 14 DAT against *Matricaria inodora* |
|---|---|---|
| A6 | 1 | 40 |
| (B7.5) Glyphosate (CAS 38641-94-0) | 50 | 40 |
| A6 + (B7.5) Glyphosate (CAS 38641-94-0) | 1 + 50 | $E^A = 70$ ($E^B = 64$) Δ = 6 |

| Active compound(s) (Z165) | Application rate [g of a.i./ha] | Herbicidal action in [%] 28 DAT against *Phalaris minor* |
|---|---|---|
| A6 | 16 | 90 |
| (B7.5) Glyphosate (CAS 38641-94-0) | 50 | 30 |
| A6 + (B7.5) Glyphosate (CAS 38641-94-0) | 16 + 50 | $E^A = 98$ ($E^B = 93$) Δ = 5 |

| Active compound(s) (Z165) | Application rate [g of a.i./ha] | Herbicidal action in [%] 28 DAT against *Poa annua* L. |
|---|---|---|
| A6 | 16 | 70 |
| | 1 | 50 |
| (B7.5) Glyphosate (CAS 38641-94-0) | 150 | 50 |
| | 50 | 30 |
| A6 + (B7.5) Glyphosate (CAS 38641-94-0) | 16 + 150 | $E^A = 95$ ($E^B = 85$) Δ = 10 |
| | 16 + 50 | $E^A = 95$ ($E^B = 79$) Δ = 16 |
| | 1 + 150 | $E^A = 80$ ($E^B = 75$) Δ = 5 |

TABLE 3.7

Synergistic effect (Δ) for herbicidal binary compositions comprising herbicides from group B8, applied by the post-emergence method

| Active compound(s) (Z80) | Application rate [g of a.i./ha] | Herbicidal action in [%] 14 DAT against *Alopecurus myosuroides* |
|---|---|---|
| A3 | 4 | 75 |
| | 1 | 30 |
| (B8.1) 2,4-D (CAS 1928-44-5) | 300 | 40 |
| | 33 | 20 |
| A3 + (B8.1) 2,4-D (CAS 1928-44-5) | 4 + 300 | $E^A = 95$ ($E^C = 85$) Δ = 10 |
| | 4 + 33 | $E^A = 93$ ($E^C = 80$) Δ = 13 |
| | 1 + 100 | $E^A = 75$ ($E^C = 51$) Δ = 24 |
| | 1 + 33 | $E^A = 60$ ($E^C = 44$) Δ = 16 |

| Active compound(s) (Z80) | Application rate [g of a.i./ha] | Herbicidal action in [%] 28 DAT against *Alopecurus myosuroides* |
|---|---|---|
| A3 | 4 | 60 |
| | 1 | 10 |
| (B8.1) 2,4-D (CAS 1928-44-5) | 300 | 0 |
| | 100 | 0 |
| | 33 | 0 |
| A3 + (B8.1) 2,4-D (CAS 1928-44-5) | 4 + 300 | $E^A = 98$ ($E^C = 60$) Δ = 38 |
| | 4 + 33 | $E^A = 85$ ($E^C = 60$) Δ = 25 |
| | 1 + 300 | $E^A = 20$ ($E^C = 10$) Δ = 10 |
| | 1 + 100 | $E^A = 20$ ($E^C = 10$) Δ = 10 |
| | 1 + 33 | $E^A = 30$ ($E^C = 10$) Δ = 20 |

| Active compound(s) (Z80) | Application rate [g of a.i./ha] | Herbicidal action in [%] 14 DAT against *Bromus sterilis* |
|---|---|---|
| A3 | 1 | 30 |
| (B8.1) 2,4-D (CAS 1928-44-5) | 300 | 20 |
| | 100 | 20 |
| | 33 | 10 |
| A3 + (B8.1) 2,4-D (CAS 94-75-7) | 1 + 300 | $E^A = 60$ ($E^C = 44$) Δ = 16 |
| | 1 + 100 | $E^A = 70$ ($E^C = 44$) Δ = 26 |
| | 1 + 33 | $E^A = 75$ ($E^C = 37$) Δ = 38 |

| Active compound(s) (Z80) | Application rate [g of a.i./ha] | Herbicidal action in [%] 28 DAT against *Bromus sterilis* |
|---|---|---|
| A3 | 4 | 90 |
| | 1 | 30 |
| (B8.1) 2,4-D (CAS 1928-44-5) | 300 | 0 |
| | 100 | 0 |
| | 33 | 0 |
| A3 + (B8.1) 2,4-D (CAS 1928-44-5) | 4 + 300 | $E^A = 95$ ($E^C = 90$) Δ = 5 |
| | 4 + 100 | $E^A = 95$ ($E^C = 90$) Δ = 5 |
| | 4 + 33 | $E^A = 98$ ($E^C = 90$) Δ = 8 |
| | 1 + 33 | $E^A = 40$ ($E^C = 30$) Δ = 10 |

| Active compound(s) (Z80) | Application rate [g of a.i./ha] | Herbicidal action in [%] 14 DAT against *Galium aparine* |
|---|---|---|
| A3 | 1 | 50 |
| (B8.1) 2,4-D (CAS 1928-44-5) | 300 | 40 |
| | 100 | 30 |
| A3 + (B8.1) 2,4-D (CAS 1928-44-5) | 1 + 300 | $E^A = 80$ ($E^C = 70$) Δ = 10 |
| | 1 + 100 | $E^A = 70$ ($E^C = 65$) Δ = 5 |

| Active compound(s) (Z80) | Application rate [g of a.i./ha] | Herbicidal action in [%] 14 DAT against *Lolium rigidum* |
|---|---|---|
| A3 | 4 | 85 |
| | 1 | 40 |
| (B8.1) 2,4-D (CAS 1928-44-5) | 300 | 5 |
| | 100 | 5 |
| | 33 | 5 |
| A3 + (B8.1) 2,4-D (CAS 1928-44-5) | 4 + 300 | $E^A = 93$ ($E^C = 86$) Δ = 7 |
| | 4 + 100 | $E^A = 93$ ($E^C = 86$) Δ = 7 |
| | 4 + 33 | $E^A = 95$ ($E^C = 86$) Δ = 9 |
| | 1 + 300 | $E^A = 60$ ($E^C = 43$) Δ = 17 |
| | 1 + 100 | $E^A = 60$ ($E^C = 43$) Δ = 17 |
| | 1 + 33 | $E^A = 70$ ($E^C = 43$) Δ = 27 |

| Active compound(s) (Z80) | Application rate [g of a.i./ha] | Herbicidal action in [%] 28 DAT against *Lolium rigidum* |
|---|---|---|
| A3 | 4 | 70 |
| | 1 | 10 |
| (B8.1) 2,4-D (CAS 1928-44-5) | 300 | 0 |
| | 100 | 0 |
| | 33 | 0 |
| A3 + (B8.1) 2,4-D (CAS 1928-44-5) | 4 + 300 | $E^A = 85$ ($E^C = 70$) Δ = 15 |
| | 4 + 100 | $E^A = 85$ ($E^C = 70$) Δ = 15 |
| | 4 + 33 | $E^A = 98$ ($E^C = 70$) Δ = 28 |
| | 1 + 300 | $E^A = 20$ ($E^C = 10$) Δ = 10 |

TABLE 3.7-continued

Synergistic effect (Δ) for herbicidal binary compositions comprising herbicides from group B8, applied by the post-emergence method

|   |   |   |
|---|---|---|
|   | 1 + 100 | $E^A = 20$ ($E^C = 10$) $\Delta = 10$ |
|   | 1 + 33 | $E^A = 30$ ($E^C = 10$) $\Delta = 20$ |

| Active compound(s) (Z80) | Application rate [g of a.i./ha] | Herbicidal action in [%] 14 DAT against *Lolium rigidum* (resistant biotype) |
|---|---|---|
| A3 | 4 | 60 |
|  | 1 | 30 |
| (B8.1) 2,4-D | 300 | 5 |
| (CAS 1928-44-5) | 100 | 5 |
|  | 33 | 5 |
| A3 + | 4 + 300 | $E^A = 85$ ($E^C = 62$) $\Delta = 23$ |
| (B8.1) 2,4-D | 4 + 100 | $E^A = 90$ ($E^C = 62$) $\Delta = 28$ |
| (CAS 1928-44-5) | 4 + 33 | $E^A = 85$ ($E^C = 62$) $\Delta = 23$ |
|  | 1 + 300 | $E^A = 50$ ($E^C = 34$) $\Delta = 16$ |
|  | 1 + 100 | $E^A = 50$ ($E^C = 34$) $\Delta = 16$ |
|  | 1 + 33 | $E^A = 70$ ($E^C = 34$) $\Delta = 36$ |

| Active compound(s) (Z80) | Application rate [g of a.i./ha] | Herbicidal action in [%] 28 DAT against *Lolium rigidum* (resistant biotype) |
|---|---|---|
| A3 | 16 | 80 |
|  | 4 | 40 |
|  | 1 | 0 |
| (B8.1) 2,4-D | 100 | 0 |
| (CAS 1928-44-5) | 33 | 0 |
|  | 300 | 0 |
| A3 + | 16 + 100 | $E^A = 95$ ($E^C = 80$) $\Delta = 15$ |
| (B8.1) 2,4-D | 16 + 33 | $E^A = 85$ ($E^C = 80$) $\Delta = 5$ |
| (CAS 1928-44-5) | 4 + 300 | $E^A = 60$ ($E^C = 40$) $\Delta = 20$ |
|  | 4 + 100 | $E^A = 75$ ($E^C = 40$) $\Delta = 35$ |
|  | 4 + 33 | $E^A = 80$ ($E^C = 40$) $\Delta = 40$ |
|  | 1 + 300 | $E^A = 20$ ($E^C = 0$) $\Delta = 20$ |
|  | 1 + 100 | $E^A = 20$ ($E^C = 0$) $\Delta = 20$ |
|  | 1 + 33 | $E^A = 30$ ($E^C = 0$) $\Delta = 30$ |

| Active compound(s) (Z80) | Application rate [g of a.i./ha] | Herbicidal action in [%] 14 DAT against *Matricaria inodora* |
|---|---|---|
| A3 | 1 | 0 |
| (B8.1) 2,4-D | 300 | 85 |
| (CAS 1928-44-5) |  |  |
| A3 + | 1 + 300 | $E^A = 93$ ($E^C = 85$) $\Delta = 8$ |
| (B8.1) 2,4-D |  |  |
| (CAS 1928-44-5) |  |  |

| Active compound(s) (Z80) | Application rate [g of a.i./ha] | Herbicidal action in [%] 14 DAT against *Phalaris minor* |
|---|---|---|
| A3 | 16 | 85 |
|  | 4 | 85 |
|  | 1 | 20 |
| (B8.1) 2,4-D | 300 | 0 |
| (CAS 1928-44-5) | 100 | 0 |
|  | 33 | 0 |
| A3 + | 16 + 300 | $E^A = 98$ ($E^C = 85$) $\Delta = 13$ |
| (B8.1) 2,4-D | 16 + 100 | $E^A = 90$ ($E^C = 85$) $\Delta = 5$ |
| (CAS 1928-44-5) | 16 + 33 | $E^A = 98$ ($E^C = 85$) $\Delta = 13$ |
|  | 4 + 300 | $E^A = 90$ ($E^C = 85$) $\Delta = 5$ |
|  | 4 + 100 | $E^A = 95$ ($E^C = 85$) $\Delta = 10$ |
|  | 4 + 33 | $E^A = 98$ ($E^C = 85$) $\Delta = 13$ |
|  | 1 + 300 | $E^A = 60$ ($E^C = 20$) $\Delta = 40$ |
|  | 1 + 100 | $E^A = 70$ ($E^C = 20$) $\Delta = 50$ |
|  | 1 + 33 | $E^A = 70$ ($E^C = 20$) $\Delta = 50$ |

| Active compound(s) (Z80) | Application rate [g of a.i./ha] | Herbicidal action in [%] 28 DAT against *Phalaris minor* |
|---|---|---|
| A3 | 16 | 85 |
|  | 4 | 85 |
|  | 1 | 10 |
| (B8.1) 2,4-D | 300 | 0 |
| (CAS 1928-44-5) | 33 | 0 |
|  | 100 | 0 |
| A3 + | 16 + 300 | $E^A = 98$ ($E^C = 85$) $\Delta = 13$ |
| (B8.1) 2,4-D | 16 + 33 | $E^A = 100$ ($E^C = 85$) $\Delta = 15$ |
| (CAS 1928-44-5) | 4 + 300 | $E^A = 90$ ($E^C = 85$) $\Delta = 5$ |
|  | 4 + 100 | $E^A = 95$ ($E^C = 85$) $\Delta = 10$ |
|  | 4 + 33 | $E^A = 98$ ($E^C = 85$) $\Delta = 13$ |
|  | 1 + 300 | $E^A = 40$ ($E^C = 10$) $\Delta = 30$ |
|  | 1 + 100 | $E^A = 40$ ($E^C = 10$) $\Delta = 30$ |
|  | 1 + 33 | $E^A = 30$ ($E^C = 10$) $\Delta = 20$ |

| Active compound(s) (Z80) | Application rate [g of a.i./ha] | Herbicidal action in [%] 14 DAT against *Poa annua* L. |
|---|---|---|
| A3 | 16 | 93 |
|  | 4 | 85 |
|  | 1 | 50 |
| (B8.1) 2,4-D | 300 | 0 |
| (CAS 1928-44-5) | 100 | 0 |
|  | 33 | 0 |
| A3 + | 16 + 300 | $E^A = 98$ ($E^C = 93$) $\Delta = 5$ |
| (B8.1) 2,4-D | 16 + 100 | $E^A = 98$ ($E^C = 93$) $\Delta = 5$ |
| (CAS 1928-44-5) | 16 + 33 | $E^A = 98$ ($E^C = 93$) $\Delta = 5$ |
|  | 4 + 300 | $E^A = 98$ ($E^C = 85$) $\Delta = 13$ |
|  | 4 + 100 | $E^A = 98$ ($E^C = 85$) $\Delta = 13$ |
|  | 4 + 33 | $E^A = 95$ ($E^C = 85$) $\Delta = 10$ |
|  | 1 + 300 | $E^A = 75$ ($E^C = 50$) $\Delta = 25$ |
|  | 1 + 100 | $E^A = 70$ ($E^C = 50$) $\Delta = 20$ |
|  | 1 + 33 | $E^A = 75$ ($E^C = 50$) $\Delta = 25$ |

| Active compound(s) (Z80) | Application rate [g of a.i./ha] | Herbicidal action in [%] 28 DAT against *Poa annua* L. |
|---|---|---|
| A3 | 16 | 85 |
|  | 4 | 80 |
|  | 1 | 20 |
| (B8.1) 2,4-D | 300 | 0 |
| (CAS 1928-44-5) | 100 | 0 |
|  | 33 | 0 |
| A3 + | 16 + 300 | $E^A = 100$ ($E^C = 85$) $\Delta = 15$ |
| (B8.1) 2,4-D | 16 + 100 | $E^A = 98$ ($E^C = 85$) $\Delta = 13$ |
| (CAS 1928-44-5) | 16 + 33 | $E^A = 100$ ($E^C = 85$) $\Delta = 15$ |
|  | 4 + 300 | $E^A = 98$ ($E^C = 80$) $\Delta = 18$ |
|  | 4 + 100 | $E^A = 98$ ($E^C = 80$) $\Delta = 18$ |
|  | 4 + 33 | $E^A = 98$ ($E^C = 80$) $\Delta = 18$ |
|  | 1 + 300 | $E^A = 60$ ($E^C = 20$) $\Delta = 40$ |
|  | 1 + 100 | $E^A = 50$ ($E^C = 20$) $\Delta = 30$ |
|  | 1 + 33 | $E^A = 60$ ($E^C = 20$) $\Delta = 40$ |

| Active compound(s) (Z80) | Application rate [g of a.i./ha] | Herbicidal action in [%] 14 DAT against *Veronica hederifolia* |
|---|---|---|
| A3 | 4 | 30 |
|  | 1 | 10 |
| (B8.1) 2,4-D | 33 | 60 |
| (CAS 1928-44-5) |  |  |
| A3 + | 4 + 33 | $E^A = 85$ ($E^C = 72$) $\Delta = 13$ |
| (B8.1) 2,4-D | 1 + 33 | $E^A = 80$ ($E^C = 64$) $\Delta = 16$ |
| (CAS 1928-44-5) |  |  |

| Active compound(s) (Z80) | Application rate [g of a.i./ha] | Herbicidal action in [%] 28 DAT against *Veronica hederifolia* |
|---|---|---|
| A3 | 4 | 50 |
|  | 1 | 30 |
| (B8.1) 2,4-D | 33 | 30 |
| (CAS 1928-44-5) |  |  |

TABLE 3.7-continued

Synergistic effect (Δ) for herbicidal binary compositions comprising herbicides from group B8, applied by the post-emergence method

| Active compound(s) | Application rate [g of a.i./ha] | |
|---|---|---|
| A3 + (B8.1) 2,4-D (CAS 1928-44-5) | 4 + 33 1 + 33 | $E^A = 70\ (E^C = 65)\ \Delta = 5$ $E^A = 70\ (E^C = 51)\ \Delta = 19$ |

| Active compound(s) (Z80) | Application rate [g of a.i./ha] | Herbicidal action in [%] 28 DAT against *Viola tricolor* |
|---|---|---|
| A3 | 1 | 30 |
| (B8.1) 2,4-D (CAS 1928-44-5) | 300 | 85 |
| A3 + (B8.1) 2,4-D (CAS 1928-44-5) | 1 + 300 | $E^A = 95\ (E^C = 89.5)\ \Delta = 5.5$ |

| Active compound(s) (Z81) | Application rate [g of a.i./ha] | Herbicidal action 37 DAT [%] against *Abutilon theophrasti* |
|---|---|---|
| (B8.5) Aclonifen | 500 | 30 |
| A3 | 100 | 75 |
| A3 + (B8.5) Aclonifen | 100 + 500 | $E^A = 87\ (E^C = 82.5)\ \Delta\ 4.5$ |

| Active compound(s) (Z81) | Application rate [g of a.i./ha] | Herbicidal action 37 DAT [%] against *Ipomoea hederacea* |
|---|---|---|
| (B8.5) Aclonifen | 500 | 0 |
| A3 | 100 | 8 |
| A3 + (B8.5) Aclonifen | 100 + 500 | $E^A = 60\ (E^C = 8)\ \Delta\ 52$ |

| Active compound(s) (Z81) | Application rate [g of a.i./ha] | Herbicidal action 27 DAT [%] against *Chenopodium album* |
|---|---|---|
| (B8.5) Aclonifen | 500 | 15 |
| A3 | 100 | 85 |
| A3 + (B8.5) Aclonifen | 100 + 500 | $E^A = 95\ (E^C = 87)\ \Delta\ 8$ |

TABLE 3.8

Synergistic effect (Δ) for herbicidal binary compositions comprising herbicides from group B9, applied by the post-emergence method

| Active compound(s) (Z82) | Application rate [g of a.i./ha] | Herbicidal action 21 DAT [%] against *Brachiaria platyphylla* |
|---|---|---|
| (B9.10) Saflufenacil | 4 | 25 |
| A3 | 1.7 | 20 |
| A3 + (B9.10) Saflufenacil | 1.7 + 4 | $E^A = 55\ (E^C = 40)\ \Delta\ 15$ |

| Active compound(s) (Z82) | Application rate [g of a.i./ha] | Herbicidal action 21 DAT [%] against *Digitaria sanguinalis* |
|---|---|---|
| (B9.10) Saflufenacil | 12 | 50 |
| A3 | 1.7 | 10 |
| A3 + (B9.10) Saflufenacil | 1.7 + 12 | $E^A = 100\ (E^C = 55)\ \Delta\ 45$ |

| Active compound(s) (Z82) | Application rate [g of a.i./ha] | Herbicidal action 21 DAT [%] against *Amaranthus palmeri* |
|---|---|---|
| (B9.10) Saflufenacil | 1.3 | 70 |
| A3 | 1.7 | 0 |
| A3 + (B9.10) Saflufenacil | 1.7 + 1.3 | $E^A = 100\ (E^C = 70)\ \Delta\ 30$ |

TABLE 3.8-continued

Synergistic effect (Δ) for herbicidal binary compositions comprising herbicides from group B9, applied by the post-emergence method

| Active compound(s) (Z82) | Application rate [g of a.i./ha] | Herbicidal action 21 DAT [%] against *Pharbitis purpurea* |
|---|---|---|
| (B9.10) Saflufenacil | 1.3 | 30 |
| A3 | 5 | 80 |
| A3 + (B9.10) Saflufenacil | 5 + 1.3 | $E^A = 99\ (E^C = 86)\ \Delta\ 13$ |

| Active compound(s) | Application rate [g of a.i./ha] | Herbicidal action in [%] 28 DAT against *Poa annua* |
|---|---|---|
| A3 | 1 | 30 |
| (B9.14) Ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate | 10 5 | 60 80 |
| A3 + (B9.14) Ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate | 1 + 10 1 + 5 | $E^A = 85\ (E^C = 72)\ \Delta = 13$ $E^A = 100\ (E^C = 86)\ \Delta = 14$ |

| Active compound(s) | Application rate [g of a.i./ha] | Herbicidal action in [%] 28 DAT against *Centaurea cyano* |
|---|---|---|
| A3 | 16 | 70 |
| (B9.14) Ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy] acetate | 2.5 | 90 |
| A3 + (B9.14) Ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate | 16 + 2.5 | $E^A = 100\ (E^C = 97)\ \Delta = 3$ |

| Active compound(s) | Application rate [g of a.i./ha] | Herbicidal action in [%] 28 DAT against *Galium aparine* |
|---|---|---|
| A3 | 16 4 | 80 70 |
| (B9.14) Ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate | 10 5 | 90 90 |
| A3 + (B9.14) Ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate | 16 + 10 16 + 5 4 + 5 | $E^A = 100\ (E^C = 98)\ \Delta = 2$ $E^A = 100\ (E^C = 98)\ \Delta = 2$ $E^A = 100\ (E^C = 97)\ \Delta = 3$ |

| Active compound(s) | Application rate [g of a.i./ha] | Herbicidal action in [%] 28 DAT against *Matricaria inodora* |
|---|---|---|

TABLE 3.8-continued

Synergistic effect (Δ) for herbicidal binary compositions comprising herbicides from group B9, applied by the post-emergence method

| | | |
|---|---|---|
| A3 | 4 | 0 |
| | 1 | 0 |
| (B9.14) Ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate | 10 | 98 |
| A3 + (B9.14) Ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate | 4 + 10<br>1 + 10 | $E^A = 100$ ($E^C = 98$) Δ = 2<br>$E^A = 100$ ($E^C = 98$) Δ = 2 |

TABLE 3.9

Synergistic effect (Δ) for herbicidal binary compositions comprising herbicides from group B10, applied by the post-emergence method

| Active compound(s) (Z83) | Application rate [g of a.i./ha] | Herbicidal action in [%] 14 DAT against *Alopecurus myosuroides* |
|---|---|---|
| A3 | 4 | 75 |
| | 1 | 30 |
| (B10.5) Diuron | 45 | 20 |
| | 15 | 10 |
| | 5 | 0 |
| A3 + (B10.5) Diuron | 4 + 45 | $E^A = 95$ ($E^C = 80$) Δ = 15 |
| | 4 + 15 | $E^A = 90$ ($E^C = 78$) Δ = 12 |
| | 4 + 5 | $E^A = 90$ ($E^C = 75$) Δ = 15 |
| | 1 + 45 | $E^A = 80$ ($E^C = 44$) Δ = 36 |
| | 1 + 15 | $E^A = 70$ ($E^C = 37$) Δ = 33 |
| | 1 + 5 | $E^A = 70$ ($E^C = 30$) Δ = 40 |

| Active compound(s) (Z83) | Application rate [g of a.i./ha] | Herbicidal action in [%] 28 DAT against *Alopecurus myosuroides* |
|---|---|---|
| A3 | 4 | 60 |
| | 1 | 10 |
| (B10.5) Diuron | 45 | 0 |
| | 15 | 0 |
| | 5 | 0 |
| A3 + (B10.5) Diuron | 4 + 45 | $E^A = 98$ ($E^C = 60$) Δ = 38 |
| | 4 + 15 | $E^A = 85$ ($E^C = 60$) Δ = 25 |
| | 4 + 5 | $E^A = 85$ ($E^C = 60$) Δ = 25 |
| | 1 + 45 | $E^A = 30$ ($E^C = 10$) Δ = 20 |
| | 1 + 15 | $E^A = 30$ ($E^C = 10$) Δ = 20 |
| | 1 + 5 | $E^A = 30$ ($E^C = 10$) Δ = 20 |

| Active compound(s) (Z83) | Application rate [g of a.i./ha] | Herbicidal action in [%] 14 DAT against *Bromus sterilis* |
|---|---|---|
| A3 | 4 | 90 |
| | 1 | 30 |
| (B10.5) Diuron | 5 | 0 |
| | 45 | 30 |
| | 15 | 10 |
| A3 + (B10.5) Diuron | 4 + 5 | $E^A = 95$ ($E^C = 90$) Δ = 5 |
| | 1 + 45 | $E^A = 70$ ($E^C = 51$) Δ = 19 |
| | 1 + 15 | $E^A = 85$ ($E^C = 37$) Δ = 48 |
| | 1 + 5 | $E^A = 85$ ($E^C = 30$) Δ = 55 |

| Active compound(s) (Z83) | Application rate [g of a.i./ha] | Herbicidal action in [%] 28 DAT against *Bromus sterilis* |
|---|---|---|

TABLE 3.9-continued

Synergistic effect (Δ) for herbicidal binary compositions comprising herbicides from group B10, applied by the post-emergence method

| | | |
|---|---|---|
| A3 | 1 | 30 |
| (B10.5) Diuron | 15 | 0 |
| | 5 | 0 |
| A3 + (B10.5) Diuron | 1 + 15<br>1 + 5 | $E^A = 60$ ($E^C = 30$) Δ = 30<br>$E^A = 40$ ($E^C = 30$) Δ = 10 |

| Active compound(s) (Z83) | Application rate [g of a.i./ha] | Herbicidal action in [%] 14 DAT against *Centaurea cyanus* |
|---|---|---|
| A3 | 1 | 30 |
| (B10.5) Diuron | 5 | 10 |
| A3 + (B10.5) Diuron | 1 + 5 | $E^A = 50$ ($E^C = 37$) Δ = 13 |

| Active compound(s) (Z83) | Application rate [g of a.i./ha] | Herbicidal action in [%] 14 DAT against *Galium aparine* |
|---|---|---|
| A3 | 1 | 50 |
| (B10.5) Diuron | 5 | 0 |
| A3 + (B10.5) Diuron | 1 + 5 | $E^A = 60$ ($E^C = 50$) Δ = 10 |

| Active compound(s) (Z83) | Application rate [g of a.i./ha] | Herbicidal action in [%] 14 DAT against *Lamium purpureum* L. |
|---|---|---|
| A3 | 1 | 70 |
| (B10.5) Diuron | 5 | 5 |
| A3 + (B10.5) Diuron | 1 + 5 | $E^A = 80$ ($E^C = 72$) Δ = 9 |

| Active compound(s) (Z83) | Application rate [g of a.i./ha] | Herbicidal action in [%] 28 DAT against *Lamium purpureum* L. |
|---|---|---|
| A3 | 1 | 50 |
| (B10.5) Diuron | 5 | 0 |
| A3 + (B10.5) Diuron | 1 + 5 | $E^A = 75$ ($E^C = 50$) Δ = 25 |

| Active compound(s) (Z83) | Application rate [g of a.i./ha] | Herbicidal action in [%] 14 DAT against *Lolium rigidum* |
|---|---|---|
| A3 | 4 | 85 |
| | 1 | 40 |
| (B10.5) Diuron | 45 | 5 |
| | 5 | 0 |
| | 15 | 0 |
| A3 + (B10.5) Diuron | 4 + 45 | $E^A = 93$ ($E^C = 86$) Δ = 7 |
| | 4 + 5 | $E^A = 93$ ($E^C = 85$) Δ = 8 |
| | 1 + 45 | $E^A = 70$ ($E^C = 43$) Δ = 27 |
| | 1 + 15 | $E^A = 80$ ($E^C = 40$) Δ = 40 |
| | 1 + 5 | $E^A = 70$ ($E^C = 40$) Δ = 30 |

| Active compound(s) (Z83) | Application rate [g of a.i./ha] | Herbicidal action in [%] 28 DAT against *Lolium rigidum* |
|---|---|---|
| A3 | 4 | 70 |
| | 1 | 10 |
| (B10.5) Diuron | 45 | 0 |
| | 15 | 0 |
| | 5 | 0 |
| A3 + (B10.5) Diuron | 4 + 45 | $E^A = 85$ ($E^C = 70$) Δ = 15 |
| | 4 + 15 | $E^A = 80$ ($E^C = 70$) Δ = 10 |
| | 4 + 5 | $E^A = 95$ ($E^C = 70$) Δ = 25 |
| | 1 + 45 | $E^A = 30$ ($E^C = 10$) Δ = 20 |
| | 1 + 15 | $E^A = 50$ ($E^C = 10$) Δ = 40 |
| | 1 + 5 | $E^A = 40$ ($E^C = 10$) Δ = 30 |

| Active compound(s) (Z83) | Application rate [g of a.i./ha] | Herbicidal action in [%] 14 DAT against *Lolium rigidum* (resistant biotype) |
|---|---|---|

TABLE 3.9-continued

Synergistic effect (Δ) for herbicidal binary compositions comprising herbicides from group B10, applied by the post-emergence method

| Active compound(s) (Z83) | Application rate [g of a.i./ha] | Herbicidal action |
|---|---|---|
| A3 | 4 | 60 |
|  | 1 | 30 |
| (B10.5) Diuron | 45 | 5 |
|  | 15 | 0 |
|  | 5 | 0 |
| A3 + | 4 + 45 | $E^A = 85$ ($E^C = 62$) $\Delta = 23$ |
| (B10.5) Diuron | 4 + 15 | $E^A = 85$ ($E^C = 60$) $\Delta = 25$ |
|  | 4 + 5 | $E^A = 85$ ($E^C = 60$) $\Delta = 25$ |
|  | 1 + 45 | $E^A = 60$ ($E^C = 34$) $\Delta = 26$ |
|  | 1 + 15 | $E^A = 50$ ($E^C = 30$) $\Delta = 20$ |
|  | 1 + 5 | $E^A = 40$ ($E^C = 30$) $\Delta = 10$ |

| Active compound(s) (Z83) | Application rate [g of a.i./ha] | Herbicidal action in [%] 28 DAT against *Lolium rigidum* (resistant biotype) |
|---|---|---|
| A3 | 4 | 40 |
|  | 1 | 0 |
| (B10.5) Diuron | 45 | 0 |
|  | 15 | 0 |
|  | 5 | 0 |
| A3 + | 4 + 45 | $E^A = 75$ ($E^C = 40$) $\Delta = 35$ |
| (B10.5) Diuron | 4 + 15 | $E^A = 70$ ($E^C = 40$) $\Delta = 30$ |
|  | 4 + 5 | $E^A = 70$ ($E^C = 40$) $\Delta = 30$ |
|  | 1 + 45 | $E^A = 30$ ($E^C = 0$) $\Delta = 30$ |
|  | 1 + 15 | $E^A = 30$ ($E^C = 0$) $\Delta = 30$ |
|  | 1 + 5 | $E^A = 30$ ($E^C = 0$) $\Delta = 30$ |

| Active compound(s) (Z83) | Application rate [g of a.i./ha] | Herbicidal action in [%] 14 DAT against *Matricaria inodora* |
|---|---|---|
| A3 | 4 | 30 |
|  | 1 | 0 |
| (B10.5) Diuron | 5 | 0 |
|  | 15 | 0 |
| A3 + | 4 + 5 | $E^A = 40$ ($E^C = 30$) $\Delta = 10$ |
| (B10.5) Diuron | 1 + 15 | $E^A = 20$ ($E^C = 0$) $\Delta = 20$ |

| Active compound(s) (Z83) | Application rate [g of a.i./ha] | Herbicidal action in [%] 28 DAT against *Matricaria inodora* |
|---|---|---|
| A3 | 1 | 0 |
| (B10.5) Diuron | 15 | 0 |
| A3 + (B10.5) Diuron | 1 + 15 | $E^A = 20$ ($E^C = 0$) $\Delta = 20$ |

| Active compound(s) (Z83) | Application rate [g of a.i./ha] | Herbicidal action in [%] 14 DAT against *Phalaris minor* |
|---|---|---|
| A3 | 16 | 85 |
|  | 4 | 85 |
|  | 1 | 20 |
| (B10.5) Diuron | 45 | 0 |
|  | 15 | 0 |
|  | 5 | 0 |
| A3 + | 16 + 45 | $E^A = 95$ ($E^C = 85$) $\Delta = 10$ |
| (B10.5) Diuron | 16 + 15 | $E^A = 95$ ($E^C = 85$) $\Delta = 10$ |
|  | 16 + 5 | $E^A = 95$ ($E^C = 85$) $\Delta = 10$ |
|  | 4 + 45 | $E^A = 95$ ($E^C = 85$) $\Delta = 10$ |
|  | 4 + 15 | $E^A = 95$ ($E^C = 85$) $\Delta = 10$ |
|  | 4 + 5 | $E^A = 95$ ($E^C = 85$) $\Delta = 10$ |
|  | 1 + 45 | $E^A = 60$ ($E^C = 20$) $\Delta = 40$ |
|  | 1 + 15 | $E^A = 40$ ($E^C = 20$) $\Delta = 20$ |
|  | 1 + 5 | $E^A = 50$ ($E^C = 20$) $\Delta = 30$ |

| Active compound(s) (Z83) | Application rate [g of a.i./ha] | Herbicidal action in [%] 28 DAT against *Phalaris minor* |
|---|---|---|
| A3 | 16 | 85 |
|  | 4 | 85 |
|  | 1 | 10 |
| (B10.5) Diuron | 45 | 0 |
|  | 5 | 0 |
|  | 15 | 0 |
| A3 + | 16 + 45 | $E^A = 98$ ($E^C = 85$) $\Delta = 13$ |
| (B10.5) Diuron | 16 + 5 | $E^A = 98$ ($E^C = 85$) $\Delta = 13$ |
|  | 4 + 45 | $E^A = 98$ ($E^C = 85$) $\Delta = 13$ |
|  | 4 + 15 | $E^A = 98$ ($E^C = 85$) $\Delta = 13$ |
|  | 4 + 5 | $E^A = 95$ ($E^C = 85$) $\Delta = 10$ |
|  | 1 + 45 | $E^A = 30$ ($E^C = 10$) $\Delta = 20$ |
|  | 1 + 15 | $E^A = 30$ ($E^C = 10$) $\Delta = 20$ |
|  | 1 + 5 | $E^A = 20$ ($E^C = 10$) $\Delta = 10$ |

| Active compound(s) (Z83) | Application rate [g of a.i./ha] | Herbicidal action in [%] 14 DAT against *Poa annua* L. |
|---|---|---|
| A3 | 16 | 93 |
|  | 4 | 85 |
|  | 1 | 50 |
| (B10.5) Diuron | 45 | 0 |
|  | 15 | 0 |
|  | 5 | 0 |
| A3 + | 16 + 45 | $E^A = 98$ ($E^C = 93$) $\Delta = 5$ |
| (B10.5) Diuron | 16 + 15 | $E^A = 98$ ($E^C = 93$) $\Delta = 5$ |
|  | 16 + 5 | $E^A = 98$ ($E^C = 93$) $\Delta = 5$ |
|  | 4 + 45 | $E^A = 98$ ($E^C = 85$) $\Delta = 13$ |
|  | 4 + 15 | $E^A = 98$ ($E^C = 85$) $\Delta = 13$ |
|  | 4 + 5 | $E^A = 98$ ($E^C = 85$) $\Delta = 13$ |
|  | 1 + 45 | $E^A = 75$ ($E^C = 50$) $\Delta = 25$ |
|  | 1 + 15 | $E^A = 80$ ($E^C = 50$) $\Delta = 30$ |
|  | 1 + 5 | $E^A = 85$ ($E^C = 50$) $\Delta = 35$ |

| Active compound(s) (Z83) | Application rate [g of a.i./ha] | Herbicidal action in [%] 28 DAT against *Poa annua* L. |
|---|---|---|
| A3 | 16 | 85 |
|  | 4 | 80 |
|  | 1 | 20 |
| (B10.5) Diuron | 45 | 0 |
|  | 15 | 0 |
|  | 5 | 0 |
| A3 + | 16 + 45 | $E^A = 98$ ($E^C = 85$) $\Delta = 13$ |
| (B10.5) Diuron | 16 + 15 | $E^A = 98$ ($E^C = 85$) $\Delta = 13$ |
|  | 16 + 5 | $E^A = 100$ ($E^C = 85$) $\Delta = 15$ |
|  | 4 + 45 | $E^A = 98$ ($E^C = 80$) $\Delta = 18$ |
|  | 4 + 15 | $E^A = 98$ ($E^C = 80$) $\Delta = 18$ |
|  | 4 + 5 | $E^A = 98$ ($E^C = 80$) $\Delta = 18$ |
|  | 1 + 45 | $E^A = 60$ ($E^C = 20$) $\Delta = 40$ |
|  | 1 + 15 | $E^A = 50$ ($E^C = 20$) $\Delta = 30$ |
|  | 1 + 5 | $E^A = 70$ ($E^C = 20$) $\Delta = 50$ |

| Active compound(s) (Z83) | Application rate [g of a.i./ha] | Herbicidal action in [%] 14 DAT against *Veronica hederifolia* |
|---|---|---|
| A3 | 4 | 30 |
|  | 1 | 10 |
| (B10.5) Diuron | 5 | 0 |
|  | 45 | 0 |
| A3 + | 4 + 5 | $E^A = 60$ ($E^C = 30$) $\Delta = 30$ |
| (B10.5) Diuron | 1 + 45 | $E^A = 30$ ($E^C = 10$) $\Delta = 20$ |
|  | 1 + 5 | $E^A = 30$ ($E^C = 10$) $\Delta = 20$ |

| Active compound(s) (Z83) | Application rate [g of a.i./ha] | Herbicidal action in [%] 28 DAT against *Veronica hederifolia* |
|---|---|---|
| A3 | 1 | 30 |
| (B10.5) Diuron | 15 | 0 |
|  | 5 | 0 |
| A3 + | 1 + 15 | $E^A = 50$ ($E^C = 30$) $\Delta = 20$ |
| (B10.5) Diuron | 1 + 5 | $E^A = 50$ ($E^C = 30$) $\Delta = 20$ |

| Active compound(s) (Z83) | Application rate [g of a.i./ha] | Herbicidal action in [%] 14 DAT against *Viola tricolor* |
|---|---|---|

TABLE 3.9-continued

Synergistic effect (Δ) for herbicidal binary compositions comprising herbicides from group B10, applied by the post-emergence method

| | | |
|---|---|---|
| A3 | 1 | 60 |
| (B10.5) Diuron | 5 | 10 |
| A3 + (B10.5) Diuron | 1 + 5 | $E^A = 70$ ($E^C = 64$) Δ = 6 |

| Active compound(s) (Z83) | Application rate [g of a.i./ha] | Herbicidal action in [%] 28 DAT against *Viola tricolor* |
|---|---|---|
| A3 | 16 | 70 |
| | 1 | 30 |
| (B10.5) Diuron | 5 | 0 |
| | 45 | 0 |
| | 15 | 0 |
| A3 + (B10.5) Diuron | 16 + 5 | $E^A = 75$ ($E^C = 70$) Δ = 5 |
| | 1 + 45 | $E^A = 60$ ($E^C = 30$) Δ = 30 |
| | 1 + 15 | $E^A = 60$ ($E^C = 30$) Δ = 30 |
| | 1 + 5 | $E^A = 70$ ($E^C = 30$) Δ = 40 |

TABLE 3.10

Synergistic effect (Δ) for herbicidal binary compositions comprising herbicides from group B11, applied by the post-emergence method

| Active compound(s) | Application rate [g of a.i./ha] | Herbicidal action 28 DAT [%] against *Brachiaria plantaginea* |
|---|---|---|
| (B11.2) Atrazine | 1000 | 0 |
| A3 | 100 | 82 |
| A3 + (B11.2) Atrazine | 100 + 1000 | $E^A = 88$ ($E^C = 82$) Δ 7 |

| Active compound(s) | Application rate [g of a.i./ha] | Herbicidal action 37 DAT [%] against *Digitaria sanguinalis* |
|---|---|---|
| (B11.2) Atrazine | 1000 | 5 |
| A3 | 100 | 94 |
| A3 + (B11.2) Atrazine | 100 + 1000 | $E^A = 99$ ($E^C = 94$) Δ 5 |

| Active compound(s) | Application rate [g of a.i./ha] | Herbicidal action 37 DAT [%] against *Ipomoea hederacea* |
|---|---|---|
| (B11.2) Atrazine | 1000 | 10 |
| A3 | 100 | 8 |
| A3 + (B11.2) Atrazine | 100 + 1000 | $E^A = 35$ ($E^C = 17.2$) Δ 17.8 |

| Active compound(s) | Application rate [g of a.i./ha] | Herbicidal action 21 DAT [%] against *Abutilon theophrasti* |
|---|---|---|
| (B11.2) Atrazine | 450 | 20 |
| | 150 | 15 |
| | 50 | 0 |
| A3 | 15 | 45 |
| | 1.7 | 10 |
| A3 + (B11.2) Atrazine | 1.7 + 450 | $E^A = 65$ ($E^C = 28$) Δ 37 |
| | 15 + 150 | $E^A = 75$ ($E^C = 53.25$) Δ 22 |
| | 15 + 50 | $E^A = 55$ ($E^C = 45$) Δ 10 |

| Active compound(s) | Application rate [g of a.i./ha] | Herbicidal action 21 DAT [%] against *Amaranthus palmeri* |
|---|---|---|
| (B11.2) Atrazine | 50 | 70 |
| A3 | 5 | 0 |
| A3 + (B11.2) Atrazine | 5 + 50 | $E^A = 30$ ($E^C = 15$) Δ 15 |

TABLE 3.10-continued

Synergistic effect (Δ) for herbicidal binary compositions comprising herbicides from group B11, applied by the post-emergence method

| Active compound(s) | Application rate [g of a.i./ha] | Herbicidal action 21 DAT [%] against *Bidens pilosa* |
|---|---|---|
| (B11.2) Atrazine | 450 | 15 |
| A3 | 5 | 10 |
| | 1.7 | 0 |
| A3 + (B11.2) Atrazine | 5 + 450 | $E^A = 65$ ($E^C = 24$) Δ 41 |
| | 1.7 + 450 | $E^A = 45$ ($E^C = 15$) Δ 30 |

| Active compound(s) (Z86) | Application rate [g of a.i./ha] | Herbicidal action 28 DAT [%] against *Brachiaria plantaginea* |
|---|---|---|
| (B11.6) Indaziflam | 50 | 0 |
| A3 | 100 | 82 |
| A3 + (B11.6) Indaziflam | 100 + 50 | $E^A = 96$ ($E^C = 82$) Δ 14 |

| Active compound(s) (Z86) | Application rate [g of a.i./ha] | Herbicidal action 28 DAT [%] against *Digitaria horizontalis* |
|---|---|---|
| (B11.6) Indaziflam | 50 | 3 |
| A3 | 100 | 96 |
| A3 + (B11.6) Indaziflam | 100 + 50 | $E^A = 100$ ($E^C = 96$) Δ 4 |

| Active compound(s) (Z86) | Application rate [g of a.i./ha] | Herbicidal action 28 DAT [%] against *Brachiaria decumbens* |
|---|---|---|
| (B11.6) Indaziflam | 50 | 15 |
| A3 | 100 | 87 |
| A3 + (B11.6) Indaziflam | 100 + 50 | $E^A = 100$ ($E^C = 89$) Δ 11 |

| Active compound(s) (Z86) | Application rate [g of a.i./ha] | Herbicidal action 28 DAT [%] against *Panicum maximum* |
|---|---|---|
| (B11.6) Indaziflam | 50 | 0 |
| A3 | 100 | 82 |
| A3 + (B11.6) Indaziflam | 100 + 50 | $E^A = 87$ ($E^C = 82$) Δ 5 |

| Active compound(s) (Z86) | Application rate [g of a.i./ha] | Herbicidal action in [%] 14 DAT against *Alopecurus myosuroides* |
|---|---|---|
| A3 | 4 | 75 |
| | 1 | 30 |
| (B11.6) Indaziflam | 36 | 40 |
| | 12 | 30 |
| | 4 | 0 |
| A3 + (B11.6) Indaziflam | 4 + 36 | $E^A = 95$ ($E^C = 85$) Δ = 10 |
| | 4 + 12 | $E^A = 90$ ($E^C = 83$) Δ = 7 |
| | 4 + 4 | $E^A = 95$ ($E^C = 75$) Δ = 20 |
| | 1 + 36 | $E^A = 80$ ($E^C = 58$) Δ = 22 |
| | 1 + 12 | $E^A = 75$ ($E^C = 51$) Δ = 24 |
| | 1 + 4 | $E^A = 85$ ($E^C = 30$) Δ = 55 |

| Active compound(s) (Z86) | Application rate [g of a.i./ha] | Herbicidal action in [%] 28 DAT against *Alopecurus myosuroides* |
|---|---|---|
| A3 | 4 | 60 |
| | 1 | 10 |
| (B11.6) Indaziflam | 36 | 70 |
| | 12 | 20 |
| | 4 | 0 |
| A3 + (B11.6) Indaziflam | 4 + 36 | $E^A = 98$ ($E^C = 88$) Δ = 10 |
| | 4 + 12 | $E^A = 85$ ($E^C = 68$) Δ = 17 |
| | 4 + 4 | $E^A = 90$ ($E^C = 60$) Δ = 30 |
| | 1 + 12 | $E^A = 50$ ($E^C = 28$) Δ = 22 |
| | 1 + 4 | $E^A = 60$ ($E^C = 10$) Δ = 50 |

TABLE 3.10-continued

Synergistic effect (Δ) for herbicidal binary compositions comprising herbicides from group B11, applied by the post-emergence method

| Active compound(s) (Z86) | Application rate [g of a.i./ha] | Herbicidal action in [%] 14 DAT against *Bromus sterilis* |
|---|---|---|
| A3 | 1 | 30 |
| (B11.6) Indaziflam | 36 | 70 |
|  | 12 | 50 |
|  | 4 | 30 |
| A3 + (B11.6) Indaziflam | 1 + 36 | $E^A = 93$ ($E^C = 79$) Δ = 14 |
|  | 1 + 12 | $E^A = 85$ ($E^C = 65$) Δ = 20 |
|  | 1 + 4 | $E^A = 90$ ($E^C = 51$) Δ = 39 |

| Active compound(s) (Z86) | Application rate [g of a.i./ha] | Herbicidal action in [%] 28 DAT against *Bromus sterilis* |
|---|---|---|
| A3 | 1 | 30 |
| (B11.6) Indaziflam | 4 | 30 |
| A3 + (B11.6) Indaziflam | 1 + 4 | $E^A = 60$ ($E^C = 51$) Δ = 9 |

| Active compound(s) (Z86) | Application rate [g of a.i./ha] | Herbicidal action in [%] 14 DAT against *Lolium rigidum* |
|---|---|---|
| A3 | 4 | 85 |
|  | 1 | 40 |
| (B11.6) Indaziflam | 4 | 10 |
|  | 36 | 50 |
|  | 12 | 40 |
| A3 + (B11.6) Indaziflam | 4 + 4 | $E^A = 95$ ($E^C = 87$) Δ = 8 |
|  | 1 + 36 | $E^A = 85$ ($E^C = 70$) Δ = 15 |
|  | 1 + 12 | $E^A = 80$ ($E^C = 64$) Δ = 16 |
|  | 1 + 4 | $E^A = 75$ ($E^C = 46$) Δ = 29 |

| Active compound(s) (Z86) | Application rate [g of a.i./ha] | Herbicidal action in [%] 28 DAT against *Lolium rigidum* |
|---|---|---|
| A3 | 4 | 70 |
|  | 1 | 10 |
| (B11.6) Indaziflam | 12 | 60 |
|  | 4 | 30 |
| A3 + (B11.6) Indaziflam | 4 + 12 | $E^A = 98$ ($E^C = 88$) Δ = 10 |
|  | 4 + 4 | $E^A = 98$ ($E^C = 79$) Δ = 19 |
|  | 1 + 12 | $E^A = 70$ ($E^C = 64$) Δ = 6 |
|  | 1 + 4 | $E^A = 50$ ($E^C = 37$) Δ = 13 |

| Active compound(s) (Z86) | Application rate [g of a.i./ha] | Herbicidal action in [%] 14 DAT against *Lolium rigidum* (resistant biotype) |
|---|---|---|
| A3 | 4 | 60 |
|  | 1 | 30 |
| (B11.6) Indaziflam | 36 | 50 |
|  | 4 | 20 |
|  | 12 | 40 |
| A3 + (B11.6) Indaziflam | 4 + 36 | $E^A = 95$ ($E^C = 80$) Δ = 15 |
|  | 4 + 4 | $E^A = 85$ ($E^C = 68$) Δ = 17 |
|  | 1 + 36 | $E^A = 80$ ($E^C = 65$) Δ = 15 |
|  | 1 + 12 | $E^A = 70$ ($E^C = 58$) Δ = 12 |
|  | 1 + 4 | $E^A = 60$ ($E^C = 44$) Δ = 16 |

| Active compound(s) (Z86) | Application rate [g of a.i./ha] | Herbicidal action in [%] 28 DAT against *Lolium rigidum* (resistant biotype) |
|---|---|---|
| A3 | 4 | 40 |
|  | 1 | 0 |
| (B11.6) Indaziflam | 36 | 80 |
|  | 4 | 30 |
| A3 + | 4 + 36 | $E^A = 98$ ($E^C = 88$) Δ = 10 |
| (B11.6) Indaziflam | 4 + 4 | $E^A = 80$ ($E^C = 58$) Δ = 22 |
|  | 1 + 36 | $E^A = 85$ ($E^C = 80$) Δ = 5 |
|  | 1 + 4 | $E^A = 40$ ($E^C = 30$) Δ = 10 |

| Active compound(s) (Z86) | Application rate [g of a.i./ha] | Herbicidal action in [%] 14 DAT against *Matricaria inodora* |
|---|---|---|
| A3 | 1 | 0 |
| (B11.6) Indaziflam | 36 | 90 |
| A3 + (B11.6) Indaziflam | 1 + 36 | 95 ($E^C = 90$) Δ = 5 |

| Active compound(s) (Z86) | Application rate [g of a.i./ha] | Herbicidal action in [%] 14 DAT against *Phalaris minor* |
|---|---|---|
| A3 | 16 | 85 |
|  | 4 | 85 |
|  | 1 | 20 |
| (B11.6) Indaziflam | 4 | 10 |
|  | 36 | 75 |
| A3 + (B11.6) Indaziflam | 16 + 4 | $E^A = 95$ ($E^C = 87$) Δ = 8 |
|  | 4 + 4 | $E^A = 95$ ($E^C = 87$) Δ = 8 |
|  | 1 + 36 | $E^A = 90$ ($E^C = 80$) Δ = 10 |
|  | 1 + 4 | $E^A = 40$ ($E^C = 28$) Δ = 12 |

| Active compound(s) (Z86) | Application rate [g of a.i./ha] | Herbicidal action in [%] 28 DAT against *Phalaris minor* |
|---|---|---|
| A3 | 16 | 85 |
|  | 4 | 85 |
|  | 1 | 10 |
| (B11.6) Indaziflam | 4 | 30 |
|  | 36 | 80 |
| A3 + (B11.6) Indaziflam | 16 + 4 | $E^A = 98$ ($E^C = 90$) Δ = 8 |
|  | 4 + 4 | $E^A = 95$ ($E^C = 90$) Δ = 5 |
|  | 1 + 36 | $E^A = 98$ ($E^C = 82$) Δ = 16 |

| Active compound(s) (Z86) | Application rate [g of a.i./ha] | Herbicidal action in [%] 14 DAT against *Poa annua* L. |
|---|---|---|
| A3 | 4 | 85 |
|  | 1 | 50 |
| (B11.6) Indaziflam | 4 | 30 |
|  | 36 | 85 |
|  | 12 | 85 |
| A3 + (B11.6) Indaziflam | 4 + 4 | $E^A = 98$ ($E^C = 90$) Δ = 8 |
|  | 1 + 36 | $E^A = 98$ ($E^C = 93$) Δ = 5 |
|  | 1 + 12 | $E^A = 98$ ($E^C = 93$) Δ = 5 |
|  | 1 + 4 | $E^A = 90$ ($E^C = 65$) Δ = 25 |

| Active compound(s) (Z86) | Application rate [g of a.i./ha] | Herbicidal action in [%] 28 DAT against *Poa annua* L. |
|---|---|---|
| A3 | 16 | 85 |
|  | 4 | 80 |
|  | 1 | 20 |
| (B11.6) Indaziflam | 4 | 30 |
|  | 36 | 85 |
|  | 12 | 85 |
| A3 + (B11.6) Indaziflam | 16 + 4 | $E^A = 100$ ($E^C = 90$) Δ = 10 |
|  | 4 + 4 | $E^A = 98$ ($E^C = 86$) Δ = 12 |
|  | 1 + 36 | $E^A = 100$ ($E^C = 88$) Δ = 12 |
|  | 1 + 12 | $E^A = 100$ ($E^C = 88$) Δ = 12 |
|  | 1 + 4 | $E^A = 80$ ($E^C = 44$) Δ = 36 |

| Active compound(s) (Z87) | Application rate [g of a.i./ha] | Herbicidal action 21 DAT [%] against *Brachiaria platyphylla* |
|---|---|---|
| (B11.8) Metribuzin | 50 | 25 |
| A3 | 1.7 | 20 |

TABLE 3.10-continued

Synergistic effect (Δ) for herbicidal binary compositions comprising herbicides from group B11, applied by the post-emergence method

| A3 + | 1.7 + 50 | $E^A = 50$ ($E^C = 40$) Δ 10 |
|---|---|---|
| (B11.8) Metribuzin | | |

| Active compound(s) (Z87) | Application rate [g of a.i./ha] | Herbicidal action 21 DAT [%] against *Digitaria sanguinalis* |
|---|---|---|
| (B11.8) Metribuzin | 50 | 20 |
| A3 | 1.7 | 10 |
| A3 + (B11.8) Metribuzin | 1.7 + 50 | $E^A = 60$ ($E^C = 28$) Δ 32 |

TABLE 3.10

Synergistic effect (Δ) for herbicidal ternary compositions comprising herbicides from group B5 and B10, applied by the post-emergence method

| Active compound(s) | Application rate [g of a.i./ha] | Herbicidal action 27 DAT [%] against *Chenopodium album* |
|---|---|---|
| (B5.27) Fluridone + (B10.7) Fluometuron | 14.4 + 72 | 28 |
| A3 | 100 | 85 |
| A3 + (B5.27) Fluridone + (B10.7) Fluometuron | 100 + 14.4 + 72 | $E^A = 97$ ($E^C = 89$) Δ 8 |

| Active compound(s) | Application rate | Herbicidal action 37 DAT [%] against *Echinochloa crus-galli* |
|---|---|---|
| (B5.27) Fluridone + (B10.7) Fluometuron | 14.4 + 72 g ae/ha | 0 |
| A3 | 100 g a.i./ha | 93 |
| A3 + (B5.27) Fluridone + (B10.7) Fluometuron | 100 g a.i./ha + 14.4 + 72 g ae/ha | $E^A = 96$ ($E^C = 93$) Δ 3 |

The invention claimed is:

1. A composition comprising:

an herbicidally active compound (A) selected from the group consisting of A1, A2, A3, A4, A5 and A6, or an agrochemically acceptable salt thereof, where A1-A6 are defined as follows:

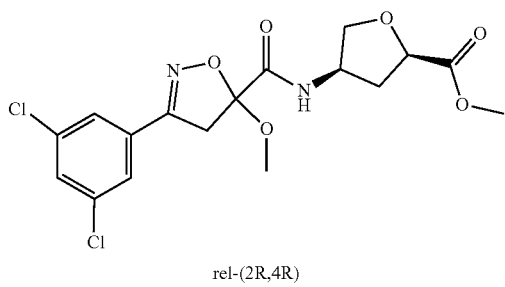

rel-(2R,4R)

A1

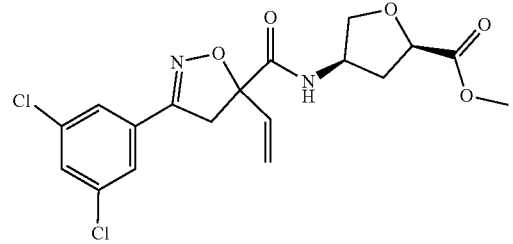

rel-(2R,4R)

A2

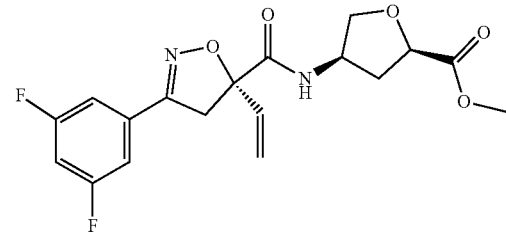

rel-(2R,4R)

A3

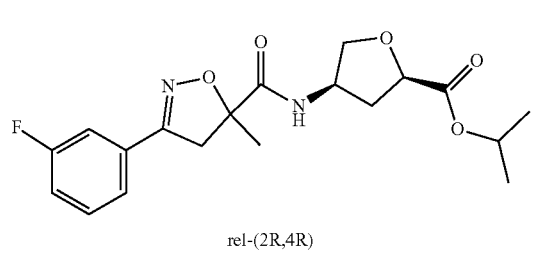

rel-(2R,4R)

A4

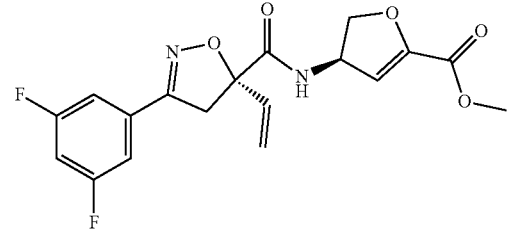

A5

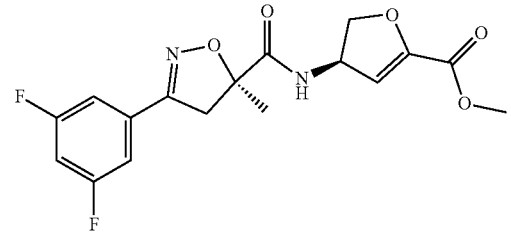

A6 and;

at least one herbicide (B) selected from the group of consisting of:
(B1.7) mesotrione,
(B1.14) tembotrione,
(B2.4) asulam,
(B2.18) diflufenican,
(B2.28) flufenacet,
(B2.31) foramsulfuron,
(B2.37) mesosulfuron,
(B2.63) rimsulfuron,
(B2.64) S-metolachlor,
(B2.68) thiencarbazone, (B3.1) bromoxynil,
(B4.8) carfentrazone,
(B4.11) imazamox,
(B4.13) imazapyr,
(B4.18) isoxaflutole,
(B4.22) pyrasulfotole,
(B4.25) pyroxasulfone,
(B5.7) bixlozone,
(B5.23) florpyrauxifen,
(B5.26) flumioxazin,
(B5.27) fluridone,
(B5.31) halauxifen,
B5.37) paraquat,
(B7.4) glufosinate,
(B7.5) glyphosate,
(B8.1) 2,4-D,
(B8.5) aclonifen,
(B9.10) saflufenacil,
(B9.14) ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy]acetate,
(B10.5) diuron,
(B10.7) fluometuron,
(B11.2) atrazine
(B11.6) indaziflam and
(B11.8) metribuzin.

2. The composition according to claim 1, wherein the herbicidally active compound (A) and herbicide (B) are in a weight ratio of from 1:100000 to 2000:1.

3. The composition according claim 2, wherein the herbicidally active compound (A) and herbicide (B) are in a weight ratio of from 1:15000 to 500:1.

4. The composition according to claim 1, comprising one or more further active crop protection compounds.

5. The composition according to claim 1, further comprising one or more agriculturally acceptable additives in crop protection.

6. A method for controlling one or more harmful plants and/or for regulating the growth of one or more plants, the method comprising applying the herbicidal composition according to claim 1 to the plants, at least one part of the plants, seeds of the plants, and/or an area under cultivation.

7. The method according to claim 6, where the active compound components (A) and (B) of the herbicidal composition are applied jointly or separately by a pre-emergence method, a post-emergence method and/or by a pre- and post-emergence method to the plants, plant parts, plant seeds and/or the area under cultivation.

8. The method according to claim 7, where the herbicide component (A) is applied at an application rate of 0.01 to 1000 g of a.i./ha.

9. The method according to claim 7, where the herbicide component (B) is applied at an application rate of 0.01 to 4000 g of a.i./ha, except for pelargonic acid, which is applied at an application rate of 1 to 100 000 g of a.i./ha.

10. The method according to claim 7 for controlling harmful plants wherein the herbicidal composition is applied before a sowing of one or more crop plants.

11. The method according to claim 7, where the active components (A) and (B) of the herbicidal composition are applied in the form of a herbicidal composition comprising one or more additives customary in crop protection.

12. The method according to claim 7 for controlling harmful plants wherein the herbicidal composition is applied to plantation crops.

13. The method according to claim 7 for controlling harmful plants wherein the herbicidal composition is applied to non-crop land.

14. The method according to claim 7, where the active components (A) and (B) of the herbicidal composition are applied after dilution with water.

\* \* \* \* \*